US007624052B1

(12) United States Patent
Seaman et al.

(10) Patent No.: US 7,624,052 B1
(45) Date of Patent: Nov. 24, 2009

(54) METHODS AND SYSTEMS FOR PROCESSING AND MANAGING CORPORATE ACTION INFORMATION INCLUDING VOLUNTARY AND MANDATORY CORPORATE ACTION DATA

(75) Inventors: Kimberly D. Seaman, Phoenixville, PA (US); Melissa Go, Warminster, PA (US); Virginia Kern, Charlotte, NC (US); Louise Glass, Edmond, OK (US); Robert Hallowell, West Deptford, NJ (US); Sharon Stirling, Springfield, PA (US); Janet Cleary, Upper Darby, PA (US)

(73) Assignee: The PNC Financial Services Group, Inc., Pittsburgh, PA (US)

( * ) Notice: Subject to any disclaimer, the term of this patent is extended or adjusted under 35 U.S.C. 154(b) by 1223 days.

(21) Appl. No.: 10/631,165

(22) Filed: Jul. 31, 2003

Related U.S. Application Data

(60) Provisional application No. 60/399,929, filed on Jul. 31, 2002.

(51) Int. Cl.
*G06Q 40/00* (2006.01)

(52) U.S. Cl. ............................ 705/35; 705/38; 705/36; 705/37

(58) Field of Classification Search .................. 705/34, 705/35–38
See application file for complete search history.

(56) References Cited

U.S. PATENT DOCUMENTS 5,101,353 A 3/1992 Lupien et al.
6,014,642 A 1/2000 El-Kadi et al.
6,021,397 A * 2/2000 Jones et al. ............... 705/36 R
6,192,347 B1 2/2001 Graff
6,629,081 B1 9/2003 Cornelius et al.
6,853,974 B1 2/2005 Akifuji et al.
6,856,970 B1 2/2005 Campbell et al.
6,996,563 B2 2/2006 Kumagai et al.
7,181,493 B2 2/2007 English et al.
7,264,154 B2 9/2007 Harris
7,376,588 B1 5/2008 Gregov et al.
7,389,265 B2 6/2008 Lawrence et al.
7,469,341 B2 12/2008 Edgett et al.

(Continued)

OTHER PUBLICATIONS

Group 1 Software Posts Sharply Higher Profit; [Final Edition] Krissah Williams. The Washington Post. Washington, D.C.: Jul. 31, 2002. p. E.05.*

(Continued)

*Primary Examiner*—Frantzy Poinvil
*Assistant Examiner*—Clement Graham
(74) *Attorney, Agent, or Firm*—K&L Gates LLP

(57) ABSTRACT

In one embodiment, in a financial institution, a method is provided for managing corporate action information of at least one entity. The method includes receiving data associated with at least one corporate action of at least one of the entities, wherein the corporate action data includes data associated with at least one of a voluntary corporate action and a mandatory corporate action; matching at least a portion of the corporate action data to at least one client of the financial institution; generating at least one notification including at least a portion of the corporate action data; and, performing at least one workflow management activity in connection with generating the notification including the corporate action data. System and computer-readable media embodiments are also provided.

42 Claims, 72 Drawing Sheets

U.S. PATENT DOCUMENTS

| | | | | |
|---|---|---|---|---|
| 2001/0042785 | A1* | 11/2001 | Walker et al. | 235/379 |
| 2002/0023085 | A1* | 2/2002 | Keith, Jr. | 707/5 |
| 2002/0032642 | A1 | 3/2002 | Chichilnisky | |
| 2002/0049705 | A1 | 4/2002 | Haviv-Segal et al. | |
| 2002/0065752 | A1 | 5/2002 | Lewis | |
| 2002/0087454 | A1 | 7/2002 | Calo et al. | |
| 2002/0091635 | A1 | 7/2002 | Dilip et al. | |
| 2002/0138389 | A1 | 9/2002 | Martone et al. | |
| 2002/0184133 | A1 | 12/2002 | Zangari et al. | |
| 2003/0040929 | A1 | 2/2003 | Knegendorf et al. | |
| 2003/0051164 | A1 | 3/2003 | Patton | |
| 2003/0074342 | A1 | 4/2003 | Curtis | |
| 2003/0078794 | A1 | 4/2003 | Knapp | |
| 2004/0024693 | A1 | 2/2004 | Lawrence | |
| 2004/0117302 | A1* | 6/2004 | Weichert et al. | 705/40 |
| 2004/0254988 | A1 | 12/2004 | Rodriguez | |
| 2005/0091524 | A1 | 4/2005 | Abe et al. | |
| 2005/0102210 | A1 | 5/2005 | Song et al. | |
| 2005/0131752 | A1 | 6/2005 | Gracie et al. | |
| 2006/0089894 | A1 | 4/2006 | Balk et al. | |
| 2008/0262961 | A1 | 10/2008 | Dellomo et al. | |

OTHER PUBLICATIONS

Equant Partners with Network Appliance to Improve Enterprise Customers' Access to the Internet and Their Intranet Business Applications Business Editors/High-Tech Writers. Business Wire. New York: Jul 31, 2003. p. 1.*

"Xcitek offers Exchange Data International data via Xcitek.com," printed from http://www.exchange-data.com/products/press/xcitek.asp Internet site, accessed on Jun. 28, 2002, 3 pages.

"Corporate Actions Processing System," printed from http://www.exchange-data.com/products/corpactprocess.asp Internet site, accessed on Jun. 28, 2002, 5 pages.

Cristina McEachern, "Raymond James Signs With Xcitek For Corporate Actions Processing," *Wall Street & Technology Magazine*, printed from http://www.wallstreetandtech.com/story/mag/WST20010514S0011 Internet site, accessed on Jun. 27, 2002, 2 pages.

"eActions: A Unique and Exciting Corporate Actions Notification Service," printed from http://www.eactions.hubdata.com/ Internet site, accessed on Jun. 27, 2002, 1 page.

"Meeting the Needs of Growing Advisors," printed from http://www.eactions.hubdata.com/info.asp Internet site, accessed on Jun. 27, 2002, 2 pages.

"Frequently Asked Questions," printed from http://www.eactions.hubdata.com/faq.asp Internet site, accessed on Jun. 27, 2002, 2 pages.

"CAMS Corporate Actions Management System," printed from http://www.effsols.com/statichtml/camspg.html Internet site, accessed on Jun. 11, 2002, 1 page.

"Sponsors," printed from http://www.sia.com/ops2002/html/sponsors.html, Internet site, accessed on Jul. 1, 2002, 10 pages.

Xcitek Consulting Services, Inc., "System Features & Functionality," Sep. 1996, New York, NY, 17 pages.

Xcitek and Solutions Plus, "The Xcitek Solutions Plus Corporate Actions Processing Application, System Features & Functionality," Mar. 1999, New York, NY, 32 pages.

"Xcitek Update," Summer 1996, 1 page.

"Now You Can Take Complete Control of all Corporate Actions Plus Provide Proper Notification to Your Clients," Solutionsplus, 1 page.

U.S. Appl. No. 10/631,243, filed Jul. 31, 2003.

U.S. Appl. No. 60/613,672, filed Sep. 28, 2004.

U.S. Appl. No. 12/117,387, filed May 8, 2008.

U.S. Appl. No. 11/237,501, filed Sep. 28, 2005.

U.S. Appl. No. 12/019,964, filed Jan. 25, 2008.

"Customer Identification Program Notice," printed from http://www.tricontinental.com/public/general/cip_ notice.html, Internet site, accessed on Aug. 15, 2006, 1 page.

"Bankers Systems, Inc. develops new product packages to help finanacial institutions comply with USA Patroit Act," Bankers Systems Inc.®, Press Release dated Mar. 4, 2002, printed from http://www.bankerssystems.com/newsroom/Press_ Releases/press23.html, Internet site, accessed on Aug. 15, 2006, 3 pages.

"Customer Identification Programs Proposed for Mutual Funds," Investment Company Institute, Jul. 18, 2002, printed from http://www.ici.org/issues/fserv/arc-reg/02_treas_aml_cips.html, INternet site, accessed on Aug. 15, 2006, 2 pages.

Dian Vujovich, "The Patriot Act and Mutual Funds," *My Weekly Column*, printed from http://www.diansfundfreebies.com/other/111003.html, Internet site, accessed on Aug. 15, 2006, 3 pages.

"Customer Identification Programs," printed from http://www.choicepoint.net/ChoicePoint/business/financial/patriotact.html, Internet site, accessed on Aug. 15, 2006, 2 pages.

"New York Bankers Service Corporation Selects Bankers Systems to Help Member Banks Comply with USA Patriot Act," Bankers Systems Inc.®, Press Release dated Sep. 22, 2003, printed from http://www.bankerssystems.com/newsroom/Press_Releases/press55.html, Internet site, accesses on Aug. 15, 2006, 2 pages.

"Bankers Systems adds OFAC WatchDog™ software to its USA Patriot Act solutions," Bankers Systems Inc.®, Press Release dated Jun. 13, 2002, printed from http://www.bankerssystems.com/newsroom/Press_Releases/press29.html, Internet site, accessed on Aug. 15, 2006, 2 pages.

Jessica Pallay, "CIP Hits the Street," dated Oct. 10, 2003, printed from http://www.castlecops.com/modules.php?name=News&file=print&sid=3547, Internet site, accesses on Aug. 15, 2006, 2 pages.

Laura Bruce, "Patriot Act makes banks pry into new accounts," posted Sep. 30, 2003, printed from http://www.bankrate.com/brm/news/bank/20030930a1.asp, Internet site, accessed on Aug. 15, 2006, 6 pages.

"Holistic Compliance," *Wall Street & Technology*, dated Nov. 17, 2003, printed from http://www.wallstreetandtech.com/showArticle.jhtml?articleID=16100954, Internet site, accessed on Aug. 15, 2006, 5 pages.

"PFPC to Tailor AML Tech for Hedge Funds," *Operations Management*, www.operationsmanagement.com, Oct. 13, 2003, p. 5.

Matt Ackermann, "PFPC Offers Funds ID Rule Compliance Help," *American Banker*, Sep. 30, 2003, 2 pages.

"PFPC Offers New Patriot Act Compliance Service for Fund Managers," dated Oct. 7, 2003, printed from http://www.newsdesk.fundnexus.com/newsdesk/newsdesk.asp?StoryID=2234&target=1&rp=1, Internet site, accessed on Oct. 7, 2003, 1 page.

"PFPC Delivers AML System," *Fund Action*, http://www.fundaction.com, dated Oct. 6, 2003, p. 6.

"Tool aids compliance with USA Patriot Act," *InvestmentNews*, Oct. 20, 2003, p. 27.

Tom Leswing, "ICI Surveys Members on Money Laundering Policies," dated Oct. 31, 2003, printed from http://www.ignites.com/home/members/print.article.html?id=974218951, Internet site, accessed on Oct. 31, 2003, 2 pages.

Tom Leswing, "Firms Mostly Up to Speed on Customer ID Regs," dated Oct. 24, 2003, printed from http://www.ignites.com/home/members/print.article.html?id-974218868, Internet site, accessed on OCt. 24, 2003, 2 pages.

"PFPC to Offer Customer Identification Program (CIP) Services," PFPC Press Release dated Sep. 29, 2003, 3 pages.

PFPC, Transfer Agency Division, Customer Identification Program ("CIP") Services Description, Jul. 24, 2003, 3 pages.

PFPC, Transfer Agency Division, Answers to Frequently Asked Questions about Mutual Fund Customer Identification Programs, May 16, 2003, 2 pages.

"Mantas Anti-Money Laundering", printed from http://www.mantas.com/Products/RegulatorvCompliance/AntiMonevLaundering.html Internet site, accessed on May 31, 2007, 3 pages.

"Mantas Supports Section 312 of US Patriot Act," printed from http://www.mantas.com/Products/RegulatoryCompliance/USAPA312.html Internet site, accessed on May 31, 2007, 2 pages.

Protiviti Inc., "Guide to U.S. Anti-Money Laundering Requirements Frequently Asked Questions," http://web.archive.org/web/20061026211517/http://www.roberthalfmr.com/External_Sites/ downloads/Rhmr/rhmr- us/RHMR_Link/ffinancial_reporting/ProtivitiAMLFAQGuidev2.pdf, Oct. 26, 2006, Second Edition, pp. 31-32.
Memorandum from Investment Company Institute dated May 2, 2003 regarding "SEC and Treasury Adopt Final Customer Identification Program Ruel for Mutual Funds," 8 pages.
Memorandum from Investment Company Institute dated Aug. 12, 2003 regarding "Additional Guidance Issued on Final customer Identification Program Rule," 6 pages.
Memorandum from Investment Company Institute dated Jan. 9, 2004 regarding "Additional AML Guidance Issued on Customer Identification Program Rule," 11 pages.
Satish M. Kini, "Designing Robust Anti-Money Laundering Programs for Mutual Funds," printed from https://www.ai-aba.ora/aliaba/BUSINESS/BUSWOS_0ct04.pdf, Internet site, accessed Jan. 27, 2005, 12 pages.
Actimize - Brokerage Compliance, Anti-Money Laundering, Financial Fraud Prevention, "Solutions - AML/USPA Compliance," printed from http://www.actimize.com/asp/sub/asp?sec=116&sub=947, Internet site, accessed on Jan. 27, 2005, 4 pages.
Paul Adams, "Anti-Terrorist Rules Make It Harder to Open New Bank, Brokerage Account," printed from http://www.consumerwatchdog.org/corporate/nw/nw003637.pho3, Internet site, accessed on Jan. 27, 2005, 4 pages.
Office Action dated Jun. 26, 2008 for U.S. Appl. No. 10/631,243, filed Jul. 31, 2003.
Office Action dated Mar. 18, 2009 for U.S. Appl. No. 10/631,243, filed Jul. 31, 2003.
Office Action dated Sep. 4, 2008 for U.S. Appl. No. 11/237,501, filed Sep. 28, 2005.
Office Action dated Nov. 9, 2007 for U.S. Appl. No. 11/237,331, filed Sep. 28, 2005.
Office Action dated Dec. 30, 2008 for U.S. Appl. No. 12/019,964, filed Jan. 25, 2008.
Office Action dated Apr. 9, 2009 for U.S. Appl. No. 12/113,387, filed May 8, 2008.
Office Action dated May 28, 2009 for U.S. Appl. No. 11/237,501, filed Sep. 28, 2005.

* cited by examiner

*PNC Corporate Action Types*

Valid PNC Indicator values represent the following types of announcements: Mandatory, Voluntary, Redemption, Informational, Class Action.

| PNC Event Type | PNC Action Type | PNC Indicator | Eligibility Calculation | Xcitek Code | Important Date 1 | Important Date 2 | Display Template |
|---|---|---|---|---|---|---|---|
| Exchange / Conversions | Conversion | Volu | Expiration Date | L | Expiration Date | | Vol |
| | Conversion | Mand | Effective Date | L | Effective Date | DTC ASD (Anticipated Swing Date) | Eff |
| | Exchange | Mand | Effective Date | X, ?, U | Effective Date | DTC ASD | Eff |
| | Exchange | Volu | Expiration Date | X | Expiration Date | | Vol |
| | Unit Split | Mand | Effective Date | S | Effective Date | DTC ASD | Eff |
| | Partial Pre-Refunding | Mand | Publication Date | = | Depository Lottery Date | Publication Date | Red |

FIG. 4A

| PNC Event Type | PNC Action Type | PNC Indicator | Eligibility Calculation | Xcitek Code | Important Date 1 | Important Date 2 | Display T mplate |
|---|---|---|---|---|---|---|---|
| Splits / Distributions | Distribution | Mand | Ex-Date (if present) OR Static Record Date. | # | Ex Date | Payable Date | Ex |
| | Spin-Off | Mand | Ex-Date (XRP **or** RPX) | 9 | Ex Date | Due Bill Settlement | Ex |
| | Stock Split | Mand | Ex-Date (RPX) | 7 | Ex Date | Due Bill Settlement | Ex |
| **Reverse Splits / Name Changes** | Reverse Stock Split | Mand | Effective Date | + | Effective Date | DTC ASD | Eff |
| | Name Change | Mand | Effective Date | $ | Effective Date | DTC ASD | Eff |
| Dividends | Stock Dividend | Mand | Ex-Date OR Static Record Date | / | Payable Date | | Ex |
| | Optional Dividend | Volu | Ex-Date (if present) OR Static Record Date. | # | Expiration Date | Payable Date | Vol |

FIG. 4B

| PNC Event Type | PNC Action Type | PNC Indicator | Eligibility Calculation | Xcitek Code | Important Date 1 | Important Date 2 | Display Template |
|---|---|---|---|---|---|---|---|
| **Redemptions** | Full Pre-Refundings | Redm | Current Position | ! | Redemption Date | | Red |
| | Full Redemption | Redm | Payable Date | * (star) | Redemption Date | | Red |
| | Partial Redemption | Redm | Publication Date | 2 | Depository Lottery Date | Redemption Date | Red |
| | Put - Mandatory | Redm | Redemption Date | I | Redemption Date | | Red |
| | Put – Mandatory with Right to Retain | Volu | Expiration Date | I | Expiration Date | Payable Date | Vol |
| | Put - Optional | Volu | Expiration Date | V | Expiration Date | Payable Date | Vol |
| | UIT Terminations | Volu | Expiration Date | E | Expiration Date | Payable Date | Vol |
| | Conversion / Redemption | Volu | Expiration Date | L and * or 2 | Expiration Date | Payable Date | Vol |

FIG. 4C

| PNC Event Type | PNC Action Type | PNC Indicator | Eligibility Calculation | Xcitek Code | Important Date 1 | Important Date 2 | Display Template |
|---|---|---|---|---|---|---|---|
| Mergers | Merger | Mand | Effective Date | M | Effective Date | DTC ASD | Eff |
| | Merger Election | Volu | Expiration Date | - | Expiration Date | | Vol |
| Rights / Warrants | Rights Issue | Mand | Ex-Date OR Static Record Date | % | Ex Date | Payable Date | Vol |
| | Rights Offer | Volu | Expiration Date | % | Expiration Date | | Vol |
| | Warrant Exercise | Volu | Expiration Date | H | Expiration Date | | Vol |
| | Rights Plan – Adoption | Inf | Effective Date | 8 | Effective Date | | Eff |

FIG. 4D

| PNC Event Type | PNC Action Type | PNC Indicator | Eligibility Calculation | Xcitek Code | Important Date 1 | Important Date 2 | Display Template |
|---|---|---|---|---|---|---|---|
| **Offers** | Consent | Volu | Record Date (if present) OR Expiration Date | ( | Expiration Date | Record Date | Vol |
| | Tender-Consent | Volu | Expiration Date | ) | Expiration Date | Record Date | Vol |
| | Odd Lot Tender | Volu | Odd Lot Record Date (if present); OR Odd Lot Expiration Date. | ; | Expiration Date | Record Date | Vol |
| | Tender Offer | Volu | Expiration Date | T | Expiration Date | | Vol |
| | Fixed Spread Tender | Volu | Expiration Date | T | Expiration Date | | Vol |
| | Mini-Tenders | Volu | Expiration Date | T | Expiration Date | | Vol |

FIG. 4E

| PNC Event Type | PNC Action Type | PNC Indicator | Eligibility Calculation | Xcitek Code | Imp rtant Date 1 | Important Date 2 | Display Template |
|---|---|---|---|---|---|---|---|
| Bids | Dutch Auction | Volu | Expiration Date | T | Expiration Date | | Vol |
| | Bid Tender | Volu | Expiration Date | T | Expiration Date | | Vol |
| Others | Bankruptcy | Inf | Effective Date; calculate entitlement once | & | Announcement Date | | Eff |
| | Consent | Inf | Record Date (if present) OR Expiration Date | ( | Expiration Date | | Vol |
| | Default | Inf | Effective Date | Z | Announcement Date | | Eff |
| | Escrow to Maturity | Inf | Effective Date | > | Announcement Date | | Red |
| | Informational | Inf | Current Holders | E, O | Announcement Date | | Eff |
| | Informational | Volu | Current Holders | E | Expiration Date | | Vol |
| | Lawsuit | Clas | None | W | Expiration Date | | Vol |
| | Liquidation | Mand | Static Record Date | K | Effective Date | Payable Date | Eff |
| | Registration Statement | Volu | Expiration Date | | Expiration Date | | Vol |

FIG. 4F

FIG. 6C
Response Queue
Done
Local intranet

PNC ADVISORS
The Thinking Behind The Money.

Responses Due

Corporate Action Notification
Date: 01/11/2001 @ 12:52 PM
To: Local Market Group Name Action Type: Consent
Security Name: Advest Group
Desc Line 2
Desc Line 3
CUSIP #: 123456789
Offeror: rlkjdsklfjeklsdurioe
Record Date: mm/dd/yyyy
Ex Date: mm/dd/yyyy PNC Specialist: Sharon Graham
Telephone #: 215-749-6998
Fax #: 215-749-3939
CASPR ID: 123456
Withdrawal Privilege: Yes (No)
Withdrawal Date: mm/dd/yyyy Announcement Status: New
PNC Deadline: mm/dd/yyyy @ 5:00pm
Expiration Date: mm/dd/yyyy @ 12:00am
Depos. Expiration Date: mm/dd/yyyy @ 12:00am
Payable Date: mm/dd/yyyy Terms: this would be the announcement text as found in the master announcement.
There could be many lines.

Officer/Advisor: 999 - T Rowe Price

| Account Number Name | Pos Status | | Current Position | Any & All | Cash | Any & All | Stock | Any & All | Cash & Stock | Any & All | Option 4 | Any & All | Option 5 |
|---|---|---|---|---|---|---|---|---|---|---|---|---|---|
| xx-xx-xxx-xxxxxxx A. Individual | N | | 400.000 | ☐ | | | | ☐ | | | | ☐ | |
| xx-xx-xxx-xxxxxxx B. Company | I | | 79,300.000 | ☐ | | | | ☐ | | | | ☐ | |
| xx-xx-xxx-xxxxxxx C. Company | | | 120,933.000 | ☐ | | | | ☐ | | | | ☐ | |
| xx-xx-xxx-xxxxxxx D. Company | | FYI WH 01 | 1.000 | ☐ | | | | ☐ | | | | ☐ | |

CHECKING THE ANY & ALL BOX FOR AN ELECTION WILL APPLY TO ALL CURRENT AND SUBSEQUENT INCREASES TO POSITIONS

ANY RESPONSES RECEIVED AFTER THE PNC DEADLINE WILL BE PROCESSED ON A BEST EFFORTS BASIS ONLY

AUTHORIZED SIGNATURE DATE

Page 1 of 1

FIG. 21

Responses Received today

| Specialist | Status | Acknowledgement | ExpDT | Cusip | Description | Action | BROA | Inst Qty | All | Option Title | CASPR ID | NotificDT | PFPC RespNum | PFPC RespDT | CASPR RecvDT | Reason |
|---|---|---|---|---|---|---|---|---|---|---|---|---|---|---|---|---|
| Ayyaz | Rejected | | 07/21/2003 05:00 PM | 800907AE7 | SANMINA-SCI CORP | Exchange | xxxxxxxxxxxxxx | 790,000.000 | Y | Exchange | 25408 | 7/1/2003 4:06:37 PM | 4151 | 7/3/2003 4:05:56 PM | 7/3/2003 4:33:39 PM | Acct has existing responsc |
| Matt | Rejected | | 07/07/2003 05:00 PM | 712713106 | PEOPLESOFT INC | Tender Offer | xxxxxxxxxxxxxx | 68,100.000 | Y | No Action | 24702 | 7/3/2003 12:06:58 PM | 4132 | 7/3/2003 4:00:57 PM | 7/3/2003 4:33:39 PM | Acct has existing response |
| Matt | Accepted | | 07/07/2003 05:00 PM | 712713106 | PEOPLESOFT INC | Tender Offer | xxxxxxxxxxxxxx | 11,930.000 | Y | No Action | 24702 | 7/3/2003 12:06:58 PM | 4140 | 7/3/2003 4:00:59 PM | 7/3/2003 4:33:39 PM | |
| Matt | Rejected | | 07/07/2003 05:00 PM | 712713106 | PEOPLESOFT INC | Tender Offer | xxxxxxxxxxxxxx | 3,400.000 | Y | No Action | 24702 | 7/3/2003 12:06:58 PM | 4133 | 7/3/2003 4:00:59 PM | 7/3/2003 4:33:39 PM | Acct has existing response |
| Matt | Accepted | | 07/08/2003 05:00 PM | 67575J102 | ODD JOB STORES INC | Tender Offer | xxxxxxxxxxxxxx | 1,000.000 | Y | No Action | 24290 | 7/3/2003 11:06:39 AM | 4148 | 7/3/2003 4:03:19 PM | 7/3/2003 4:33:39 PM | |
| Matt | Accepted | | 07/08/2003 05:00 PM | 67575J102 | ODD JOB STORES INC | Tender Offer | xxxxxxxxxxxxxx | 9,000.000 | Y | No Action | 24290 | 7/3/2003 11:06:39 AM | 4149 | 7/3/2003 4:03:20 PM | 7/3/2003 4:33:39 PM | |
| Matt | Accepted | | 07/08/2003 05:00 PM | 67575J102 | ODD JOB STORES INC | Tender Offer | xxxxxxxxxxxxxx | 199,500.000 | Y | No Action | 24290 | 7/3/2003 11:06:39 AM | 4145 | 7/3/2003 4:03:18 PM | 7/3/2003 4:33:39 PM | |
| Matt | Accepted | | 07/08/2003 05:00 PM | 67575J102 | ODD JOB STORES INC | Tender Offer | xxxxxxxxxxxxxx | 12,700.000 | Y | No Action | 24290 | 7/3/2003 11:06:39 AM | 4146 | 7/3/2003 4:03:19 PM | 7/3/2003 4:33:39 PM | |

Responses Acknowledged today that were received prior to today

| Specialist | Status | Acknowledgement | ExpDT | Cusip | Description | Action | BROA | Inst Qty | All | Option Title | CASPR ID | NotificDT | PFPC RespNum | PFPC RespDT | CASPR RecvDT | Reason |
|---|---|---|---|---|---|---|---|---|---|---|---|---|---|---|---|---|
| Matt | Accepted | Jerry Jul 3 2003 9:59AM | 07/07/2003 05:00 PM | 712713106 | PEOPLESOFT INC | Tender Offer | xxxxxxxxxxxxxx | 6,602.000 | Y | No Action | 24702 | 7/2/2003 2:06:55 PM | 4138 | 7/2/2003 4:37:41 PM | 7/2/2003 5:33:39 PM | |
| Ayyaz | Accepted | Ayyaz Jul 3 2003 10:07AM | | 419794VJ8 | HAWAII ST AIRPORT SYS - PT 111 | Mandatory Put w/Rt to Retain | xxxxxxxxxxxxxx | 2,495,000.000 | Y | Put | 25384 | 6/30/2003 2:06:38 PM | 4139 | 7/2/2003 4:38:54 PM | 7/2/2003 5:33:39 PM | |

FIG. 31B

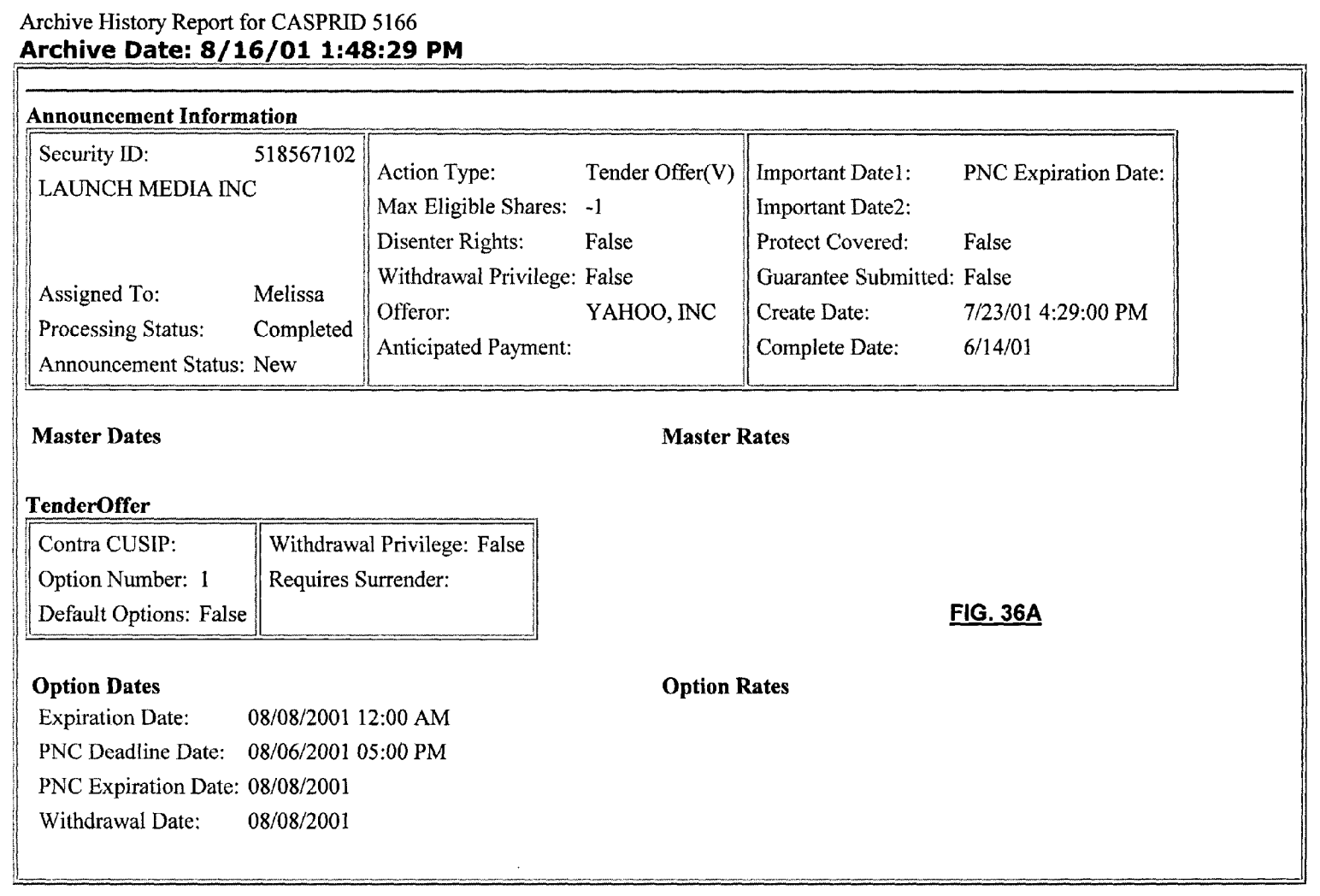

Archive History Report for CASPRID 5166

Archive Date: 8/16/01 1:48:29 PM

Announcement Information

| | | | | | |
|---|---|---|---|---|---|
| Security ID: | 518567102 | Action Type: | Tender Offer(V) | Important Date1: | PNC Expiration Date: |
| LAUNCH MEDIA INC | | Max Eligible Shares: | -1 | Important Date2: | |
| | | Disenter Rights: | False | Protect Covered: | False |
| Assigned To: | Melissa | Withdrawal Privilege: | False | Guarantee Submitted: | False |
| Processing Status: | Completed | Offeror: | YAHOO, INC | Create Date: | 7/23/01 4:29:00 PM |
| Announcement Status: | New | Anticipated Payment: | | Complete Date: | 6/14/01 |

Master Dates

Master Rates

TenderOffer

| | | | |
|---|---|---|---|
| Contra CUSIP: | | Withdrawal Privilege: | False |
| Option Number: | 1 | Requires Surrender: | |
| Default Options: | False | | |

FIG. 36A

Option Dates

| | |
|---|---|
| Expiration Date: | 08/08/2001 12:00 AM |
| PNC Deadline Date: | 08/06/2001 05:00 PM |
| PNC Expiration Date: | 08/08/2001 |
| Withdrawal Date: | 08/08/2001 |

Option Rates

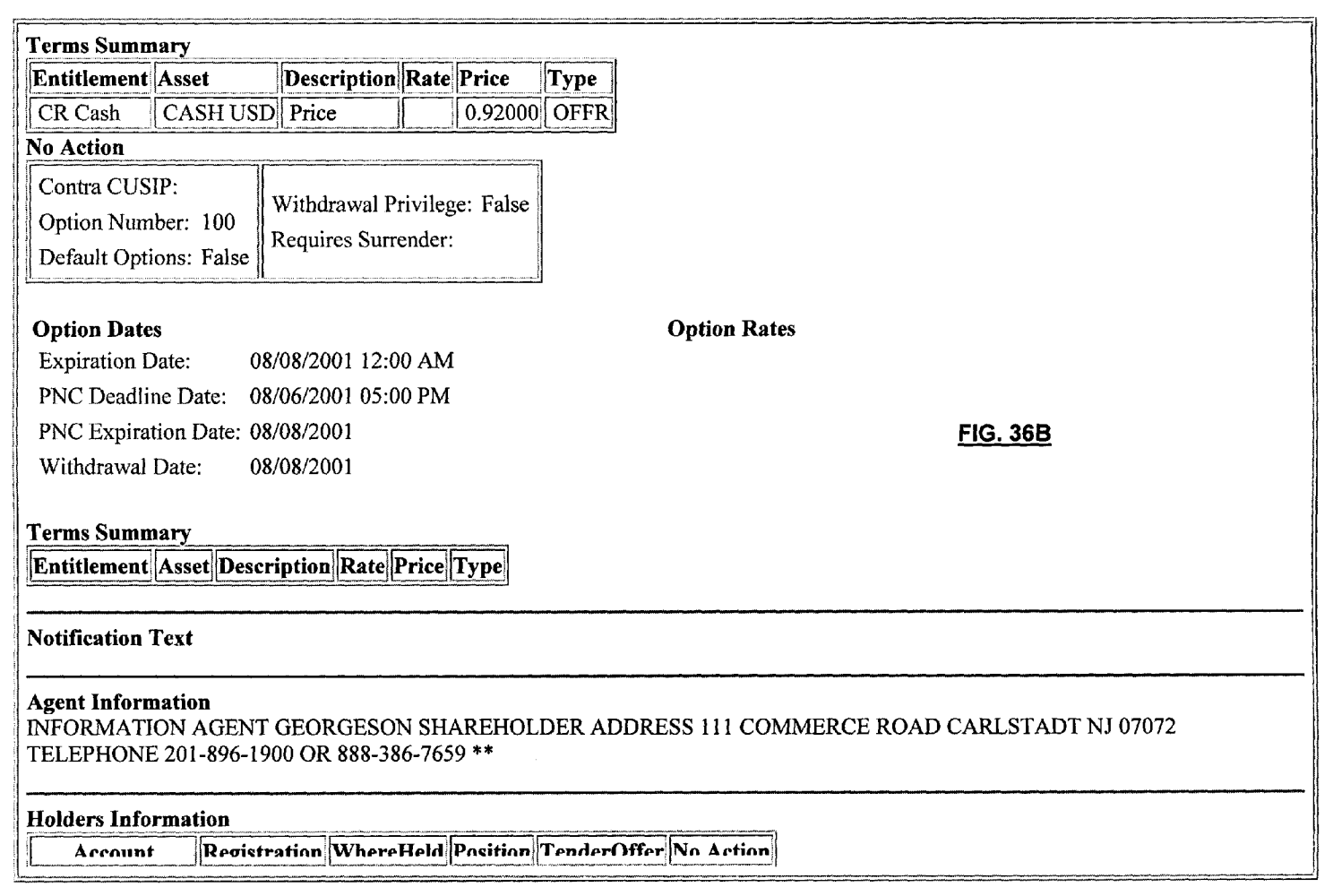

Terms Summary

| Entitlement | Asset | Description | Rate | Price | Type |
|---|---|---|---|---|---|
| CR Cash | CASH USD | Price | | 0.92000 | OFFR |

No Action

| | |
|---|---|
| Contra CUSIP:<br>Option Number: 100<br>Default Options: False | Withdrawal Privilege: False<br>Requires Surrender: |

Option Dates

Expiration Date: 08/08/2001 12:00 AM
PNC Deadline Date: 08/06/2001 05:00 PM
PNC Expiration Date: 08/08/2001
Withdrawal Date: 08/08/2001

Option Rates

Terms Summary

| Entitlement | Asset | Description | Rate | Price | Type |
|---|---|---|---|---|---|

Notification Text

Agent Information

INFORMATION AGENT GEORGESON SHAREHOLDER ADDRESS 111 COMMERCE ROAD CARLSTADT NJ 07072
TELEPHONE 201-896-1900 OR 888-386-7659 **

Holders Information

| Account | Registration | WhereHeld | Position | TenderOffer | No Action |
|---|---|---|---|---|---|

FIG. 36B

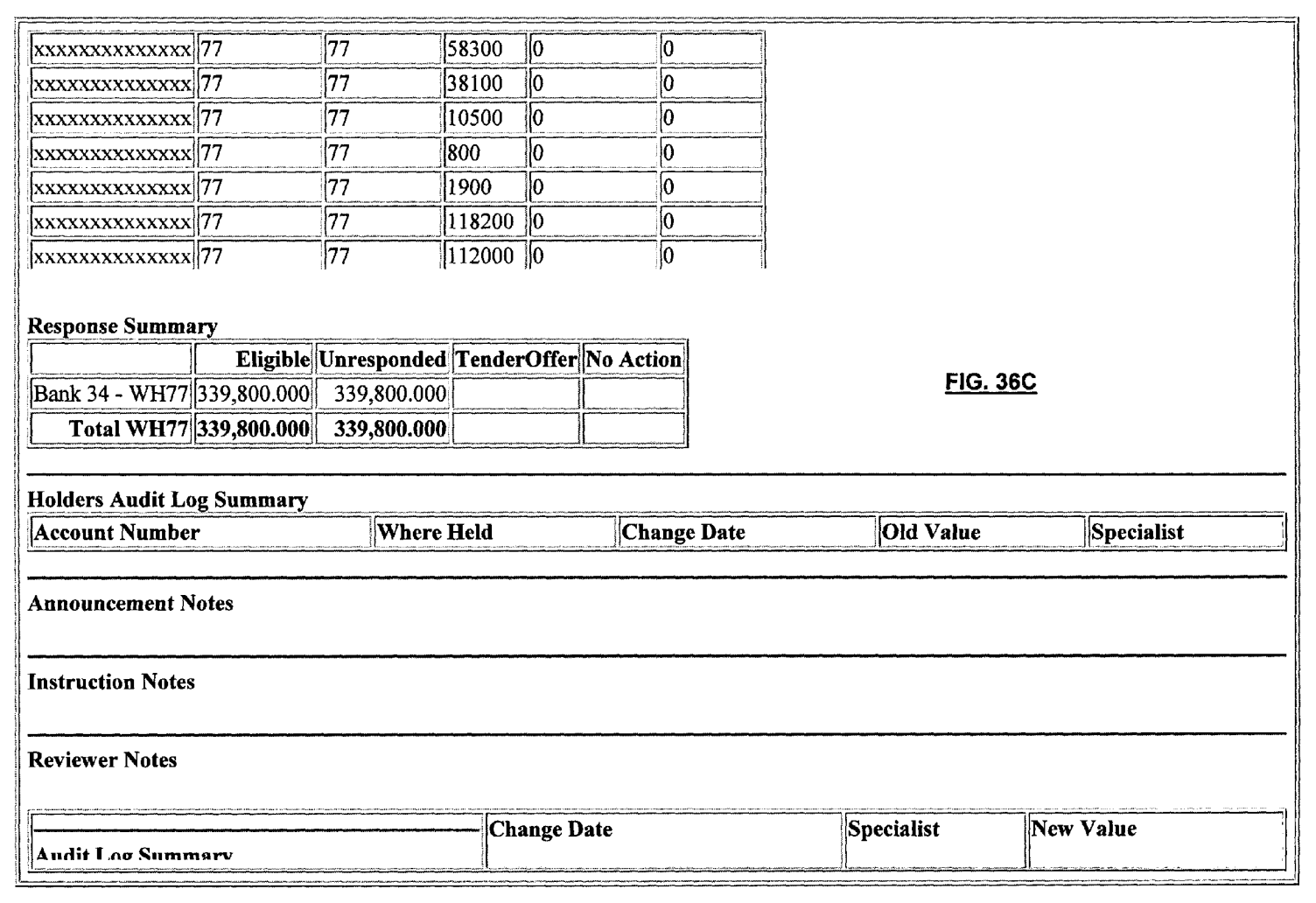

| | | | | | |
|---|---|---|---|---|---|
| xxxxxxxxxxxxxx | 77 | 77 | 58300 | 0 | 0 |
| xxxxxxxxxxxxxx | 77 | 77 | 38100 | 0 | 0 |
| xxxxxxxxxxxxxx | 77 | 77 | 10500 | 0 | 0 |
| xxxxxxxxxxxxxx | 77 | 77 | 800 | 0 | 0 |
| xxxxxxxxxxxxxx | 77 | 77 | 1900 | 0 | 0 |
| xxxxxxxxxxxxxx | 77 | 77 | 118200 | 0 | 0 |
| xxxxxxxxxxxxxx | 77 | 77 | 112000 | 0 | 0 |

Response Summary

| | Eligible | Unresponded | TenderOffer | No Action |
|---|---|---|---|---|
| Bank 34 - WH77 | 339,800.000 | 339,800.000 | | |
| **Total WH77** | **339,800.000** | **339,800.000** | | |

FIG. 36C

Holders Audit Log Summary

| Account Number | Where Held | Change Date | Old Value | Specialist |
|---|---|---|---|---|

Announcement Notes

Instruction Notes

Reviewer Notes

| Audit Log Summary | Change Date | Specialist | New Value |
|---|---|---|---|

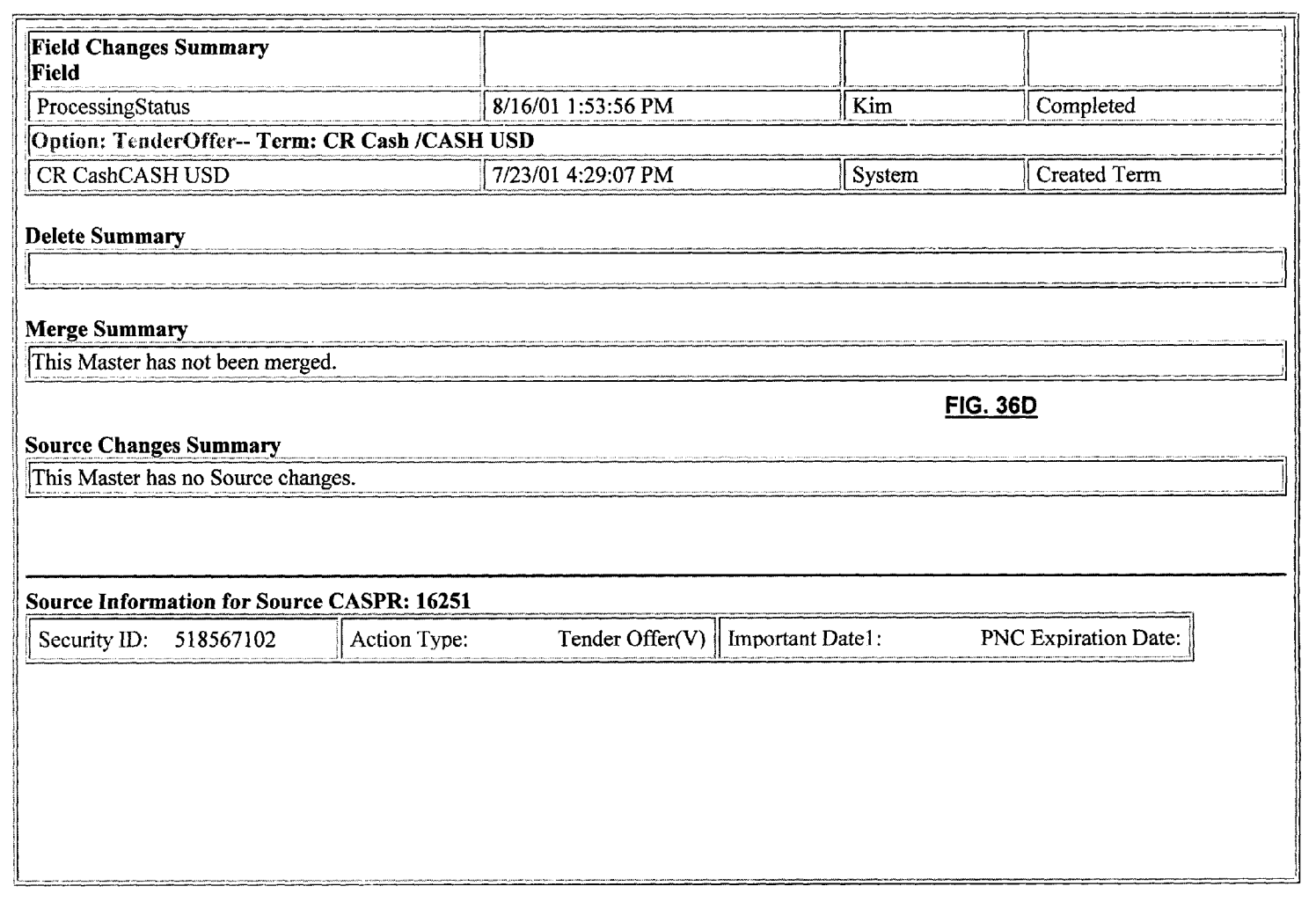

| Field Changes Summary<br>Field | | | |
|---|---|---|---|
| ProcessingStatus | 8/16/01 1:53:56 PM | Kim | Completed |
| **Option: TenderOffer-- Term: CR Cash /CASH USD** | | | |
| CR CashCASH USD | 7/23/01 4:29:07 PM | System | Created Term |

Delete Summary

Merge Summary

This Master has not been merged.

FIG. 36D

Source Changes Summary

This Master has no Source changes.

Source Information for Source CASPR: 16251

| | | |
|---|---|---|
| Security ID: 518567102 | Action Type: Tender Offer(V) | Important Date1: PNC Expiration Date: |

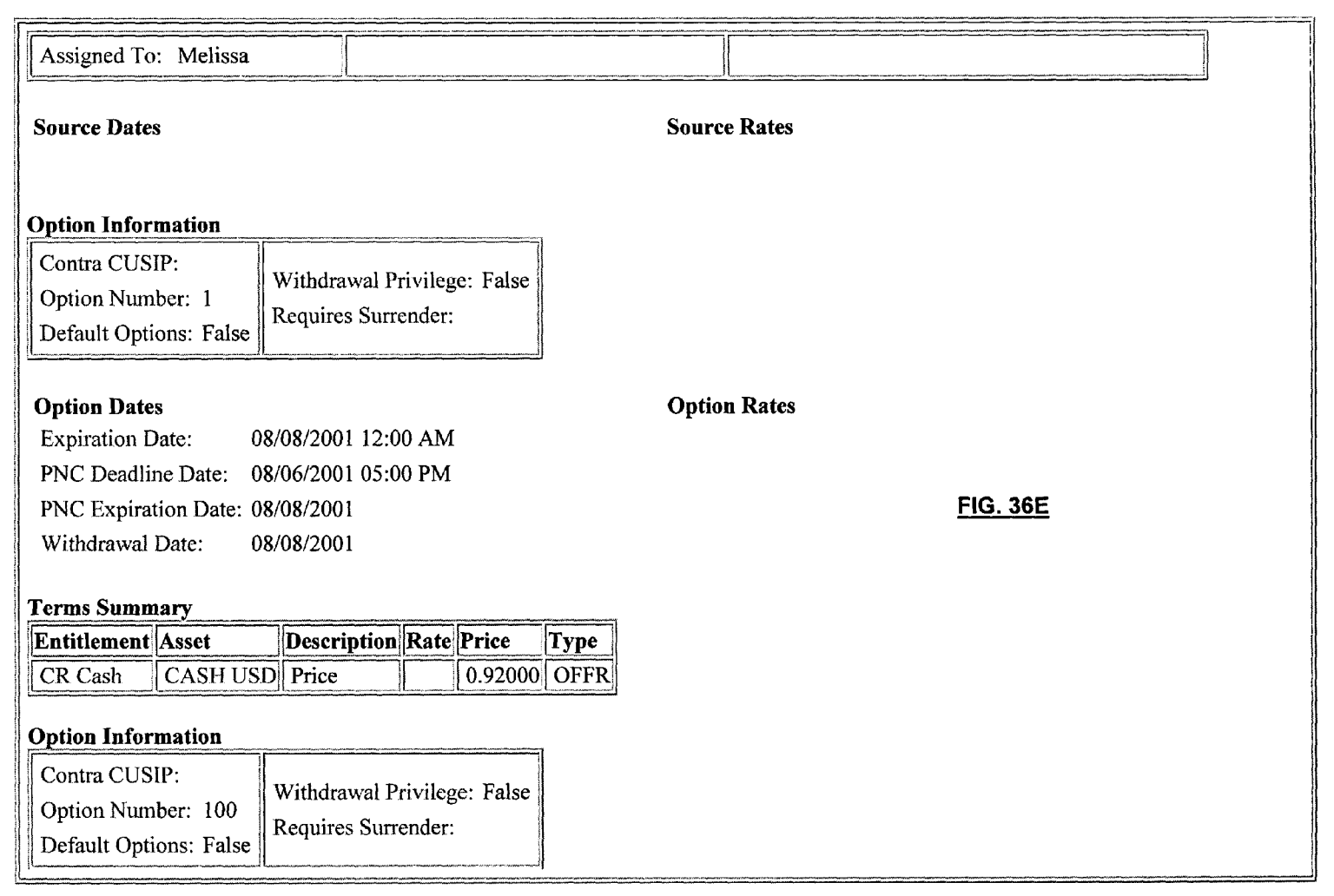

| Assigned To: Melissa | | |
|---|---|---|

Source Dates

Source Rates

Option Information

| | |
|---|---|
| Contra CUSIP:<br>Option Number: 1<br>Default Options: False | Withdrawal Privilege: False<br>Requires Surrender: |

Option Dates

Expiration Date: 08/08/2001 12:00 AM
PNC Deadline Date: 08/06/2001 05:00 PM
PNC Expiration Date: 08/08/2001
Withdrawal Date: 08/08/2001

Option Rates

Terms Summary

| Entitlement | Asset | Description | Rate | Price | Type |
|---|---|---|---|---|---|
| CR Cash | CASH USD | Price | | 0.92000 | OFFR |

Option Information

| | |
|---|---|
| Contra CUSIP:<br>Option Number: 100<br>Default Options: False | Withdrawal Privilege: False<br>Requires Surrender: |

FIG. 36E

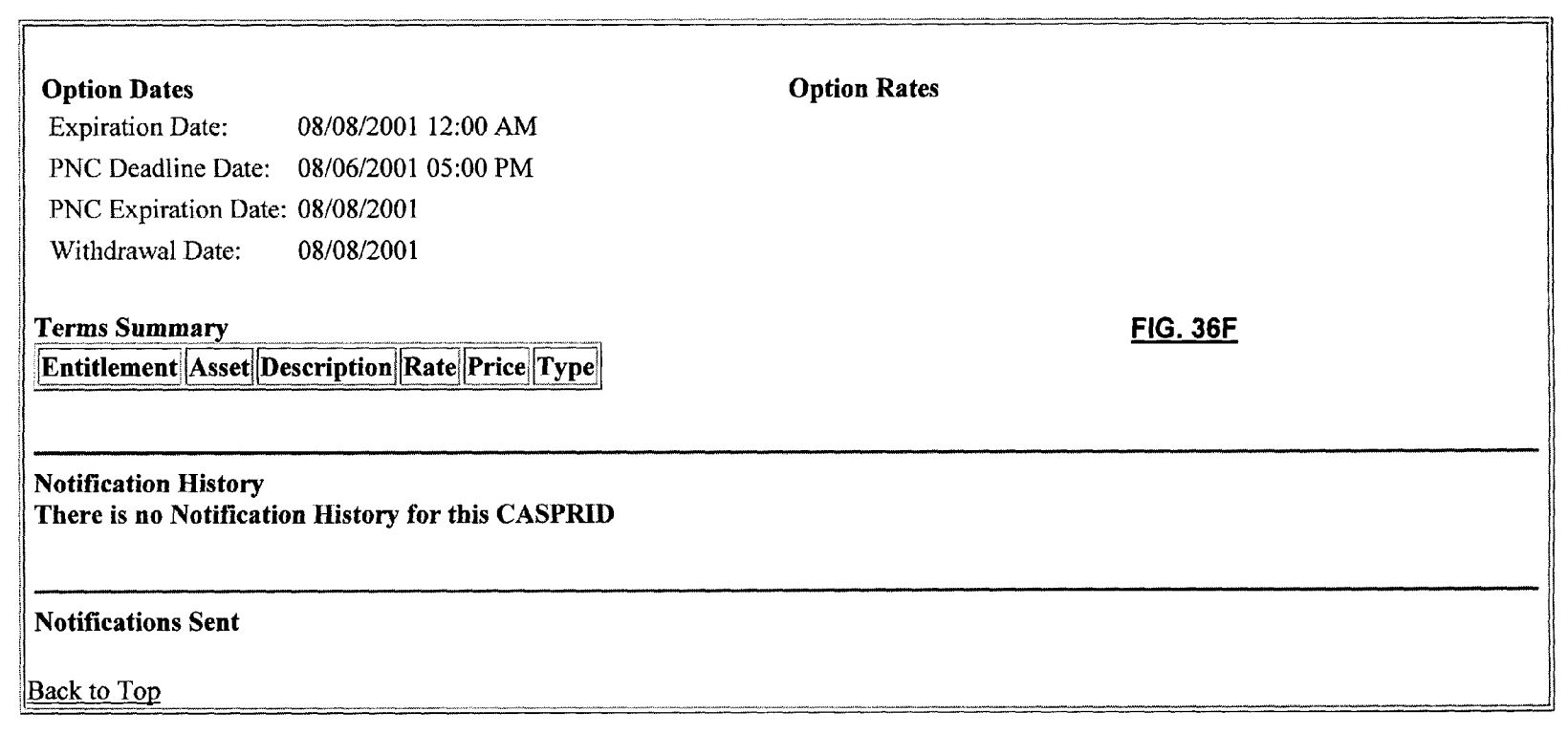

Option Dates

Expiration Date: 08/08/2001 12:00 AM
PNC Deadline Date: 08/06/2001 05:00 PM
PNC Expiration Date: 08/08/2001
Withdrawal Date: 08/08/2001

Option Rates

Terms Summary

| Entitlement | Asset | Description | Rate | Price | Type |
|---|---|---|---|---|---|

Notification History
There is no Notification History for this CASPRID

Notifications Sent

Back to Top

FIG. 36F

```
........................................................ ENT:08/15/00:(2000)
DEAL#: 1: TEXT#:1115396: REMARKS:EXCHANGE   :  IND:XUX2M: EFF:99/99/99:(9999)
TARGET:586603CK6: :MENDOCINO : INIT:999999999: :9999999999: EXP:08/15/04:(2004)
CASH:   0.00000:  :N: PROTECT:CA:  T.AGENT:N555: INFO:    : WDR:08/15/06:(2006)
RATE:   4.05000:  : : :  1.00000:V:DTC: : PRATE:  0.000000: PRO:99/99/99:(9999)
OPT:02: MENDOCINO COUNTY CA                UPDTEXT:1106318:
      REFUNDING CERTIFICATES OF PARTICIPATION
      SERIES 1998
      4.05%  DUE 08-15-2006  DATED 05-15-2003
OPTION NUMBER TWO: CASH TENDER OPTION
TERMS: FOR EVERY $1,000.00 PRINCIPAL AMOUNT OF CERTIFICATES,
HOLDERS MAY ELECT TO RECEIVE $1,020.00 IN CASH PLUS ACCRUED INTEREST
UP UNTIL THE DAY BEFORE SETTLEMENT DATE (EXPECTED TO BE 09-07-2004):
HOLDERS MAY EXCHANGE A PORTION OF THEIR CERTIFICATES FOR NEW
CERTIFICATES AND A PORTION FOR CASH.
THE OFFER AND WITHDRAWAL RIGHTS EXPIRE AUGUST 15, 2004 (02:00 PM PDT).
THERE IS NO PROTECT PERIOD AFFORDED THIS OFFER.
CONTINUED ON TEXT NO. 1115397, DATED 08-15-2004            ***
........................................................ ENT:08/15/04:(2004)
DEAL#: 1: TEXT#:1115397: REMARKS:EXCHANGE   :  IND:XUX2M: EFF:99/99/99:(9999)
TARGET:586603CK6: :MENDOCINO : INIT:999999999: :9999999999: EXP:08/15/04:(2004)
CASH:   0.00000:  :N: PROTECT:CA:  T.AGENT:N555: INFO:    : WDR:08/15/06:(2006)
RATE:   4.05000:  : : :  1.00000:V:DTC: : PRATE:  0.000000: PRO:99/99/99:(9999)
OPT:01: CONTINUATION OF TEXT NO. 1115396          UPDTEXT:1106318:
PARTICIPATING HOLDERS WILL RECEIVE AN APPRECIATION GIFT OF ONE-HALF
CASE (6 BOTTLES) OF MENDOCINO COUNTY WINE SUPPLIED BY FETZER WINERY.
HOLDERS MAY CHOOSE TO TENDER THEIR CERTIFICATES USING
DTC CONTRA CUSIP NUMBER 586MEN5K0.
TENDERING HOLDERS MUST TENDER ALL THEIR CERTIFICATES TO PARTICIPATE.
DEPOSITARY: BONDHOLDER COMMUNICATIONS GROUP
ADDRESS:   30 BROAD STREET  46TH FLOOR  NEW YORK NY 10004
```

FIG. 37

METHODS AND SYSTEMS FOR PROCESSING AND MANAGING CORPORATE ACTION INFORMATION INCLUDING VOLUNTARY AND MANDATORY CORPORATE ACTION DATA

CROSS REFERENCE TO RELATED APPLICATION

The present application claims priority to U.S. Provisional Patent Application Ser. No. 60/399,929, filed on Jul. 31, 2002, which is incorporated herein by reference.

BACKGROUND

A corporate action can be defined as any event that is initiated by a commercial entity that impacts one or more shareholders of the entity. With regard to at least some corporate actions, shareholders of the entity may be required to provide a response to the corporate action. With regard to other types of corporate actions, a response to the corporate action may be voluntary on the part of the shareholder. Examples of common corporate actions include, for example and without limitation, the following events: stock splits, mergers of the business entity with another business entity, acquisition by the business entity of another business, establishing a portion of the business entity as a stand-alone business entity (i.e., a "spin-off"), tender offers, exchanges, conversions, puts, full redemptions, partial redemptions, rights, warrants, reverse stock splits, consents, partial pre-refunding, full pre-refunding, liquidations, name changes, stock dividends, and the like.

It can be appreciated that a financial institution such as a financial services firm, for example, may need to process and monitor corporate actions in connection with the duties it performs for its clients who are shareholders of one or more entities that issue corporate actions. Many conventional systems and methods, however, involve manually generated and distributed reports, announcements, and other communications related to corporate actions. Furthermore, critical deadlines, due dates, and deliverables associated with corporate actions are often manually calendar docketed by personnel of the financial institution who are responsible for monitoring, distributing, and tracking the corporate actions. Thus, many conventional systems and methods do not sufficiently translate workflow management requirements into features that can effectively monitor, process, and control activities associated with corporate action information.

What are needed, therefore, are systems and methods that allow corporate action information to be monitored, processed, and distributed to responsible parties for notification and decision-making purposes. In addition, systems and methods are needed that can provide enhanced workflow management for a financial institution to manage responses, deadlines and other potentially critical activities associated with corporate actions. Such improved systems and methods are needed to maximize the potential for automation of corporate action processes that performing monitoring, communication, and control functions in connection with corporate action information that impacts the financial institution and its clients.

SUMMARY

In one embodiment of the present embodiments, in a financial institution, a method is provided for managing corporate action information of at least one entity. The method includes receiving data associated with at least one corporate action of at least one of the entities, wherein the corporate action data includes data associated with at least one of a voluntary corporate action and a mandatory corporate action; matching at least a portion of the corporate action data to at least one client of the financial institution; generating at least one notification including at least a portion of the corporate action data; and, performing at least one workflow management activity in connection with generating the notification including the corporate action data.

In another embodiment of the present embodiments, in a financial institution, a computer-readable medium is provided including instructions for performing a method for managing corporate action information of at least one entity. The medium includes instructions for receiving data associated with at least one corporate action of at least one of the entities, wherein the corporate action data includes data associated with at least one of a voluntary corporate action and a mandatory corporate action; instructions for matching at least a portion of the corporate action data to at least one client of the financial institution; instructions for generating at least one notification including at least a portion of the corporate action data; and, instructions for performing at least one workflow management activity in connection with generating the notification including the corporate action data.

In another embodiment of the present systems, in a financial institution, a system is provided for managing corporate action information of at least one entity. The system includes means for receiving data associated with at least one corporate action of at least one of the entities, wherein the corporate action data includes data associated with at least one of a voluntary corporate action and a mandatory corporate action; means for matching at least a portion of the corporate action data to at least one client of the financial institution; means for generating at least one notification including at least a portion of the corporate action data; and, means for performing at least one workflow management activity in connection with generating the notification including the corporate action data.

BRIEF DESCRIPTION OF THE FIGURES

FIGS. 4A through 4F include various tabulations of variables applied in accordance with various embodiments of the present corporate action embodiments;

FIG. 21 is an example screen display showing various functions of one illustrative embodiment of the present corporate action embodiments;

FIG. 31B includes further detail of various aspects of FIG. 31A;

FIGS. 36A-36F include example screen displays showing various functions of one illustrative embodiment of the present corporate action embodiments;

FIG. 37 is a sample illustration of a data file that can be processed in accordance with various embodiments of the present corporate action embodiments;

DESCRIPTION

As used herein, the term "financial institution" can include any financial entity that can be configured and/or operated to practice the present corporate action systems and methods. Examples of potentially suitable financial entities include, without limitation, brokerage firms, banks, investment management firms, and the like.

Where applicable for convenience of disclosure herein, the terms "screen display" and "page" may be used interchangeably. In addition, where applicable for disclosure herein, the terms "processor" and "user" may be used interchangeably. The term "user" may be employed generally to identify a processor, a user, a supervisor, a manager, or other personnel of a financial institution and/or its clients that may access corporate action information in connection with the present corporate action methods and systems. The term "CASPR" may be employed sometimes herein for convenience of disclosure as an abbreviation for a corporate action processing system.

Figure 1:
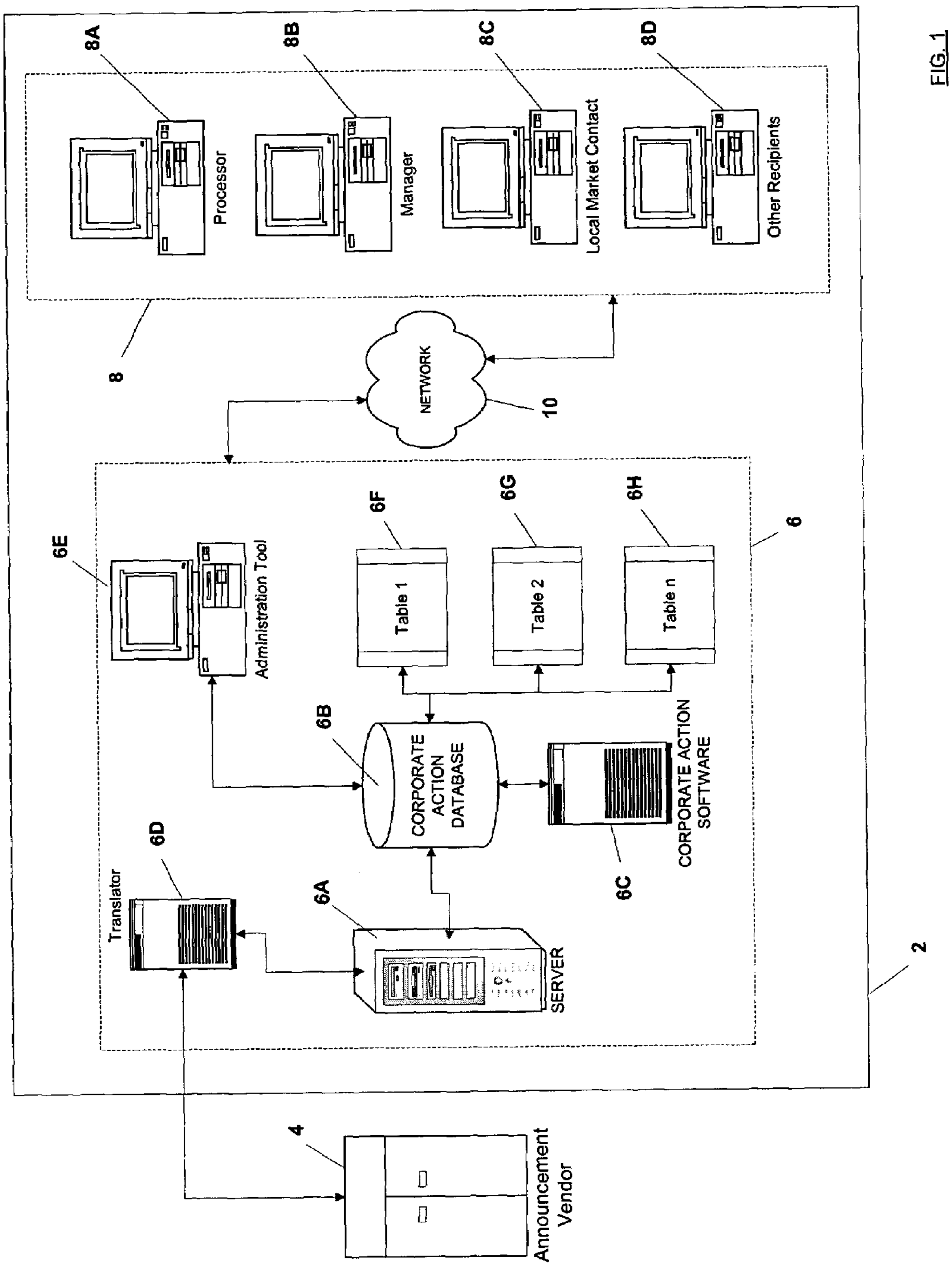
FIG. 1 is one embodiment of a system for processing and managing corporate action information in accordance with the present corporate action embodiments.
Figure 2:
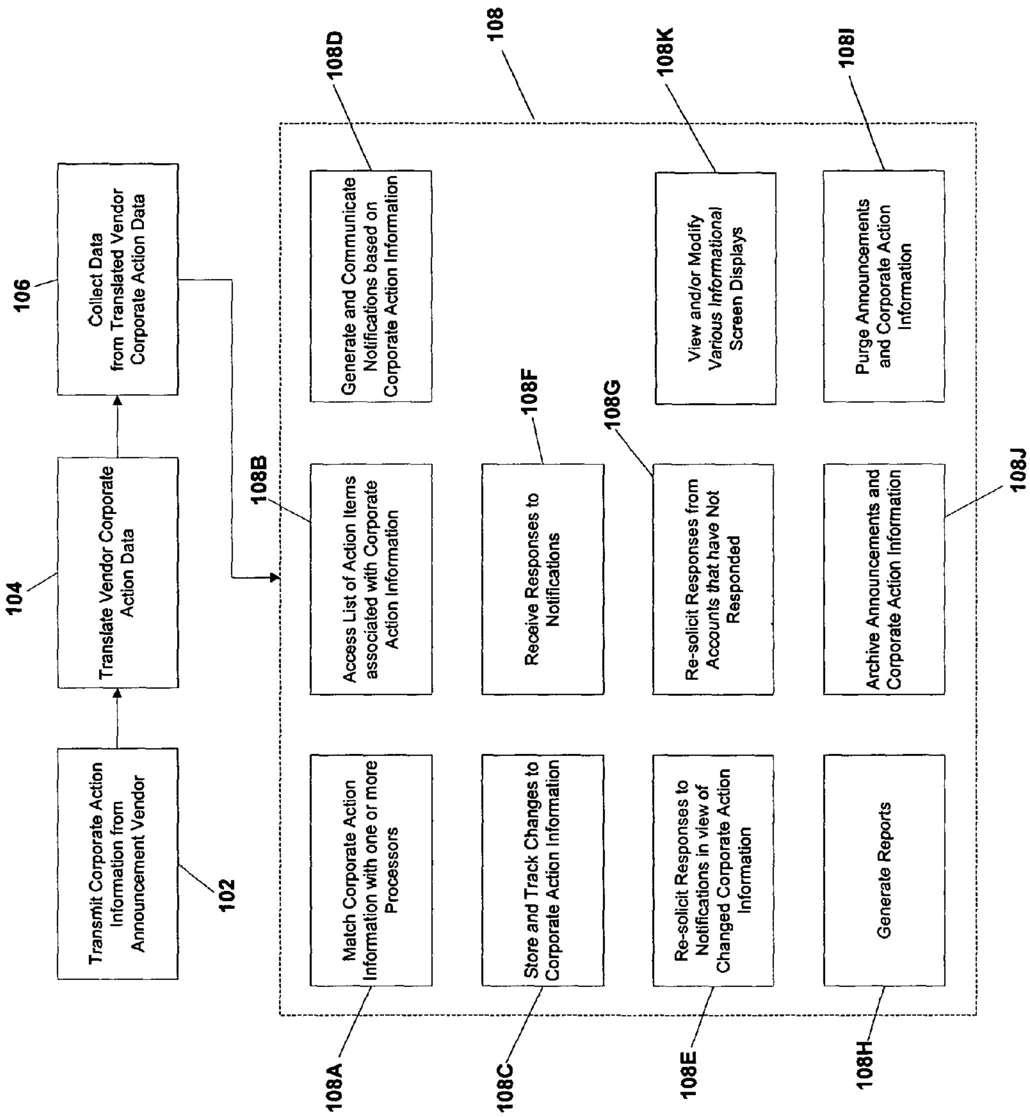
FIG. 2 is one embodiment of a method for processing and managing corporate action information in accordance with the present corporate action embodiments.

Referring now to FIGS. 1 and 2, overviews are provided of one system embodiment and one method embodiment of the present systems and methods for processing corporate action information in a financial institution 2. In step 102, one or more data files are transmitted from one or more announcement vendors 4 for processing by a corporate action system 6 of the financial institution 2 on a periodic basis (e.g, a daily basis). The data files include corporate action information and other information that may be associated with one or more operational aspects and/or clients of the financial institution 2. Information included in the data files can also include information related to financial investments such as, for example, the number of shares of a particular security held or managed by the financial institution 2.

In one aspect, the corporate action processing system 6 includes a server 6A (e.g., a web server) and a database 6B and corporate action software 6C operatively associated with the server 6A. In step 104, the corporate action processing system 6 applies a translator 6D to convert corporate action information contained in the data received from the announcement vendor 4 into translated data provided in a format suitable for further processing by the corporate action processing system 6. In various embodiments, the translator 6D may employ functionality provided by products marketed and sold under the "nBalance" trade designation. One example of an announcement vendor suitable for practice of the present methods and systems is the vendor conducting corporate action related business under the "XCITEK" trade designation (XCITEK, 5 Hanover Square, New York, N.Y.). The corporate action processing system 6 automatically or substantially automatically collects various data from the translated data in step 106. The data collection of step 106 can be performed to reduce or eliminate manual intervention involved in preparing a corporate action announcement for distribution, for example, and/or for performing further activities required by the corporate action information.

In other embodiments of the present systems and methods, the corporate action processing system 6 provides functionality that assists with performance of one or more workflow management activities of the financial institution 2 in step 108. In general, the workflow management activities are associated with monitoring, processing and controlling corporate action information. As shown in FIG. 2, it can be appreciated that any reasonable number and/or combination of workflow management activities can be performed in connection with various aspects of the present methods and systems.

Based on one or more user-defined rules, the corporate action processing system 6 matches appropriate corporate action information in step 108A to one or more users 8 of the financial institution 2. Rules and other instructions executed in connection with the server 6A, the corporate action database 6B, and the corporate action software 6C can be facilitated by use of one or more tables 6F, 6G, 6H, which are discussed hereinbelow in more detail. In one aspect, an administration tool 6E can be configured and employed to generate rules used by the corporate action processing system 6. The users 8 are responsible for monitoring, processing, and performing additional workflow activities in connection with the corporate action information. Users 8 can include, for example and without limitation, one or more processors 8A, one or more managers 8B of the financial institution 2, one or more local market contacts 8C, and other recipients 8D (as appropriate as designated by the financial institution 2).

In one aspect of the present methods and systems, each processor 8A can log into the corporate action processing system 6 in step 108B, for example, to access a list of action items associated with the corporate action information that require the attention of the processor 8A. Processors 8A and others who are responsible for corporate action information can view or interact, in at least some embodiments of the present systems and methods, with all corporate action information stored in the corporate action processing system 6. This permits one processor 8A, for example, to view the work performed by another processor 8A, for example, pursuant to processing corporate action information. Changes made to an announcement, for example, can be stored and tracked in step 108C in the database 6B of the corporate action processing system 6. The change information can indicate the times and dates of various changes, for example, and which processor 8A or other user 8 of the corporate action processing system 6 made the changes.

In one illustrative embodiment, the administration tool 6E of the corporate action processing system 6 permits certain users 8 to define what change information comprises an update to an announcement and what level of importance should be assigned to the update. It can be appreciated that other appropriate manual and automatic systems and methods can also be employed to define and modify data within the corporate action processing system 6. An audit log can also be provided within the corporate action processing system 6 to track and store changes made by users 8.

Through its database 6B, the corporate action processing system 6 stores electronic mail addresses and other contact information of the various users 8 responsible for corporate action information. The corporate action processing system 6 also provides functionality to generate and communicate one or more notifications (e.g., electronic mail notifications) in step 108D to designated users 8 based on the content and requirements associated with the corporate action information in the announcement. In one aspect, the administration tool 6E can be employed by the corporate action processing system 6 to govern various names, e-mail addresses, and other like information used by the corporate action processing system 6.

In various embodiments of the present systems and methods, the corporate action processing system 6 can in step 108C substantially automatically track changes to positions that occur during the life of the announcement and re-solicit responses in step 108E in view of changed or increased positions. As used herein, the term "eligible position" is an amount of securities applicable to, and which can participate in, a given corporate action. The "eligible position" can include securities that may or may not be currently owned or held. One example of a "position" is ownership of securities of an entity, which ownership can be considered as "holding" a "position" with respect to the entity. For eligible positions not held by the financial institution 2 or its clients on an issue date of an announcement, the corporate action processing system 6 can recycle an announcement against the holdings of the financial institution 2 until an expiration date of the announcement has passed. Therefore, the corporate action processing system 6 can alert the appropriate user 8 if a client account of the financial institution 2 has increased or decreased an eligible position and thereby implicated or removed consideration of any active and applicable corporate action information.

In other aspects of the present systems and methods, during the response period of the announcement, the corporate action processing system 6 can receive responses in step 108F and automatically re-solicit client accounts of the financial institution 2 in step 108G that have not yet responded to the announcement. Daily workflow management activities 108 can be prioritized for the processors and management can be designated as responsible to review, for example, expiring announcements, expired and not reviewed announcements, expiring and not reviewed announcements, and others. In one aspect, daily workflow management activities 108 that are not addressed can be reported with an end-of-the-day report. Additional relevant reports can be generated and reported by the corporate action processing system 6 as desired by the financial institution 2 in step 108H.

The corporate action processing system 6 can also invoke user-defined rules in step 108I to purge announcements that are not associated with eligible positions held in the financial institution 2. In another aspect, the corporate action processing system 6 can archive announcements in step 108J on a monthly, quarterly, yearly or another appropriately periodic basis. Archived announcements may include relevant information about corporate action information when the information was active (e.g., notification history, audit log entries, response tracking, and the like). In addition, various screen displays and other graphical user 8 interfaces (discussed in more detail below) can be presented to the users 8, including informational screens that may be viewed and/or modified by the users 8 in step 108K. Communications between and among the users 8 and the corporate action processing system 6 can be enabled by an interface 10 that includes a network connection, for example, such as an Internet or intranet connection. In another aspect, communications between and among users 8 can be enabled by a suitable file transfer protocol employed by computers or computer systems of the users 8.

Based on the foregoing and supported by further disclosure provided hereinafter, it can be seen that the corporate action processing system 6 provides an interactive environment for monitoring, processing, and managing corporate action information.

Operational Examples of User Interfaces

The following disclosure includes illustrative examples of various aspects of graphical user interfaces and other user interfaces that can be employed in connection with various embodiments of the present corporate action systems and methods.

In one embodiment, the corporate action processing system 6 can employ one or more web-based user interfaces (as described hereinbelow) to facilitate workflow management activities 108 associated with corporate action information. In one aspect, the system 6 can be executed with web browser software marketed and sold under either the "NETSCAPE" trade designation or the "MICROSOFT INTERNET EXPLORER" trade designation.

Figure 3:
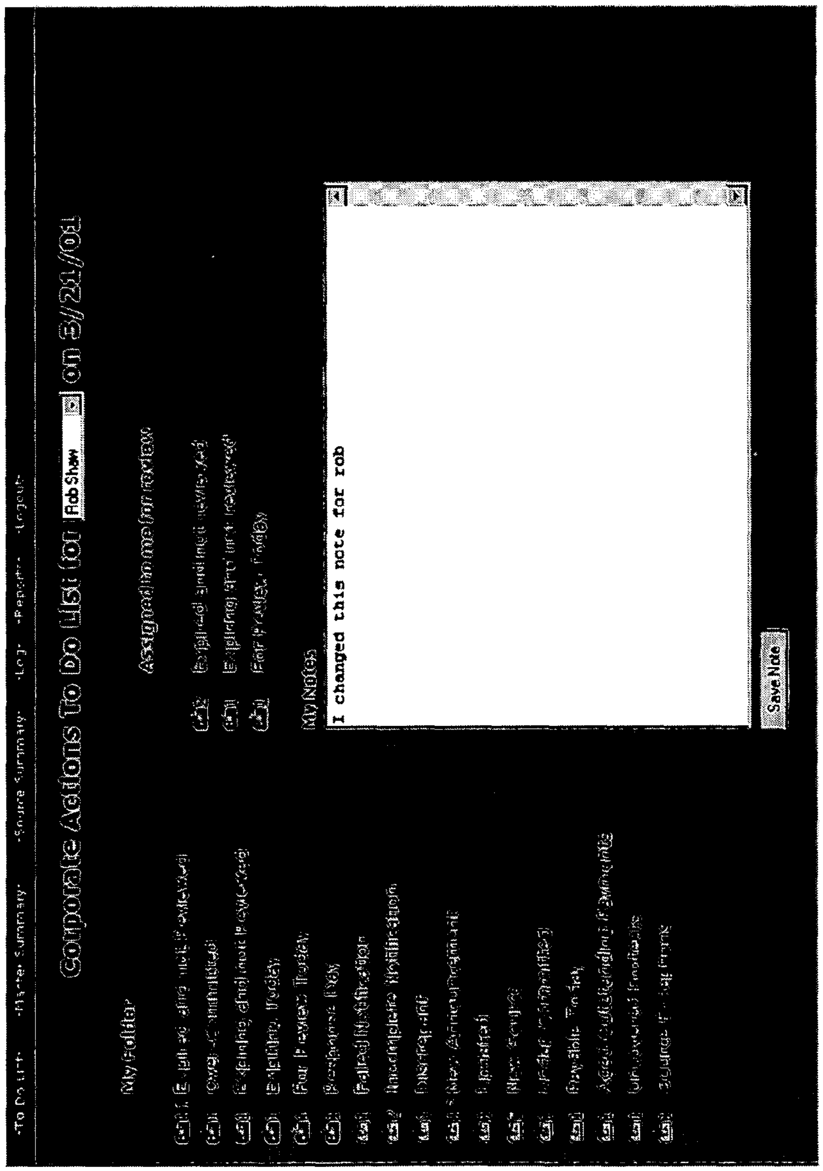
FIG. 3 includes an example screen display showing various functions of one illustrative embodiment of the present corporate action embodiments.

Referring now to FIG. 3, upon successful login into the corporate action processing system 6, a user 8 is presented with a "To Do Page" screen display that provides various functions that the user 8 can perform by accessing one or more categories or links. At the top of the page is a header that includes several hyperlinks that allow the user 8 to move between different screen displays of the corporate action processing system 6. This page helps the user 8 identify and prioritize work items within the corporate action processing system 6 and to determine a workload for a given time period, such as the workload for a given day, for example. The page permits the user 8 to navigate to areas where the user 8 can view announcements and announcement related information that are assigned to the user 8 and other users 8. As shown, the "To Do Page" includes one or more links to other portions of the corporate action processing system 6.

The "To Do Page" page includes the current date and a drop-down list of all users 8 of the corporate action processing system 6. The drop-down list is populated with display user 8 names from a Specialists table included within the system 6. By default, the system 6 selects the user 8 name of the logged-in user 8. The user 8 can select any user 8, however, from the drop-down list to view the "To Do Page" of that user 8. The system 6 permits more than one user 8 to display the "To Do Page" of the same user 8 at the same time. In one aspect, the "To Do Page" draws information in connection with operation of the administration tool 6E.

The category named "Incomplete Notifications" is provided for announcements that should have been notified or re-notified but were not. The user 8 can clear these items by marking the announcement as ready to automatically notify. The category named "Aged Outstanding Payments" is for voluntary announcements with a processing status of "Active" or "Completed" and that are some configurable number of days past expiration date and the "waiting payment" flag is checked. The user 8 clears these items by clearing (i.e., unchecking) the "waiting payment" flag. The number of days past expiration date is configurable in the administration tool as an "Event Type" specific setting. In another aspect, the waiting payment functionality can be configured so that the user 8 does not have to check/uncheck to drive workflow management.

The category named "Payable Today" is for all voluntary announcements that have a processing status of "Active" and are payable today or prior to today. The "Payable Date" and the "Anticipated Payment Date" determine whether an announcement is payable. If either date is in the future, the announcement is not payable. If neither date exists (i.e., empty) then the announcement is not payable. If only one date exists and it is today or prior to today, the announcement is payable. If both dates exist and both dates are either today or prior to today the announcement is payable. To meet the "Payable Today" criteria the voluntary announcement must be payable and have "Active" status. The user 8 can clear these items by moving the processing status to "Completed" or by changing either the payable or anticipated payment dates to a future date. In the case of an announcement with multiple options, it is possible for the payable date (not the anticipated payment date) to vary by option. In this situation, the user 8 is not able to move the announcement to a "Completed" status until all options are paid. The user 8 can use the "Anticipated Payment Date" to control the payable category. In another aspect, the system 6 can be configured to move announcements to "Completed" status automatically where the system 6 has enough information to do so.

The category named "Uncovered Protects" is provided for all active and completed voluntary announcements wherein a guarantee is submitted but the protect has not been covered (these are represented as checkboxes on the voluntary announcement master page described hereinafter). The user 8 can clear these items by checking the "Covered Protect" checkbox on the master announcement page. Also, if the user 8 removes the check from the "Guarantee Submitted" box, the item can be cleared.

The category "Over-Committed" is provided for all active and completed voluntary announcements that have at least one position that is less than the total response value for that position. The user 8 can clear these action items by correcting the response value to match the reported position amount. The category "Under-Committed" is for all announcements that have at least one position that is more than the total response value for that position and "all and subsequent" is selected and the option is not a "No Action" Option. Other conditions where a position is more than the total response are considered "unresponded" and optionally are not shown on the To Do Page. The under-committed category is intended for cases where the financial institution 2 has already received the response for the account, but the financial institution 2 must correct the response amount, as in the case of an "all and subsequent" response, for example, that has an increase in positions. The user 8 can clear the under-committed items by correcting the response value to match the reported position amount.

The categories "Discrepant" and "Updated" are provided for all active and completed announcements that have at least a field that the system 6 has marked as "discrepant" or "updated and must show". The user 8 clears these To Do items by resolving the discrepancy or update in the field detail page. All discrepancies and updates must be resolved before the system 6 can remove the item from the To Do Page.

The category "New Announcement" is for all active or completed announcements for which a first notification has not been sent. The user 8 clears these To Do items by checking the "Allow automatic notification" box. In one aspect, the user 8 cannot clear this status for a non-voluntary announcement. In another aspect, the "New Announcement" category can be employed by the user 8 in connection with both voluntary and non-voluntary types of corporate actions. In one embodiment, the system 6 clears the new status at the end of a given day.

The category "Source Exceptions" is provided for all source announcements that have a status of "BadCUSIP" or "BadAction". The user 8 clears To Do items listed under source exceptions depending on the exception. For a Bad CUSIP (e.g., one that is blank) the user 8 enters the financial institution 2 CUSIP to clear the To Do item. The financial institution 2 CUSIP must be nine characters and can be all 9's if financial institution 2 is not concerned with the announcement, but wants to remove it from the source exception list. The CATranslator sets the financial institution 2 CUSIP to blank if XCITEK reports it as all 9's. In this case, both the target CUSIP and the financial institution 2 CUSIP remain blank and this is considered a Bad CUSIP source exception. After the user 8 changes the CUSIP, if the source announcement has a valid Action Type, the source status can be designated as a "No Holders" status. Even though the source has "No Holders" status, that status may change during the next position refresh. Examples of Action Types and other relevant data applied in various embodiments and aspects of the present corporate action systems and methods are provided in the tabulations of FIGS. 4A through 4F.

The system 6 can look for holders and create a master document, if necessary, during its next periodic processing. If once the user 8 changes the CUSIP, the action type is not valid, the source status changes to "BadAction" and the source announcement remains on the source exception list. For a "Bad Action" status, the user 8 enters a valid action and action indicator to clear the exception. After the user 8 changes the action, if the source announcement has a valid CUSIP, the source status is designated "NoHolders" status. In one aspect, the system 6 looks for holders and creates a master document, if necessary, during its next periodic processing. If, after the user 8 changes the action, the CUSIP is not valid, the source status changes to "BadCUSIP" and the source announcement remains on the source exception list.

The user 8 can clear To Do Page items listed under the Expiring Today, Review Day, and Response Day categories by checking "Allow auto notify". If the system 6 fails to send out the notification, the system 6 logs the error to the event log. In addition to this error logging, the system 6 marks the announcement as failed and the user 8 can view the announcement listed on the To Do Page under the "Failed Notifications" category. Once the system 6 successfully posts the notification, the announcement is removed from the To Do Page. If the user 8 or the system 6 cannot resolve the problem the user 8 may choose to send the notification manually. If this happens, the user 8 can use the administration tool 6E to clear the "send notification" request. The user 8 can use the administration tool 6E to register that a manual notice was sent and that the system 6 should not attempt to send the notification.

In another aspect, the specialist categories of "Expired and not Reviewed" and "Expiring and not Reviewed" can be cleared when the specialist's reviewer has reviewed the Masters and checked the reviewed box on the Master Detail Page. As a reviewer, the "Expired & Not Reviewed", "Expiring & Not Reviewed" and other types of "Review" categories, in general, may be used by the reviewer as tools for accomplishing one or more workflow management activities. Once completing review of the master document, the reviewer can check the reviewed box on the Master Detail Page and clear the master out of the category.

In other aspects of the present embodiments, it can be appreciated that various other types of categories may be provided such as, for example and without limitation, the following categories. Response Queue—shows the count of incoming responses assigned to the Specialist that are not acknowledged (this includes accepted and rejected responses). Clicking on the link will take the user to the new Response Queue Page where they can view and acknowledge responses. Important Date—prompts the specialist to post the results of the corporate action. A master will be listed in this category if the Posted flag (announcement level, not the projection status at account/whereheld level) is false and today is on or after the important date. Due Bill—Offers will match this category if master has a due bill settlement date and an Ex Date and today is between ExDate+1 and Due Bill+1 (inclusive). Preparation Date—The purpose of this folder is to prepare for the possibility of posting the corporate action on the next business day. Preparation date can be calculated by CASPR based on an action-specific date (such as ex-date, payable date, effective date, meeting date, etc.) and subtracting one PNC business day from that date. Meeting Date—prompts the specialist to investigate the outcome of the meeting, determine if any new information is available for entry into CASPR, and make any appropriate changes to the status of the corporate action. Missing Information—to identify those corporate actions for which an important date has been established but for which a rate/price or new CUSIP (if required) has not been received.

The My Notes textbox on the To Do Page provides a convenient function for the user 8 to enter reminder notes. The notes remain on the To Do Page until the user 8 removes them. The notes are linked to the user 8 view and not to a particular announcement. In one aspect, the system 6 can be configured to not maintain a history of changes and not record changes associated with these notes into the audit log.

The category "New Source" is for all active and completed announcements that have received a new source announcement. This new source announcement may or may not have generated updates or discrepancies. The user 8 can clear this To Do item by removing the check in the Source Text page that indicates new sources have been added and may need user 8 attention.

An announcement may be counted in more than one To Do Page category. For example, a user 8 may have five offers with discrepancies and two of those offers expire today. Those two offers are to be counted in both To Do Page "Expiring Today"

and "Discrepant" categories. If a To Do Page category does not have any matching announcements, the line item does not display on the To Do Page. If a user 8 has cleared all To Do items, the page can be configured to appear blank with only the page title displayed and the top-level navigation links.

In one aspect, the End of Day report can be generated for Voluntary indicator type announcements. In another aspect, the End of Day report can include both voluntary and non-voluntary types of corporate actions. The report is grouped on Specialist and To Do category. In one aspect, the report can include the user 8 name, category, Action Type, CASPR ID, CUSIP, and CUSIP description. This report can be provided as an HTML document that all users 8 may access from a reports link in the navigation panel. The End of Day report can also include uncovered protects associated with corporate action information. In another aspect, the generated reports, or summary portions of the generated reports, for example, can be generated for a particular manager, for example.

It is possible for a source announcement to remain unlinked if financial institution 2 never has eligible holders for the corporate action; therefore, a master announcement is never created for that event. In addition to the "no holders" condition, there are exception conditions that also may prevent the system 6 from linking a source announcement to a master announcement. In these cases the system 6 must mark the source as an exception and wait for a user 8 to correct the problem. One possible source announcement exception is designated "BadCUSIP" for the situation wherein the source announcement does not have a valid CUSIP. A CUSIP can be considered invalid if it is empty or does not have nine alphanumeric characters. If the source announcement has an invalid CUSIP, the system 6 cannot check for holders; therefore, the system 6 cannot use that source to create or update a master announcement. Another possible source exception can be designated "BadAction" for the situation wherein the source announcement has an unrecognized action type. The action type is one of the items that the system 6 can use to match a source document to a master document.

Figure 5:
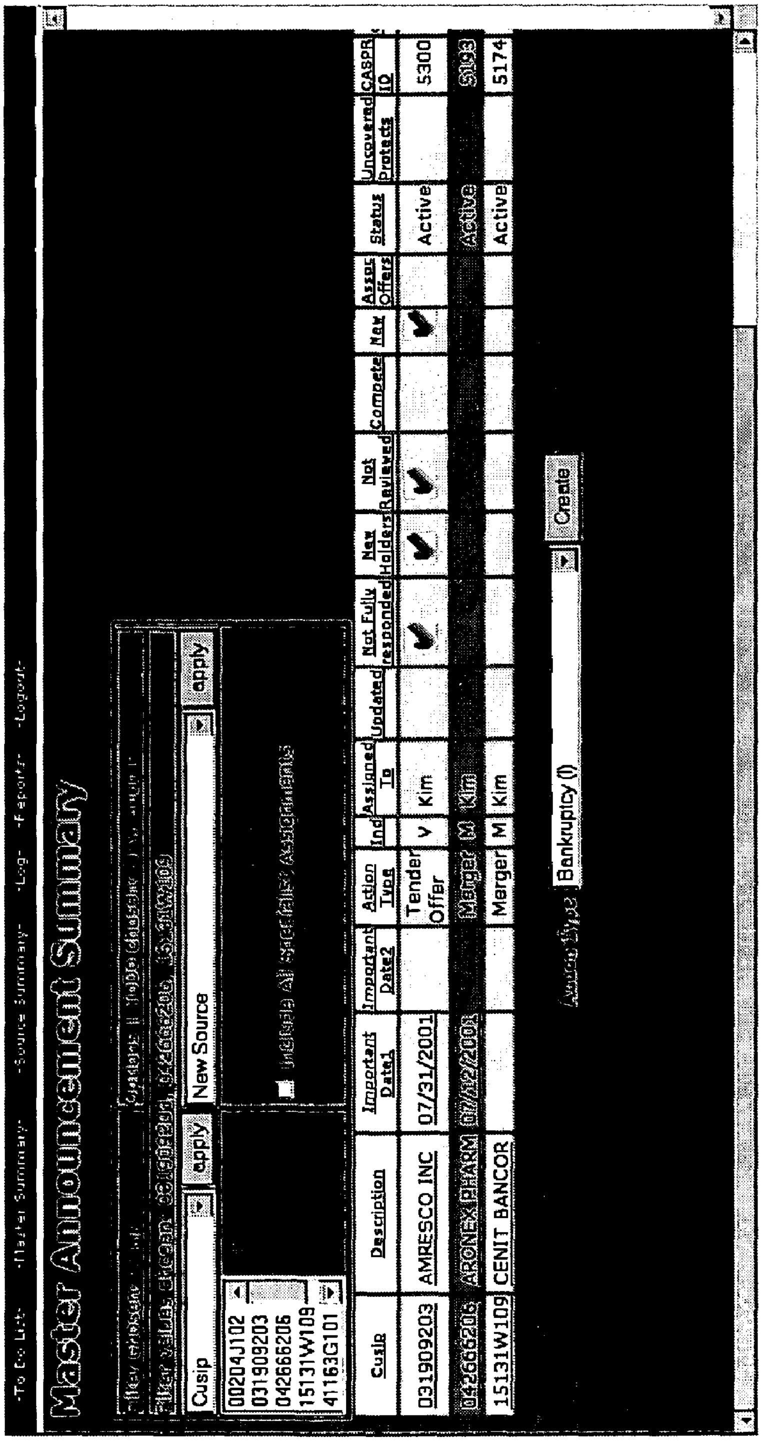
FIG. 5 includes an example screen display showing various functions of one illustrative embodiment of the present corporate action embodiments.

Referring now to FIG. 5, a Master Announcement Summary Page displays a summary of information associated with each master announcement. The user 8 can organize the display using filtering and sorting capabilities of the system 6 to list the announcements in which the user 8 is most interested. This page provides a way for the user 8 to check the announcement for important conditions, such as discrepant data, new holders, and the like. The user 8 is able to navigate to other pages to view detailed information on a selected announcement. The Master Announcement Summary Page also provides the user 8 with the ability to create a new announcement.

Each corporate action announcement that enters the corporate action processing system 6 from a vendor feed or from a manual entry is stored in the database 6B as a source announcement. The system 6 does not change the information contained in the source announcement. For example, if the announcement vendor 4 sends an announcement to the system 6 for a new offer, and then subsequently sends two update announcements for the same offer, there are three source announcements stored in the database 6B. The system 6 creates a master announcement when it determines that the financial institution 2 has holders that are eligible to participate in the corporate action. The master announcement holds the most recent information regarding the offer. Master announcements are linked to source announcements for historical purpose to allow the user 8 to review the changes and additions that have occurred for the offer as updates have been received into the system 6.

With regard to master summary announcement functionality, in another aspect, the user 8 can sort the display on any one column in either ascending or descending order by clicking on the column header. The page can be configured such that all columns are sorted in alphanumeric order with numerals (i.e., 0-9) displayed first. To view the details of an announcement, the user 8 can select a link on a row of the page. This link takes the user 8 to the appropriate master announcement page for the action type. The summary page displays a set of announcements based on the selected category. The category is set automatically when the user 8 enters the summary page from the To Do Page. The user 8 can change the announcement category by selecting from the drop down list labeled "Options|To Do Chosen:" (note: this document sometimes refers to categories herein as "reload sets"). When the user 8 clicks the "apply" button, the summary page refreshes to display those announcements.

Usually the user 8 may only want to view announcements that are assigned to the user 8. Should the user 8 need to view announcements assigned to others, however, the user 8 can check the "Include all user 8 assignments" checkbox and then refresh the summary page by clicking the "apply" button. The user 8 can use filters to view a subset of the selected announcements. The user 8 can filter on any column and can select multiple values to match. To do this, the user 8 can first sort the display on a given column. The user 8 can then filter on values in that column by selecting the filter group from the drop down list to the left of the page. From the list box to the left of the page, the user 8 selects the values that the user 8 wishes to see displayed in the summary page. Then the user 8 can click the "apply" button to refresh the page with only those rows matching the filter selections. If this action does not find any announcements matching the criteria, the body of the table remains empty, leaving only the headers in the table.

The system 6 displays a red checkmark in the "New Holders" column if the announcement has new holders or new positions. The checkmark remains in the column until the user 8 checks the "allow auto automatic notification" box for the announcement. The system 6 displays a red checkmark in the "Assoc Offer" column if the announcement has associated offers, i.e., those that share the same underlying security, but only one if any associated offer requires surrender. The system 6 displays a red checkmark in the "Competing Offer" column, if an announcement has competing offers, i.e., those that share the same underlying security and each offer requires surrender of the security, but only if one associated offer requires surrender.

To create a new master announcement, a user 8 selects the action type from the drop-down list and then clicks the "Create" button. Clicking the "Create" button takes the user 8 to the new master announcement page based on the action type selected. In one aspect, there are four announcement categories, each with its own new master announcement input page (see FIGS. 4A-4F).

There are a few reload sets that are not To Do list categories. These are the "All Active Announcements" and "All Announcements" reload sets. The system 6 displays all announcements with a processing status of "Active" when the "All Active" reload set is chosen. The system 6 displays all announcements regardless of processing status when the "All Announcement" reload set is chosen. The user 8 can use the "include all users" indicator to control the resulting set. When the user 8 uses the top menu link to navigate to the Master Summary page for the first time in a login session, or in linking from the To Do Page, the Master Summary page displays the All Active category.

The "Not Fully Responded" column displays one of two icons or remains blank. If the offer has over committed positions, the cell will show a red "X" or an equivalent symbol. If the offer has "not fully responded" positions, the cell shows a red checkmark. If both flags are set, then the cell holds a red "X" symbol. If neither flag is set, then the cell remains empty. The "Updated" column displays one of two icons or remains blank. If the offer has discrepant fields, the cell shows a red "X" symbol. If the offer has "updated and must show" fields, the cell shows a red checkmark. If the offer has both discrepant and updated fields, then the cell shows a red "X" symbol. If neither condition is true, then the cell remains empty. The "New Offer", "Not Reviewed", and "Uncovered Protect" columns display red checkmarks, if the announcement meets their criteria.

Within the login session of a user 8, the system 6 remembers the last filter settings used in the summary page. This means that when a user 8 returns to the summary page by using the top-level navigation links, the user 8 can view the same subset of announcements that the user 8 viewed when last on the summary page. There are exceptions to this rule: if the user 8 changes the "user 8 view user 8", then the summary filter settings are lost. Also, if the user 8 returns to the summary page via the To Do Page, the most recent filter setting is disregarded.

The "Important Date" columns display the name of the important date for the announcement type and the current value of that date if available in the announcement data.

Figure 6:
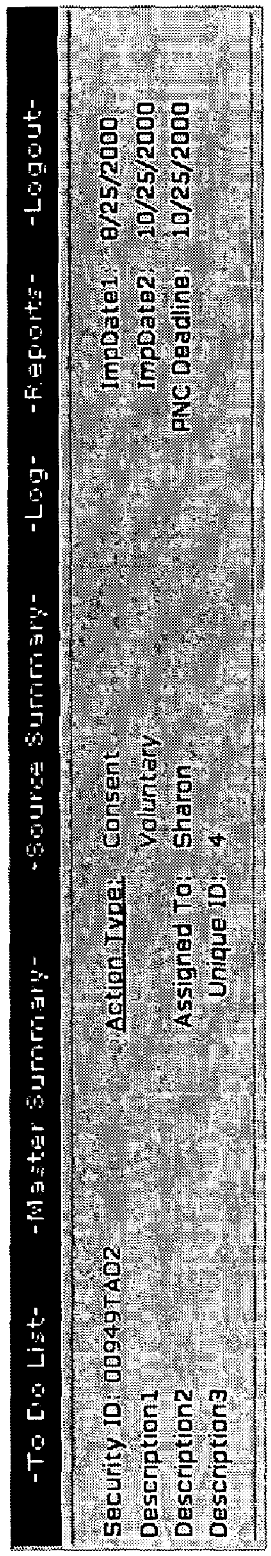
FIG. 6 includes an example screen display showing various functions of one illustrative embodiment of the present corporate action embodiments.

Referring now to FIG. 6, a Common Header is provided for displaying information that is beneficial to have visible for the user 8 while working on a particular announcement. The Common Header provides a consistent view of basic announcement information regardless of which page is active for master announcement. The Common Header helps the user 8 identify the current working master announcement and shows the user 8 important date information. Another function of the Common Header is to provide the user 8 with convenient navigation links to the To Do page, Summary pages, and System pages. When the To Do Page, summary pages, source announcement pages, and system pages are displayed, only the top-level navigation is displayed in the header area (because these pages do not have a master announcement for the common data).

Figure 6A:
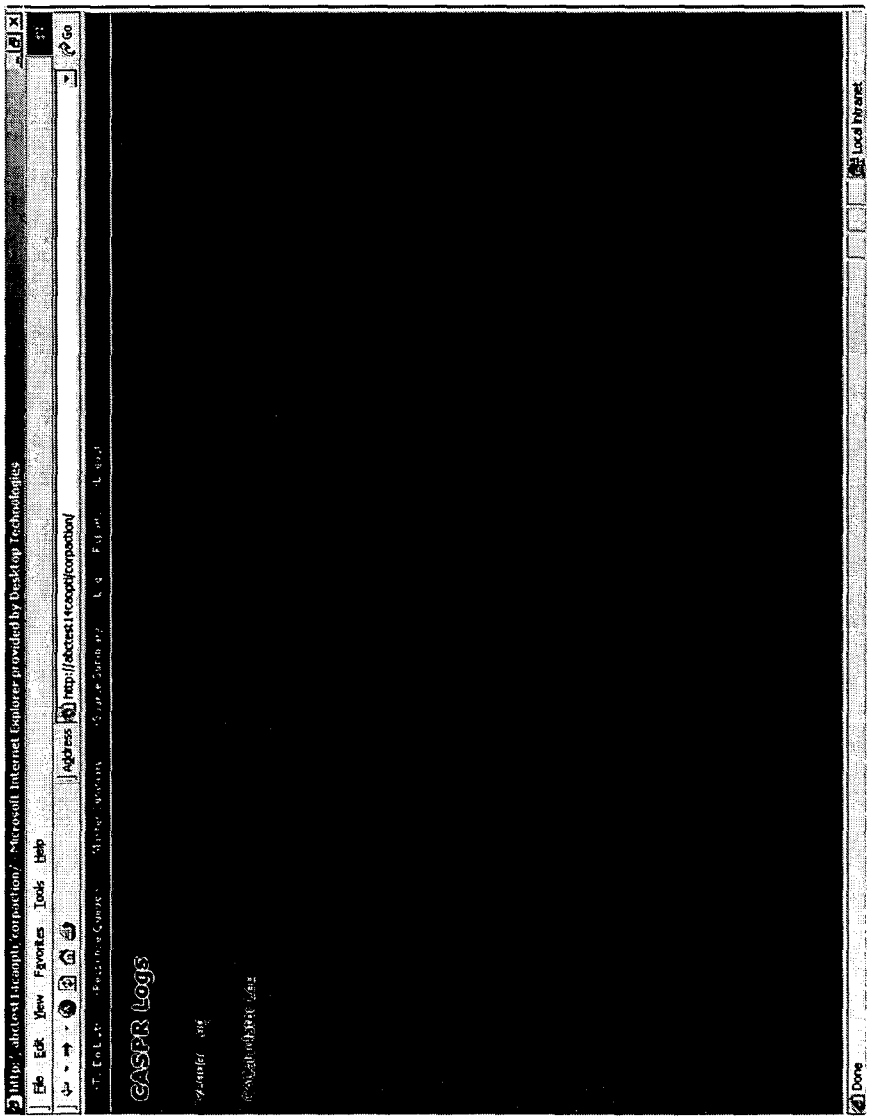
FIG. 6A includes an example screen display showing various functions of one illustrative embodiment of the present corporate action embodiments.
Figure 6B:
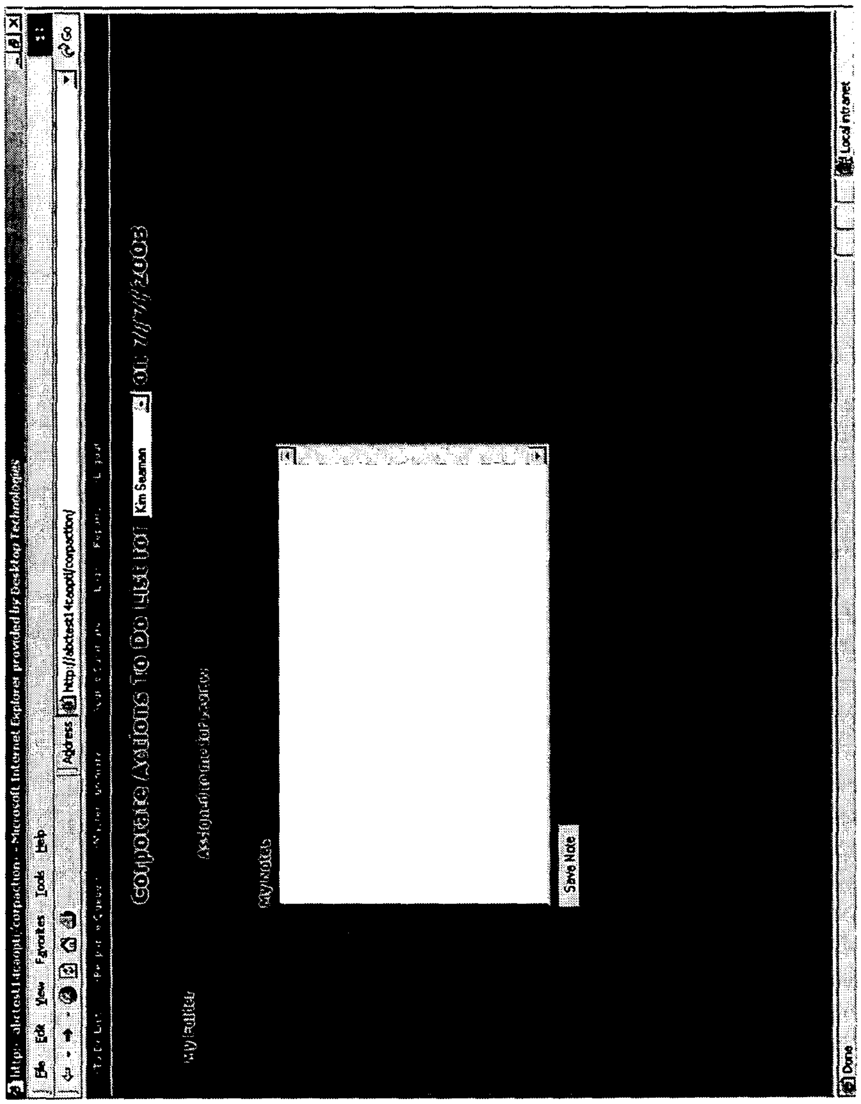
FIG. 6B includes an example screen display showing various functions of one illustrative embodiment of the present corporate action embodiments.
Figure 6C:
FIG. 6C includes an example screen display showing various functions of one illustrative embodiment of the present corporate action embodiments.

Selecting the "To Do List" link will take the user 8 to the To Do Page for the user view. Selecting the "Master Summary" link takes the user 8 to the Master Announcement Summary Page. The Master Summary Page displays the list of announcements based on the criteria used when the summary page was last seen (within the same login session). Selecting the "Source Summary" link takes the user 8 to the Source Announcement Summary Page. The Source Summary Page displays the list of announcements based on the criteria used when the summary page was last seen (within this same login session) unless navigating from the To Do page. Selecting the "Log" link takes the user 8 to a menu display screen, such as the example screen display of FIG. 6A, where the user 8 can select from vendor logs or calculator logs, for example. Selecting the "Logout" link displays a conventional logout confirmation page. Selecting the "Reports" link takes the user 8 to the Reports Page where the user 8 can view one or more system 6 reports. In another embodiment of a top level navigation panel, as shown in FIG. 6B, a "response queue" link can be included on the top level navigation panel. Selecting the "response queue" link takes the user 8 to a Response Queue page (an example of which is shown in FIG. 6C).

The Common Header also displays the Action Type and Indicator. The user 8 can go to the Field Detail Page to view history or change the action type and indicator by clicking on the "Action Type" label in the Common Header. After the user 8 changes the action type and indicator and navigates to a new page, the user 8 interface should reflect the new action type, adjust the important dates, display different template, and other information. The user 8 cannot change the action type, however, if notifications have been sent for that offer. If there are notifications for the offer, then the Action Type label in the Common Header is not a link to the Field Detail Page. The change action type feature is important because there are several action types, especially tenders, which announcement vendors 4 report as one offer type, but for which the financial institution 2 needs to make a distinction, such as Dutch auction, bid tenders, and the like. The Common Header information should stay consistent while a user 8 works with a master announcement. If the user 8 changes a date that affects the important dates or the financial institution 2 deadline date, for example, the Common Header should reflect that change. When the user 8 changes the action type, the system 6 should present him with both the action type and the indicator because there are some action types that are valid with more than one indicator. When the user 8 changes the action type, the important date assignments may change. It can also be seen that when the action type changes the system 6 may need to display a different master announcement page.

Figure 7:
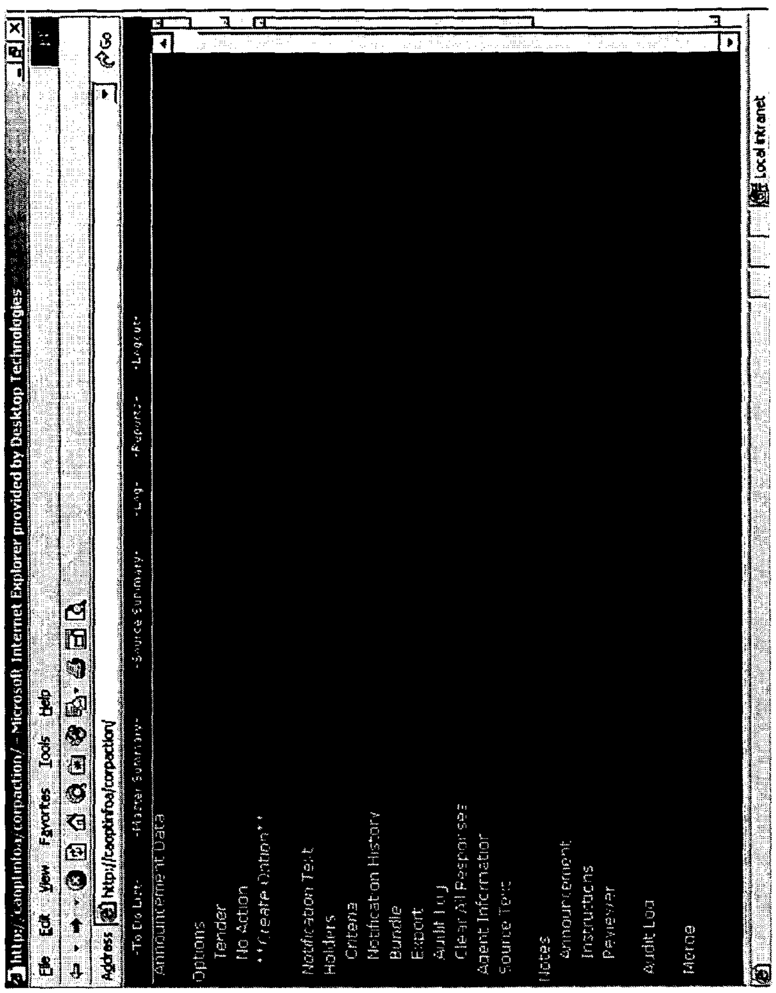
FIG. 7 is an example screen display showing various functions of one illustrative embodiment of the present corporate action embodiments.

Referring now to FIG. 7, the Navigation Panel function provides the user 8 with navigation capabilities among the pages of master announcement information. The Navigation Panel is accessible from all pages while the user 8 is working with a master announcement. In addition to navigation, the panel also provides a visual indication of the currently active page.

If the current announcement is of action indicator type mandatory, informational, class or redemption, the Option links do not appear on the navigation panel, as the Option links only appear for voluntary announcements. The navigation panel places a red arrow on the left side of the link showing the current page. For voluntary announcements, the option titles are listed under the "Options" label in the navigation panel. The options titles are ordered by option number and each is a link to their respective option pages. The last link under Options is the "Create Option" designation. The user 8 can use this link to navigate to the New Option Page to create a new option. After the user 8 saves the new option to the database 6B by clicking the submit button on the New Options page, the navigation panel lists the new option under the Options label. Each link in the panel takes the user 8 to the appropriate page where that page has information pertaining to the current announcement.

Clicking the "Notification History" link on the navigation panel takes the user 8 to the Notification History Page without any preset criteria. Clicking the "Export" link exports all holder data (across all account ranges) to a spreadsheet file stored on the server 6A. The Export function on the navigation panel can display the spreadsheet file in a new browser window. The user 8 can also save the data locally if so desired.

Figure 8A:
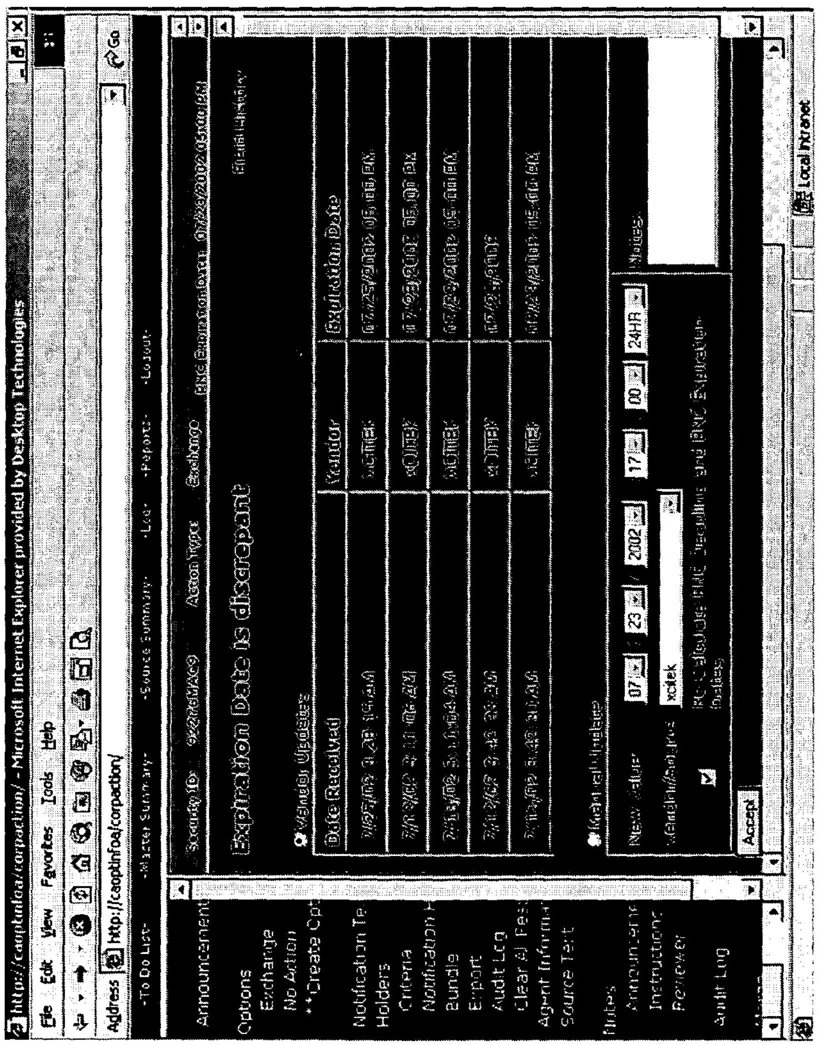
FIGS. 8A-8C include example screen displays showing various functions of one illustrative embodiment of the present corporate action embodiments.
Figure 8B:
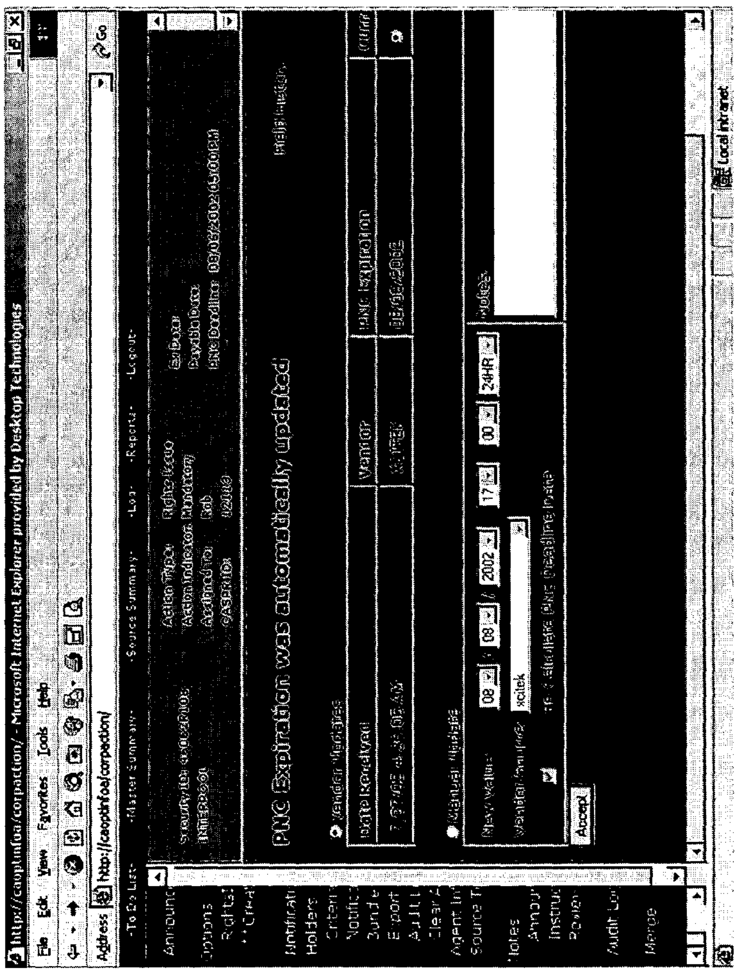
Figure 8C:
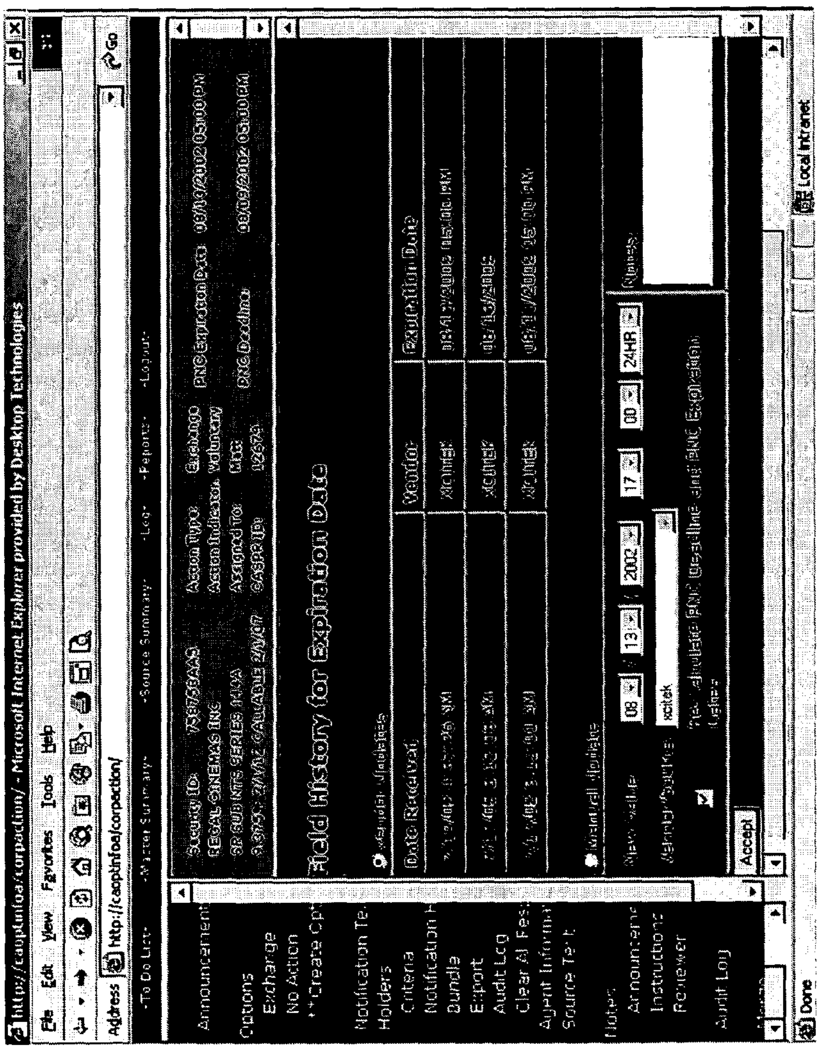

Referring now to FIGS. 8A, 8B and 8C, examples of field detail pages are provided. The field detail page displays the entire history of a field or only the values related to a recent update or discrepancy. The user 8 can use this page to resolve any outstanding updates and discrepancies. This page also allows the user 8 to change the current value by choosing from previous values or entering a new value. This page is usually accessed under three situations in which the user 8 wants to view field details: a recent update, a discrepancy, or a complete field history. If the field is updated, the user 8 sees the past and current value. If the field is discrepant, then the user 8 sees only the discrepant values, which are the field value that made the field discrepant and all subsequent source values. If the field is neither discrepant nor updated, then the user 8 can view the entire history of field values. Field history is the list of values from all sources that are linked to the master. It is important to note that field history is different from the history of changes to the field. The change history is recorded in the audit log, which shows all values that the master once held for that field.

Dates that enter the system 6 as reference dates, such as the protect date, will be stored as reference dates. For example, the announcement vendor 4 may report an expiration date of Jan. 22, 2004 with a protect of three days. The system 6 stores Jan. 22, 2004 for the expiration date and a date three business days after the expiration date for the protect date. When the system 6 displays the protect date, it displays Jan. 25, 2004. If the expiration date is updated to Jan. 23, 2004, then the protect date displays as Jan. 26, 2004. If a manual update changes the protect date to Jan. 24, 2004, the protect date is stored as that date and displays Jan. 24, 2004. At this point, if the expiration date changes, the protect date does not change because it is not stored as a reference date.

A manual update is a field value that is updated outside of the current set of source records for the existing master. When the user 8 saves the manual update, the system 6 creates a source record with that value and links the new source record to the master. If more manual updates for other fields in the same master occur in the same day and by the same user 8, the system 6 adds to the created source record instead of creating a new source record for every new manual update. If the same field is updated manually more than once a day, then multiple source records are created. The system 6 can log the date that the user 8 changed the field value, which can be made visible in the audit log. The page orders the table by date received.

If the field is discrepant, then the user 8 sees all field values that have entered into the system 6 since the field was mark as discrepant. The row holding the current value has the current radio button marked. To help the user 8 identify the page mode, the user 8 interface displays a title stating that the field is discrepant, for example, by showing “Expiration Date is discrepant” text on the page. If the field is updated, then the user 8 sees the current value and the previous value. The row holding the current value has the current radio button marked. To help the user 8 identify the page mode, the user 8 interface displays a title stating that the field was automatically updated, for example, by showing the “Withdrawal Date was automatically updated” text on the page.

If the field is neither updated nor discrepant, or if the user 8 entered the page from the “Field History” link, then the user 8 sees the entire history of values for the field. To help the user 8 identify the page mode, the user 8 interface displays a title stating that this is the field history, for example, by showing “Field History for Expiration Date” text on the page. If the page is showing either a discrepancy or update, then a link is provided on the page for “Field History”. If the user 8 selects this link, a refresh occurs to show the entire field history. The tables are ordered on the receipt date with the most recent at the top. The current value for the field is not always the most recent value.

The Date Received column is the date the system 6 received the source record. It is not the date the value became the current value. When this page is displayed the Vendor Updates radio button is selected. This radio button must be selected in order for the user 8 to select an existing source value. If the user 8 wants to enter a manual value, he must first select the “Manual Update” radio button to enable that section of the page. For manual updates the user 8 must provide both the value and the vendor/source (where the user 8 obtained the value).

For manual updates, there is an optional notes area that the user 8 may use to enter additional information about the manual update. If the user 8 enters a note, the system 6 appends the note text with the field name and vendor/source selection before saving the note as an Announcement Note. The user 8 can view all manual update notes in the Announcement Notes Page. For example, if the user 8 enters a manual change to Withdrawal Date with vendor/source Bloomberg and note “Talked to Sue Z. Queue today. She said withdrawal date was misquoted”, then the announcement note will be “[Manual Update] Withdrawal Date financial institution 2/RS/Bloomberg: Talked to Sue Z. Que today. She said withdrawal date was misquoted”. An announcement note is not added to the system 6 if the user 8 does not provide a note for the manual update. A field remains marked as “must show update” or “discrepant” until the user 8 clicks the Accept button. When the user 8 selects the Accept button, the page displays a message stating that the field issue has been resolved. If the user 8 moves to another page without accepting the field value, the field status does not change. The value column heading in the vendor updates table should match the field name.

If the user 8 accepts the change for a “updated and show” field, the system 6 notes in the audit log that the logged-in user 8 accepted the change and that the field is no longer considered “updated and show”. Similarly, if the user 8 changes the value for a “updated and show” field, the system 6 notes in the audit log that the logged-in user 8 changed the field and that the field is no longer considered “updated and show”. If the user 8 views but does not change a discrepant field (i.e., the user 8 goes to the discrepant page and clicks the “Accept” button), then the system 6 notes in the audit log that the user 8 cleared the discrepancy without changing the value. Similarly, if the user 8 views and changes the discrepant field and clicks the “Accept” button, the system 6 notes in the audit log that the user 8 cleared the discrepancy by changing the field value. In another aspect, the announcement detail page and/or the option detail page can display an icon to alert the user 8 that a field is discrepant or updated.

Figure 9:
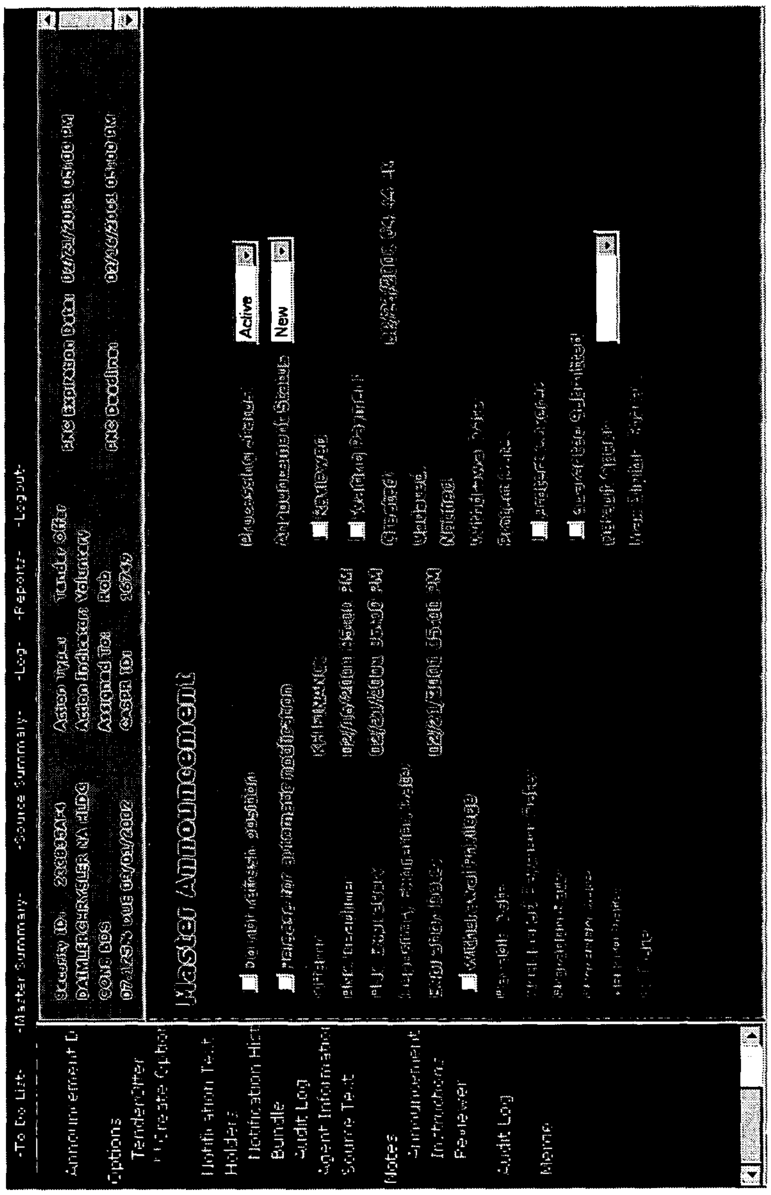
FIG. 9 is an example screen display showing various functions of one illustrative embodiment of the present corporate action embodiments.

Referring now to FIG. 9, a master announcement page for voluntary announcements is provided. This page shows the user 8 the current announcement level values stored for the announcement. The page indicates whether a field value varies across the option level data. The user 8 cannot edit most values on this page, but can easily navigate to the Field Detail Page to make changes. To make it easier for the user 8 to find system 6 updated fields, each page graphically denotes whether a field is considered discrepant or updated. The master announcement page also allows the user 8 to navigate to the Notification History page to view the last notification.

If the “Do not refresh position” box is checked the system 6 does not automatically refresh the position data for the announcement. If the “Release for automatic notification” box is checked the system 6 will automatically send notifications and re-notifications for the announcement. The notification process is a system 6 process that runs at scheduled times throughout a given business day. If this box is not checked, the system 6 will not attempt to send notifications for this announcement. This setting does not prevent the user 8 from sending manual notifications. The user 8 is not able to check the “Release for automatic notification” box if the announcement has updates that have not been approved or has discrepancies that have not been resolved. If the user 8 manually changes any field that applies to the notification, the system 6 will remove the check from the "Release for automatic notification" box. The system 6 does this to resist a notification from being sent while the user 8 is making changes to important notification information.

The following is a list of example notification fields: Record Date, Ex Date, Withdrawal Privilege, Withdrawal Date, financial institution Deadline Date, Expiration Date, Depository Expiration Date, Payable Date, Offeror, Notification Text, Entitlement, Record Date, Ex Date, Redemption Date, Payable Date, Effective Date, Redemption Price, Accrued Interest, and Lottery Results. Selecting the "Notified:" link takes the user 8 to the Notification History Page. The date displayed on the master announcement page is the last day and time that the system 6 (either due to automated or manual notification) sent a notification for the announcement. The link takes the user 8 to the notification history page with pre-set search criteria that shows only the accounts notified on that date.

The date after the "Created:" label is the day the master announcement was created. The date after the "Updated:" label is the day the master announcement was last updated (either automatically or manually).

The master announcement page shows the "updated" icon for fields that the system 6 has automatically updated and because of the update rules, the system 6 "must show" the update to the user 8. The icon is displayed to the left of the field label. Selecting the link for this field takes the user 8 to the Field Detail Page in "update" mode, meaning only the current and previous values of the field are displayed.

The master announcement page shows the "discrepant" icon for fields for which the system 6 has received an update and, because of the update rules, the user 8 does not want the system 6 to automatically update the field. The icon is displayed to the left of the field label. Selecting the link for this field takes the user 8 to the Field Detail Page in "discrepant" mode, meaning the current value and all updates for the field that have arrived since the field became discrepant are displayed.

An asterisk to the right of the field value indicates whether the value varies by option. The values displayed on the announcement page will be the values from the option with the earliest expiration date that is not reviewed. If more than one option has the earliest expiration date, the system 6 uses the values from the option with the lowest option number (001, 002, 003, etc). Whenever a field value varies by option, the user 8 cannot edit (go to the field detail page) that field from the master announcement level.

If the user 8 edits a field from the master announcement level, the change is applied to all options within the announcement (if the field change is applicable at the option level). The system 6 provides a date field at the master level for the user 8 to enter an anticipated payment date. The drop down list for the default option contains all options titles for this announcement. The system 6 does not pick a default option. The user 8 must set this.

The user 8 needs to be able to change the financial institution Deadline and financial institution Expiration Date for voluntary announcements. These values are initially set by the system 6. The system 6 maintains a field history for the financial institution dates just like other announcement dates. If a vendor sends an update to the DTC Expiration or Expiration Date, the system 6 calculates the financial institution Expiration and Deadline dates for the source records and updates the fields according to the field update rules. If the user 8 manually changes either the DTC Expiration Date or the Expiration Date, the system 6 does not calculate the financial institution Deadline or financial institution Expiration Date. The user 8 can also be provided with the ability to instruct the system to recalculate all related dates after selecting a new expiration date. This functionality holds true when selecting values for Expiration date & Financial Institution Expiration Date.

Figure 10:
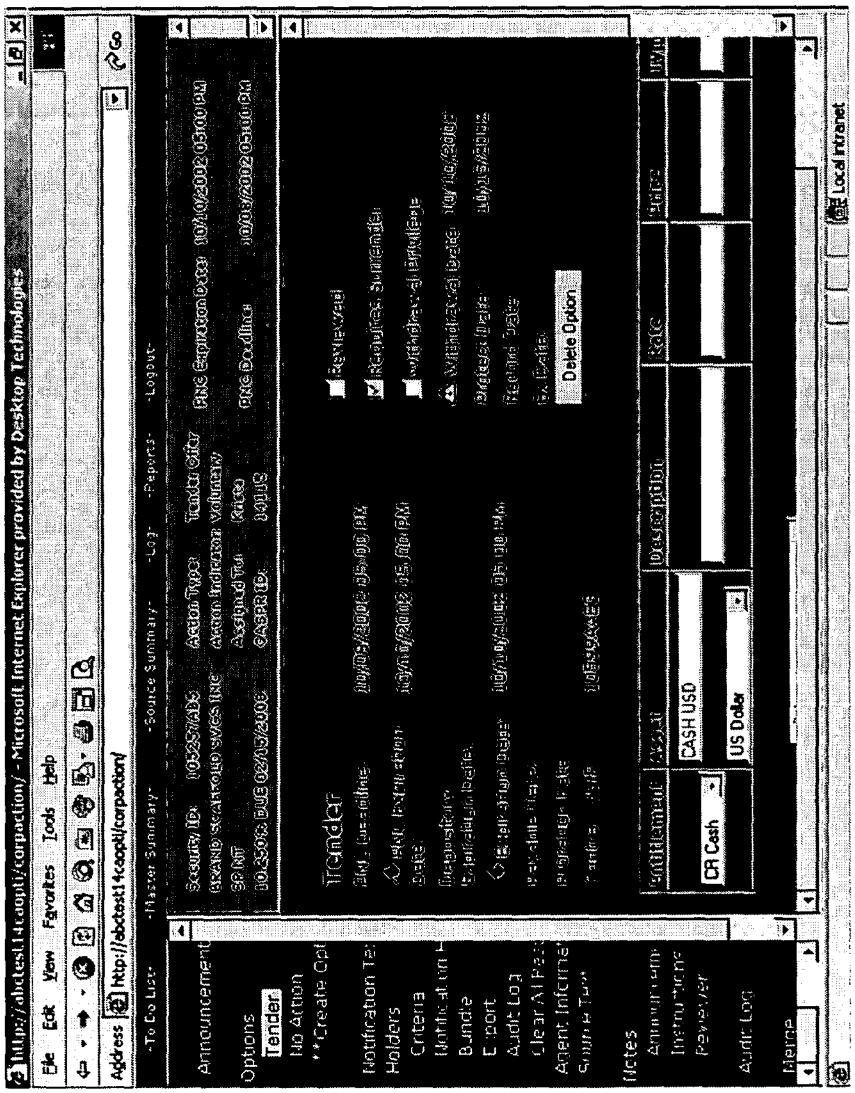
FIG. 10 is an example screen display showing various functions of one illustrative embodiment of the present corporate action embodiments.

Referring now to FIG. 10, an option page is provided for displaying information for a single option within an announcement. The user 8 is able to update fields and modify the entitlement information. This Options page is valid for voluntary announcements only. Mandatory announcements have a similar interface on the Mandatory Announcement Pages. When a user 8 deletes an option or entitlement, the system 6 records the action in the audit log to provide a way for the user 8 to find the deleted option values.

The user 8 can delete an option by clicking the "Delete Option" button. The system 6 can warn the user 8 that the delete is unrecoverable (other than manually entering the data again) and give the user 8 the opportunity to cancel the delete. If the user 8 continues with the delete, the option will no longer be visible in the navigation area. The user 8 interface will display a message page informing the user 8 the delete is complete. The system 6 can log the delete action in the announcement audit log, but no field values are stored with the entry. If the option has responses recorded, the system 6 may prevent the user 8 from deleting the option.

The page shows the "updated" icon for fields that the system 6 has automatically updated in connection with the update rules. The "updated" icon is displayed to the left of the field label. Selecting the link for this field takes the user 8 to the Field Detail Page in "update" mode, meaning only the current and previous values are displayed.

The page shows the "discrepant" icon for fields for which the system 6 has received an update, but because of the update rules the system 6 does not automatically update the field. The icon is displayed to the left of the field label. Selecting the link for this field takes the user 8 to the Field Detail Page in "discrepant" mode, meaning the current value and all updates for the field that have come in since the field became discrepant are displayed. The table shows the rate and price information for each entitlement. The user 8 can edit the values for the entitlement by clicking the link for the field the user 8 wishes to change. On the Field Detail Page, the user 8 can select a value previously sent by a vendor or enter a value from an external source. In general, the user 8 can change only one part of the entitlement information and is not able to edit the entire entitlement definition at one time. This feature can be provided so that the user 8 is able set a value from one vendor and an asset number from another vendor.

The user 8 can add a new entitlement by clicking the "Add Entitlement" button after entering the asset name, description, rate, price, vendor/source information, and optional note information. The user 8 must enter the asset name and either a price or a rate. The description field for a security entitlement will hold the CUSIP. The description field for a cash entitlement will hold the currency, i.e. "Cash in USD". The system 6 defaults to United States dollars. When the user 8 clicks the button, the information in the input boxes moves up to its own row in the table and the input boxes are cleared. The user 8 is able to delete an entitlement by selecting the delete link in the rightmost column of the entitlement row. The system 6 can remove the entitlement from the master and place an entry in the audit log. The entitlement values are not saved with the audit log entry for delete.

The user 8 can change the option title by selecting the option title link to navigate to the field detail page. From there the user 8 can manually enter an option title or select from a previous value. If the option is the default option for the announcement, the user 8 will see the text "(Default)" below the option title. The user 8 cannot change the default option setting on this page. To change the default option, the user 8 must navigate to the master announcement page. Valid values for the entitlement type drop down list are "CR Security", "DB Security", "CR Cash", and "DB Cash".

If a Contra CUSIP number is available, the system 6 should force the "requires surrender" checkbox to be checked. The user 8 should not be able to change this while a Contra CUSIP is defined. But a user 8 should be able to check the "requires surrender" box even if the option does not have a contra CUSIP.

Figure 11:
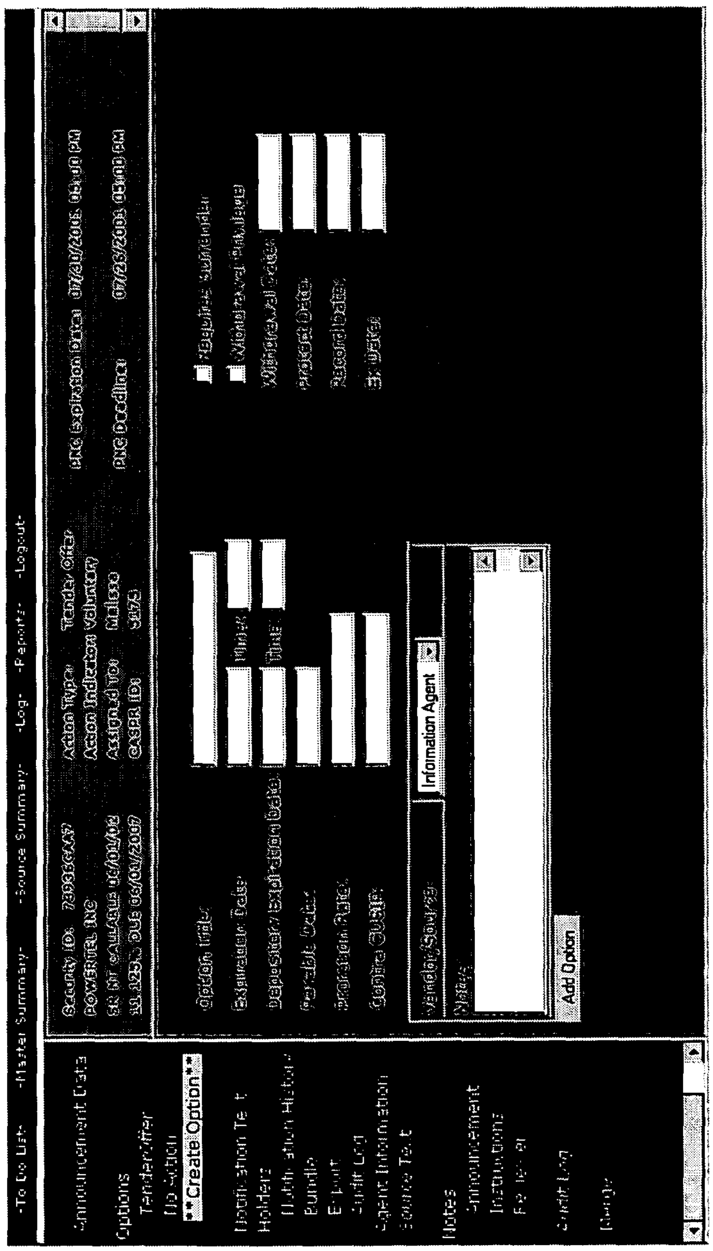
FIG. 11 is an example screen display showing various functions of one illustrative embodiment of the present corporate action embodiments.

Referring now to FIG. 11, a new option page is provided that allows the user 8 to establish a new option for the master announcement. After the new option is stored, the user 8 can enter entitlement information from the option page (see FIG. 10 discussed hereinabove).

Only the Option title is required to create a new option. All other fields are optional and will default to the master value if not provided. If the user 8 clicks the "Create Option" button without entering an option title, the system 6 will display a message telling the user 8 that the option title is required. The user 8 will then be taken back to the New Option page. If the user 8 enters an option title used by an existing option, the system 6 will force the user 8 to enter a unique option title. If the user 8 input is valid and the user 8 clicks the "Create Option" button, the system 6 will create the new option and display the new option in the Option page. The navigation panel should also reflect the newly added option. If the user 8 enters a value for the Contra CUSIP, the system 6 can be configured to automatically check the "Requires Surrender" flag when adding the new option.

Figure 12:
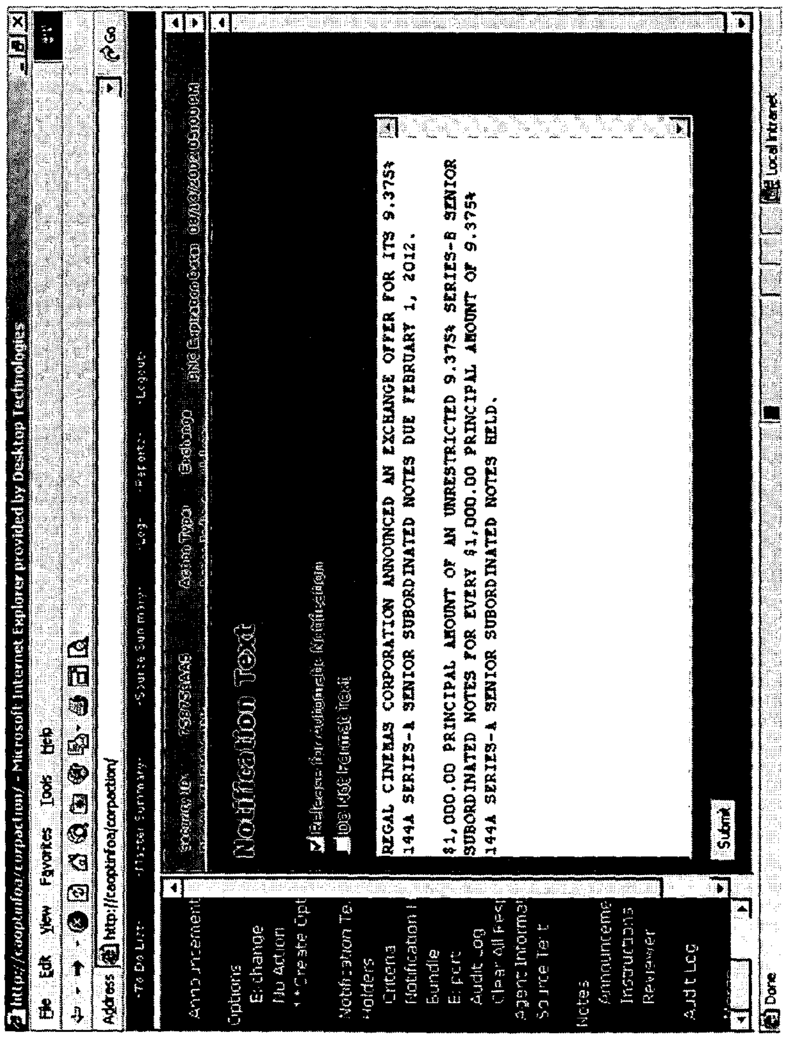
FIG. 12 is an example screen display showing various functions of one illustrative embodiment of the present corporate action embodiments.

Referring now to FIG. 12, a notification text page is provided that allows the user 8 to view and modify the text portion of the notification document that is sent to the local market contacts 8C. The user 8 can type, copy, or paste text or other information directly into this area. In addition, the user 8 can tell the system 6 whether or not to include this announcement in the automatic notification processing. This page displays the current notification text for the announcement. The user 8 can select the "Submit" button to save the changes to the database 6B. If the user 8 does not select the "Submit" button and leaves the page, changes are not saved. If the "Release for automatic notification" box is checked, the system 6 will automatically send notifications and re-notifications for the announcement. The notification process is a system 6 process that runs at scheduled times throughout the business day or other suitable period. If the "Release for automatic notification" box is not checked, the system 6 will not attempt to send notifications for this announcement. The user 8 is not able to check the "Release for automatic notification" box if the announcement has updates that have not been approved or has discrepancies that have not been resolved.

Figure 13:
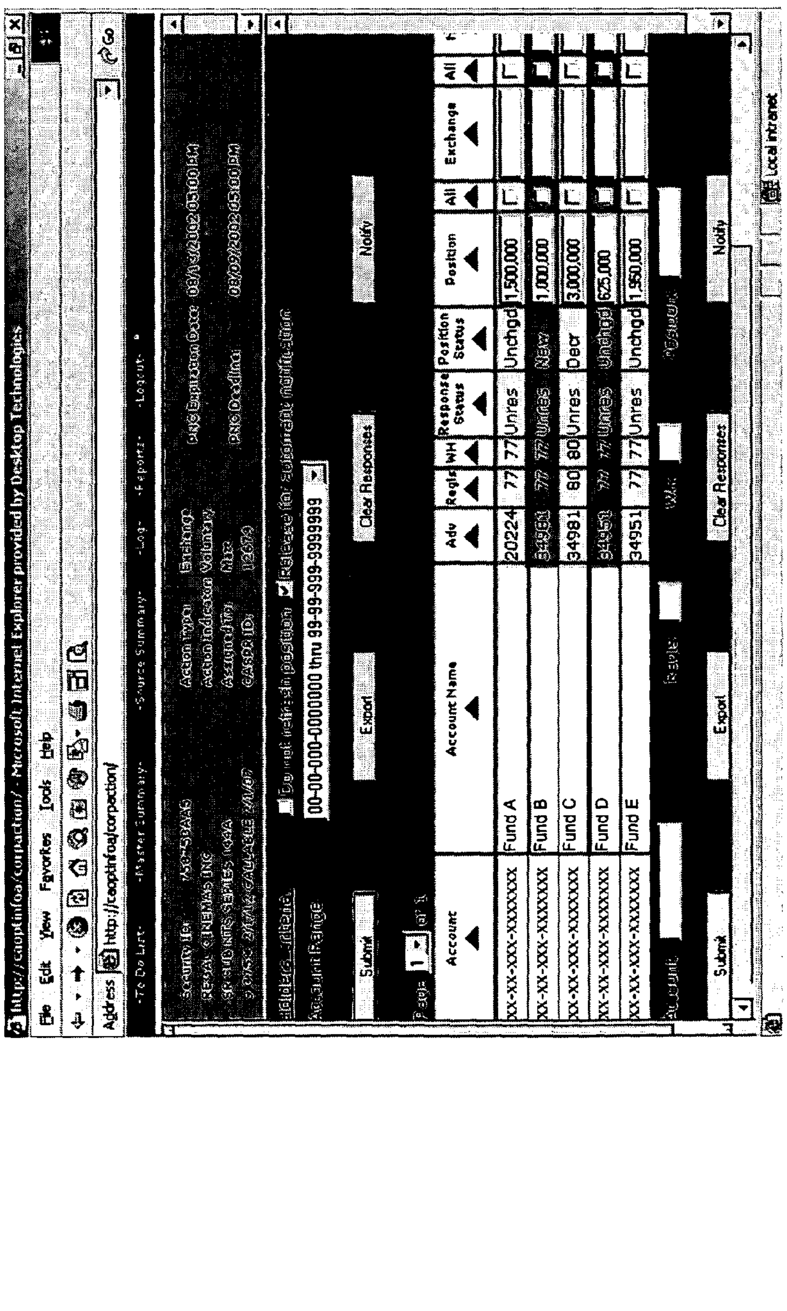
FIG. 13 is an example screen display showing various functions of one illustrative embodiment of the present corporate action embodiments.

Referring now to FIG. 13, a Holders page displays holder and response information. Using this page the user 8 can perform maintenance on positions and enter responses at the "where-held" level ("where-held" is used herein to refer to a depository location). The financial institution 2 typically does not want the system 6 to automatically adjust the response up when a position increases and the "all" box is checked. This is because the user 8 needs to know about the increase so extra positions can be tendered. The user 8 will know about an increase because it will show on the To Do Page of the user 8 in the under-committed category. In one aspect, the system 6 does not store the LMC name with the position because the financial institution 2 could change the Local Market Group (LMG) and BRO (Bank, Region, and Office) assignments. In this event, the financial institution 2 expects all notifications to go to the new Local Market Group.

The advisor column shows the IO ("Investment Officer") or Advisor number. The choice is determined by bank, i.e., for a given bank the system 6 will always display the Advisor if available; and if the Advisor is not available, then IO will be displayed. The local market group is a hidden column in the table. The user 8 can filter on this value, but does not see it in the table. A LMG is assigned to a BRO in the administration tool 6E. The system 6 can examine the BRO to obtain the LMG to use in the Holders table filter value selection.

If the "Do not refresh position" box is checked the system 6 will not automatically refresh the position data for the announcement. The refresh is a system 6 process that runs at a scheduled time before every business day. If this box is not checked, the position data will get refreshed during the next refresh process. If the "Release for automatic notification" box is checked the system 6 will automatically send notifications and re-notifications for the announcement. If this box is not checked, the system 6 will not attempt to send notifications for this announcement. In one aspect, the user 8 is not able to check the "Release for automatic notification" box if the announcement has updates that have not been approved or has discrepancies that have not been resolved, or if the notification text is not populated.

In one embodiment of the present embodiments, the user 8 can sort on any column by clicking on the column header. All subsequent clicks on that header will alternate the sort order between ascending and descending order. The user 8 can apply up to three filters on the displayed data. In addition to each column heading, the user 8 can also apply filters on bank, region, office, and LMG, which are all hidden columns in the table. After the user 8 selects a filter, the corresponding value combo box contains all possible values for that filter based on the displayed values in the table. The user 8 may select multiple values on which to filter. The user 8 clicks the "Apply" button to filter the holder information. Once a filter is activated, it is listed in the other filter selections with an asterisk to the left of its name. Selecting any asterisk filter is ignored. In one aspect, the user 8 can remove a filter by selecting <No Filter> in the filter selection list. The filtering at this level and any subsequent level will be cleared. For example, if there are three filters activated and the user 8 selects <No Filter> at level three, then level two and level three filters will be cleared and only the first filter will remain active.

In one illustrative embodiment of the present methods and systems, when the user 8 clicks the "Export" button at the bottom of the Holders page the system 6 writes all visible rows in the table into a spreadsheet. The hidden columns in the displayed rows can also be exported. The spreadsheet remains open for the user 8 to edit and save if desired. This "Export" function differs from the export function in the navigation area, which exports all holder data (across all account ranges) to a spreadsheet on the server 6A. The Export function on the navigation panel displays the spreadsheet in a new browser window.

When the user 8 clicks the "Bundle" link, the system 6 takes the user 8 to the Response Summary Page where the holder information is displayed rolled up by bank and where-held.

There are times when the user 8 needs to remove all responses and start fresh with new responses. The user 8 can either manually clear each response or can use the "Clear Responses" button which will remove all text and checkmarks in the "Status", "All" and option columns. To help prevent accidental loss of information when the user 8 clicks the "Clear Responses" button, the system 6 will present the user 8 with a dialog allowing the user 8 continue or cancel the clear operation. If the user 8 chooses to cancel the operation, the response information is not changed. If the user 8 chooses to continue, the response information is cleared from the table. The response information can still be recovered if the user 8 leaves the page without clicking the Submit button. The "Clear Responses" button clears responses for the displayed rows, but not for rows that are not shown due to filters. If a filter is active when the user 8 clicks "Clear Responses", the system 6 displays a warning that only the displayed rows will be cleared. The user 8 must click Submit to save changes. Until the user 8 clicks the Submit button, all the changes in the Holders table are only seen on this page. When the user 8 clicks the Submit button all the changes are saved to the database 6B. When the page refreshes, the table should reflect the new position and response statuses.

In one embodiment of the present methods and systems, the user 8 can send notifications to a single holder or to a group of holders. When the user 8 clicks the Notify button a notification is created for all accounts displayed in the holders table. So, if an account is in multiple rows because of multiple where-helds and the user 8 only displays one of those rows, the notification will be for all positions held in that account. A manual notification does not clear the "MustNotify" setting at the announcement level. Therefore it is possible to notify the LMG twice when financial institution 2 sends user 8 initiated notices (once manual and once automated).

The "All" column for an option is not meaningful if there is a position value entered for another option. For example, if there are three options and the user 8 enters a position value into option two, then both the "All" columns for option one and option three are inaccessible. The "All" column for option two is accessible. This rule also applies when an account is split across various where-held codes. Within all position rows for a single account, it is not valid to have more than one "All" column checked. This is because the local market contacts 8C view and return response data at the account level and not at the where-held level. A response from the LMC must be applied to all rows shown for that account. For example an account has positions held at 77 and 78 therefore there are 2 rows in the Holders table for that account. The LMC response indicates that the holder wants "all and subsequent increases" in Option 1. When the user 8 clicks the "All" column for Option 1 in the row for where-held 77, the system 6 automatically checks the "All" column for Option 1 in the row for where-held 78. At this point the user 8 cannot check the "All" column for any other Option in the two rows for that account.

The "All" column is not meaningful if there is more than one response value given. For example, if there are three options and the user 8 enters a response value into both option one and option two, then all of the "All" columns are inaccessible. The user 8 is not allowed to check the "All" boxes if an account/where-held has more than one response. The user 8 cannot enter a response value that is greater than the position. The Holders table can, however, display a response that is greater than the position. This situation can happen when a response is recorded and then the posted position is reduced during the nightly processing (or the user 8 adjusts down). The system 6 does not automatically reduce the response (unless the option is "No Action"). The account is reported as over-committed on the To Do Page. The system 6 will automatically enter the response value if one does not exist when the user 8 checks the "All" column. If a response already has an amount recorded and the user 8 checks the "All" column, the system 6 will not alter the response amount. The system 6 will not automatically update the response if the "All" column is checked and the position changes (either increase or decrease). The user 8 must update the response field when positions change. The user 8 must make the change. For example: Case 1—A holder has 1000 shares and has not responded to either of the two options in the offer. This week the holder responds with 1000 and all and subsequent increases in option two. The user 8 checks the "All" column for option one. The system 6 automatically places 1000 in the option one column (and the "All" column is checked, too). Case 2—A holder has 1000 shares. Last week the holder responded with 500 shares in option one and the system 6 reflects this response. This week the holder responded with 1000 and all and subsequent increases in option one. The user 8 checks the "All" column for option one. The system 6 does not change the response amount of 500. The user 8 must change the 500 in option one to 1000. The system 6 will not automatically update the response if the "All" column is checked and the position changes (either increase or decrease). The user 8 must update the response field when positions change.

The user 8 can click one or more account boxes at the end of the holders list to add new accounts (note the LMC is determined based on the BRO). The user 8 is required to enter a full account number and a position greater than zero. In one aspect, only the account number, registration, where-held, and position cells are editable for a new row. The account number must exist in the CurrentAccount table. The Holders page will pull the account name and advisor number from the CurrentPositions table if the holders table does not already have information about that account. The Holders page will use the registration and where-held codes entered by the user 8. If a position already exists for that account at that where-held, the Holders page will not add the account and should give user 8 a message explaining the reason. In another aspect, the new holding row may not remain on the page for further viewing/editing if the new row does not meet the current account group or holders criteria. If a position decreases and the position has responses in the no action option, the system 6 should automatically reduce the no action response. If the position is split over multiple options and the decrease in position is greater than the amount in the no action option, the system 6 should place a zero for no action response and mark the position as over-committed. An account cannot have more than one entry at a where-held. The same account number cannot be listed in the table more than once with the same Where-Held code. The following, for example, is not valid:

| Account# | WhereHeld | Position |
|---|---|---|
| 2035202-1234567 | 77 | 100,000 |
| 2035202-1234567 | 77 | 300,000 |

The "Position Status" column shows the current status of the position as it compares to the position when the last notification was sent. The position status can be increased, decreased, new, or unchanged. The status column is updated after the user 8 clicks the submit button. The "Response Status" column shows the current response status: whether it is over-committed, under-committed, unresponded, or responded. The status column is updated after the user 8 clicks the "Submit" button. If the holder information changes for an announcement either by user 8 maintenance or system 6 updates, and the announcement does not have "Allow Automatic Notification" checked, the user 8 can check the "Allow Automatic Notification" box. If the user 8 exits the system 6 without enabling automatic notifications, the announcement will show on the To Do list the next day as Incomplete Notification. In one aspect, the user 8 can enter an empty Where-Held code for pending positions. Pending positions that the system 6 records also use this empty code. As the user 8 makes position adjustments including new rows, the system 6 can, in one aspect, shade the modified rows. This shading remains until the position data is refreshed. The shading is intended to tell the user 8 that positions have been adjusted from the system 6 data (e.g., data extracted from the xposition file). In another aspect, the "Holders" page does not shade user-modified rows. Based on the Where-Held code, some positions are not eligible for response. The user 8 is not able to change those cells or click the "All" boxes in that row. The informational Where-Held codes are configurable in the administration tool 6E.

Figure 13A:
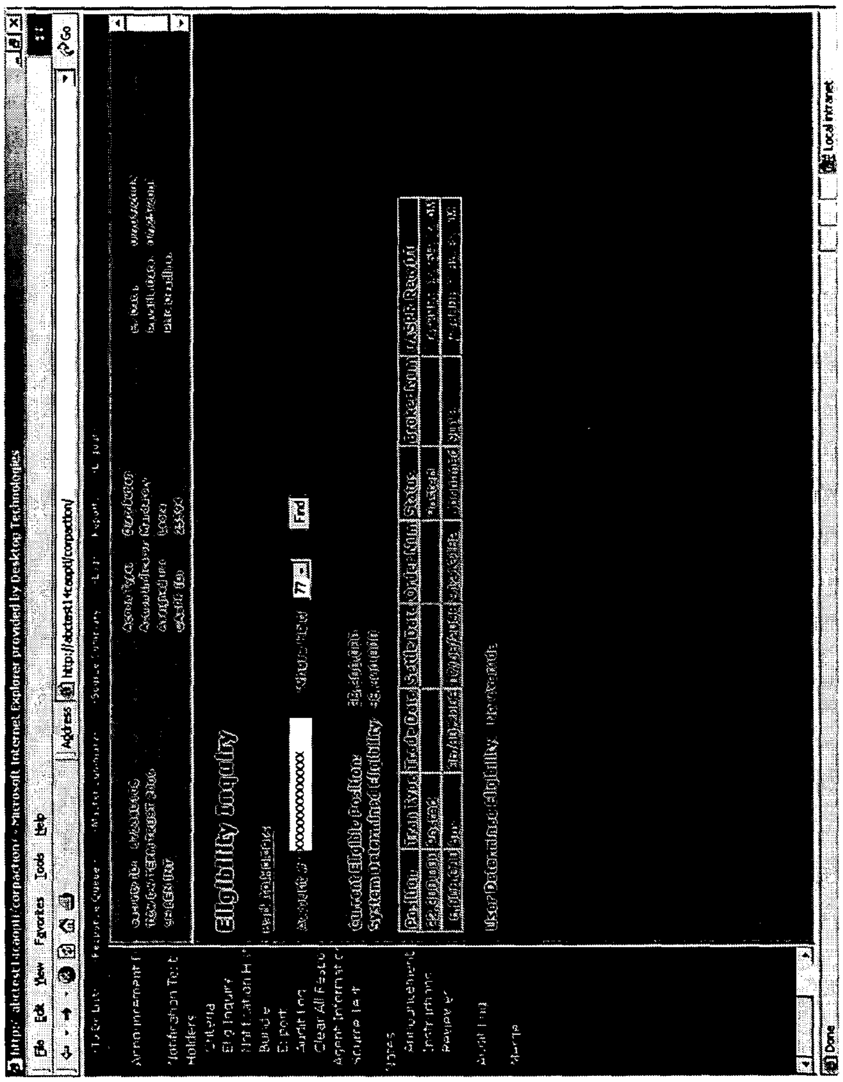
FIG. 13A is an example screen display showing various functions of one illustrative embodiment of the present corporate action embodiments.

A user 8 can change only the position, all boxes, and responses on existing rows in the Holders table. Account, Account Name, Adv#, Regis, and WH cannot change. The Holders data is not locked when a user 8 views the account information. Multiple users 8 can view and edit the data at the same time. The corporate action processing system 6 will update the audit log when a user 8 changes position and response amounts. The corporate action processing system 6 does not update the audit log for position changes that occur during the daily system 6 refresh. In one aspect, an Eligibility Inquiry page can be provided (an example of this page is shown in FIG. 13A) that can be employed for logging intra-day and batch changes to one or more eligible positions.

The following are example Account Ranges: (note, it is possible for ranges to split within a bank)

00-00-000-0000000 thru. 34-32-100-9873411

34-32-100-9873412 thru. 40-40-915-2020615

40-40-915-2020616 thru. 99-99-999-9999999

In one embodiment, the Holders page operates on only the selected range. Meaning filter and sort operations used in the table apply only to the selected range of accounts. If the user 8 views the first range listed above, for example, and then decides to filter on "unresponded" holders, the user 8 will not see the unresponded accounts greater than 34-32-100-9873411. To view the unresponded accounts in the range 34-32-100-9873412 thru 40-40-915-2020615, the user 8 must select that range then filter for "unresponded" data. In another embodiment, the Holders page operates on the entire Holders list. Thus, sorting affects all pages and not just the displayed page and filtering of data can be conducted on a criteria page, for example, instead of on the Holders page.

In another aspect, filtering with our without specified account ranges can be performed on the Holders Criteria page. For special account groups the Holders page has a link to the Holders Criteria page, where the user 8 can define specific matching criteria to find accounts to display on the Holders page. The Holders page will display the Holders criteria if any is applied as follows, for example: Holders Criteria Account No.: 20% Position status: New Response status: Unresponded.

In one embodiment, the Refresh Holders process (RefreshPositions.exe) determines the account ranges daily after the holder data is refreshed. Each day the refresh process removes all rows in the HolderAccountRanges table and calculates the account ranges for the day. Because an offer may have gained holdings from the previous day, the account ranges can vary from day to day. However, the ranges do not vary during the day. If a range has 499 rows, for example, and the user 8 adds 20 holdings, the display set will be 519 rows. The display-set ranges do not change during the day.

Figure 14:
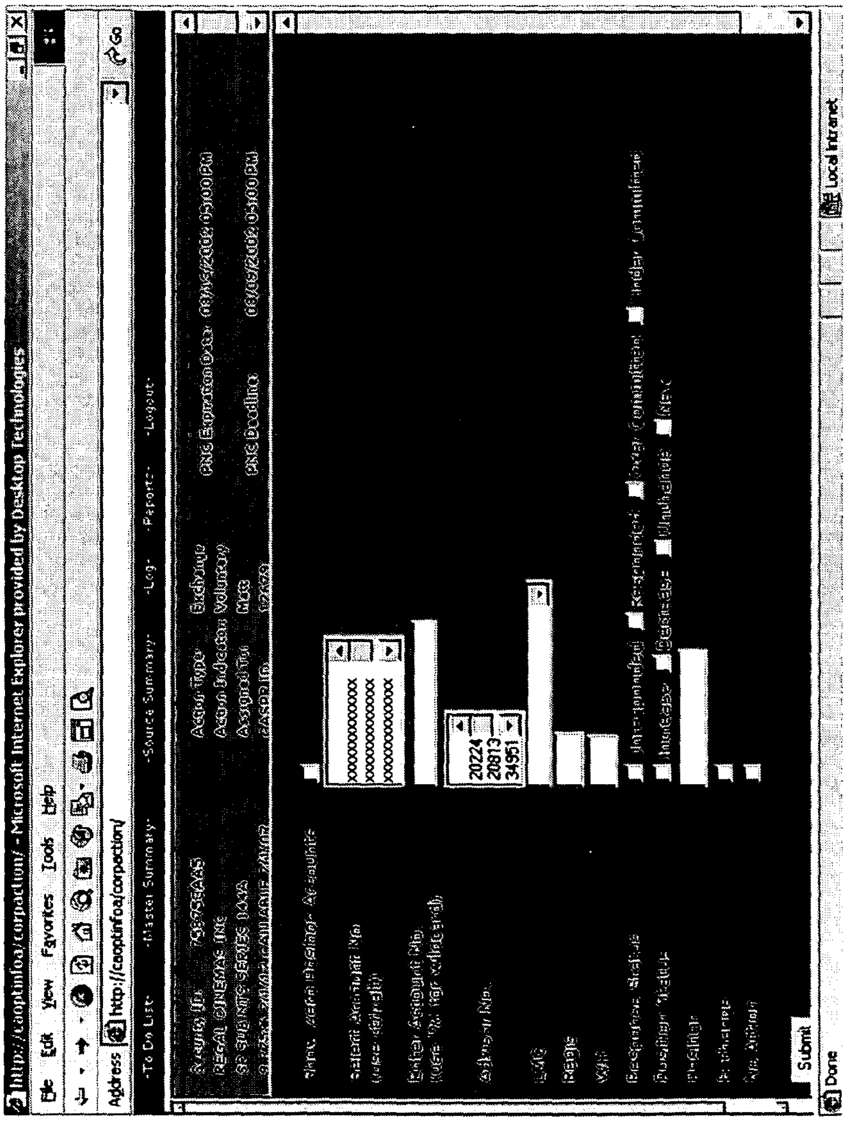
FIG. 14 is an example screen display showing various functions of one illustrative embodiment of the present corporate action embodiments.

Referring now to FIG. 14, a Holders Criteria page is provided that allows the user 8 to define specific matching criteria to find accounts to display on the holders page (see FIG. 13 discussed hereinabove). The user 8 enters this page from the "Holders Criteria" link on the Holders Page or through the navigation panel. When the user 8 has completed the criteria, he clicks the "Submit" button. The Holders page is displayed with only the accounts matching the criteria selected. In one aspect, the user 8 cannot set criteria based on response amount. The following provides a sample description of various functions of the Holders Criteria page:

Account: a single account number, with optional wildcard character. For example, 10-10-100-1234567 matches a single account;

10% matches all bank 10 accounts; 20-34% matches all bank 20, region 34 accounts.

Advisor: a single advisor number.

LMG: a single Local Market Group Name (selected from drop down list).

Registration: a single registration number, 2 digits.

Where-Held: a single where-held number, 2 digits.

Unresponded: Checkbox, where check means match unresponded account.

Overcommitted: Checkbox, where check means match overcommitted account.

Undercommitted: Checkbox, where check means match undercommitted account.

Responded: Checkbox, where check means match Fully Responded account

New Position: Checkbox, where check means match account with new position.

Increased Position: Checkbox, where check means match account with increased position.

Decreased Position: Checkbox, where check means match accounts with decreased position.

Unchanged Position: Checkbox, where check means match accounts with unchanged position.

"Include 0 position", a specific position amount, and specific options

Option Title

Position

In another aspect, the user can select multiple values for processing by the system 6, such as multiple account numbers, for example.

Figure 15:
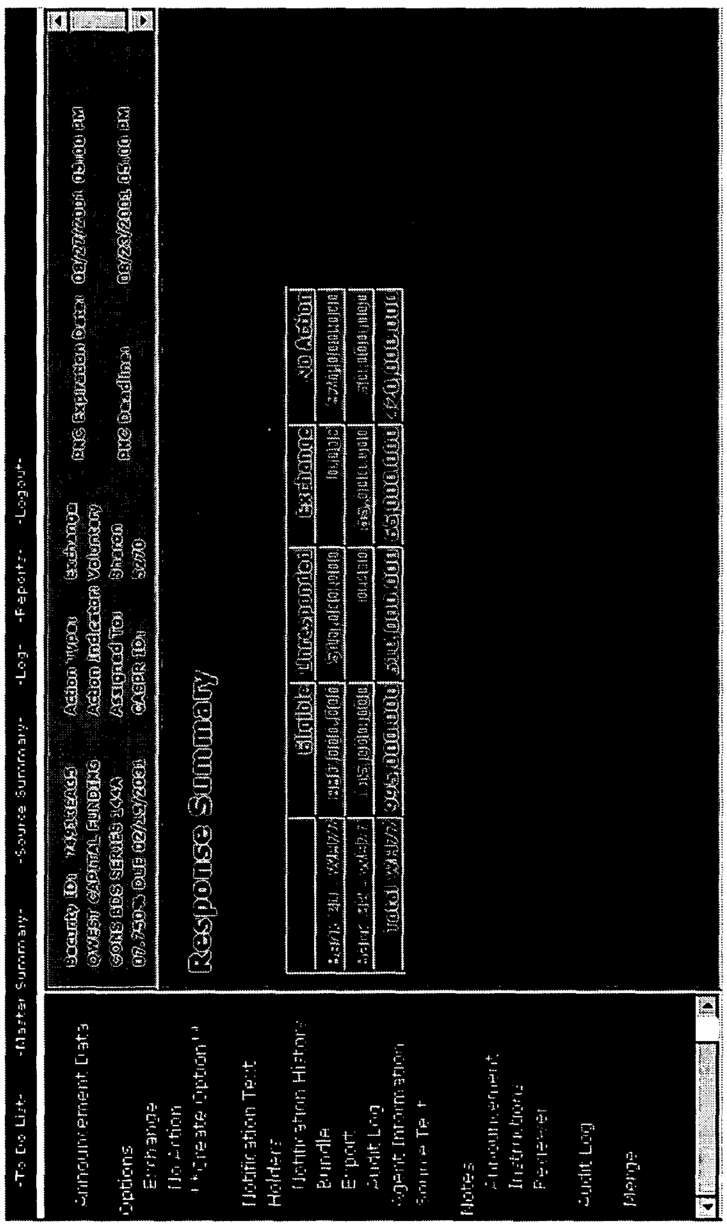
FIG. 15 is an example screen display showing various functions of one illustrative embodiment of the present corporate action embodiments.

Referring now to FIG. 15, a Response Summary page, also known as the Bundle page, is provided that displays a summary of responses by bank and where-held codes. This is an informational page that the user 8 cannot edit, but which can be printed, for example, for consumption by the user 8.

The user 8 enters this page from the "Bundle" link in the Navigation bar. The table displays the total response amounts for each bank and where-held code. The totals by where-held code are displayed at the bottom of the table. The user 8 is not able to change the bundled values on this page. The response column headers are the option titles. The total eligible positions at each bank and where-held code are displayed in the Eligible column and is totaled at the bottom by where-held. "Eligible" is the total position amount for all accounts at that bank and where-held code for the given master. "Unresponded" is the "Eligible" minus the responses. The where-held total at the bottom is the total amount at that where-held for all bank for the given master.

Figure 16:
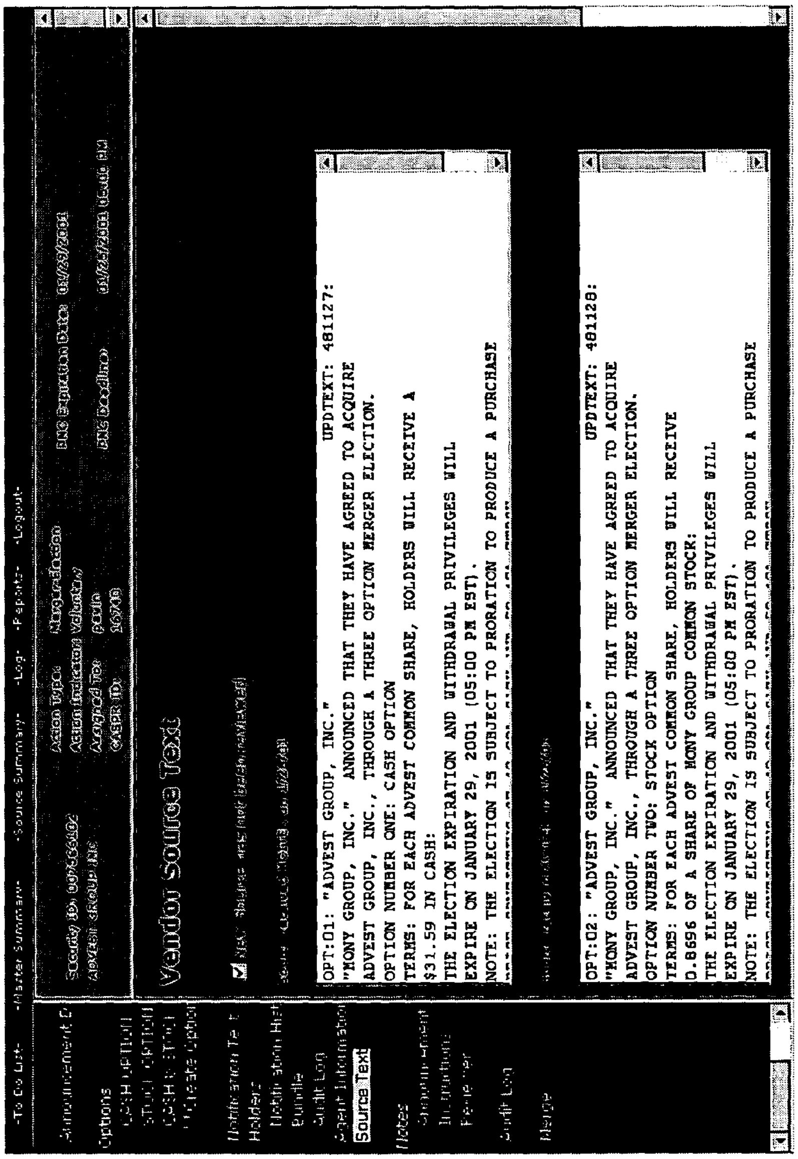
FIG. 16 is an example screen display showing various functions of one illustrative embodiment of the present corporate action embodiments.

Referring now to FIG. 16, the Source Text page shows the user 8 the source announcements that are linked to the master announcement. Specifically, this page will show the date the source came into the system 6 and the non-formatted text held in the source record. The sources will be ordered by receipt date with the most recent source displayed at the top of the page. The Source Text page provides a link for the user 8 to view the full source announcement. In one embodiment, the receipt date is the ENTDATE from "XCITEK" records. It is the created date for manual source records. Clicking on the "Source" link takes the user 8 to the Source Detail page for that source announcement.

Figure 17:
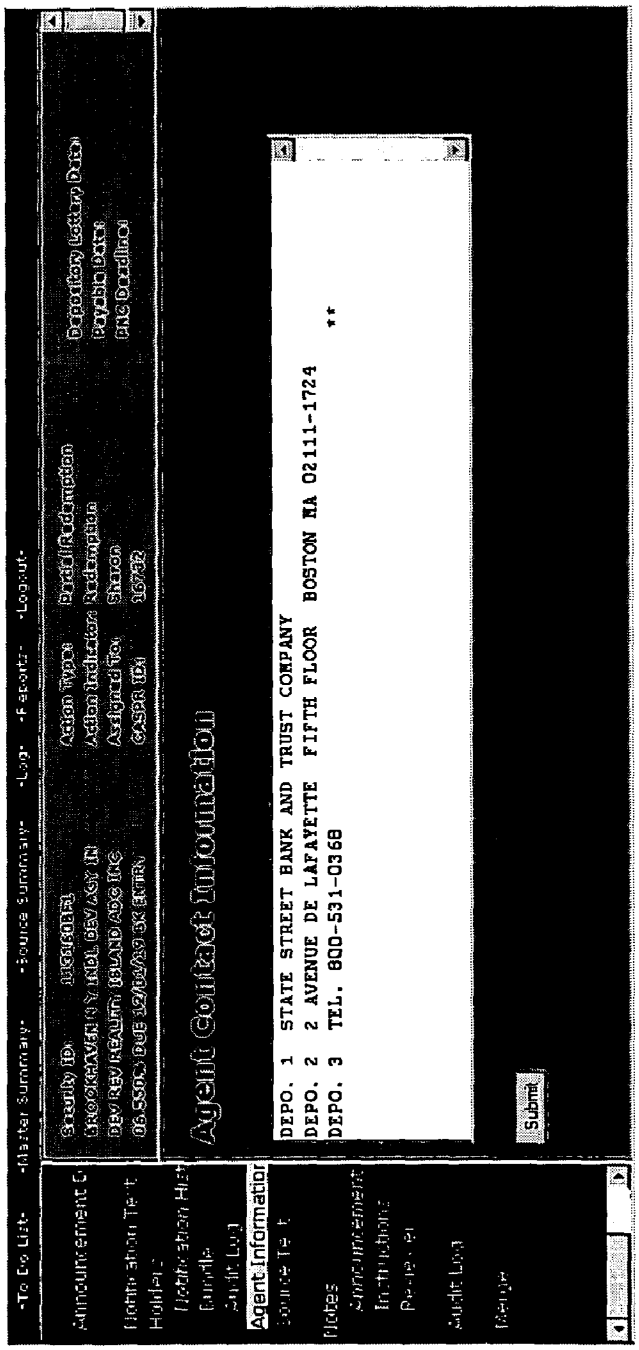
FIG. 17 is an example screen display showing various functions of one illustrative embodiment of the present corporate action embodiments.

Referring now to FIG. 17, the Agent Information page displays the agent contact information for the current master. The user 8 is able to view and edit the information. The financial institution 2 may use the announcement notes in conjunction with this page to store and view agent information. If the user 8 moves agent information to announcement notes, then the agent information will not be deleted. In the agent information area for the announcement, updating sources may overwrite the agent data. New values are logged by the system 6 in the audit log.

The user 8 sees the current agent contact information for the master. If the master does not have agent information, the text area is empty. The user 8 can edit by typing or pasting directly into the text area. The changes are not saved until the user 8 clicks the Submit button. If the user 8 leaves the page without selecting the Submit button his changes are not saved. The system 6 does not impose a format on the input. The system 6 maintains the text as input from the user 8 or as taken from the vendor feeds. The system 6 does not maintain a field history for the agent information. The system 6 does record changes to the agent information in the audit log. The new value should be recorded in the audit log. The agent information field can never be marked as "update and show" or "discrepant" because the user 8 interface does not have a way for the user 8 to view the field history and resolve the issue. The agent information field will always be treated as "update and never show". The user 8 will use the audit log to see previous values.

Figure 18:
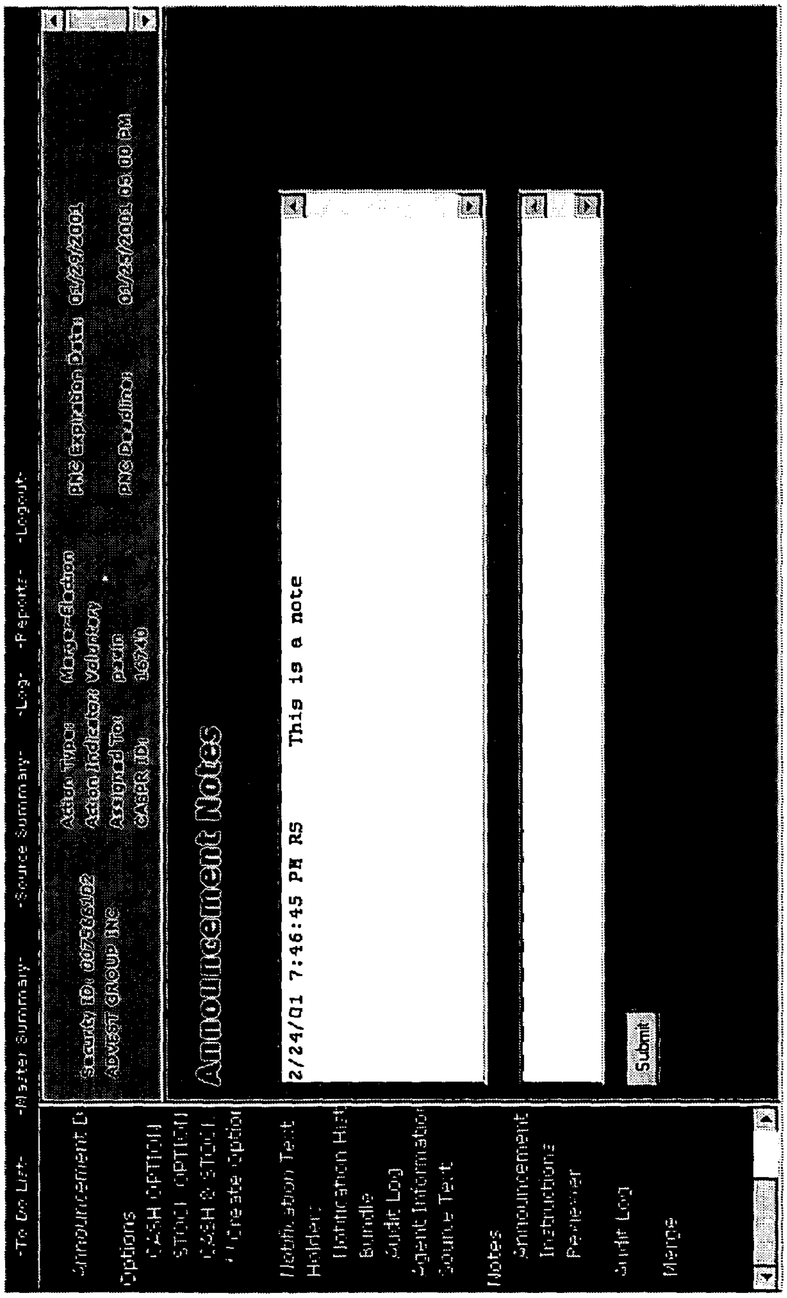
FIG. 18 is an example screen display showing various functions of one illustrative embodiment of the present corporate action embodiments.

Referring now to FIG. 18, a Notes page is provided for displaying the current user 8 notes on a master and allowing the user 8 to enter new notes. The Notes page supports various categories of notes to help the user 8 organize and better access information regarding the announcement and other corporate action information. For example, the user 8 may use the Announcement category to record conversations with an LMC and/or failed attempts to contact the LMC. The user 8 may put reminders on how to prepare instructions in the Instruction Note category. In one example embodiment, the reviewer may want to document in the Reviewer's Notes any comments communicated to the specialist regarding the review.

The page contains a title that identifies which note category is currently displayed. The title matches the current page pointer in the Navigation Panel. The user 8 sees in the top text area the existing notes for the selected note category. The existing notes are for viewing only; the user 8 cannot edit the existing notes. The existing notes are ordered by date with the most recent at the top. Each note has the date the note was entered and the initials of the user 8 who entered the note. The user 8 creates a new note by typing into the lower text area. When the note is complete, the user 8 clicks the "Submit" button. The system 6 saves the note on the database 6B and inserts the new note into the top text area on the page with today's date and the current user 8 initials. The text in the bottom area is cleared. If the user 8 clicks the "Submit" button without typing anything into the bottom text area, the system 6 will not save an empty note. Clicking the "Submit" button in this case has no effect. The Announcement Notes area displays any notes that the user 8 entered while making a manual update to a field or while creating a manual new master announcement.

Figure 19A:
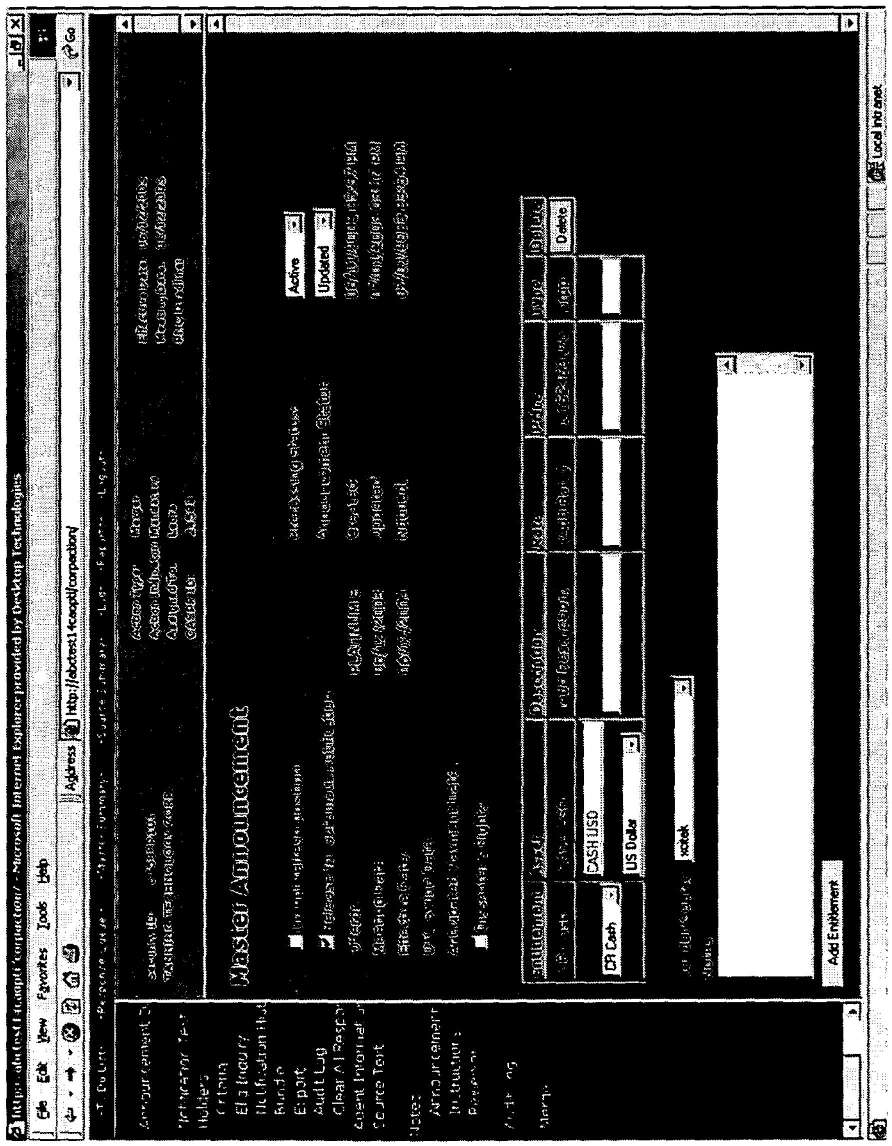
FIGS. 19A-19C include example screen displays showing various functions of one illustrative embodiment of the present corporate action embodiments.
Figure 19B:
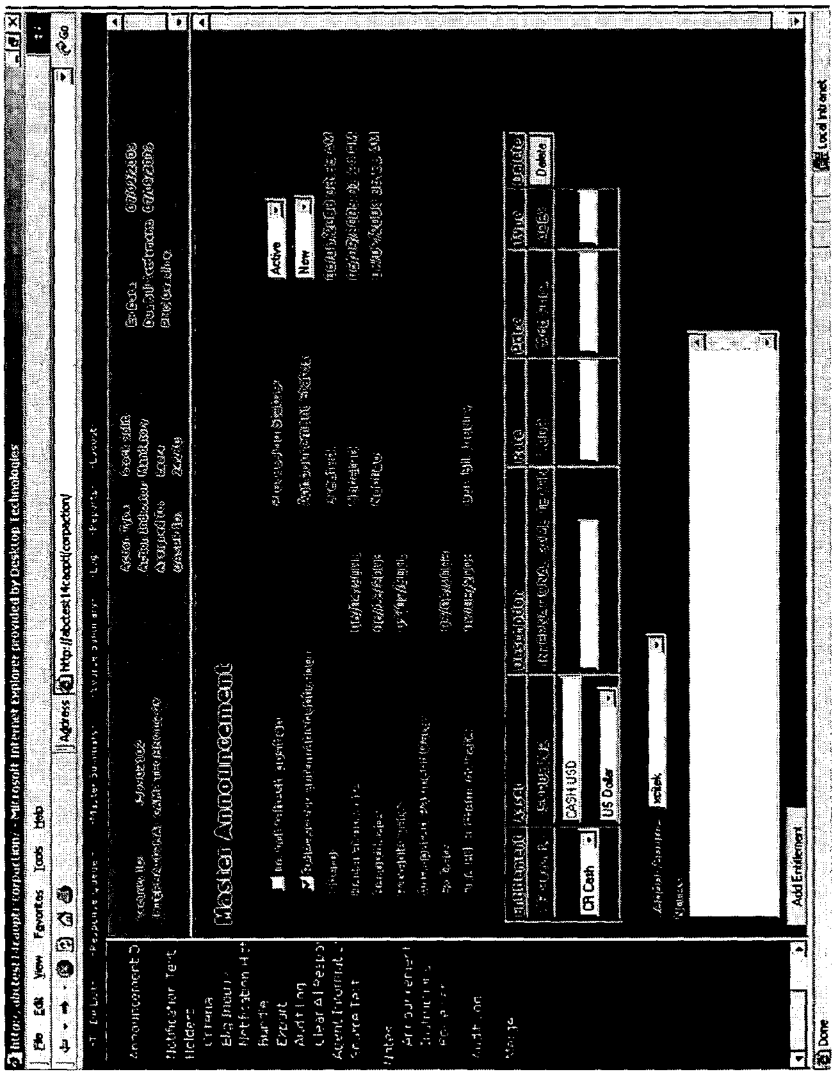
Figure 19C:
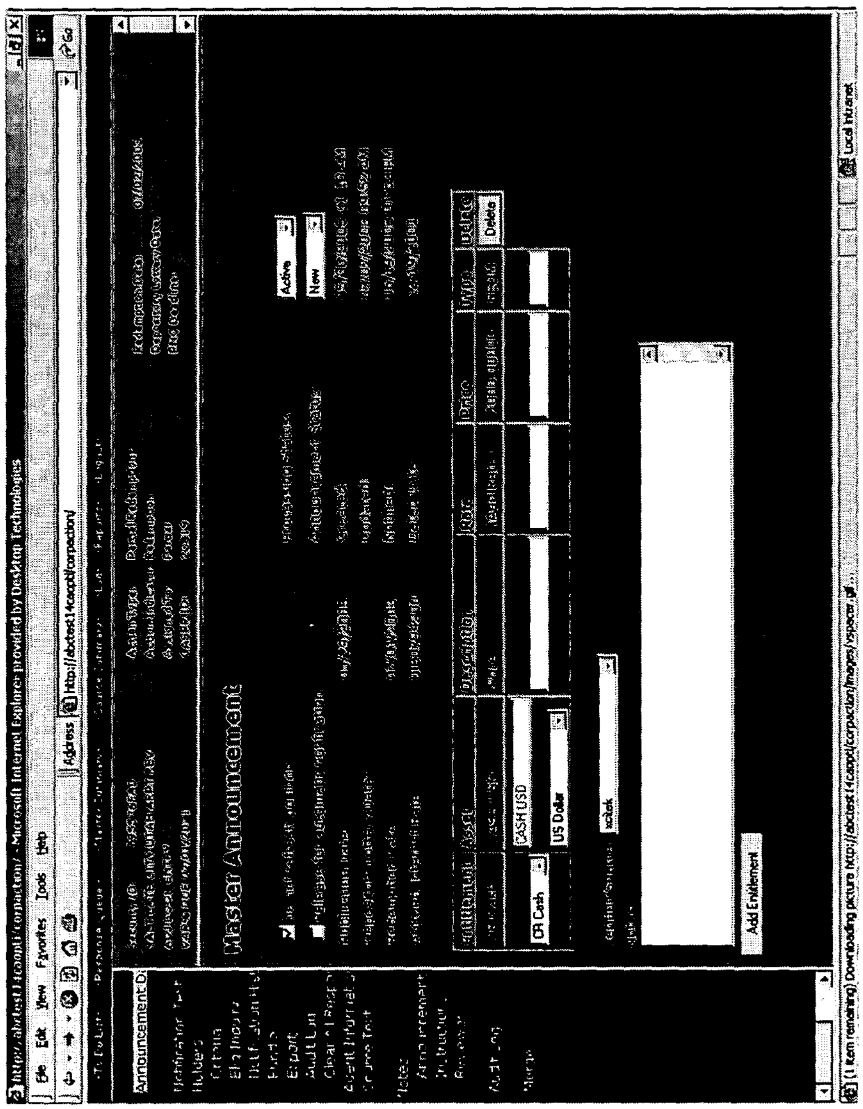

Referring now to FIGS. 19A, 19B and 19C, a mandatory effective date announcement page, a mandatory Ex Date announcement page, and a mandatory redemption announcement page are provided. Each page is intended to show the user 8 the current announcement values stored for the announcement. The user 8 cannot edit values on this page, but can easily navigate to the Field Detail Page to make changes by selecting the field label hyperlink. To make it easier for the user 8 to find system 6 updated fields, the page graphically denotes whether a field is considered discrepant or updated. Since a mandatory announcement has at most one option, the entitlement data is presented here.

Since this is a mandatory announcement, "Options" is not shown in the Navigation Panel. If the "Do not refresh position" box is not checked the system 6 will automatically refresh the position data for the announcement. The refresh is a system 6 process that runs at a scheduled time before every business day. If this box is checked, the position data will remain unchanged from day to day until the user 8 unchecks the box.

The page shows the "updated" icon for fields that the system 6 has automatically updated and, because of the update rules, the user 8 wants to see the update. The icon is displayed to the left of the field label. Selecting the link for this field takes the user 8 to the Field Detail Page in "update" mode, meaning only the current and previous values are displayed.

This page shows the "discrepant" icon for fields for which the system 6 has received an update and, because of the update rules, the user 8 does not want the system 6 to automatically update the field. The icon is displayed to the left of the field label. Selecting the link for this field takes the user 8 to the Field Detail Page in "discrepant" mode, meaning the current value and all updates for the field that have come in since the field became discrepant are displayed.

The date after the "Created:" label is the day the master announcement was created. The date after the "Updated:" label is the day the master announcement was last updated (either automatically or manually). The table shows the rate and price information for each entitlement. The user 8 can edit the values for the entitlement by clicking the link for the field desired to be changed. Clicking the link will take the user 8 to the Field Detail Page where the user 8 can select a value previously sent by a vendor or can enter a manual value from an external source. The user 8 is changing only one part of the entitlement information and is not able to edit the entire entitlement definition at one time. This was specifically requested so that the user 8 can, for example, set a value from one vendor and an asset number from another vendor.

The user 8 can add a new entitlement by clicking the "Add Entitlement" button after entering the asset name, description, rate, price, vendor/source information, and optional note information. The entitlement type, asset name, and either price or rate is required. When the user 8 clicks the button the information in the input boxes moves up to its own row in the table and the input boxes are cleared. If the user 8 entered a note for the new entitlement the system 6 inserts an announcement note. The announcement note created should indicate that the note originated from the user 8 adding a new entitlement. The format is "[New Entitlement] EntitlementType AssetName financial institution 2/IN/Vendor: note text". Valid values for the entitlement drop down list are "CR Security", "DB Security", "CR Cash", and "DB Cash". The Asset field for security entitlement will hold the CUSIP. The Asset field for a cash entitlement will hold the currency, i.e. "Cash in USD". The system 6 defaults to USD.

Figure 20:
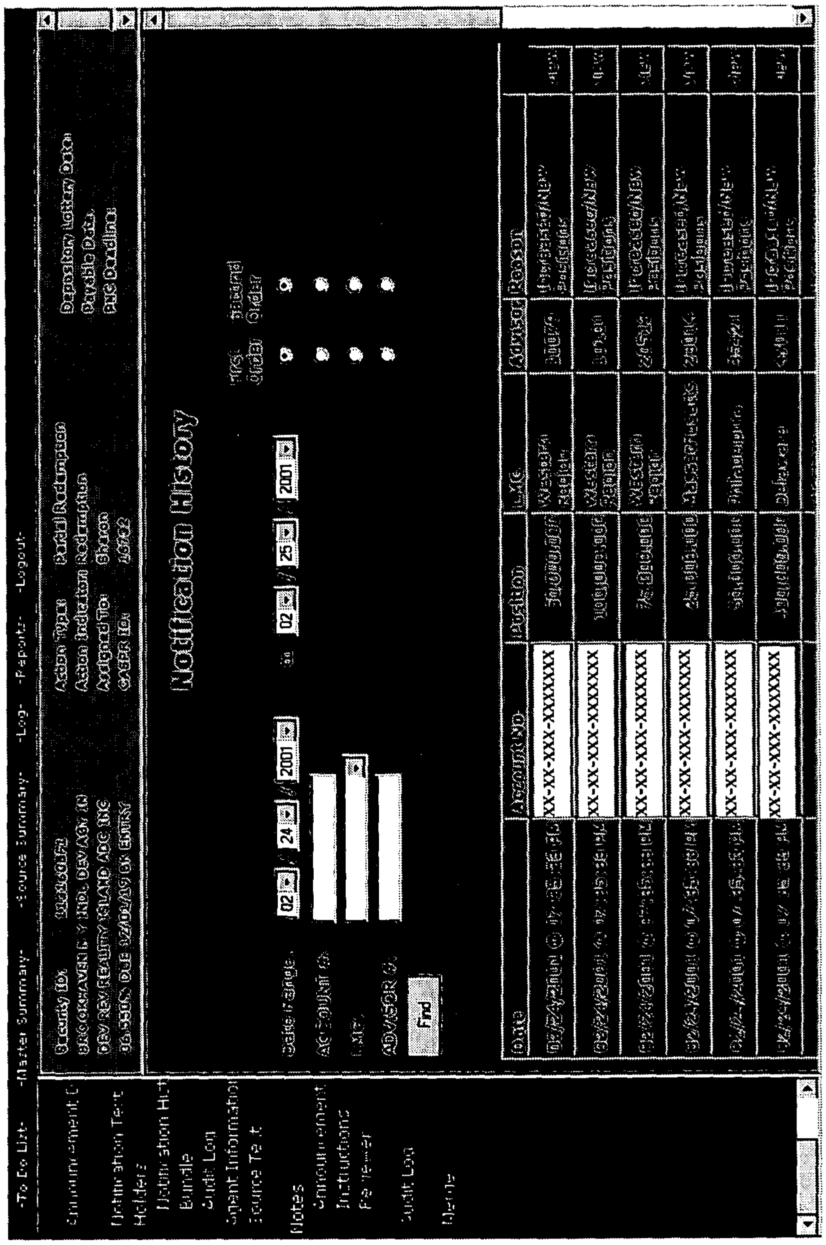
FIG. 20 is an example screen display showing various functions of one illustrative embodiment of the present corporate action embodiments.

Referring now to FIG. 20, the notification history page provides a summarized history of notifications sent for the announcement. The user 8 is able to see the date the notification was sent/posted, the receiving LMG, the accounts, and the positions listed. This page also provides a link to allow the user 8 to view the full notification that was sent.

In one aspect of the present methods and systems, the user 8 can navigate to this page from the announcement master page by selecting the "Notified On:" link. When the notification history page is displayed, the user 8 can view the list of accounts that were on the last notification sent for the announcement. Of course the user 8 can change the search criteria to view other notification once he is on this page, but initially from the master page the notification history table will show the information from the last notification. For announcements with more than 500 accounts, the user 8 should use the navigation bar to display the Notification History page so that the page does not try to display all accounts at one time. The user 8 can navigate to this page from the navigation bar. There is no default notification displayed in the notification history page when the user 8 enters from the navigation bar. The user 8 must select the appropriate search criteria to find the information needed.

The user 8 can search for notified accounts on a specific date range, account number, local market group, and/or advisor. The user 8 enters the search criteria and clicks the ""Find" button for the page to display the matching accounts. If desired, the user 8 can specify a sort order before clicking the Find button so that the results are displayed in a convenient order for the user 8 to view. If the user 8 does not give a sort order the results will be sorted by date. To view the full notification as seen by the local market contact, the user 8 selects the document link "View" to go to the Notification Page. The notification table contains date, advisor number, account, LM Group, position, and reason for notification. The reason can be "Responses Due", "Increased/New Positions", "New Offer", "Updated Offer", or can be blank. In another aspect, conventional wild card functionality can be employed to search for data including, for example, account number and/or advisor name.

Referring now to FIG. 21, a sample notification page is shown. This page allows the user 8 to view the notification as seen by the local market contact 8C. If necessary, the user 8 should be able to save or print the document using a browser menu, for example. Having saved the document to a local hard drive, the user 8 can print, fax, and/or e-mail the document, for example, as needed. The time is displayed for the expiration date, when the expiration date is provided. This applies to anywhere that Expiration or Depository Expiration dates are shown. If the notification is sent because the day is between response and expiration date (inclusive), the document includes a red "Responses Due" note. If the notification is sent because of increased positions and/or new holders, then the document includes a red "Increased/New Positions" note. If the notification is sent because it is a new announcement, then the document includes a red "New Offer" note at the top. If the notification is sent because it has update notification data, then the document includes a red "Update Offer" note. The Position Status column values can also be colored red or another suitable color. In other aspects, the following notification reasons can be employed: (1) Preliminary—the notification for a non-voluntary action is considered "Preliminary" if both important dates are blank and the meeting date is blank. Voluntary corporate actions can be automatically considered preliminary if the expiration date is not present. (2) Pending Lottery—if a Partial Redemption or Partial Pre-refunding notice has been sent prior to processing the lottery, the notification can be configured to display as "Pending Lottery". (3) Lottery Results—if a Partial Redemption or Partial Pre-refunding notice has been sent after processing the lottery, the notification can be configured to display as "Lottery Results". Lottery Adjusted—if a Partial Redemption or Partial Pre-refunding notice has been sent after processing the lottery and "Lottery Results" have been notified, and the lottery amounts have been adjusted, the notification can be configured to display as "Lottery Adjusted". No Response Required—for various notifications that may not fit any of the other notification reason criteria.

Figure 22A:
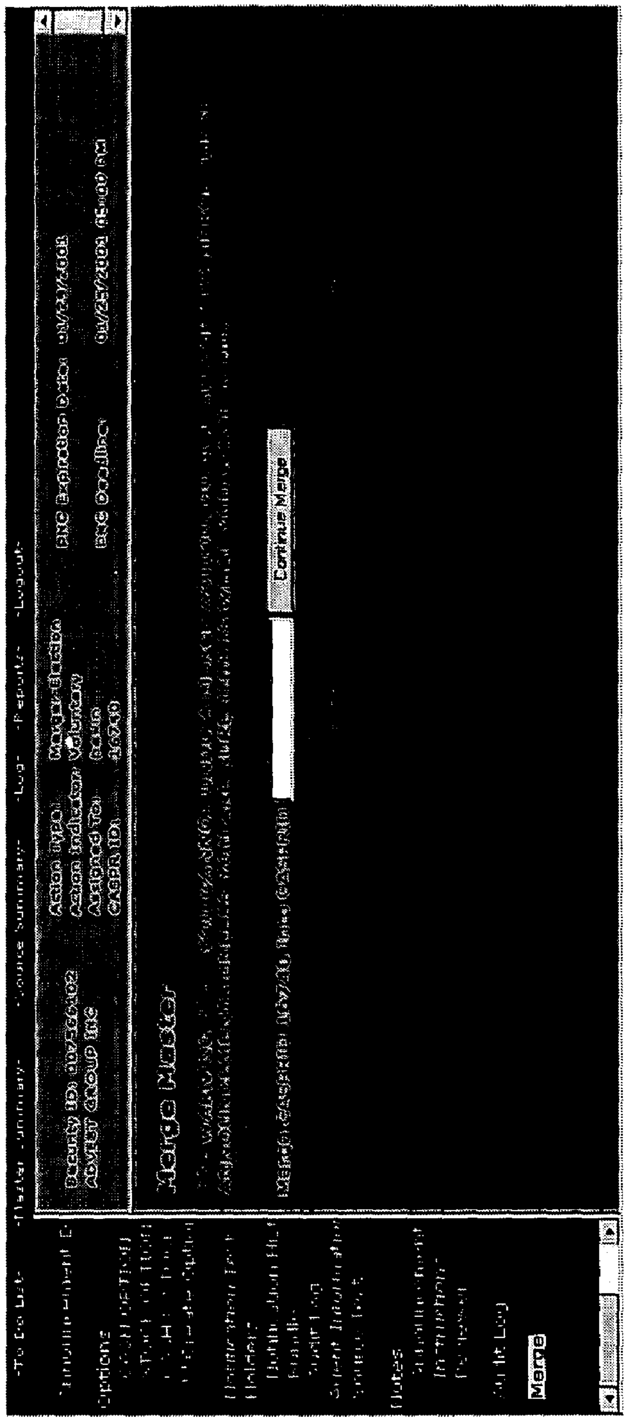
FIGS. 22A-22C include example screen displays showing various functions of one illustrative embodiment of the present corporate action embodiments.
Figure 22B:
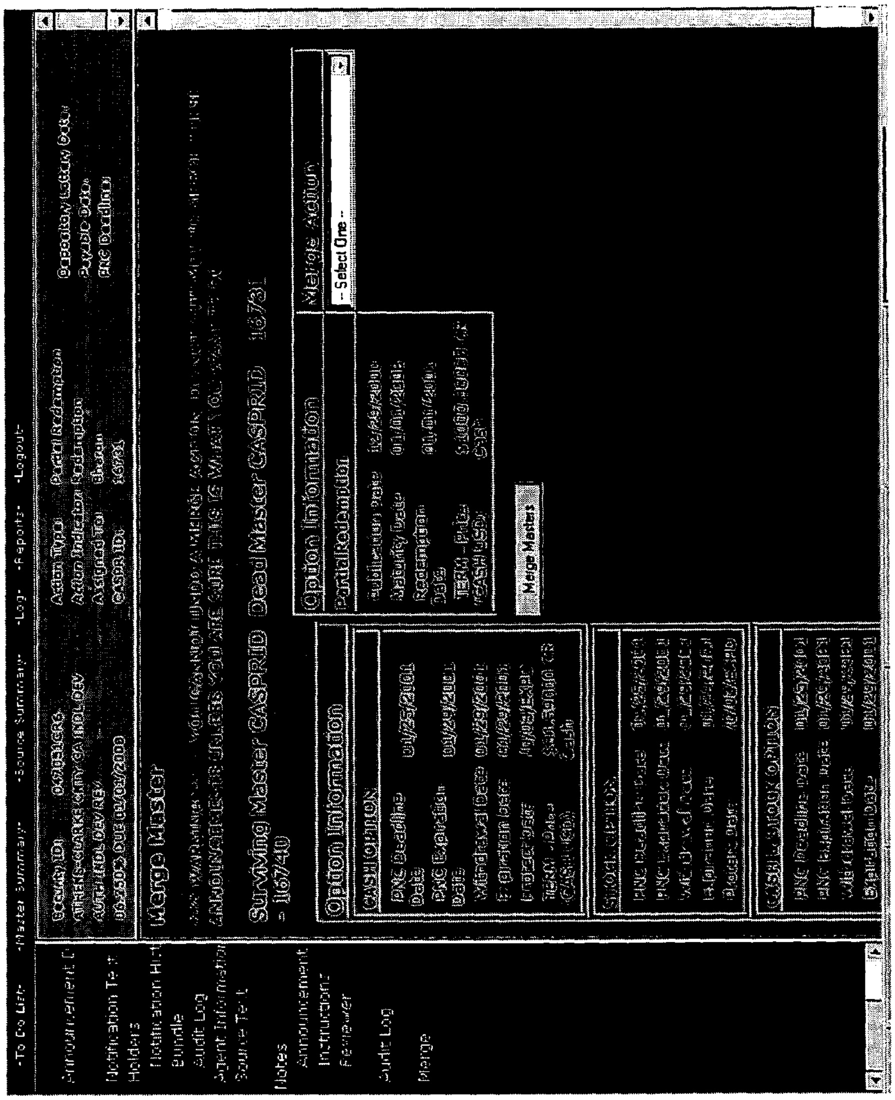
Figure 22C:
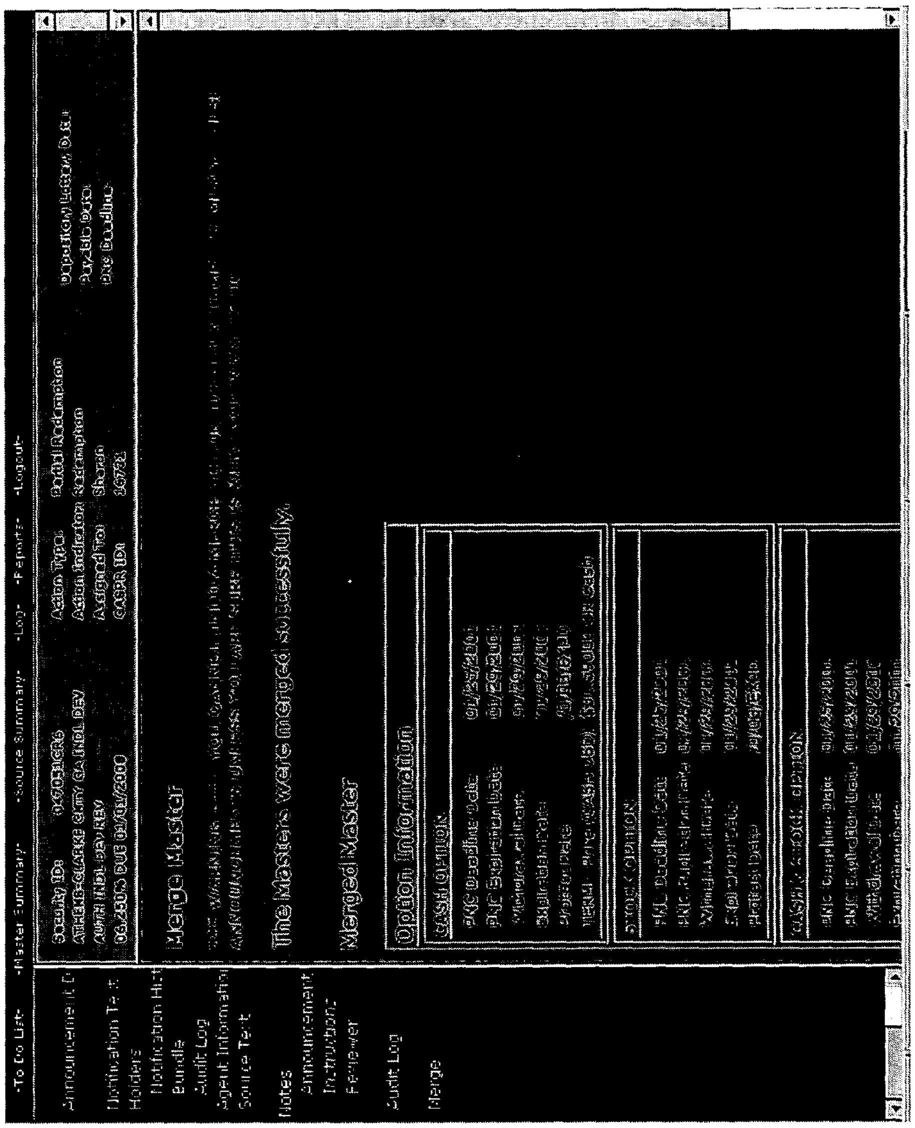

Referring now to FIGS. 22A, 22B and 22C, various illustrations of merge announcement pages are provided. The user 8 is allowed to merge two masters. The Dead Master is the master that is merged into a Surviving Master. Once the two masters are merged, updates to the dead master will update the surviving master. In addition, the source announcements that were linked to the Dead Master become linked to the Surviving Master. The Dead Master's status will be set to "Merged" status. One or more warnings can alert the user 8 that the merger cannot be undone. The merge action can be selected from the navigation panel.

The first screen that the user 8 is presented with is the Surviving Master selection screen. From this screen the user 8 must select the CASPR ID of the Master that the current Master is to be merged into. The current Master will be the dead Master and the CASPR ID that the user 8 enters will be the surviving master. The next screen that the user 8 sees is the Merge Options screen. From this screen the user 8 can view the current Options of the Surviving Master and the Dead Master. A merge action dropdown is provided near each Option of the Dead Master. The user 8 can either create a new option in the Surviving Master or merge the Dead Master Option into an existing Surviving Master Option. An action must be selected for each Dead Master Option and Dead Options cannot be merged into the same Surviving Option. The user 8 must press the "Merge Master" button. When the button is pressed the user 8 will be presented with another warning that the merger is irreversible. From this dialog the user 8 can select "OK" to continue or "Cancel" to abort the merger. If the user 8 selects "OK" the next screen presented is the confirmation screen. This screen informs the user 8 whether or not the merger was successful and displays the Options of the new Surviving Master.

Referring now to FIGS. 23A, 23B, 23C and 23D, a new voluntary announcement page, a new mandatory effective date announcement page, a new mandatory Ex Date announcement page, and a new mandatory redemption announcement are provided. These pages allow the user 8 to create master announcements. The content of these pages is similar to the master announcement pages. The user 8 can create a new master announcement of any action type. The page collects basic information needed to create the master. The user 8 can use the master announcement pages to enter information such as note, holder, agent, options, and other relevant data.

Figure 23A:
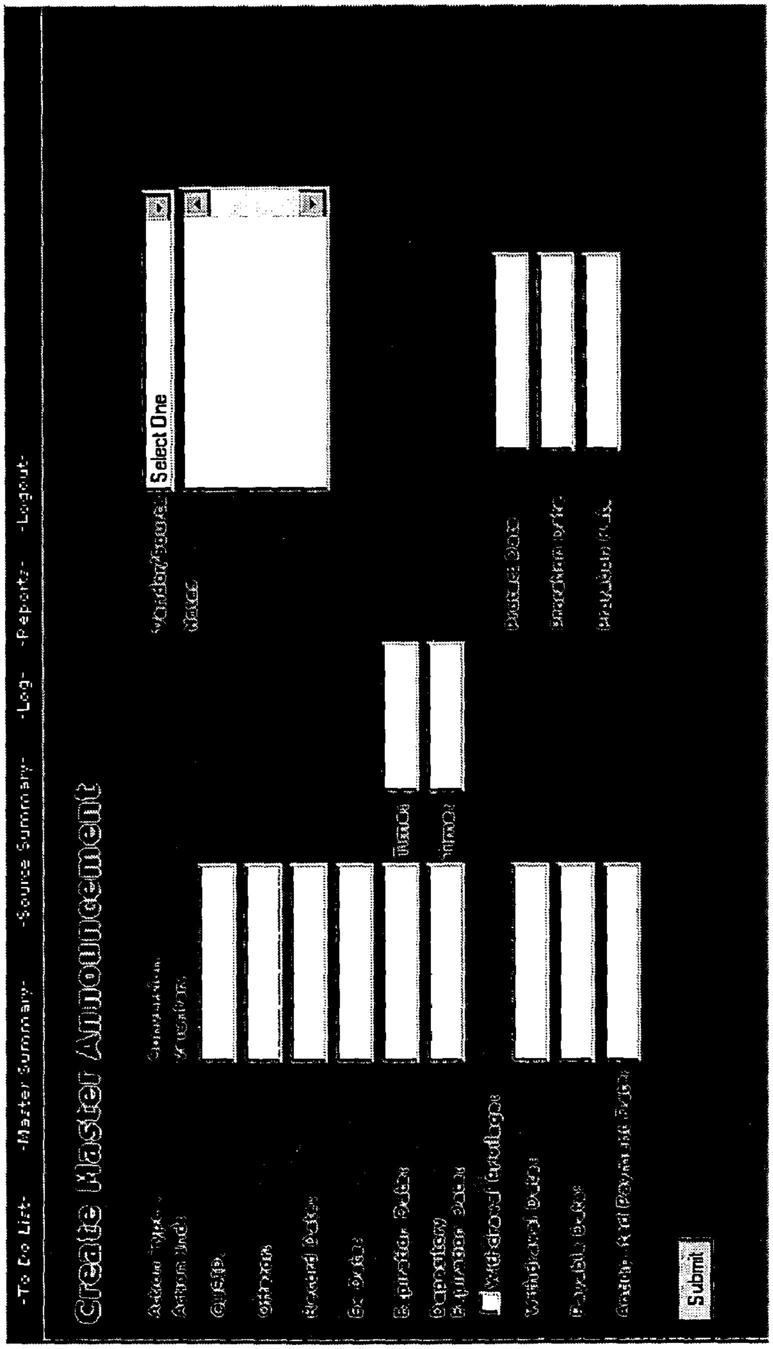
FIGS. 23A-23F include example screen displays showing various functions of one illustrative embodiment of the present corporate action embodiments.
Figure 23B:
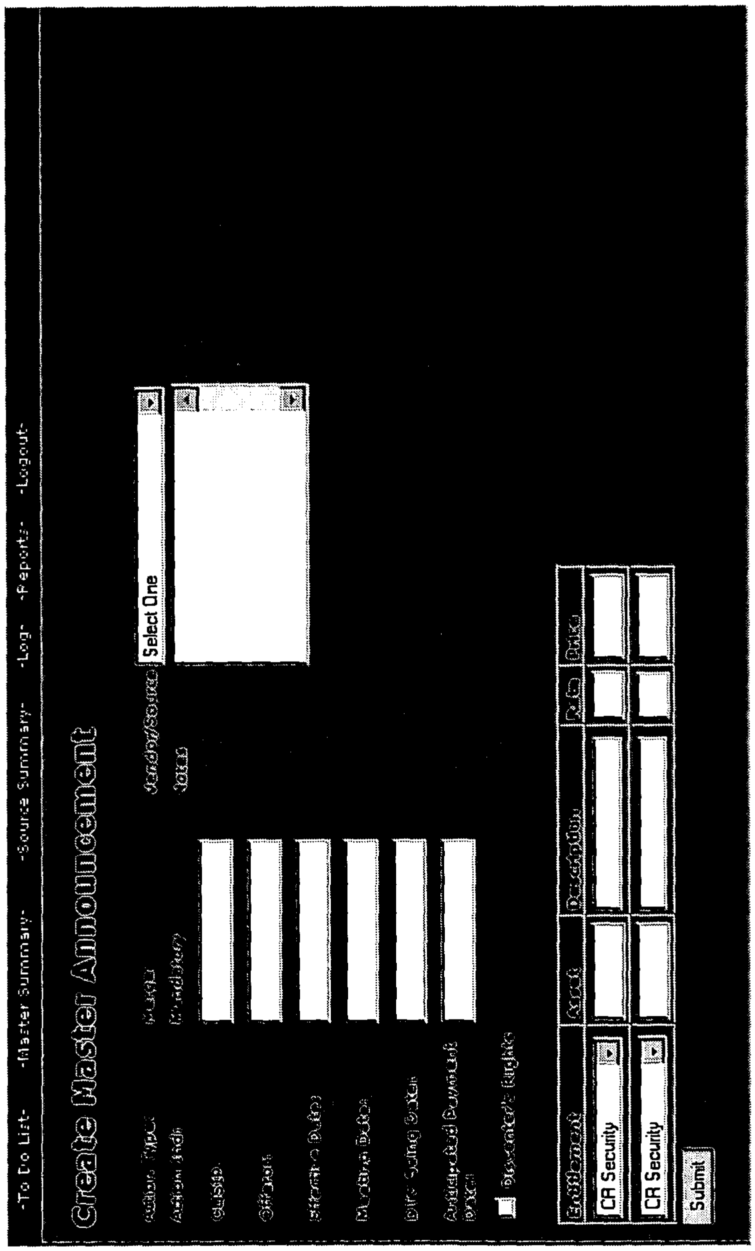
Figure 23C:
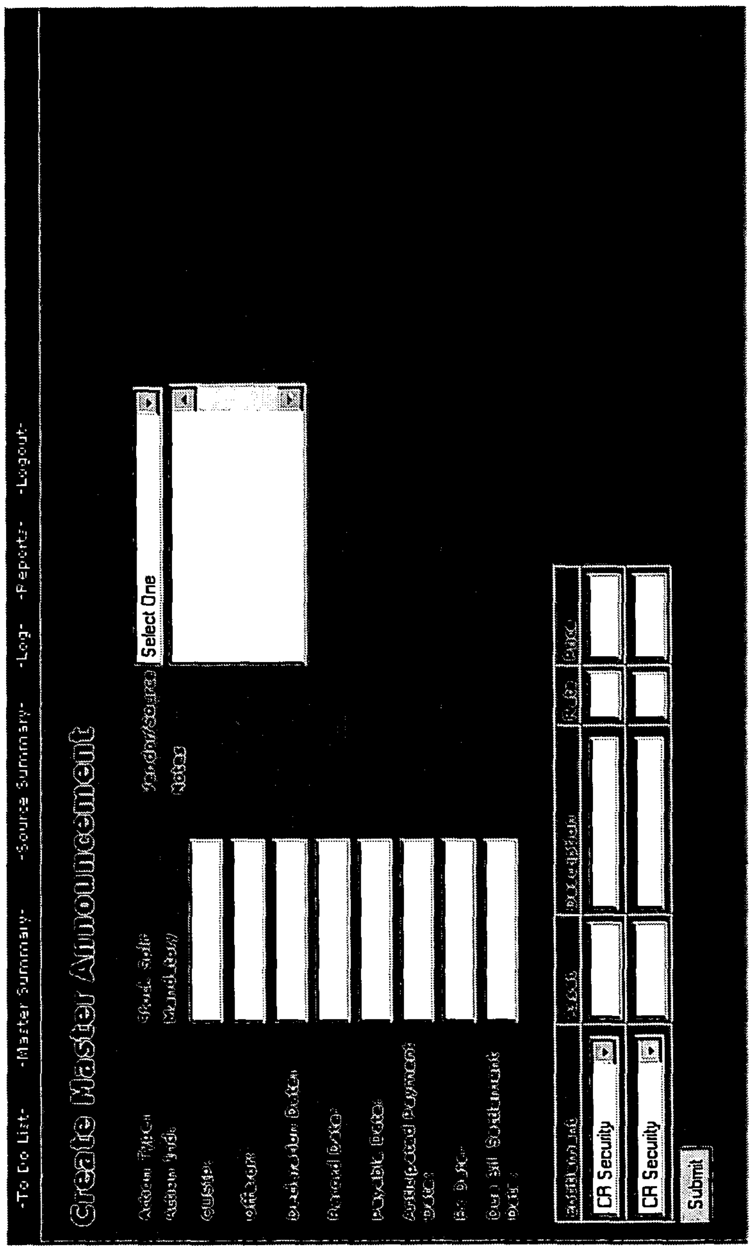
Figure 23D:
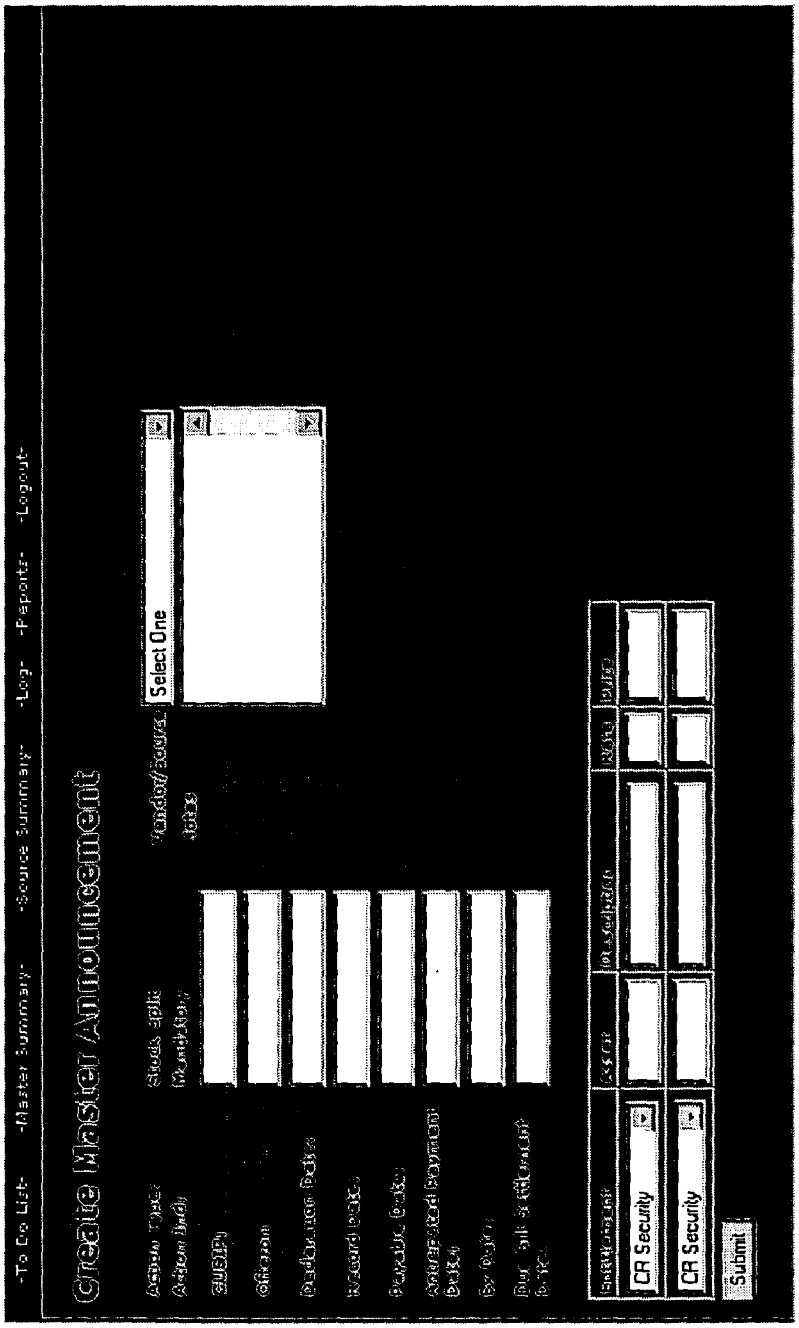
Figure 23E:
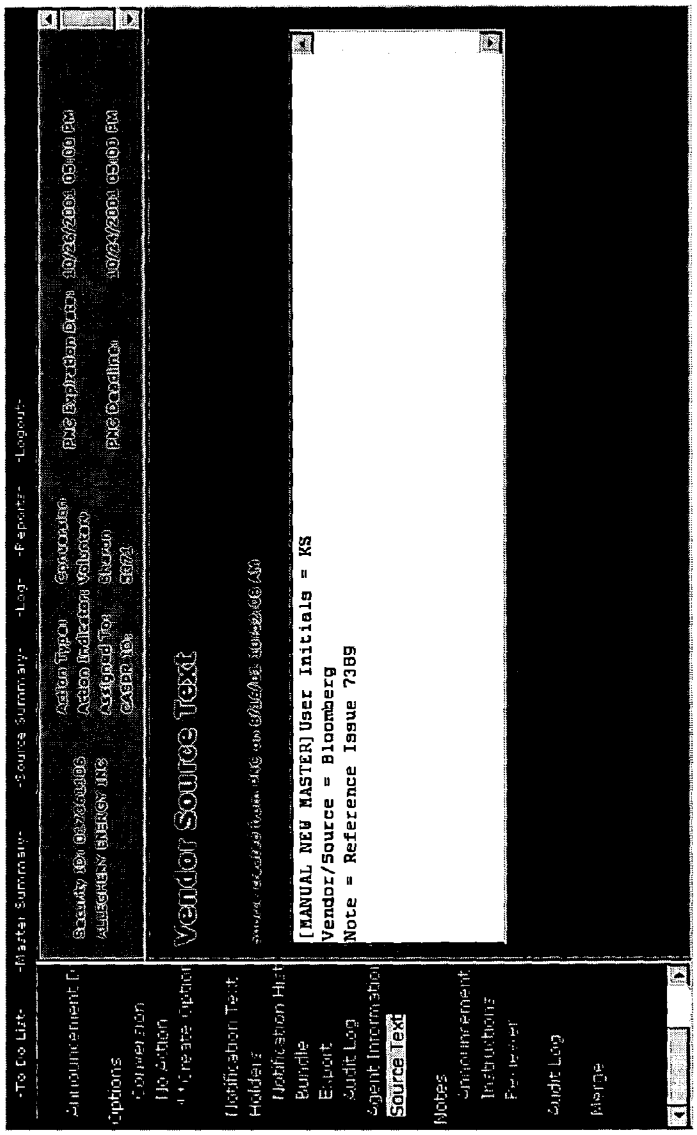
Figure 23F:
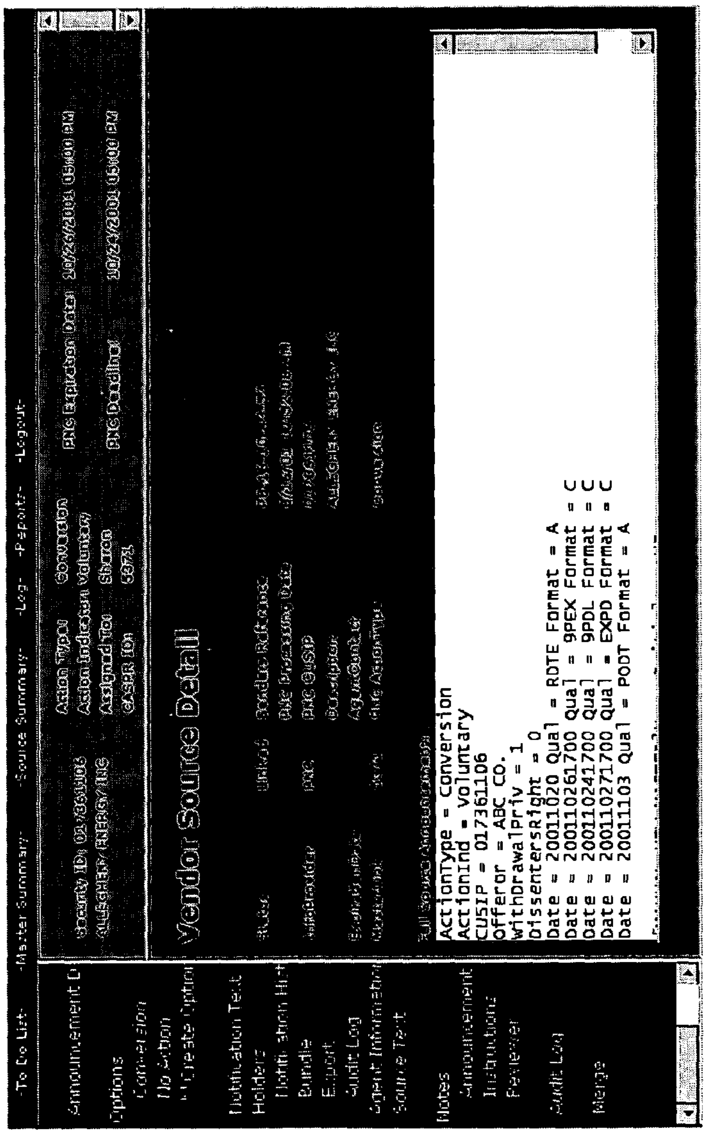

The user 8 navigates to this page from the Master Summary Page by selecting the type (action type and indicator) of announcement that is to be created. When creating a new announcement the user 8 must provide CUSIP, action type, action indicator, and vendor/source. This is the minimum information required to create an announcement. The user 8 is responsible for keeping the "allow automatic notification" flag off until the announcement has more complete information for notification. Notes entered are stored as Announcement Notes for the new master. The system 6 includes the vendor/source selection, the note and special text to clarify that the note was added due to the user 8 manually creating the master. The system 6 creates a source announcement containing all the data the user 8 entered on the new master page. The vendor name seen in the source text page for the master is "financial institution". The user 8 will be able to see the original source with values displayed in label value pairs in the source summary and source detail pages (see, for example, the screen displays of FIGS. 23E and 23F).

For non-voluntary announcements the user 8 is limited to two entitlements in a new master. If more entitlements are needed, the user 8 must save the new master and continue entering entitlement information on the master announcement page. If the user 8 leaves the new master page without selecting the Save button a new master is not created. When the user 8 provides all required information and clicks the Save Button, the system 6 automatically takes the user 8 to the master announcement page for the new master.

Figure 24:
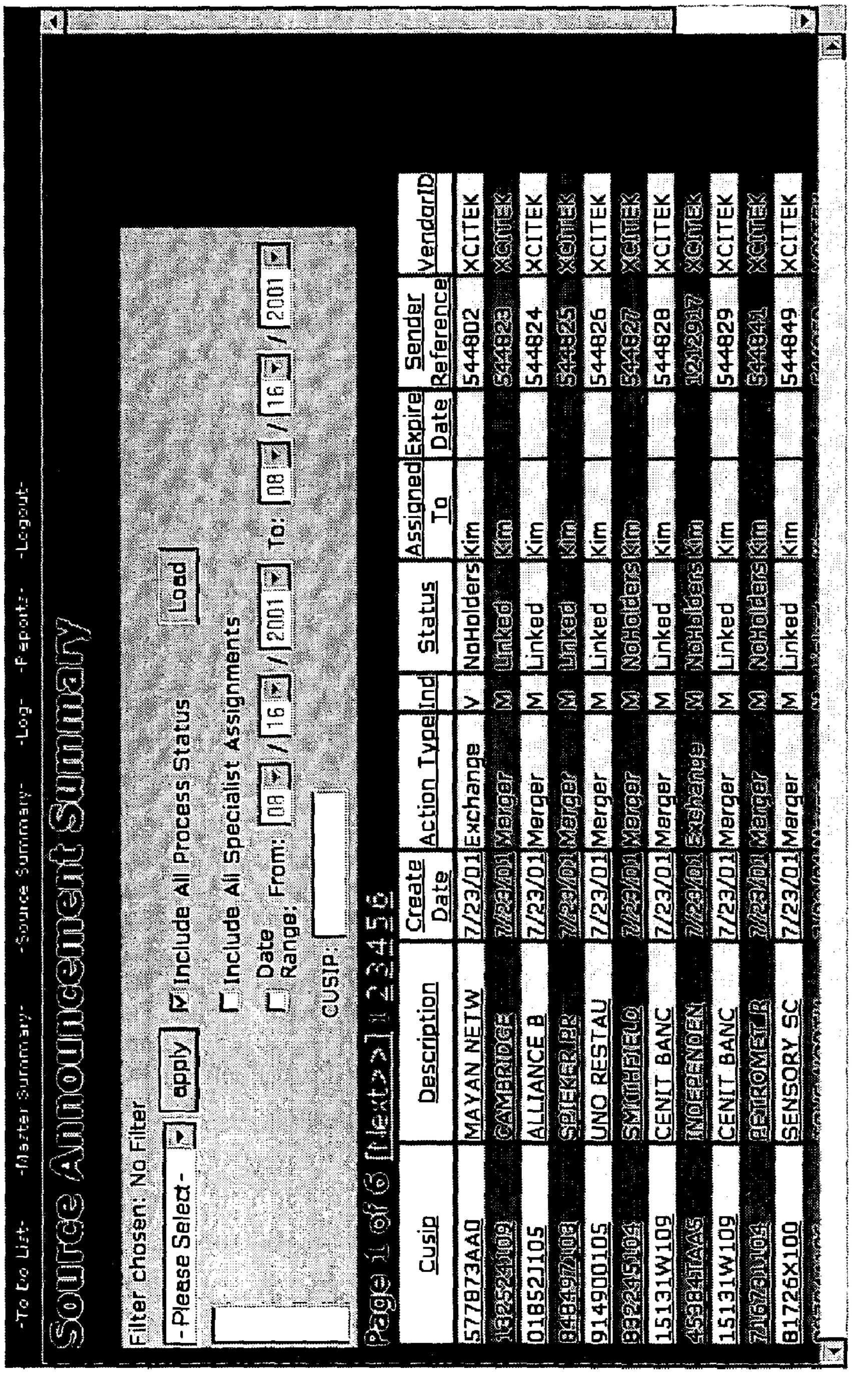
FIG. 24 is an example screen display showing various functions of one illustrative embodiment of the present corporate action embodiments.

Referring now to FIG. 24, a source announcement summary page displays a list of source announcements and provides a link for the user 8 to navigate to the Source Detail Page for that source announcement. By default, when the user 8 navigates to this page from the To Do page, this page displays only source exceptions. To view source announcements that are not exceptions (i.e., sources that are linked to masters), the user 8 can change the filter to view all source announcements.

The user 8 can sort the display on any one column in either ascending or descending order by simply clicking on the column header. The first click will apply the sort in ascending order and the second click will apply the sort in descending order. All columns are sorted in alphanumeric order with numbers displayed first with the exception of dates, which are displayed in date order. The user 8 selects a link in the row to view the details of the announcement. This action takes the user 8 to the Source Detail Page.

The user 8 can use filters to view a subset of the selected announcements. The user 8 can filter on any column and can select multiple values to match. To do this, the user 8 must first sort the display on a given column. The user 8 can then filter on values in that column by selecting the filter group from the drop down list to the left of the page. From the list box to the left of the page, the user 8 selects the values that are desired for viewing/display in the summary page. The user 8 can click the "apply" button to refresh the page with only those rows matching the filter selections. If a reload does not find any announcements matching the criteria, the body of the table is empty, leaving only the headers in the table.

If the user 8 wants to see source announcements that are assigned to other users 8 or see assigned non-exception sources, the user 8 must reload the page using the reload controls. If the user 8 chooses to view all source announcements assigned to everyone and with all status settings, the system 6 will require time to retrieve and display that many rows. Within a user's 8 login session the system 6 remembers the last filter settings used in the summary page. This means that when a user 8 returns to the summary page by using the top-level navigation links, the user 8 can see the same subset of announcements seen the last time the user 8 accessed the summary page. There are exceptions to this rule: one exception is if the user 8 changes the "user view user", then the summary filter settings are lost. Also, if the user 8 returns to the summary page via the To Do Page, the last summary filter setting is disregarded. After the user 8 selects one of the links, the page refreshes with the announcements for that set. The user 8 can also use the "Next" and "Prev" link to view the other announcements.

Figure 25A:
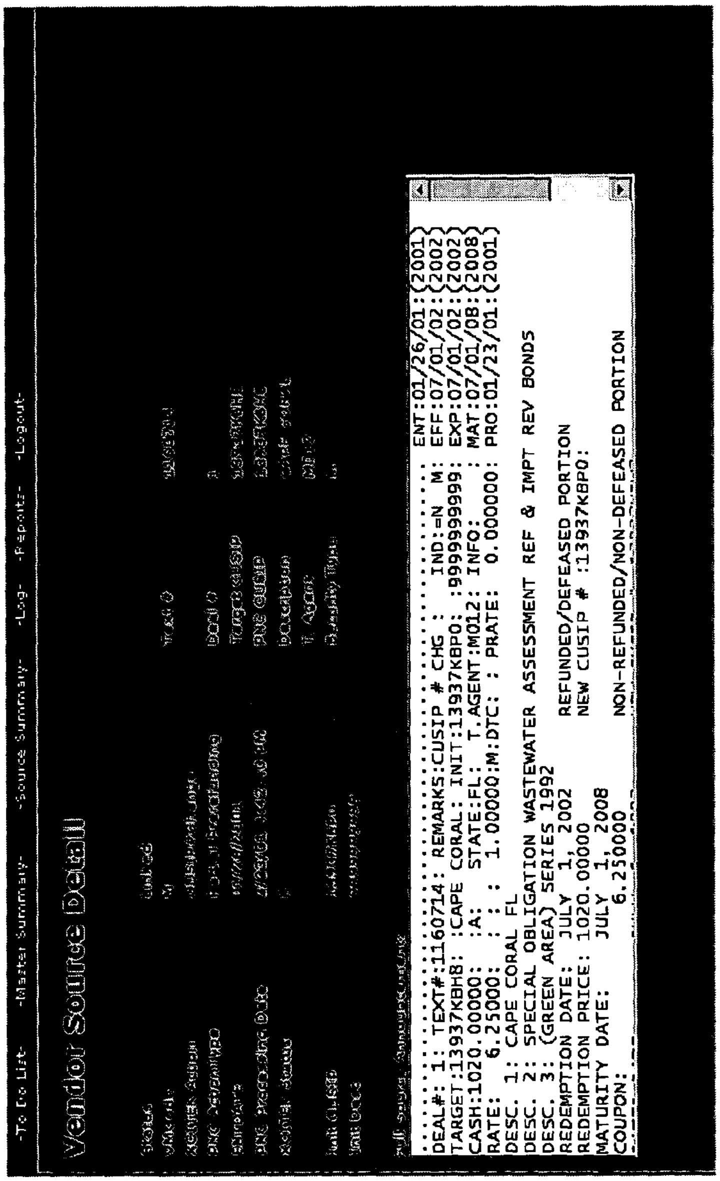
FIGS. 25A-25B include example screen displays showing various functions of one illustrative embodiment of the present corporate action embodiments.
Figure 25B:
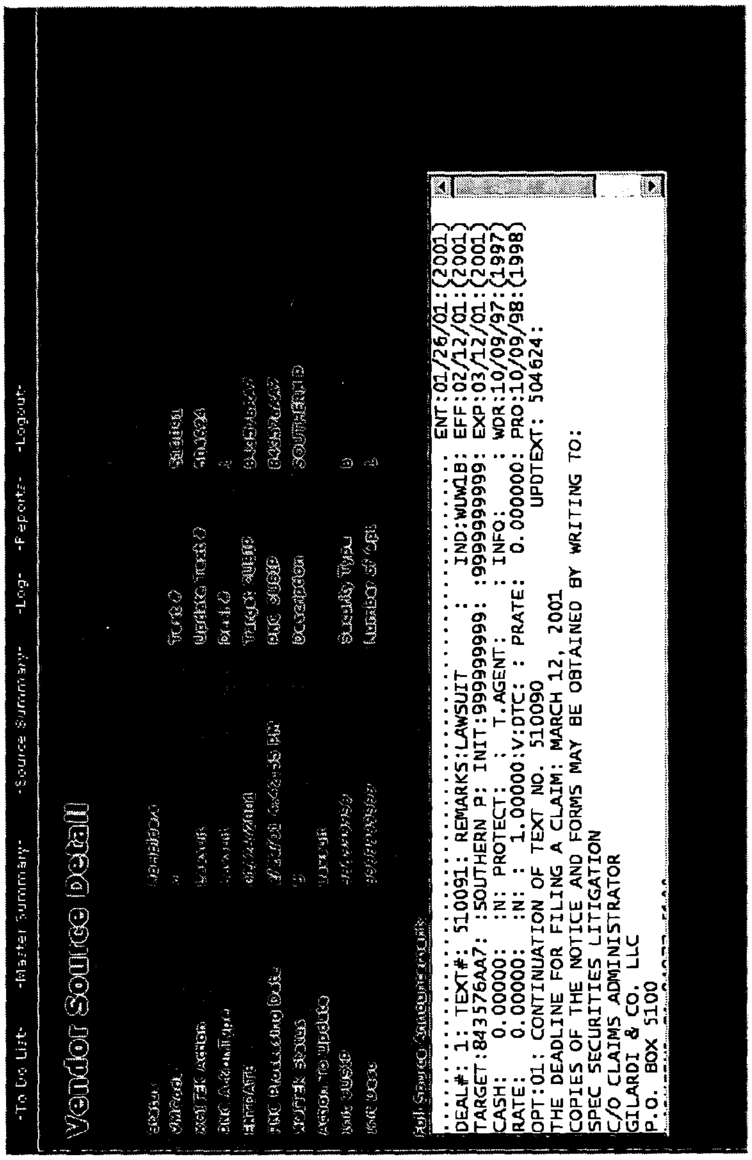

Referring now to FIGS. 25A and 25B, a source detail page for a linked source and a source detail page for an exception source are provided. The source detail pages display the full source announcement in the original vendor format and some important vendor and reference data. When displaying a source exception, this page allows the user 8 to change the financial institution 2 CUSIP and financial institution 2 Action Type. When displaying a linked source announcement, this page does not allow the user 8 to change the source data.

In general, this page is provided for viewing only. When the source is not linked to a master announcement, however, the user 8 can change the financial institution 2 CUSIP and the financial institution 2 Action Type by selecting the labels to navigate to the Field Detail page. The source reference data and the vendor specific fields displayed at the top of this page are placed according to the display rules saved in the DisplayRules database table. The user 8 can use the administration tool 6E to change the layout of the page.

Figure 26A:
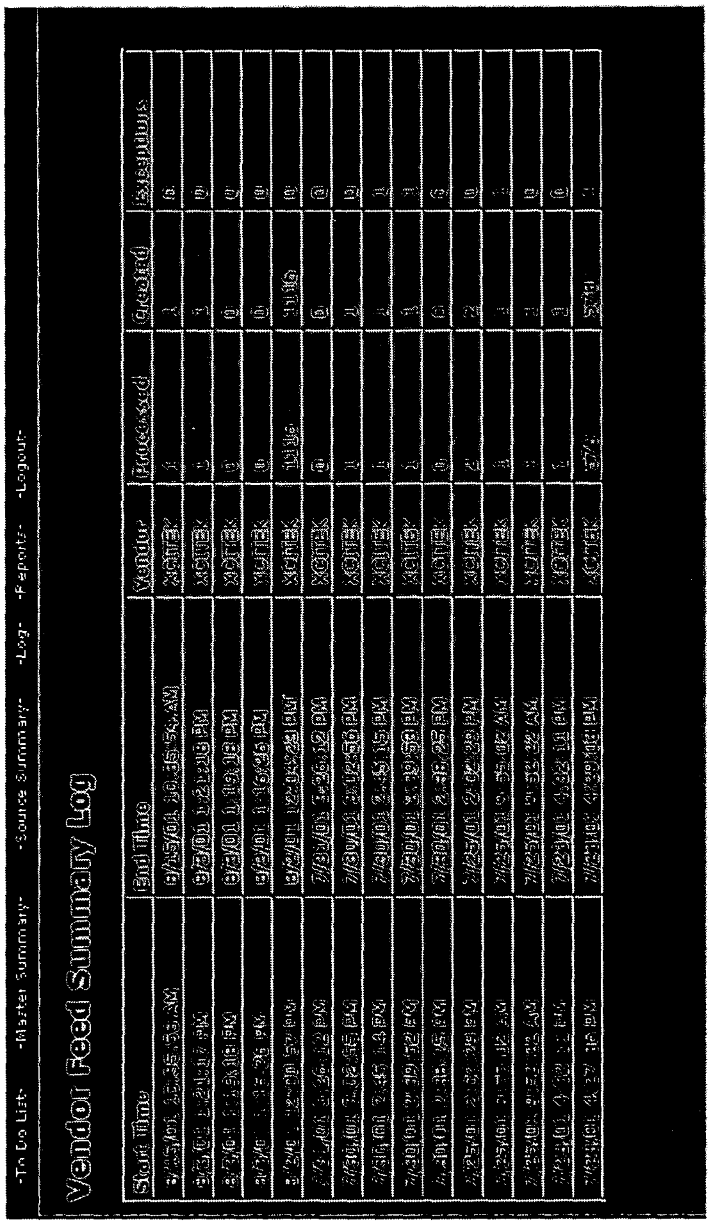
FIGS. 26A-26B include example screen displays showing various functions of one illustrative embodiment of the present corporate action embodiments.
Figure 26B:
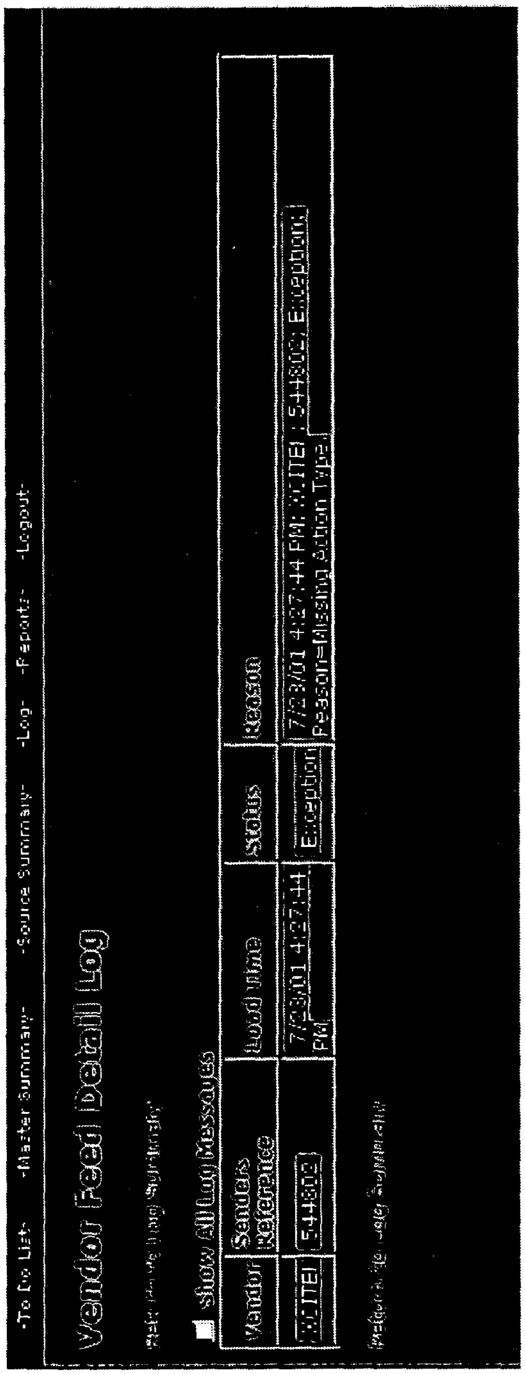

Referring now to FIGS. 26A and 26B, illustrations of transmission log pages are provided. A transmission log page displays the results of each CALoader execution. CALoader is the component that creates source announcements derived from the ISO message (which was translated by the translator 6D into an ISO message based on data received from the announcement vendor 4 by the translator 6D) with its vendor-specific fields. The Transmission Log Summary Page holds a table showing vendor name, start time, end time, number records read, number source announcements created, and the number of exceptions encountered. The date is a hyperlink to the Transmission Detail Page, which shows all the announcements processed for that CALoader execution. The Transmission Detail Page holds a table showing Senders Reference, Log Entry Timestamp, Process Result, and Comment.

The transmission summary table is sorted by the log entry timestamp in descending order with the most recent vendor load at the top of the table. The transmission detail table is sorted by the log entry timestamp in ascending order with the first record processed at the top of the table. The column "Processed" in the summary page table contains the total number of vendor records CALoader read from the VendorAnnouncements table that were flagged as "waiting to process". The column "Created" in the summary page table contains the total number of source announcements that CALoader created. The total created includes source announcements created with exceptions, i.e., those with bad CUSIPs or action types. The column "Exception" contains the total number of source announcements that where created, but have either a bad CUSIP or bad action. The detail page displays a record for every announcement processed.

The status column reflects the result of the processing. The process result can be one of Created, Exception, or Failed. Created means a source announcement was created without exceptions. Exception means a source announcement was created with an exception (meaning missing CUSIP or action type). Failed means the source announcement was not created. The user 8 interface displays error records in red and exception records in blue.

The Reason column provides further information about the processing, especially to describe the exception or failure. Initially the detail page only displays records that are exception or failed. If the user 8 wants to view the full list, he checks the "Show all log messages" checkbox. The user 8 can return to the summary page by selecting the "return to summary" link that is available at the top and bottom of the detail page.

Figure 27A:
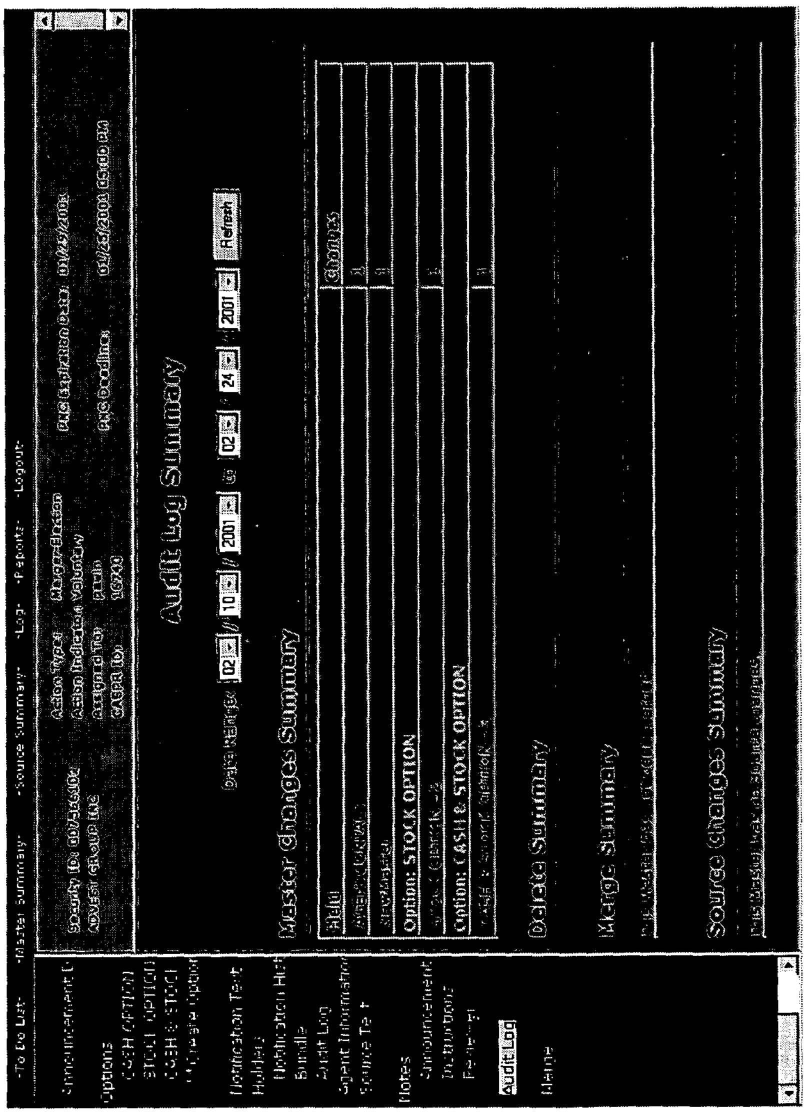
FIGS. 27A-27B include example screen displays showing various functions of one illustrative embodiment of the present corporate action embodiments.
Figure 27B:
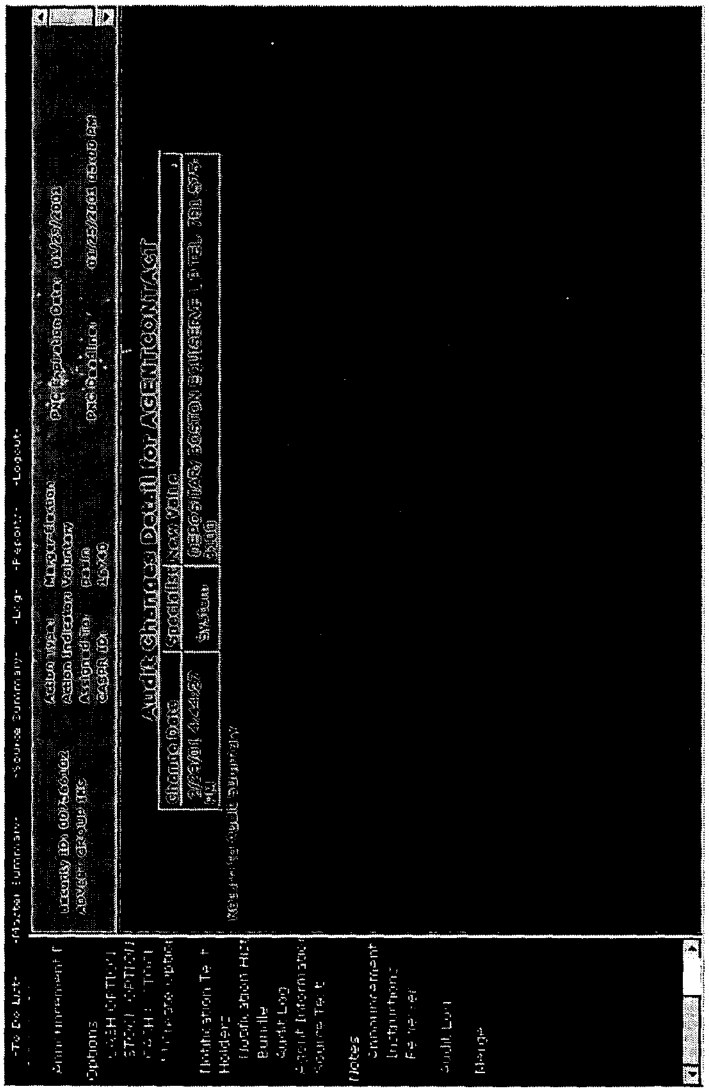

Referring now to FIGS. 27A and 27B, announcement audit log pages are provided. From the audit log pages the user 8 can view who changed a field, when the change was made, and the new value. The user 8 can also see when a field was flagged as discrepant and when, who, and how a user 8 cleared the discrepancy. Similarly, with an updated field, the user 8 can see when the system 6 updated the field and who and when a user 8 accepted the update. The audit log pages give the user 8 the ability to limit displayed entries to a certain date range.

The audit log information is displayed for one master at a time. The first page displays a list of field names that have audit log entries. It is clear which fields are at the master level and which fields are at option and entitlement levels. The user 8 selects one of these field names to view the audit log entries for that field. The audit log entries contain user/system name, entry date, action taken, and new value, if applicable. Actions taken can include add, change, flag, accept, delete, and merge. The actions "flag" and "accept" are used with updated and discrepant fields. The audit log summary page displays all audit log entries between the dates specified. This helps the user 8 to limit the information on the page when searching for a particular entry. By default, the summary page shows a two-week window of audit log entries.

Figure 28A:
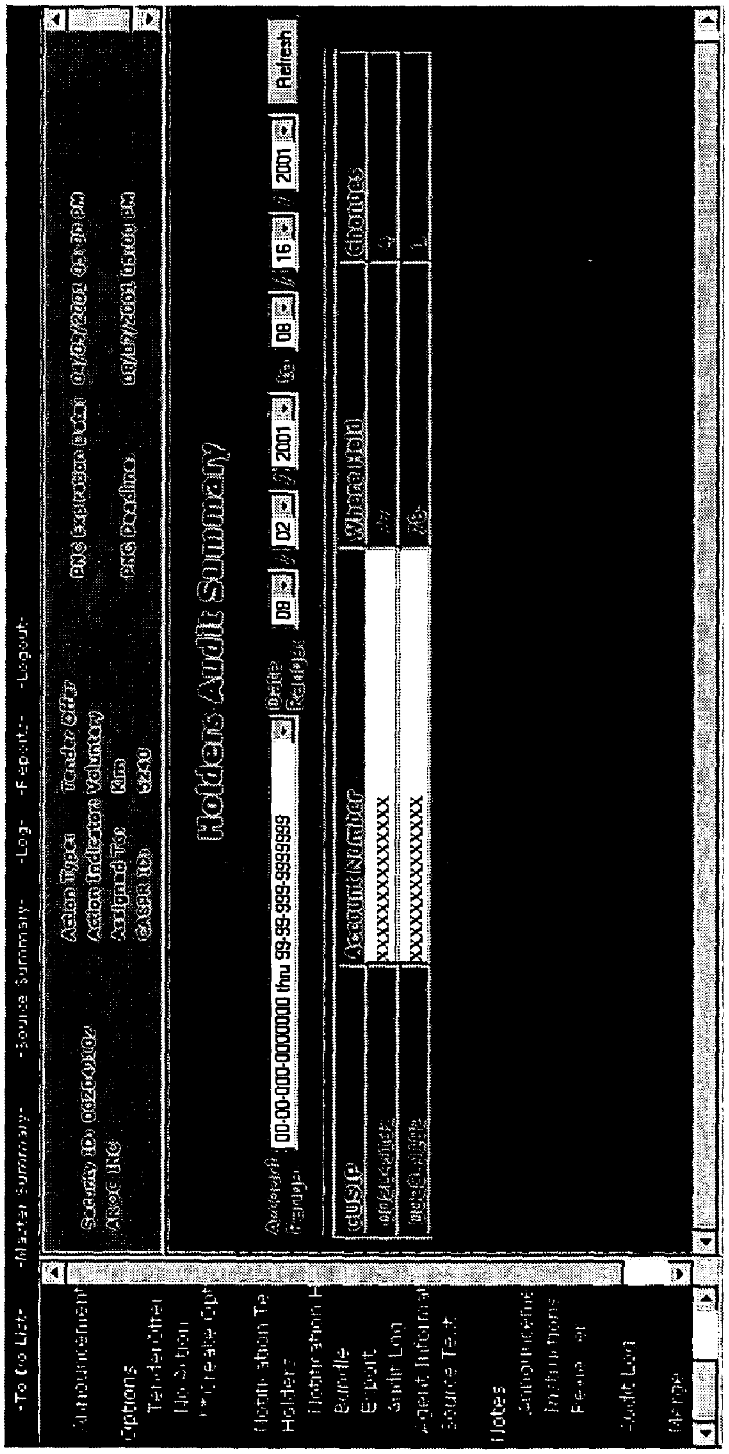
FIGS. 28A-28B include example screen displays showing various functions of one illustrative embodiment of the present corporate action embodiments.
Figure 28B:
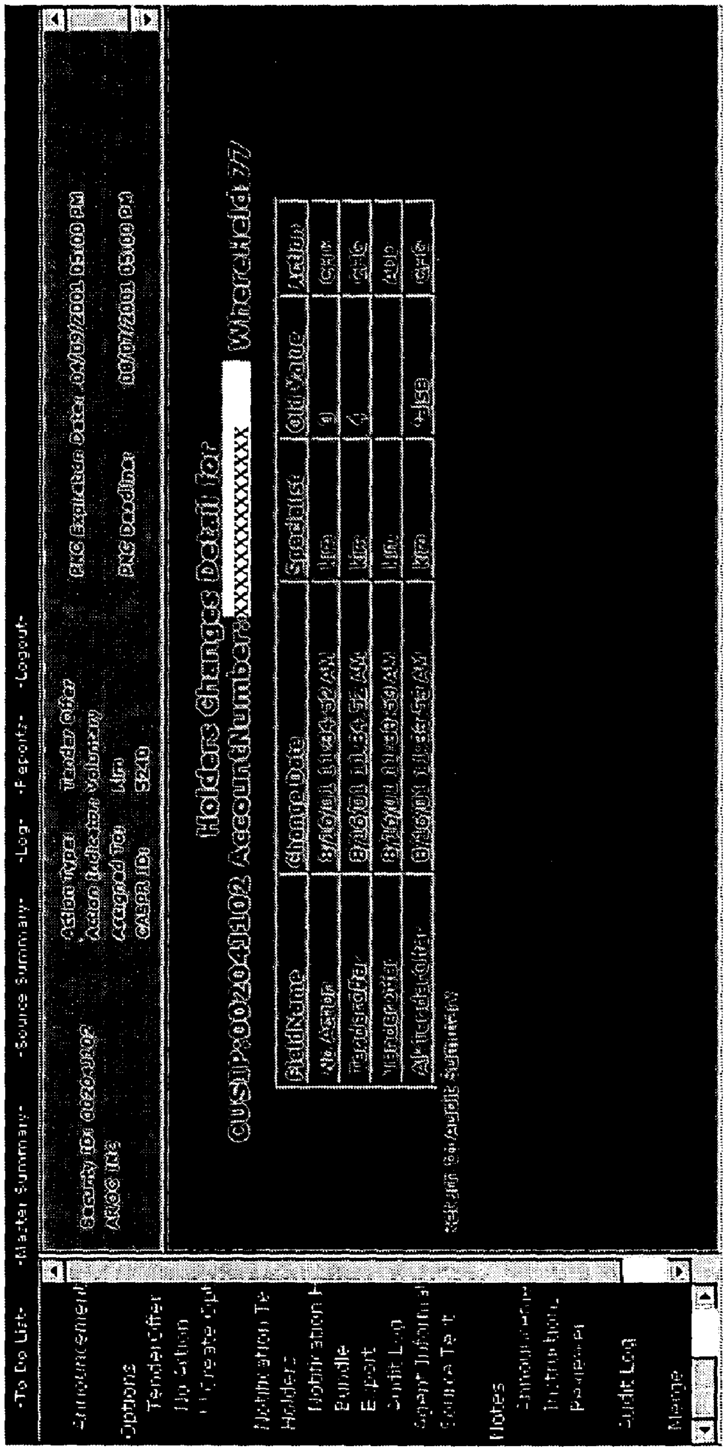

Referring now to FIGS. 28A and 28B, illustrations of holders audit log pages are shown. From the holders audit log pages the user 8 can see when a user 8 added accounts and when a user 8 changed position amounts. The system 6 can also track user 8 changes to the response values and make that information available for view on these pages. Holder information is maintained in an audit log separate from the announcement audit log. Identifying holder information and how it changes differs from identifying changes to general announcement information.

The holders audit log information is displayed for one master at a time. The first page displays a list of accounts and where-held pairs that have audit log entries. The user 8 selects one of the links to view the audit log entries for that account and where-held code. The audit log entries contain user/system name, entry date, action taken, and old value. The holders audit log summary page displays all audit log entries that fall between the dates specified and for the select account range. This helps the user 8 limit the information on the page when he is searching for a particular entry. By default, the summary page shows a two-week window of audit log entries. The user 8 can navigate to the Holders audit log page from a link on the navigation panel.

Figure 29:
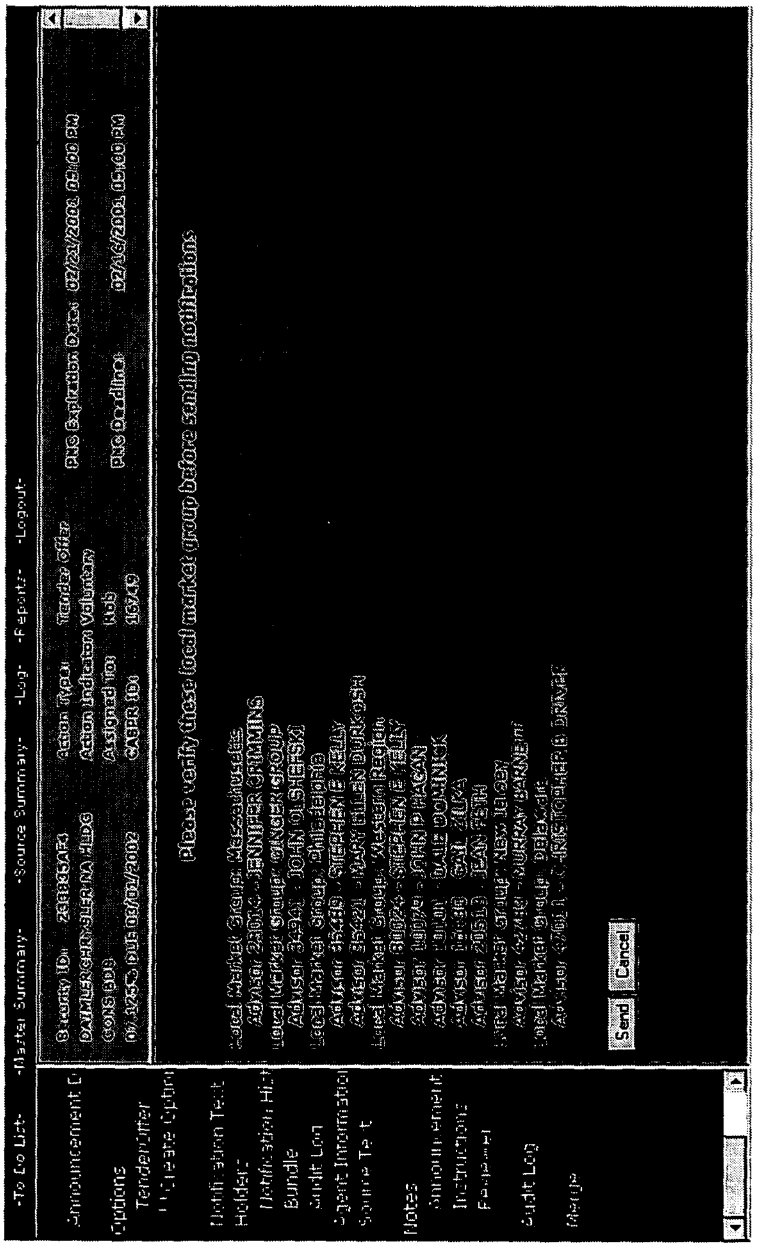
FIG. 29 is an example screen display showing various functions of one illustrative embodiment of the present corporate action embodiments.

Referring now to FIG. 29, a manual notification confirmation page is provided. After communicating a notification to a local market group 8C, the user 8 can view the actual notifications from this page. The user 8 enters this page after selecting the "Notify" button on the Holders page. This page shows the breakdown of notifications to be generated if the user 8 proceeds with a manual notification request. The page shows for each Local Market Group which advisors receive a notification. The user 8 is able to select the "document" link for any of these advisors to view the notification after the user 8 has sent the notification. The user 8 can cancel the notification request by clicking the "Cancel" button, which takes the user 8 back to the Holders Page. If the user 8 clicks the "Send" button the system 6 will post those notifications immediately.

Figure 30:
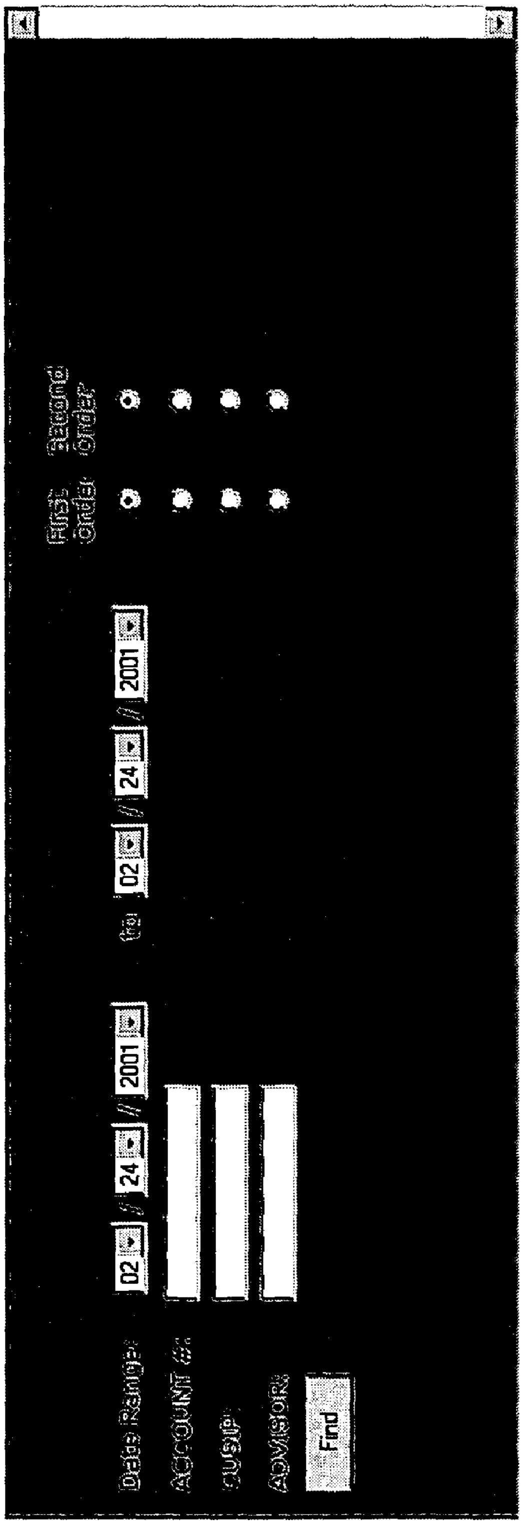
FIG. 30 is an example screen display showing various functions of one illustrative embodiment of the present corporate action embodiments.

Referring now to FIG. 30, a local market group page provides a summarized history of all notifications sent to the local market group. The local market contact (LMC) is able to see important summary information about the notifications that he has received. This page also provides a link to allow the LMC to view the full notification.

The LMC can navigate to this page from one of his electronic mail messages, for example, that includes a notification. When the page is displayed, the LMC can see the list of accounts that were on that notification sent for the announcement. The LMC can change the search criteria to view other notification once on this page, but initially from the e-mail links the notification history table will show the information from that notification. The LMC can navigate to this page directly by entering a URL address, for example, into his browser software. There is no default notification displayed in the notification history page when the LMC enters in this manner.

The LMC must select the appropriate search criteria to find the information needed. The LMC can search for notified accounts on a specific date range, account number, CUSIP, and/or advisor. The LMC enters the search criteria and clicks the "Search" button for the page to display matching accounts. If desired, the LMC can specify a sort order before clicking the Search Button so that the results are displayed in a convenient order for viewing on the page. If the LMC does not give a sort order, then the results can be sorted by date. The notification table contains CASPR ID, date, advisor name, action type/indicator, CUSIP, CUSIP description, and reason for notification. The reason for notification can be "Responses Due", "Increased/New Positions", "New Offer", Updated Offer", or can remain blank. To view the full notification, the LMC can select the document link to go to the Notification Page. In another aspect, a conventional wild card search functionality can be employed to search, for example, account numbers, advisor name, and/or CUSIP, among other data elements.

Figure 31:
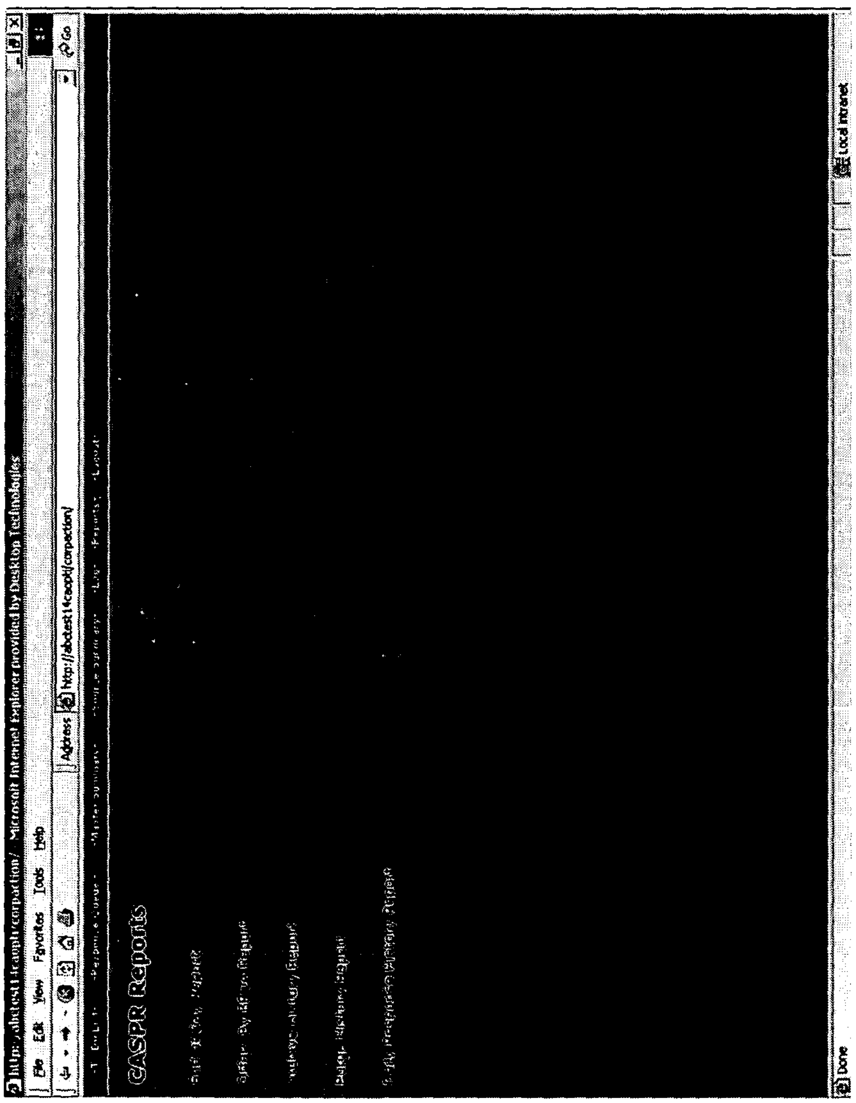
FIG. 31 is an example screen display showing various functions of one illustrative embodiment of the present corporate action embodiments.
Figure 31A:
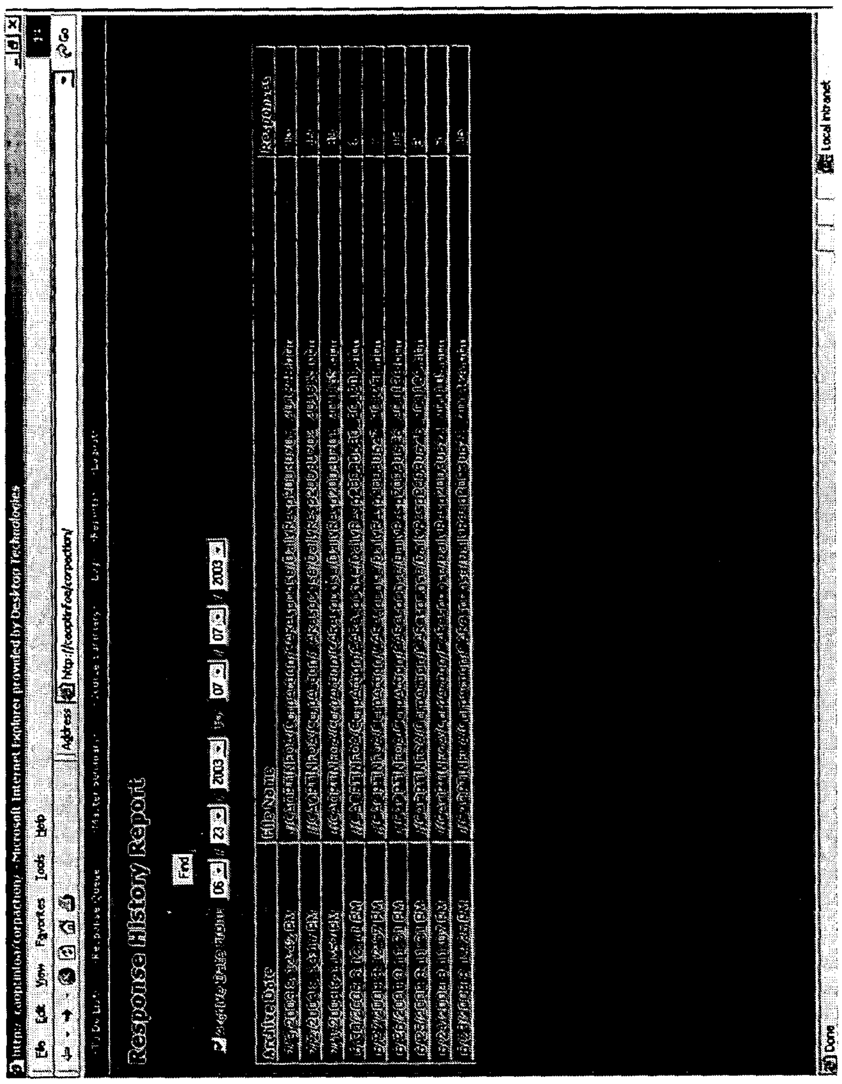
FIG. 31A includes an example screen display showing various functions of one illustrative embodiment of the present corporate action embodiments.

Referring now to FIG. 31, a reports page is provided as a navigation page that allows the user 8 to access the system 6 report pages. Clicking the "End of Day Report" link takes the user 8 to the EOD Report Page. Clicking the "Offers by BROA Report" link takes the user 8 to the BROA Report Page. Clicking the "Archive History Report" link takes the user 8 to the Archive History Page. Clicking the "Purge History Report" link takes the user 8 to the Purge History Page. Referring now to FIG. 31A, a Daily Response History Report is provided which includes one or more links to various daily response reports (an example of which is shown in FIG. 31B). These reports display a history of all response activity for a certain day. This report is available for any business day prior to the current day. The user 8 selects a date range for CASPR to display all available reports. The user 8 may then choose the date for which a Daily Response Report is desired, and the system 6 retrieves the fixed report that was archived for that date. It can be seen, in one aspect, that the user 8 should use the Response Queue Page to view responses for a current day. The reports can be accessed from the main Report Menu within CASPR. In one aspect, the report contents are provided in chronological order according to the PFPC Response Datetime. In one aspect, the user 8 can employ the browser find feature to look for specific text. In one aspect, when daily response reports are created, the reports reflect the current day's activity; incoming responses and acknowledged responses that arrived on previous days. It can be appreciated that the EOD process may also assist with cleanup efforts to remove acknowledged responses from the PFPCResponses table.

Figure 32:
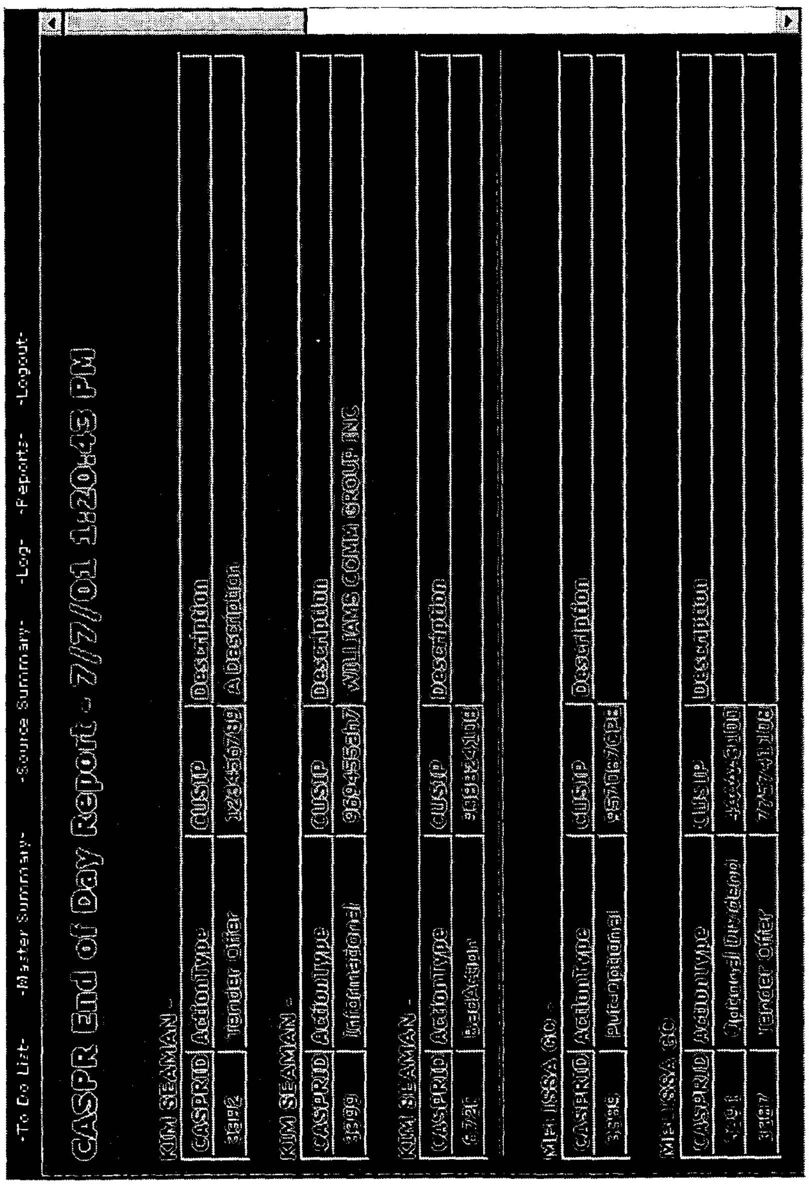
FIG. 32 is an example screen display showing various functions of one illustrative embodiment of the present corporate action embodiments.
Figure 32A:
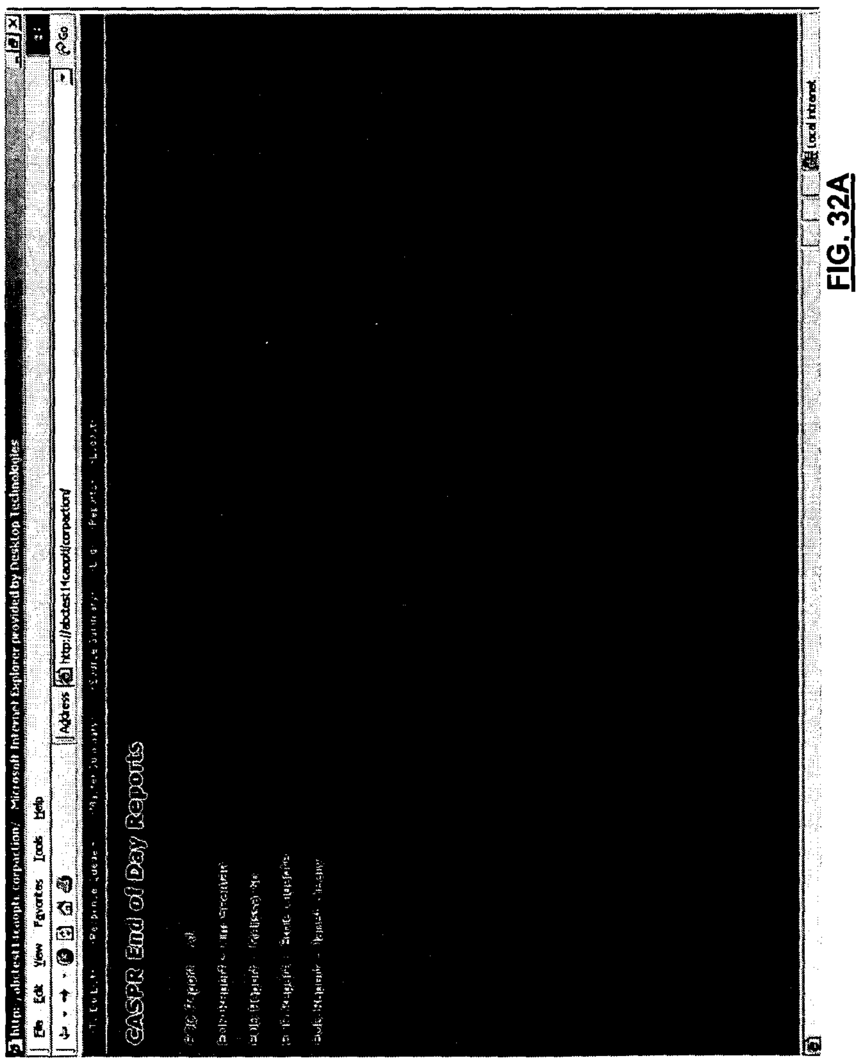
FIG. 32A includes an example screen display showing various functions of one illustrative embodiment of the present corporate action embodiments.
Figure 32B:
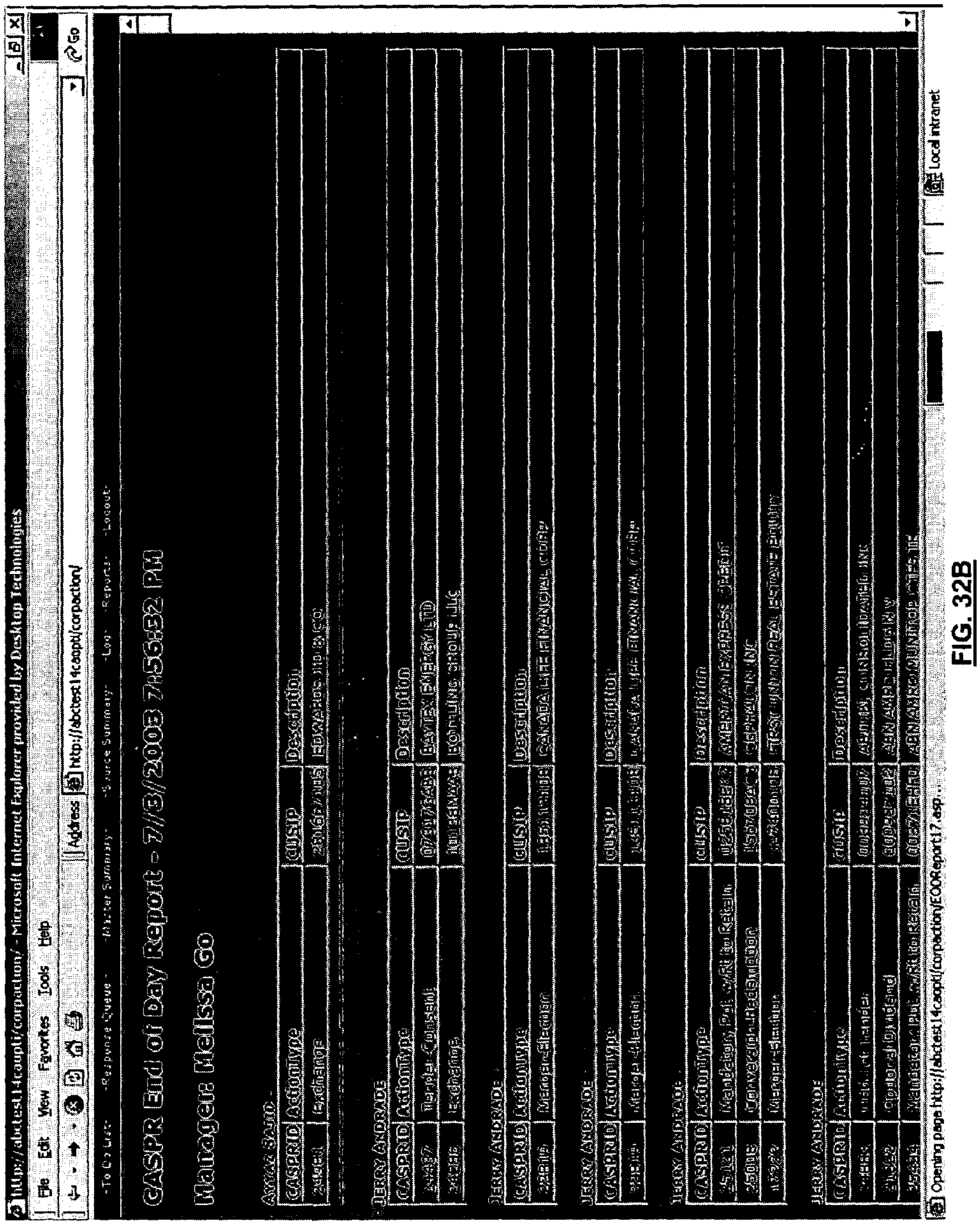
FIG. 32B includes an example screen display showing various functions of one illustrative embodiment of the present corporate action embodiments.

Referring now to FIG. 32, the EOD report page displays the end of day report that shows the user 8 the tasks that were not completed on a previous day. The page provides a means for tracking work progress and identifying problem areas. The user 8 displays this page from the Reports Page in the top-level menu. The user 8 cannot edit the information on this page; it is for view only. The report is ordered alphabetically by user 8 name and the categories are ordered based on the priority in the To Do page. In one aspect, an example of an EOD report by manager is illustrated in the screen display of FIG. 32A. In another aspect, an example of a specific EOD report is illustrated in the screen display of FIG. 32B.

End of Day Report

This report shows items that users 8 failed to clear from their To Do Page by end of day. In one aspect, the report contains only voluntary actions, because many of the To Do categories do not apply to the non-voluntaries. In another aspect, the report can include all types of corporate actions, both voluntary and non-voluntary. The report will be grouped by user 8 and To Do category and will contain the fields CASPR ID, action type, CUSIP and CUSIP description (line 1 only). The report is a HTML document that CAEOD creates. The report is available for all users 8 to view throughout the following business day. End of day can be defined to be whatever time the CAEOD is scheduled to run. The EOD report is overwritten each time the CAEOD is executed.

Offers by BROA Report

The user 8 enters an account number or some portion of the BROA to view a report that lists all active offers where that account is a holder. Report CUSIP, description, important date 1, important date 2, action type, user 8 assignment, positions, responses, and where-held are also included. This report is a HTML document that is created on demand but not typically retained on the system 6.

Archive History

The user 8 can enter a CUSIP, date range or CASPR ID to search or view the entire history. The information displayed includes the archive date, CASPR ID, CUSIP, Description 1, important date 1, and HTML file name (as well as a link to the file). The file also displays information related to the master document.

Purge History

The user 8 can enter a CUSIP, date range or Senders Reference to search or view the entire history. The information displayed includes the purge date, CUSIP, Senders Reference, Expiration date, receipt date, and Vendor.

Volume Reports

The following are volume reports that the financial institution 2 can use to obtain the information: Total number of new Masters Created, Total number of manually created Master, Total number of accounts related to Masters, Total number of participating accounts, Total number of Non-Participating Accounts, Total number of Unresponded Accounts, Total number of masters moved to "Complete" status, Report by Bank—Total number of "Unresponded", Report By Advisor—Total number of "Unresponded", Report By IO—Total number of "Unresponded", Report anything with more than five options, Point in time Report—Total "Active" by Specialist, Point in time Report—Action type, Point in time Report—Active & Expired, Point in time Report—Active & Not Expired, and other like reports.

Figure 33:
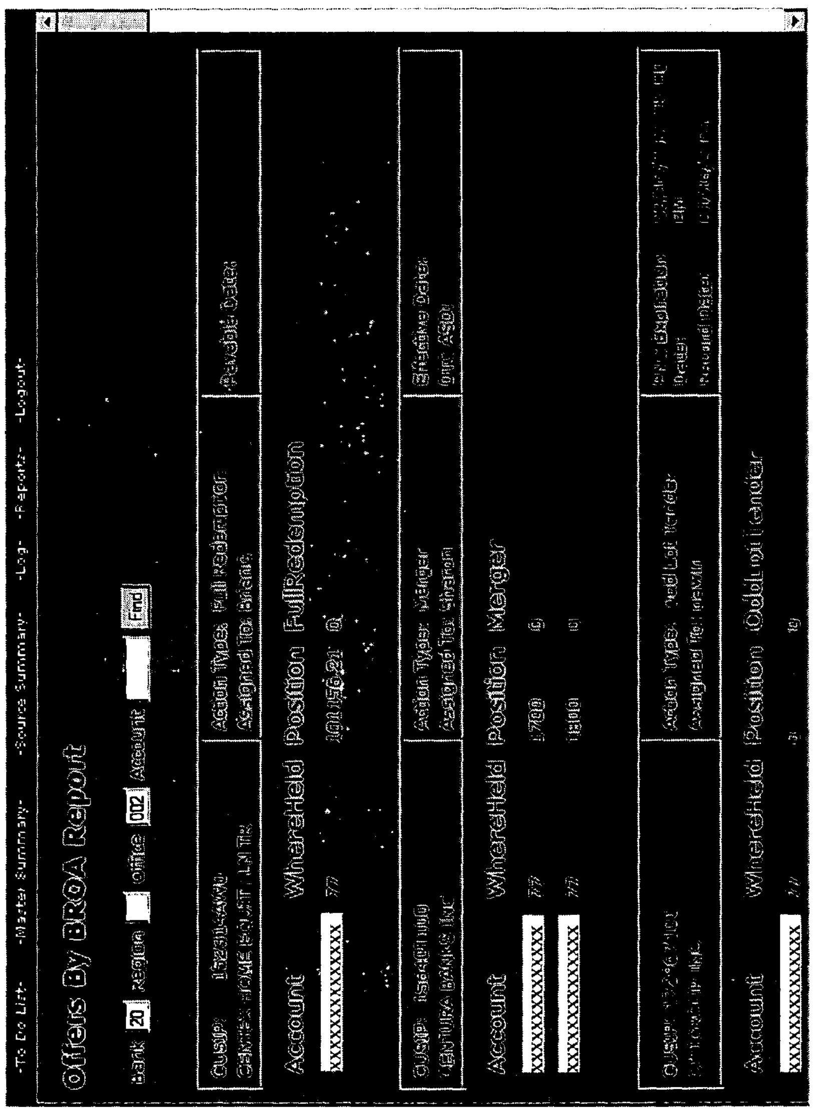
FIG. 33 is an example screen display showing various functions of one illustrative embodiment of the present corporate action embodiments.

Referring now to FIG. 33, a BROA report page allows the user 8 to find all active announcements where a certain account is eligible. The page allows the user 8 to search for a specific account or any account matching the given BROA components. The user 8 enters the account number by typing into the Bank, Region, Office and Account text areas. If a BROA component is not specified the system 6 will substitute a wildcard for the value. The user 8 can use the "%" character to specify wildcard matches within a component. For example bank "20" matches all accounts at bank 20, while bank "2%" matches all accounts at bank 20 through 29. The information displayed on this page is for viewing only. If the system 6 does not find any matching account, the page will provide a "No accounts matched the given information" message, for example.

Figure 34:
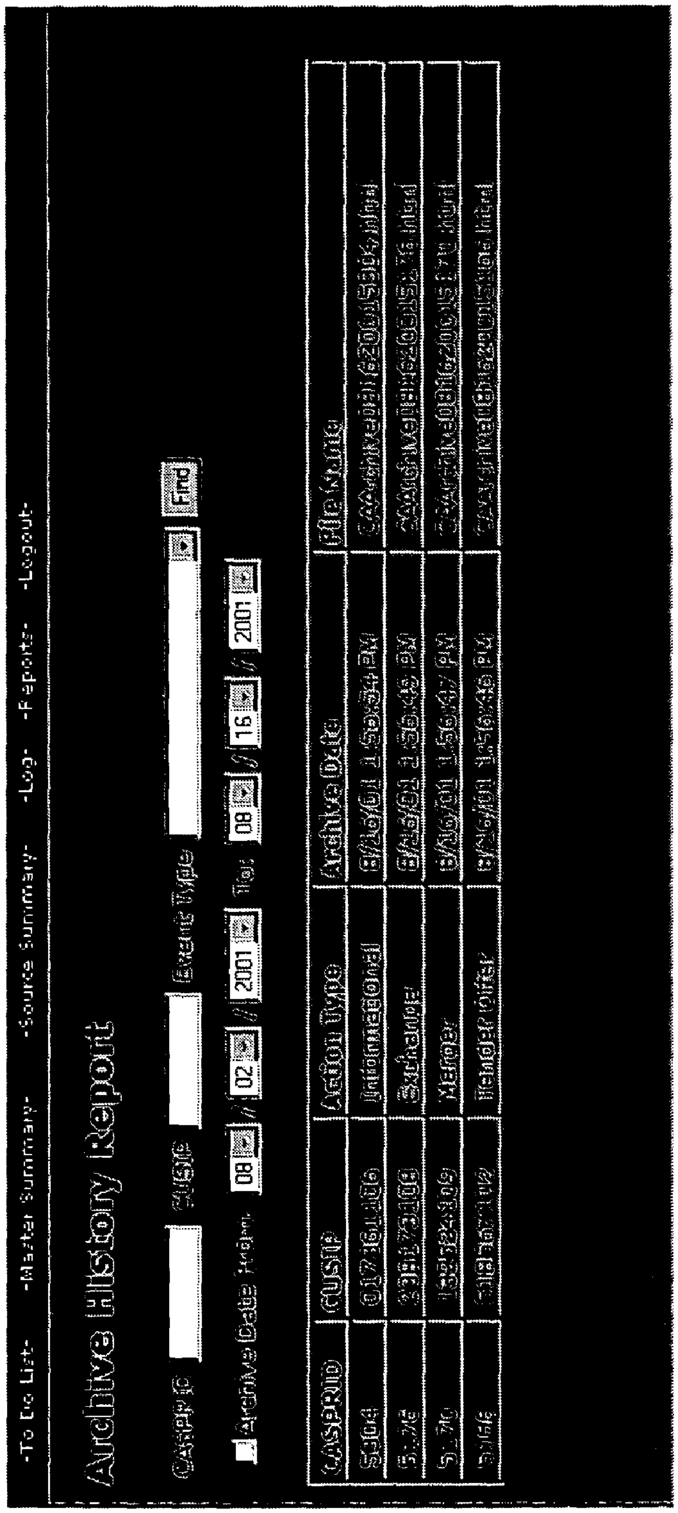
FIG. 34 is an example screen display showing various functions of one illustrative embodiment of the present corporate action embodiments.

Referring now to FIG. 34, an archive history page allows the user 8 to view the archive records of master announcements that have been removed from the system 6. The user 8 can search for a specific master or date range and view the archive report for more detail. The page does not display any history when this page first displays. The user 8 must click the "Find" button to view the history information. Before clicking the button, the user 8 can enter criteria to narrow the history display. The user 8 can enter a full CASPRID or CUSIP or the user 8 can enter a partial value and use the "%" character as a wildcard to match multiple history records. The user 8 is able to search history by any combination of CASPRID, CUSIP, Event Type, and archive date. By default, the date range is not used in the search. If the user 8 wants to search within a certain archive range, he first must check the "Archive Date" check box to enable the date controls. The user 8 selects the link in the File Name column to view the full archive report for that master.

Figure 35:
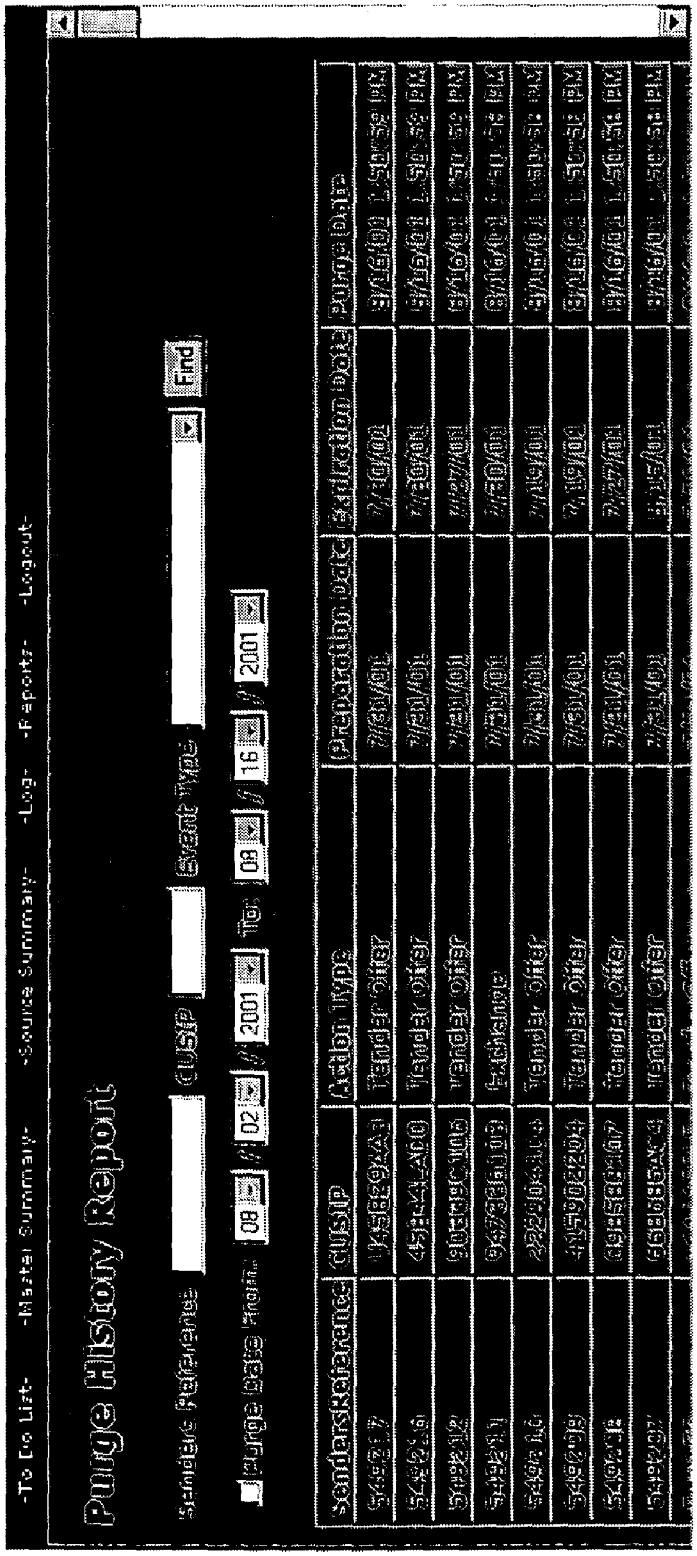
FIG. 35 is an example screen display showing various functions of one illustrative embodiment of the present corporate action embodiments.
Figure 38:
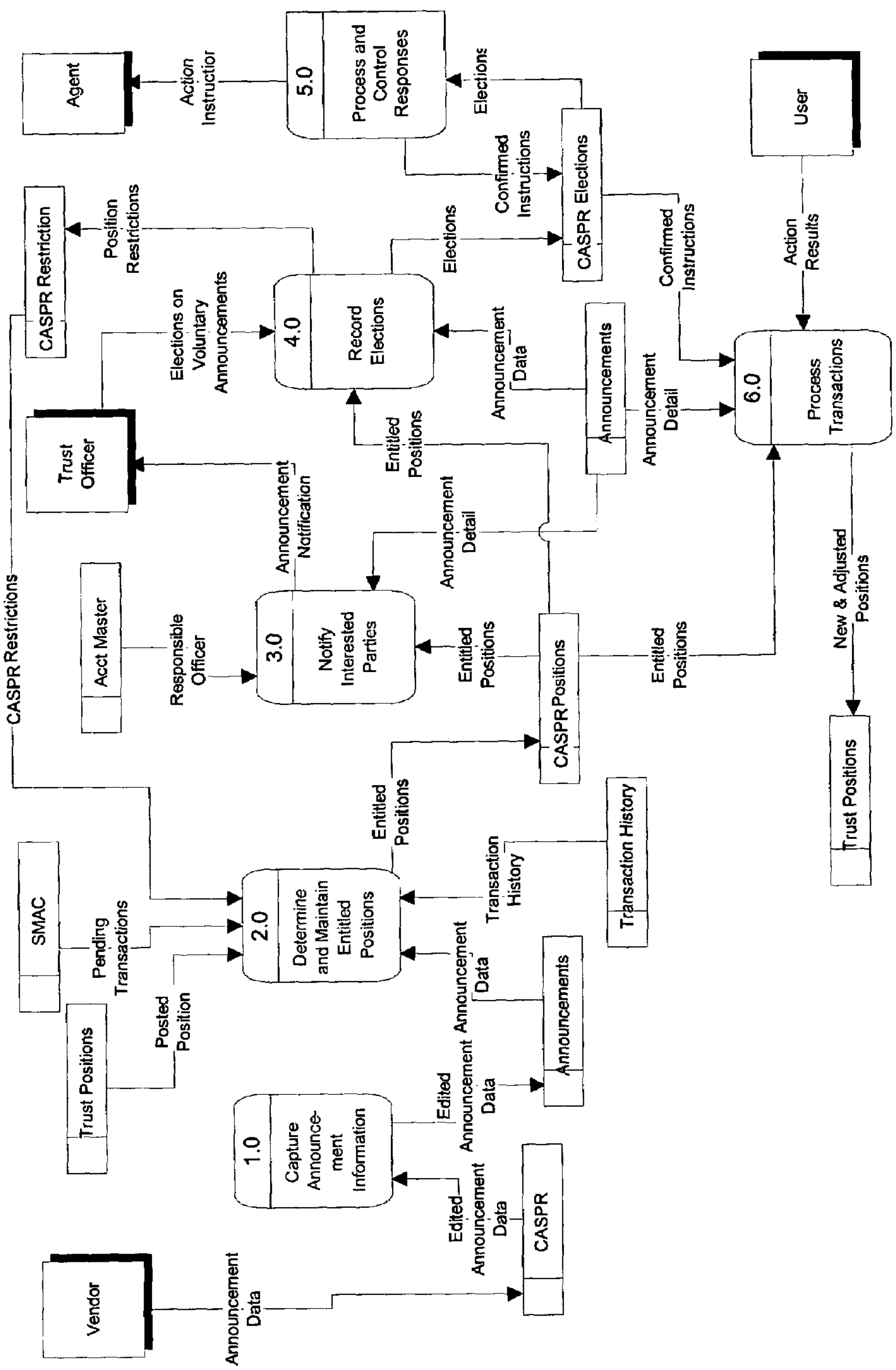
FIG. 38 depicts one embodiment for processing corporate action information in connection with the present methods and systems; and, FIG. 39 includes an example screen display showing various functions of one illustrative embodiment of the present corporate action embodiments.

Referring now to FIG. 35, a purge history page is provided that allows the user 8 to view the purge history of source announcements that have been removed from the system 6. The user 8 can search for a specific source or date range. The page does not display any history when this page first displays. The user 8 must click the "Find" button to view the history information. Before clicking the button, the user 8 can enter criteria to narrow the history display. The user 8 can enter a full sender's reference or CUSIP or the user 8 can enter a partial value and use the "%" character as a wildcard to match multiple history records. The user 8 is able to search history by any combination of sender's reference, CUSIP, Event type, and purge date. By default the date range is not used in the search. If the user 8 wants to search within a certain archive range, he first must check the "Purge Date" check box to enable the date controls.

Referring now to FIGS. 36A through 36F, a sample archive history report is provided that can be generated before a master is removed from the system 6.

System and Database Embodiments

As depicted above, the system 6 is comprised of several components that interface to the database 6B through the corporate action software 6C that includes one or more libraries. In one embodiment, the libraries are conventional libraries that encapsulate the core functionality for the corporate action processing system 6. In addition, one or more executable software programs are provided that interface with the libraries to perform a specific task. In one aspect, the corporate action processing system 6 receives incoming corporate action data formatted, for example, in the ISO 15022 message type format MT564. Since data received from some announcement vendors may not be in MT564 format, the system 6 may use the translator 6D to convert vendor-specific formats to the ISO format or a format suitable for use by the corporate action processing system 6.

The system 6 maintains data integrity while allowing multiple users 8 to access the same announcement. To reduce the chance of missing another user's 8 changes, the user 8 interface refreshes its data from the database each time a page is displayed. For most changes to an announcement the user 8 must go to a field detail page. Once the change is accepted at the field detail page, the change is immediately available to all subsequent displays of that announcement or field detail. To process relatively large corporate actions, the financial institution 2 provides multiple users with access to the Holders page to permit active entry of position and response data.

The following disclosure describes the functionality of various illustrative components that can be employed in operative association with the corporate action processing system 6.

CAResponse is an executable file responsible for reading a response table populated by one or several external systems and applies rules to evaluate whether the response can "accept" and automatically update the database, or "reject" and not update the database. CAResponse is a scheduled process that can be run on any interval such as hourly, for example. Once CAResponse processes responses, one or more specialists can be alerted to new responses by a To Do Page category. Specialists may acknowledge responses by end of day, but if a response is not acknowledged same business day, it can be reported on the EOD Report. In addition, the response can be configured to remain in the specialists' queue until acknowledged.

CACalculator can be used to process batch records at the beginning of each day, to process intraday records during the day, and to process new masters and master changes during the day. During processing, the system-determined eligibility is calculated for each combination of MasterID, CUSIP, Account number and Where-Held. Records are processed differently according to the Eligible Calculation rule assigned to the master. Records are included or excluded according to certain key dates as specified in the calculation rule and whether the master is active. Also, masters whose DoNotRefresh flag is false can be included. Records can be added/updated in the Holders table and the HolderEigDetails table. Also, records that have been "frozen" and placed into the AsOfPositions table can be processed for certain eligibility calculation rules.

CAAuthenticator is a security component that manages user 8 login and access functions in the system 6. CAAuthenticator keeps track of all active users 8 and their session settings, such as filter criteria used within the user 8 interface. IIS loads an instance of CAAuthenticator into the application object so that all login sessions share the same CAAuthenticator.

CATranslator is an "nBalance" project (marketed under the trade designation "OPTINFO") that converts vendor-specific announcement feeds into the MT564 format. Following each business day, the CATranslator must convert the announcement data for the previous day. There is a batch script that runs the CATranslator and is controlled by a scheduling process of the financial institution 2. In one embodiment, the CATranslator runs once nightly after the financial institution 2 scheduling process has detected a new data file received from an announcement vendor 4.

CATranslator writes the converted vendor announcements directly to the corporate action processing system 6 database 6B. CATranslator stores an ISO message string and vendor-specific label/value string for each vendor announcement. Each record and its results are logged to the system 6 logs for auditability.

With regard to appending source announcements, "XCITEK" may use continuation records when more than a predetermined number of lines of text are required to describe a corporate action. Source announcements that are continued across multiple "XCITEK" records must be combined to build one announcement. The fixed area of the "XCITEK" announcement does not change across the continued record blocks. Therefore, when the system 6 appends source announcements it is translating the information from the first fixed area and treating the rest of that record and all continuation records as text. For example, if XCITEK sends an announcement that is continued to a second record block that has 10 lines of text, the system 6 will store 28 lines of original text with the one source announcement. In the "XCITEK" example provided in FIG. 37, the system 6 creates one source announcement. As shown, the underlined text can be stored by the system 6 with the source announcement in a conventional and suitable text format.

The financial institution 2 scheduling software is responsible for calling CATranslator.bat. The batch script will return a bad status message if the CATranslator project was not able to process the announcement vendor 4 data file. The financial institution 2 scheduling software must detect the error and take the appropriate action, whether that action is paging a support person or retrying the process can be defined by the financial institution 2.

CALoader is a Visual Basic executable that is responsible for creating source announcements from the vendor announcements. In one embodiment, the CALoader.exe can be executed once nightly and controlled by a financial institution 2 scheduling process. The CALoader should run after CATranslator completes. The CALoader reads all vendor announcements that are waiting to be loaded from the Vendor Announcements table. As each record is processed, CALoader updates the vendor announcements table noting that the record is loaded.

CANotifier is a Visual Basic executable that is responsible for building and sending the announcement notification information to the local market contacts 8C. A financial institution 2 scheduling process controls execution of CANotifier.exe. Since financial institution 2 users 8 work with announcements throughout the business day, the CANotifier process will be scheduled to run throughout the day. Additionally, a user 8 can initiate the notification process using the web interface 10 if immediate or special notification is required. The system 6 will not check for required information when the system 6 attempts to send a notification. When creating a new announcement only the CUSIP, action type, and action indicator are required. It will be the responsibility of the user 8 to keep the "allow automatic notification" flag off, if information is not complete for notification.

CANotifier does not actually post the notification information to the screen displays. CANotifier archives the information so that when a user 8 or LMC 8C requests the notification from a certain date, the system 6 can display the archived information. CANotifier saves the notification text, announcement information, accounts, and position information. The corporate action processing system 6 user 8 can view any notification and the accounts contained on the notification.

After CANotifier archives the notification data, it sends an email to all LMC managing accounts included in the notification. The email contains a URL to a web page that will display a list of all notifications and date notified for the LMC. The LMC can then select a desired notification for viewing.

The system 6 provides a history of notification. The system 6 can reproduce a previous notification. The system 6 provides the LMC 8C with a list of current and previous notification and allows the LMC 8C to view any notification listed. The LMC 8C may see the same offer listed multiple times on his notification list. When the LMC 8C selects one of those links, the LMC 8C can see the notification as it was on that notification date. The LMC does not see the current offer information, unless the LMC 8C selects the most recent notification. Even in this case, the LMC 8C is viewing the information from the time the notification was released, and the LMC 8C may not see the most recent updates.

If the CANotifier encounters an error and cannot complete the notification, it will place a log entry into the NT application log. The CANotifier can also set the notification status for the failed master so that the user 8 is aware of the failure by way of the To Do page. If the email fails, it is important that the user 8 finds out about this failure as quickly as possible because of time obligations to the LMC 8C. The system 6 cannot directly detect electronic mail failure. The financial institution 2 can setup additional monitoring software to detect such failures.

In addition, the financial institution 2 can disable e-mail to the LMC 8C for notifications sent outside the response to expiration period. The LMC 8C will always get email with notifications sent during the response to expiration period.

CAAddMaster is a Visual Basic executable that is responsible for creating and updating master announcements. A financial institution 2 scheduling process controls when CAAddMaster.exe runs, which can be a daily period.

CAAddMaster creates or updates master announcements from unlinked source announcements. "Unlinked" means that the source announcement is not linked to a master announcement. For each unlinked source that has a status of "NoHolders", CAAddMaster will try to match the source to an existing master announcement by the sender's reference number. If the source record is an update, it should have a linking sender's reference number (for XCITEK this is the TEXT#). If CAAddMaster finds a master with this sender's reference number the source announcement is linked to that master. If an existing master is not found, CAAddMaster will look for an existing master with the same corporate reference number (e.g., for "XCITEK" this is the CUSIP, DEAL#, event code and VMCode). If found, in one aspect, the payable and redemption dates of the new source and the existing master are compared. If the dates differ the source can create a new master. In addition, the event type for the source can be compared for a match with the event type for the master. If an existing master is not found and the financial institution 2 has holders for the underlying security in the source announcement, CAAddMaster will create a master.

CARefreshPositions is a Visual Basic executable that is responsible for refreshing the position data daily from the CurrentPositions table. The financial institution 2 scheduling process controls when CARefresh.exe runs, which can be on a periodic basis, such as daily execution. The refresh positions process is comprised of two stages. The first stage consists of the extraction of position information from the xposition, xaccount, and smac files. The second stage updates the holders that are related to the existing Master announcements. The first stage runs as part of the LoadPositions.bat script. The master position refresh stage runs as part of the LoadAnnouncements.bat script.

Existing positions are updated by matching up the CUSIP, Account Number, and Where-held of each current Holding with the related information of the extracted positions. New positions are added by looking at each Master announcement and matching the CUSIP with the CUSIP of the extracted position. Only new accounts are added to the Holding's information. Current holders that no longer appear in the extracted position information may have their position set to zero, because Holdings are usually not deleted.

The following extracted positions are ignored when performing the refresh: accounts that have a WhereHeld that is ignored; announcements with a flag of DoNotAllowAutoRefresh; the extracted position has a Settle Date that is after the financial institution 2 Expiration Date; and, the total position for the CUSIP and Account Number is greater than the Maximum Eligible Shares. The following flags are reset once the Holdings have been updated: NotFullyResponded; Overcommitted; UnderCommitted; and, NewHoldings CAEOD is a Visual Basic executable that is responsible for building the EOD report containing all To Do items that the users 8 failed to clear for the day. The CAEOD process is also responsible for setting the end of day flags.

CAArchiver is a Visual Basic executable that is responsible for archiving announcement data. In order to maintain a reasonable database size, the system 6 deletes announcement information after a certain amount of time has past since the announcement was completed. The time limits are maintained in the Administration Tool. In one aspect, the archive threshold is the same for all event types. The archive will be scheduled with the financial institution 2 scheduling software. The archive process does not need to run on a daily basis; weekly or monthly may be sufficient. CASPR does not provide a restore function.

After CAArchiver determines that an announcement should be archived, it builds a HTML document containing all the announcement information. CASPR will store the document in an appropriate directory or other location within the database 6B. The user 8 will have access to this file via the Archive Report from the "Reports" link in the web-interface. The corporate action processing system 6 will maintain a history of archived announcements. It will record the date archived, CUSIP, CASPR ID, Action Type, and filename of the archive report. The Archive Report will contain a link to the HTML archive file for each archived announcement.

CAArchiver is also responsible for purging old source announcements. Source records are purged from the system 6 if the financial institution 2 does not have holders. Voluntary records can be purged one business day, for example, after the market expiration date. Non-voluntary records can be purged 90 days, for example, after preparation date, as well as voluntary records that do not have an expiration date. The preparation date is the vendor date for the source record. The purge process logs to the PurgeHistory table with the sender's reference number, the preparation date, the expiration date, the event type, CUSIP, and purge date for each purged record. The user 8 can view the purge history from the Reports link in the screen displays through the interface 10.

The financial institution 2 can configure a scheduler application to run the corporate action processing system 6 executable programs and batch scripts. The programs and scripts write success and failure messages to the server 6A application log. This feature is controlled with command line arguments to the executable. Additionally, the executables can send e-mail to registered users 8 and make calls to the trade-designated "TSS CAWTO" utility. Monitoring/scheduling software of the financial institution 2 can watch program output and messages by using the "TSS CAWTO" utility. Messages can be displayed on the monitoring/scheduling software's event console. These messages can help pinpoint in the program execution where a problem occurred and trigger pages, emails, and other communications to assist in resolving the problem.

The following disclosure describes an illustrative data model for the financial institution 2 corporate action processing system 6. The description includes sample embodiments of database tables, content of the tables, and relationships between tables.

In one illustrative embodiment, the financial institution 2 corporate action processing system 6 can use a SQL Server 7.0 database for the database 6B. In another illustrative embodiment, the corporate action processing system 6 can employ an SQL Server 2000 database for the database 6B. The engine uses "ADO 2.5" to access the database 6B for queries, updates, inserts, and other functions. For best performance and maintainability, stored procedures are used throughout for complex SQL, especially in situations with multiple table joins. The engine uses literal SQL strings within the code for simple access that involves a single table and uses indexed fields.

According to the ISO standard, field values can be represented in many formats. Each MT564 field, for example, has a format option that defines the representation of the field value. In most cases the system 6 will use an ISO-defined format to store the field in the database 6B. The representation of the values in the user 8 interface and reports is independent of the database 6B format.

The CATranslator converts the vendor announcement format to the MT564 message format before the information enters the system 6. Because each vendor has its own specific data items, the translator 6D also provides the system 6 with vendor specific data, which the system 6 also stores in the database 6B with the standard announcement data. In addition to storing the specific data items from the vendor feed, the system 6 also stores the original vendor announcement as one large text block to preserve the original vendor announcement. This is helpful to the user 8 when researching a problem on an offer. For accountability reasons it is also important that the financial institution 2 can confirm what information it received from its announcement vendor 4.

The system 6 minimizes the impact of storing vendor specific data by handling it in a generic fashion. The system 6 will store the label-value pairs, display the label-value pairs and search the label-value pairs, but the system 6 does not have any knowledge of the meaning or significance of the vendor data. There are no processing rules based on vendor data.

The following is intended to identify the reference data and describe how it is used within the system 6. Reference data is information that financial institution 2 has added to the announcement usually for distinction from the vendor data or for additional information pertaining to the announcement. The financial institution 2 Action Type is the corporate action type translated from the original vendor source as defined by financial institution 2. The financial institution 2 Indicator is the corporate action indicator translated from the original vendor source as defined by the financial institution 2. The possible values are Mandatory, Voluntary, Informational, Redemption, and Class Action. The financial institution 2 Security ID is available for cases in which the user 8 must enter a unique security ID, such as when the vendor sends the announcement with security ID either blank or all nines (i.e., "999999999"), for example. By default, the financial institution 2 Security ID is the same as that reported by the vendor, except when the vendor reports all nines. In this case, the financial institution 2 CUSIP is blank. The corporate action processing system 6 considers all nines a good CUSIP if the user 8 enters all nines. Entering all nines is a way for the user 8 to clear the source exception and indicate that the financial institution 2 is not concerned with this event (i.e., it will never have holders). The user 8 cannot change the vendor value, but the user 8 can change the financial institution 2 Security ID.

The source status reflects the current processing status of the source announcement: A "Bad CUSIP" status is an exception condition caused when the vendor 4 sends a bad CUSIP. A bad CUSIP from the vendor is one that is not exactly nine characters, contains all blanks, or contains all nines. Before the system 6 can process a source announcement with this status, a user 8 must correct the problem. A "Bad Action Type" status is an exception condition caused when the vendor 4 sends a bad action type code. A bad action type code is one that is not in the financial institution 2 action type maps that translate a vendor 4 code to a financial institution 2 action type. Before the system 6 can process a source announcement with this status, a user 8 must correct the problem.

A "No Holders" status is a normal condition that occurs when the system 6 cannot find posted or pending positions for this security in any of the financial institution 2 accounts. A "Linked" status is a normal condition that occurs when the system 6 links a source announcement to a master announcement. A "SystemOnly" status is a special status that indicates that the system 6 created the source record to help link future updates.

The master announcement has the current value for each of the announcement data fields. The master announcement is linked to the original source announcement that created the master announcement and all source announcements thereafter containing updates to the corporate action event. The system 6 stores additional information for the master announcement such as user 8 notes, holder and response information, and notification text.

The following is intended to identify the reference data and describe how it is used within the system 6. Reference data is information that financial institution 2 has added to the announcement usually for distinction from the vendor data or for additional information pertaining to the announcement. financial institution 2 Action Type is the corporate action type as defined by the financial institution 2. Financial Institution Indicator is the corporate action indicator as defined by the financial institution 2. The possible values are Mandatory, Voluntary, Informational, Redemption, and Class Action. Financial Institution Expiration Date can be the financial institution 2 Expiration Date is the same as the market expiration date for the event. The system 6 will adjust the financial institution 2 date in special cases when the market date falls on a non-business day for financial institution 2, such as weekend or holiday. The financial institution 2 date is always set to the market date or earlier. Financial Institution Deadline Date can be, for example, two business days prior to the financial institution 2 Expiration date. The system 6 will adjust the deadline for holidays and weekends.

Specialist can record notes about a master announcement. For organization purposes, a note can be cataloged in one of three categories; Announcement, Instruction, and Reviewer. The system 6 does not patrol the content of the categories so it is the responsibility of the user 8 to use the note categories according to policies of the financial institution 2. Once a note is stored, it lives with the master for life. A user 8 cannot delete or edit an existing note.

Master announcements have notification text that is input by the user 8. The notification text is a free-formatted text block that the system 6 includes on the notification sent to the local market contacts. The system 6 does not maintain a history on every change the user 8 makes to this field. It is important that the system 6 retain a record of the notification text that was sent with each notification. This is different from the change-by-change field history that is maintained for most of the other announcement data items. In another aspect, one or more non-voluntary masters can be configured to have notification text populated substantially automatically when the master is initially added.

There is a flag at the option level that the system 6 uses to determine if the option requires surrender. When the system 6 first creates the master, the system 6 will automatically set this flag based on action type. If the offer is one that financial institution 2 says requires surrender, the system 6 will set the surrender flag in each option in the offer except the "no action" option. If a contra CUSIP exists, the system 6 should automatically set the surrender flag and allow the user 8 to change it.

The system 6 considers two offers as competing if both have the same underlying security and at least one option in both requires surrender of the security. A Tender and an Exchange is an example of possible competing offers. The user 8 cannot participate in both offers. The system 6 considers two offers as associated if they both have the same underlying security and at least one does not have an option that requires surrender of the security. This applies to two master announcements that are related but independent of each other. The announcements may execute simultaneously or sequentially. As far as update and notification processing is concerned, each master is independent of the other.

The system 6 links a source announcement to a master announcement after it has determined that the two announcements pertain to the same corporate action offer. A source announcement can link to only one master announcement. It is possible for the system 6 to reassign the link to another master, but the system 6 must first unlink the source from the original master. The system 6 uses several guidelines to match and subsequently link a source to a master. Each source announcement has a unique sender's reference ID. Since a master announcement is created from a source announcement, and the master can receive updates from many other source announcements, the system 6 maintains a list of sender's reference numbers for a master. The system 6 can use the Corporate reference number which is the CUSIP+Action Type+Deal# to match incoming source to existing masters. If the system 6 cannot single out a master announcement for a source, the system 6 will create a new master. The system 6 provides a merge function to correct any announcements that should have been combined but were not.

The system 6 is able to merge two existing master announcements at the user's 8 discretion. There are some action types that XCITEK reports as separate actions, for example, that the financial institution 2 handles as one action. For example, conversion and redemption are managed by the financial institution 2 as one Conversion-Redemption; Tender and Consent-Tender are managed by the financial institution 2 as one Tender-Consent. In most cases, the corporate action processing system 6 will combine these records automatically. There will be some cases where the corporate action processing system 6 creates two master announcements and financial institution 2 wants to process the actions as a single event. The merge feature provides the function necessary for the user 8 to do this.

The merging of master announcements causes one master to die and all source announcements that were linked to the now dead master to be linked to the surviving master. The system 6 will not go back through sources to apply the updates. The dead master is available for the user 8 to look at, but he will not be able to change anything on that master record. The system 6 does not allow a merge if an announcement has responses or if the announcement is past its expiration date.

The OptionMap functionality is used to map merged options. When two masters are merged the dead master must have its options mapped into the existing master. The mapped options can either be mapped to existing options in the surviving master or mapped into new options in the surviving master. In either case, it is highly probable that the dead master's mapped option number will differ from its existing option number. When an option is mapped, the sender's reference, old option number, and new mapped option number are added to the OptionMap table. In addition, any announcements that are already linked to the dead master will have their sender's reference and option numbers added to this table.

When the CAAddMaster program is called, the OptionMap table will be referenced to determine if any of the incoming Options should be mapped. If the incoming options are to be mapped then the option number in the source record is changed to the mapped option number and the update is applied as normal. Otherwise, no mapping takes place and regular update rules apply.

The system 6 can check for matching master and update it if found. Otherwise, masters are created if holders are found. In the case a master is not created because no holders are found, then at a later date an update is received and there are holders, the system 6 should create a master using the information on the second announcement. Both sources will be linked to the master. The system will not apply updates to the master from the first source.

The system 6 can automatically update fields based on user-defined system 6 rules. The rules are defined by field and action type. A general rule will be if field is marked as updated and show is required, and then another update is received, the field is changed to discrepant status at the point of the first update. If a field is set up for auto update with show and two updates to that field are received on the same day, for example, the system 6 can mark that field as discrepant to allow the user 8 to see both new values. When a field is discrepant the system 6 should save/remember all subsequent automatic update attempts so that the user interface can display to the user 8 all source values that have been received since the field was marked discrepant. The user 8 can then choose from among those values and/or perform a manual edit to resolve the discrepancy. Fields not listed in the rules will always be automatically updated and not shown to the user 8.

The system 6 receives information for accounts at all where-helds except for those where-helds that the system 6 is instructed to ignore. The list of where-helds to ignore is configurable using the administration tool 6D. When refreshing positions on existing masters, the system 6 records whether the position increased or decreased or if the position is new (from the last refresh). The system 6 will not refresh positions in announcements that are marked with a "do not refresh" designation. In one aspect, the system 6 can be configured to recycle holders based on the applicable eligibility calculation rule assigned to that master.

The system 6 uses the financial institution 2 expiration date to determine the financial institution 2 deadline date and review date (in one aspect, this is one business day prior to expiration). "Market expiration date" refers to the real expiration date. financial institution 2 Expiration Date is the expiration date for financial institution 2 Processing. In most cases financial institution 2 Expiration will be the same as market expiration date. The system 6 will set the financial institution 2 Expiration date to the market expiration date (or DTC Expiration if it exists), unless it falls on a financial institution 2 holiday or weekend. In this case the system 6 will adjust the financial institution 2 Expiration to the closest business day (earlier than market date). The user 8 can change financial institution 2 Expiration if desired. The system 6 should recycle holders through market expiration date. This is to help the user 8 catch new holders and be able to give a best attempt at including in the offer.

If an offer has options with different expiration dates, the system 6 will look at each option expiration date to determine if that offer should be included in any of the To Do Page categories. At the master level there can only be one expiration date. The system 6 will choose the earliest expiration date where the option has not been reviewed. Important dates reflect the financial institution 2 Expiration date. Financial institution 2 expiration date does not show on the notification document. The financial institution 2 Deadline date does show. When calculating dates the system 6 must use a universal calendar to determine business days. The system 6 will also take into consideration financial institution 2 holidays. If a financial institution 2 Deadline date falls on a financial institution 2 holiday, the system 6 will set the date to the previous business day.

System Flags and Status

Announcement status is for the Local Market Contacts. The system 6 does not use the announcement status for any processing decisions. Valid values are as follows:

New—The system 6 sets this status when it creates the master announcement

Updated—The system 6 sets this status after notification data changes

Deleted—The system 6 sets this status when a delete record comes in from XCITEK Terminated—The system 6 sets this status when a termination record comes in from the announcement vendor 4

Extended—The system 6 sets this status when receive a source with SRCFUNC=9EXT.

Merged—The system 6 sets this status when the master is merged into another master Preliminary—The system 6 seta this status for a non-voluntary action if both important dates are blank and the meeting date is blank. In one aspect, voluntary corporate actions can be automatically considered preliminary if the expiration date is not present.

Processing status is to help control system 6 decisions and processing. Valid values are as follows:

Active—The system 6 sets this status when it creates the master announcement Merged—The system 6 sets this status when the master is merged into another master Completed Notification type identifies why a notification needs to be sent out. Valid values are as follows:

NewMaster—The system 6 sets this status when master is created.

ChangePositions—The system 6 sets this status when the refresh adds more positions, but does not overwrite the "Updated" or "Response" settings. The system 6 can be configured such that LMG's can receive decreases to positions in addition to increases to positions.

ChangedResponses—The system 6 sets this notification type when the action type is partially pre-refunded or partially redeemed and the master contains responses that have changed since the last notification, and the master announcement status is not "Preliminary", and lottery results have been sent. The system 6 maintains a flag at the master level that indicates if the lottery results have be been sent.

UpdatedMaster—The system 6 sets this status when notification data changes, but does not overwrite the "Response" settings.

ResponsePeriod—The system 6 sets this status on Response day

None—The system 6 sets this at beginning of day processing. It is basically a "no-action" setting.

Notification status reflects the state of the notification process, such as whether the notification has been sent, is pending, or failed. Valid values are as follows:

MustNotify—The system 6 sets when holders increased/new or notification data changes or on response period.

Overdue—The system 6 sets at EOD if notification status is "MustNotify".

Successful—The system 6 sets after information archived to Notification history table.

Failed—The system 6 sets if could not archive to notification history table.

The following are flags employed in various embodiments of the present methods and systems for processing corporate action information:

Updated (number)—System 6 increments when updates a field during the auto updates that is "update and show". System 6 decrements when user 8 clears update flag.

Discrepant (number)—System 6 increments when finds a field during the auto update that is "discrepant". System 6 decrements when user 8 clears discrepant flag.

Reviewed—System 6 sets this flag to false when create new master. If an announcement is extended (e.g., receive an XCITEK Extension), the flag should be false.

HasCompetingOffer—System 6 sets this flag to true when it finds another master with the same CUSIP and both masters require surrender.

Only masters with "Active" processing status are considered. The system 6 sets this flag once a day during the nightly processing.

HasAssociatedOffer—System 6 sets this flag to true when it finds another master with the same CUSIP and neither or only one master requires surrender. Only masters with "Active" processing status are considered. The system 6 sets this flag once a day during the nightly processing.

NewOffer—System 6 sets this flag to true when creates master. System 6 sets this flag to false after first notification is sent. For non-voluntary masters the system 6 sets this flag to false at end of day.

NewHoldings—System 6 sets this flag to true when the refresh position function brings in new/increased positions for master. The system 6 sets this flag to false at end of day regardless of whether the system 6 notified or not. The flag is adjusted during holders refresh processing based on the last notified position.

NotFullyResponded—System 6 sets this flag to true when at least one account has a total position that is not equal to responded amount.

OverCommitted—System 6 sets this flag to true when at least one account has a total position that is less than responded amount.

UnderCommitted—System 6 sets this flag to true when at least one account has a total position that is greater than responded amount Allow Auto Notification—System 6 sets this flag to false when create new master, user 8 edits position data, when user 8 edits announcement data that goes on notification, or when the master is discrepant or updated.

Refresh Positions—System 6 set this flag to true when new master is created.

Waiting Payment—System 6 set this flag to false when new master is created.

NotifyWhenNew—Flag indicating whether the CAAddMaster process automatically sets the AllowAutoNotification flag when creating a new master for the action type.

CompleteAfterNotif—Flag indicating whether the CANotifier process should automatically move the master to Completed processing status after sending the notification.

SetNewSourceAlert—Flag indicating whether the CAAddMaster process automatically sets the NewSource flag when creating a new master for the action type.

HasLottery—Flag indicating whether the action type has a lottery. For example Partial-Prefundings and Partial-Redemptions. This flag is used by the CAAddMaster process to determine whether to create a second option.

Tables

The following section contains a description for various tables used in connection with the database 6B of the corporate action processing system 6. The following description provides an illustrative explanation of what each table represents:

Master Announcement Tables

ArchiveHistory

This table holds the historical records for archived master announcements. The table contains the archive date, archive filename, linking mastered, and descriptive information about the master.

AuditLogs

This is the audit log for the changes made to the master announcement. This table holds all changes except those made to the holder data, which is stored in another table. The AuditLogs table records which field was changed, when, and by whom. In most cases the new value is also stored in the table.

HolderAccountRanges

In one aspect, this table holds account ranges for each master. CASPR may divide holder information into orders and groups of 500 or fewer accounts. If a master has 800 distinct account positions, for example, then there will be two groups where the first group contains 500 positions and the second group contains 300 positions. These groups are used in the Holders and Holders Criteria page in the user 8 interface. The corporate action processing system 6 calculates the holder account ranges daily after the holders table has been refreshed.

Holders

This table holds the account information. This is one of the tables that the system 6 updates during the nightly refresh process. The system 6 loads the XPOSITION file data into the CurrentPositions table. Then based on the "Refresh Holders" settings for each master, the system 6 will update the Holders table with the new positions. The user 8 can also update this table using the Holder page in the user 8 interface. In another aspect, advisor information is refreshed on a periodic basis, even if the master is configured for no refresh process to be performed.

There is a row in this table for each unique account and "where-held" pair that has a position for the underlying security in the master announcement. The Holders table contains the position amount and a position type flag indicating whether the amount is posted or pending. The table holds other information regarding the account such as a short name, advisor, registration, etc. The responses are not held in this table. There is a one-to-many relationship between the Holders table and the Reponses table where the option responses are stored.

The "Status" field reflects the response status for the position that may be fully responded, over-committed, under-committed, or un-responded. The position status is not in the Holders table. It is calculated dynamically based on the position amount and the last notified position amount, where the position status can be "increased", decreased", "unchanged", or "new". Note the position status is determined from the most recent position sent in a notification not the previous day's position.

The "PositionChange" field (a true/false field) indicates whether the position amount has been changed from the amount loaded from the CurrentPositions table (Xposition file). The user 8 interface looks to this field to control shading the row in the Holders page to alert the user 8 to the modified position.

HoldersAuditLog

The table records all user 8 changes to position and response amounts. The table does not record system 6 changes to the position during the daily refresh process. The corporate action processing system 6 records system 6 changes to the response fields during the daily refresh process.

MasterAnnouncements

This is the main table for master announcement information. It holds most of the announcement level information. The MasterID field, a unique database id, links the associated tables. There are 2 triggers for this table. The trigger named "CompleteTrigger" updates the CompleteDate field when the master processing status is changed to "Completed" or "Merged". The CompleteDate field is used to determine the age of a master for archive selection. The other trigger "MasterDelete" is used to delete rows from related master tables after the MasterAnnouncements row has been deleted.

MasterAssignments

This table represents the relationship between the master announcement and the user 8 assigned to the master. There should never be more than one user 8 assigned to an announcement. However, this table allows for the system 6 to support multiple users 8 per announcement.

MasterDates

This table holds the dates associated with the master announcement. This does not include dates that are specific to a certain option. The date is stored in the ISO format. The field "Format" tells the system 6 how to interpret the "Date" field. The field "Qualifier" identifies the date field.

MasterOptionDates

This table holds the dates associated with the option. The date is stored in the ISO format. The field "Format" tells the system 6 how to interpret the "Date" field. The field "Qualifier" identifies the date field.

MasterOptionRates

This table holds the rates associated with the option.

MasterOptions

There is a row in this table for each option in a master announcement. The table has basic information about the option such as title and number. Most of the option details are held in other tables linked to the MasterOptions table by OptionID, the unique database ID for the option.

MasterOptionTerms

This table holds the entitlements associated with the option. There can be many entitlements per option.

MasterRates

This table holds the rates associated with the master announcement. This does not include rates that are specific to a certain option.

MasterStatus

This table holds the information pertaining to the system 6 flags for each master announcement, such as "discrepant", "updated", or "new". This information is separate from the MasterAnnouncements table to help performance. The MasterStatus table will be queried and updated frequently and it is best to keep it focused.

NotificationAcctHistory

This table holds the account information that is part of the notification history. The NotificationHistoryID links the table to the NotificationHistory table, which holds the general notification information for the master. There is a one-to-many relationship between the NotificationHistory table and this table. This table and the NotificationHistory do not use the ISO formats.

NotificationHistory

This table holds the snapshot of the notification data for each notification sent for the master announcement. This table does not include a snapshot of the account information (which is contained in the NotificationAcctHistory table). The data in this table is formatted for the notification document. This table and the NotificationAcctHistory do not use the ISO formats.

NotificationText

This table holds the notification text information for each master announcement. The table is linked by MasterID and contains a variable character field for the notification text area.

OptionMap

The OptionMap functionality is used to map merged options. When two masters are merged the dead master must have its options mapped into the existing master. The mapped options can either be mapped to existing options in the surviving master or they can be mapped into new options in the surviving master. When an option is mapped, the sender's reference, old option number, and new mapped option number are added to the OptionMap table. In addition, any announcements that are already linked to the dead master will have their sender's reference and option numbers added to this table. When the AddMaster program is called, the OptionMap table will be referenced to determine if any of the incoming Options should be mapped. If the incoming options are to be mapped then the option number in the source record is changed to the mapped option number and the update is applied as normal. Otherwise no mapping takes place and regular update rules apply.

Responses

This table holds the responses from the local market contacts. The table can link to the Holders table by HolderID. The Reponses table is not updated as part of the daily refresh process. A Master announcement can have multiple options to which a holder may respond making multiple rows in the Reponses table for a holder (one row in Holders table). There can be only one response per holder per option number. If a holder has response information saved in the database and the position for that holder goes to zero, the system 6 still keeps the responses in the Responses table (unless it is a pending position). Through the user 8 interface the user 8 will see the zero position and the system 6 considers the position as over-committed response (status field in the Holders table).

Acct_Renumber—this table is used to store the actual accounts that have been renumbered. This table is purged and populated by executing the Account_Renumber batch file. This table is used within the system 6 to lookup old accounts to determine the new account number.

Acct_Renumber_BCP—this table is used to store the Account Renumbering Data (Old Acct/New Acct) that is bulk copied (bcp) into the database from a flat file.

AckResponses—this table holds the responses from PFPC (or external system). The table is populated by the CAResponse process. The Response Queue Web pages pull data from this table. As the users 8 review the responses, they can mark the records as "acknowledged". The end of day response process deletes acknowledged records from this table.

LMGEventType—this table holds the relationship between the local market groups and non-voluntary event-types. If a LMG wants to receive notifications for a certain event type, a relationship record must exist in this table. The system 6 provides a screen to allow the users 8 to easily manage the relationships. The CANotifier will not send a notification to a LMG if the relationship does not exist in this table.

PFPCNonVolNotificationExtracts—this table holds the notification information for non-voluntary offers that CASPR has sent to PFPC. This table is used as a temporary holding place for a BCP process to extract to a flat data file. This table is used throughout the day to extract notification data and provide to PFPC.

PFPCNotificationExtractsLast—this table holds the last notificationID that was extracted and sent to PFPC. This table is used by the PFPC extract process to select all new notifications sent to PFPC since the last extract process ran.

PFPCNotificationExtracts—this table holds the notification information for voluntary offers that CASPR has sent to PFPC. This table is used as a temporary holding place for a BCP process to extract to a flat data file. This table is used throughout the day to extract notification data and provide to PFPC.

PFPCResponses—a PFPC process writes directly to this table. This table holds the response for the CARepsonse process to pickup, process and ultimately store in the AckResponses table. The CAResponse process deletes the record from PFPCResponses after the record is stored in AckResponses.

ResponseHistory—this table holds datetime stamp and filename for the Response History reports. The response history report is an HTML document of all acknowledged PFPC responses received by CASPR. The CAEOD process generates the document and places a record in the ResponseHistory table. The web interface provides the user access to the report contents.

ToDoEventTypes—this table holds the event types to be included for each configurable ToDo category. There are 2 columns ToDoFilterID (int) and EventTypeID (int). If an event type is not listed here for the category, it is not included in the category definition.

SpecialistNotes

This table holds all notes that a user 8 records for a master announcement. Each row contains the note text, note type, user 8 ID, and date/time the note was entered. A master announcement may have many rows per note type, user 8 and/or date. There is a default object setup on the NoteDate field to set the value to the current date and time when an row is added to the table. The note field is a variable character field. Based on the business requirements, users 8 will not be allowed to edit an existing note. The system 6 will delete notes from this table only when it archives master announcements to secondary storage.

Source Announcement Tables

PurgeHistory

This table records the sources that are purged from the system 6. The table contains the purge date, sender's reference number, expiration date, and other identifying information. Unlike the archived masters, CASPR does not retain a file with the source information. After a source announcement is purged, there is no record other than the purge history.

SourceAnnouncements

This is the main table for source announcement information. It holds most of the announcement level information. This table can link to other related source tables by the SourceID field, which is a unique database identifier.

SourceAssignments

This table represents the relationship between the source announcement and the user 8 assigned to the source.

SourceDates

This table holds the dates associated with the source announcement. The date is stored in the ISO format. The field "Format" tells the system 6 how to interpret the "Date" field. The field "Qualifier" identifies the date field.

SourceOptionDates

This table holds the dates associated with the option. The date is stored in the ISO format. The field "Format" tells the system 6 how to interpret the "Date" field. The field "Qualifier" identifies the date field.

SourceOptionRates

This table holds the rates associated with the option.

SourceOptions

There is a row in this table for each option in a source announcement. The table has basic information about the option such as title and number.

SourceOptionTerms

This table holds the entitlements associated with the option.

SourceRates

This table holds the rates associated with the source announcement.

SourceVendorFields

This table holds all the extracted vendor data items that the financial institution 2 considers important to see outside the original vendor announcement. Because the list of vendor items will vary from vendor to vendor, the table is generic. The table holds a label value pair, and all values are stored as text.

SourceVendorText

This table holds the original text of the source announcement. Note, even manually created announcements will have vendor text entries. There are two types of text blocks stored, formatted and unformatted. For example, with "XCITEK" data files, lines one through five are the formatted text and the other lines are unformatted text. The original announcement is broken, because when working with master announcements the user 8 wants to see only the unformatted text portion of the sources that are linked to the master. When the user 8 interface needs to show the full original vendor announcement it will simply concatenate the two text blocks.

Miscellaneous Tables

AccountInformation

This table is used by the AccountExtract project in "nBalance". The project extracts information to this table. Then, the corporate action processing system 6 will update the CurrentPositions table with the information found in the AccountInformation table.

AdminToolUsers

This table holds the user 8 names and passwords for the administration tool 6E. The field "Active" is an important field that controls locking out multiple users 8. If the field contains a "1" the administration tool 6E Admin Tool does not allow the user 8 to access the corporate action processing system 6.

AdvisorPriorities

This table holds the priorities used in the Holders Page and Notification document. Based on bank, either the IO or advisor is the responsible party for the account.

Advisors

This table lists each advisor as uploaded from the Advisor code set file. This table is useful for translating between advisor numbers and names.

AnnAssignmentRules

This table holds the announcement letter ranges for which a user 8 is responsible. Action type and indicator define the assignment. There should be a default user 8 for each action type and indicator pair.

CALoaderLogs

This table holds the details from CALoader. Each vendor announcement processed by the CALoader is recorded in this table as to whether the process was able to successfully create a source announcement.

CurrencyCodes

This is a simple table listing the valid currency codes that the user 8 interface will allow in the entitlement section for option data.

CurrentPositions

This table holds the extracted information from the XPOSITION file. The "nBalance" projects PositionExtract and SMACExtract populate this table during the daily processing. The CAAddMaster process looks to this table to determine if there are active holdings before creating new masters.

DisplayRules

This table holds the display rules for the source detail page. This table supports displaying sources from multiple vendors.

EventTypes

This table holds configuration information specific to a financial institution 2 Action Type and Indicator pair. Information such as display template, ISO codes, and archive rules are stored here. The following is a description of each field in this table:

EventTypeID—Unique database id.

financial institution 2 Action Type—financial institution 2 action description.

financial institution 2 Action Indicator—financial institution 2 action indicator V for voluntary, M for mandatory, C for class, I for information, or R for redemption.

ISOCAEVIncoming—The ISO event code expected on incoming ISO messages. This field and the ISOCAMIncoming match with the XCITEKMapping table to define the financial institution 2 action types.

ISOCAMVIncoming—The ISO Mandatory-Voluntary code expected on incoming ISO messages. This field and the ISOCAEVIncoming match with the XCITEKMapping table to define the financial institution 2 action types.

ImportantDate1Label—The primary important date for the financial institution 2 Action Type. This label is displayed on the Master Summary page and in the Master Common Header area.

ImportantDate1Qualifier—The qualifier for the primary important date for the financial institution 2 Action Type. The corporate action processing system 6 uses this code to retrieve the date value from the database tables.

ImportantDate2Label—The secondary important date for the financial institution 2 Action Type. This label is displayed on the Master Summary page and in the Master Common Header area.

ImportantDate2Qualifier—The qualifier for the secondary important date for the financial institution 2 Action Type. CASPR uses this code to retrieve the date value from the database tables.

NewMasterURL—The ASP page to use when the user 8 wants to create a new master for this action type.

EditMasterURL—The ASP page to use when the user 8 wants to view the details of a master announcement.

OutstandingPayThreshold—The number of days past the expiration date for a master to be considered "aged outstanding".

ArchiveThreshold—The number of days past the “CompleteDate” for a master to be archived.

NoActionOption—Flag indicating whether the CAAddMaster process automatically creates a “no action” option for the Action Type.

RequiresSurrender—Flag indicating whether the CAAddMaster process automatically checks the “requires surrender” flag for the Action Type.

FieldUpdateRules

This table holds the field update rules for automatic system 6 updates.

Holidays

This table holds the financial institution 2 Holidays.

LMGAssignments

This table contains the local market group assignments. Each LMG can be assigned to one or more BRO (Bank Region Office) combinations. A BRO combination represents a group of accounts numbers where each component of the BRO can be specified. For example, all accounts at bank 20, region 34, and office 030 are represented by the designation 20-34-030. The components can be either a specific number or a wildcard representing a multiple match. The wildcard settings are denoted with the letter “A”. For example a BRO matching accounts in bank 20, any region, and office 090 is represented at 20-M-090 where the “AA” represents the wildcard match for all regions.

LocalMarketGroup

This table defines the local market groups. The table contains a group name and unique id. The unique id is used in the LMGAssignments table and LocalMarketMembers table to associate the group to its BRO assignments and members.

LocalMarketMembers

This table links to the LocalMarketGroups table by LocalMarketGroupID. There may be many members of a single group. The table holds the member names, e-mail addresses, and notification e-mail settings.

MasterDisplayFields

This table is used in conjunction with the FieldUpdateRules table to identify the data fields for each display template (voluntary, mand eff date, mand ex date, and redemption). This table holds the list of all possible fields.

NotificationFields

This table holds the list of master fields that impact the notification document (not including the holder data). The corporate action processing system 6 reviews this list to determine if it needs to re-notify because of an updated notification field.

QualDescriptions

This table holds a mapping of ISO qualifiers to names used within the user 8 interface.

SecurityDescriptions

This table holds the full three-line description received from “AMTrust” for each CUSIP. The user 8 interface needs to display the full three-line description anywhere a CUSIP is referenced. Instead of duplicating the storage for these strings, the table will hold the values, and the other tables will contain a link by CUSIP for the description.

SourceDisplayFields

This table lists the source data fields pulled from the vendor announcements. The table contains information used by the corporate action processing system 6 to determine where the source data item is stored in the database. This information is used along with the DisplayRules information in the source detail pages of the user 8 interface.

Specialists

This table holds information pertaining to the user 8; name, access rights, and reviewer.

ToDoFilters

This table lists the To Do categories and the relative order of importance for display on the To Do Page and EOD report. The “MasterFilter” field indicates whether the category is shown on the Master Summary page filter selections.

VendorAnnouncements

This is the table that CATranslator populates with ISO messages and vendor strings for each “XCITEK” or other vendor announcement. CALoader looks here for unloaded announcements. Unloaded means that source announcements have not been created from the vendor announcement.

VendorLogs

This table holds the records of vendor processing results. The information contained in this table will include the time the system 6 processed the vendor feed, the total processing time, how many source announcements were read, and how many source exceptions were created.

VendorSource

This table holds list of valid vendor source names that a user 8 may choose when making a manual update or creating a manual master.

WhereHeldCodes

This table holds the where-held codes that the system 6 should ignore when refreshing positions. This table also holds the where-held codes that are considered informational.

Administration Tool. In one embodiment, the administration tool 6E is a Visual Basic application that connects to the database 6B via ODBC. The administration tool 6E allows the user 8 to manage system 6 configuration setting and perform basic system 6 operations, such as reset passwords. Managers or systems personnel can use the administration tool 6E to maintain user 8 information, processing rules, agent information, financial institution 2 holidays, and other supporting information and rules used by the system 6. The following is an illustrative listing of various functions performed through and with the administration tool 6E: define financial institution 2 Action Type and Indicator definitions; define IO and Advisor responsibility order; mark Where-Held codes as “FYI only” or “Ignore”; define display rules for Source Detail Page; define Field Update Rules; define CASPR web users 8; maintain a list for Vendor/Source names; assign letter ranges to Specialists; define announcement vendor mapping; define Local Market groups and members; change the user 8 assignment for a master; clear the notification status for a master; reset CASPR Web user 8 password; define financial institution 2 Holidays; define Currency Codes; configure to do categories; manage notifications by action type by LMG; define by LMG notification for position changes; “holding” an announcement from notification; and/or configuring by event type: auto notify, auto complete, new source, eligibility calculation, projections.

ADDITIONAL EMBODIMENTS

The following description includes additional aspects that can be employed in association with the present methods and systems for processing corporate action information.

In various embodiments, both voluntary and non-voluntary corporate actions are included in the automated notification process of the corporate action processing system 6. Various embodiments provide one or more projections for the distribution of proceeds (such as cash and securities, for example) for corporate actions. In at least one aspect, non-voluntary corporate actions are included into the corporate action processing system 6 work flow, including mandatory corporate actions and redemptions. In another aspect, the system can calculate eligibility for corporate actions and/or project proceeds based on eligibility calculations and (for voluntary corporate actions) election option(s) chosen. In another aspect, the system can automatically create "AMTrust" transactions based on projections for certain action types. In another aspect, the system can develop an electronic interface for notification and proceeds projections.

Process Mandatory Corporate Actions in CASPR

Categories for To Do Page

CASPR can display the same To Do Page structure for each corporate action specialist. Any differences in the To Do Page from one specialist to another may be configured as a function of the type of corporate actions assigned to a specialist. The system can allow the user to define by action type which corporate action types are eligible for which categories on the To Do Page.

A "New Announcement" category or folder can be provided to make sure specialists know the announcements to which they have been assigned. In one aspect, actions stay in the "new" category until the source has been reviewed and the master has been released for notification.

A "Preparation Date" category can address the possibility of posting the corporate action on the next business day. Preparation date can be calculated by CASPR based on an action-specific date (such as ex-date, payable date, effective date, meeting date, etc.) and subtracting one PNC business day from that date. There may be nothing that the specialist need do to make an announcement leave this category. Announcements can automatically be removed from the category at the end of each business day and may not be included in the end-of-day report.

An "Important Date" (Swing, Effective, and the like dates) can be provided for mandatory corporate actions to prompt the specialist to post the results of the corporate action in AMTrust (if appropriate). If CASPR automatically reconciles the payment and releases all projected transactions for posting, the announcement can be automatically be removed from this folder. If CASPR cannot create transactions for posting (for tax lot or other reasons, for example), the specialist can manually move the announcement to a posted status which removes the announcement from this folder.

A "Meeting Date" can be provided for mandatory corporate actions that prompts the specialist to investigate the outcome of the meeting, determine if any new information is available for entry into CASPR, and make any appropriate changes to the status of the corporate action. Certain corporate action types can appear in this category on meeting date. For this release the specialist may not do anything within CASPR to make the announcement leave the category. Announcements can automatically be removed from the category at the end of each business day and may not be included in the end-of-day report. Corporate action types without a relevant meeting date can be configured to never appear in this category (based on the Action Type, for example).

A "Missing Information" category can be provided for mandatory and redemption corporate actions. The purpose of this category is to identify those corporate actions for which an important date has been established but for which a rate/price or new CUSIP (if required) has not been received. The general rule applied is that the system can prompt for a new CUSIP if certain rate qualifiers are provided. If a price is provided, no new CUSIP can be required. Exceptions to this general rule include stock splits and stock dividends. They can have a rate (qualifier ADEX), but no new CUSIP. The system can populate the underlying CUSIP in the new CUSIP field. In one aspect, announcements can be retained in this category until either the system or the user provides the missing information.

An "Unreconciled Payments" category can be applied to all corporate action types. The announcements in this category are those for which payment has been received but it does not reconcile to the projected proceeds. Payments that do not reconcile to projections may be kept in this folder regardless of the posting status of the transactions. An "Exception Payments" category can be provided for those payments that have been received, but which have not been matched to an outstanding active corporate action. An "Open Receivables" category can be provided for CASPR announcements that are posted but for which the financial institution 2 has not received payment.

New Announcement Processing

The purpose of designating announcements as "new" is to highlight those announcements assigned to a specialist but that the specialist has not yet reviewed. In one aspect, an announcement is no longer in the "new" category if the specialist has released it for notification. This works for voluntary corporate actions because the specialist must review the announcement prior to releasing it for notification.

Mandatory, redemption, and informational corporate actions can automatically be released for notification when received (based on user-defined specifications by action type and financial institution indicator). For corporate actions that are automatically notified, the user 8 can uncheck the new source box once the announcement has been reviewed. At that point, the announcement is removed from the "new" category and the box on the screen disappears. A "release for notification" box can be added to the Announcement screen. This box may be checked automatically (based on user-defined specifications) or can be manually checked for those announcements that are not automatically notified. This box may be checked automatically for mandatory, redemption, and informational corporate actions, for example.

Some announcements may never need to be reviewed by a specialist. Holders can be automatically notified and the system can automatically move these announcements to completed status (e.g., Full Pre-Refunding). These corporate actions can be identified by action type and financial institution 2 indicator in a user-defined table, for example.

End of Day Report

The End of Day report is created for the supervisor or manager and includes those items for which an action should have been taken, but was not. The source of the items on the report is the corporate actions on the specialists' To Do Page at the end of the business day. Managers can use the report to manage the work and specialists for which they are responsible. As a result, the report should be generated either by manager (covering that manager's specialists and announcements) or include everyone. One way to accomplish this is to add "manager" to the specialist table.

Announcement Status: Preliminary

Mandatory corporate actions can automatically be considered preliminary if both important dates are blank and the meeting date is blank. Voluntary corporate actions can automatically be considered preliminary if the expiration date is not present.

Redemptions and Informational corporate actions are not usually expected to be preliminary.

All preliminary announcements can be recycled (as other announcements are) to identify new holders. New holders can be notified of the preliminary announcement and updates to preliminary announcements can also generate revised notifications (although the status can continue to be "preliminary" if the criteria noted above still applies). Additionally, when the missing piece of information that is making the announcement preliminary is received, the system can automatically move the status to "updated".

New preliminary announcements can appear in the "New" category on the To Do Screen and on the Master Summary Screen when it is accessed from the To Do Screen. When accessing the Master Summary Screen directly, however, preliminary announcements may not be automatically included.

Notification Templates

In one aspect, the corporate action processing system 6 uses one template specifically for Voluntary notifications. In another aspect, the system can control which notifications an LMG is sent by reference to CASPR action type and financial institution 2 indicator. For example, the Western Regions LMG may continue to receive Voluntary action types and add only Consents. This can be accomplished by expanding the LMG table or the Event Type table, for example, in the administration tool 6E.

Action Type Control Table

A user-defined and controlled data structure within CASPR can be provided that specifies controls for certain processes. These specifications can be by action type and financial institution 2 Indicator.

The definitions can include, for example, whether or not the system can automatically release announcements for notification (e.g., Voluntary and Informational corporate actions can be manually released for notification. Notifications on Mandatory and Redemption corporate actions can be automatically released); whether or not the system can automatically populate notification text from vendor text (e.g., vendor text can be copied automatically to notification text on Mandatory corporate actions, but may not be on voluntaries); whether or not the specialist can ever review the announcement (e.g., some announcements the specialist may never need to review; holders can be automatically notified and the system can automatically move them to completed processing status (e.g. Full Pre-Refunding)).

Calculate Eligible Positions for All Corporate Actions

Determining which securities positions are eligible for a corporate action can be complicated. The criteria for eligibility vary based on the type of corporate action, who initiated the action, and other factors.

Eligibility Calculations

The system has the ability to define at an action type level what eligibility calculation to use, as well as have the flexibility to change the calculation at the master announcement level if necessary. When the calculation is changed at the master announcement level, the system can recalculate eligibility real time. Functionality can be provided to manually check a "Do Not Refresh" flag, to provide an override of subsequent CASPR calculations. Each calculation can use data from the AMTrust system and SMAC and includes or excludes positions or transactions based on certain criteria. These calculations can change when the industry moves to T+1 settlement and not all possible eligibility calculations are covered herein. As a result, the eligibility calculations can be built so that they can be easily modified and adding additional calculations can be easily accommodated.

In various embodiments, the system 6 can utilize a mainframe database to inquire real time throughout the day regarding SMAC Pending transactions that affect eligibility. In various embodiments discussed herein, SMAC pending transactions are, more generally, traded but not yet settled security transactions that affect eligibility. Categorizations of eligibility calculations can be designated as Effective Date, Expiration Date, Record Date, Ex Date, Publication Date, Odd Lot, and a Default calculation.

Effective Date Eligibility

Action Types: Lawsuit (C), Bankruptcy (I), Default (I), Escrow To Maturity (I), Informational (I), Rights Plan Adoption (I), Conversion (M), Exchange (M), Merger (M), Name Change (M), Reverse Stock Split (M), Unit Split (M), Full Redemption (R), Mandatory Put (R), Put-Mandatory (R), Pre-Refunding (R), Mini Tender (I), Merger Election (I), Conversion (non expiring) (I).

Posted Position

PLUS Executed Buys where Trade Date (TD)≦Effective Date

MINUS Executed Sales where TD≦Effective Date

PLUS Settled Free Receives where Settlement Date (SD)≦Effective Date

MINUS Settled Free Deliveries where SD≦Effective Date

Plus/Minus WH Changes where CASPR RecvDT≦Effective Date

In one aspect, the calculation continues throughout the life of the action and stops calculation at the close of business on Effective Date. When the system 6 is creating a master, and the Effective Date is in the past (EffDT<Today), CASPR creates a master announcement with holdings based on current posted position and rules above. If the Effective Date is today or in the future (EffDT>=Today), the system 6 creates a master announcement with holdings based on current posted position and rules above. If the Effective Date is not populated (EffDT=empty), the system 6 creates a master announcement with holdings based on the Default Calculation. The system 6 can be configured to refresh the master considering Effective Date. If the Effective Date is in the past (EffDT<Today), no calculation is made. The system 6 retains the previously determined eligibility and the detail records that were used to calculate that eligibility. If the Effective Date is today or in the future (EffDT>=Today), the system 6 can calculate eligibility using current posted position and rules above. If the Effective Date is not populated (EffDT=empty), the system 6 can calculate eligibility using the Default Calculation.

Expiration Date Eligibility

Action Types: Conversion (V), Merger-Election (V), BadAction (V), Bid Tenders (V), Conversion-Redemption (V), Dutch Auction (V), Exchange (V), Fixed Spread Tenders (V), Informational (V), Invitation to Cover Short (V), Mandatory Put w/Rt to Retain (V), Optional Put (V), Put-Optional (V), Registration Statement (V), Rights Offer (V), Tender Offer (V), UIT Terminations (V), Warrant Exercise (V), Mini Tenders (V)

The following is the calculation if Protect Date is populated:

Posted Position

PLUS Executed Buys where Trade Date (TD)≦Expiration Date

MINUS Executed Sales where TD≦Expiration Date

PLUS Settled Free Receives where Settlement Date (SD) ≦Expiration Date

MINUS Settled Free Deliveries where SD≦Expiration Date

Plus/Minus WH Changes where CASPR RecvDT≦Expiration Date

The following is the calculation if Protect Date is not populated:

Posted Position

PLUS Executed Buys where Settle Date (SD)≦Expiration Date

MINUS Executed Sales where TD≦Expiration Date

PLUS Settled Free Receives where Settlement Date (SD)≦Expiration Date

MINUS Settled Free Deliveries where SD≦Expiration Date

Plus/Minus WH Changes where CASPR RecvDT≦Expiration Date

When the system 6 is creating a master and the Expiration Date is in the past (ExpirDt<Today), the system 6 does not create a master. For expiration type offers the system 6 can be configured to not create a master announcement if the source receipt date is after the Expiration Date. If the Expiration Date is today or in the future (ExpirDt>=Today), the system 6 creates a master announcement with holdings based on current posted position and rules above. If the Expiration Date is not populated (ExpirDt=empty), the system 6 creates a master announcement with holdings based on the Default Calculation. In one aspect, the system 6 refreshes the master considering the Expiration Date; if it is in the past (ExpirDt<Today), no calculation is made. The system 6 retains the previously determined eligibility and the detail records that were used to calculate that eligibility. If the Expiration Date is today or in the future (ExpirDt>=Today), the system 6 can calculate eligibility using current posted position and rules above. If the Expiration Date is not populated (ExpirDt=empty), the system 6 can calculate eligibility using the Default Calculation.

Record Date Eligibility

Action Types: Consent (I), Consent (V), Distribution (M), Stock Dividend (M), Optional Dividend (V), Tender-Consent (V).

Record Date Calculation:

Posted Position

PLUS Executed Buys where Settlement Date (SD)≦Record Date

MINUS Executed Sales where SD≦Record Date

PLUS Settled Free Receives where Settlement Date (SD)≦Record Date

MINUS Settled Free Deliveries where SD≦Record Date

Plus/Minus WH Changes where CASPR RecvDT≦Record Date

In some action types, such as Consent (I), Consent (V), Tender & Consent, there may never be a record date. In these situations, the system 6 can use the Default Calculation and calculate until the processing status is "Completed".

Initially, the announcement arrives with no dates; the system 6 can calculate eligibility using the Default Calculation. Then, as updated announcements are received, the record date can be populated. If the record date is in the future, the system 6 can continue to use the current position in rules above. Once today equals Record Date, then the system 6 can perform the Record Date Calculation.

When the system 6 is creating a master and the Record Date is not populated, the system 6 creates a master announcement with holdings based on Default Calculation. When Record Date is today or in the past, the system 6 creates a master announcement with holdings based on current posted position and rules above. When Record Date is in the future, the system 6 can create a master announcement with holdings based on current posted position and rules above. In one aspect, the system 6 refreshes the master considering the Record Date. If it is not populated, the system 6 can calculate eligibility using the Default Calculation.

If Record Date is today, the system 6 can calculate eligibility using current posted position and rules above. If Record Date is in the future, the system 6 can calculate eligibility using based on current posted position and rules above. If Record Date is in the past, then no calculation is made. The system 6 can retain the previously determined eligibility and the detail records that were used to calculate that eligibility.

Ex Date Eligibility

Action Types: Liquidation (M), Rights Issue (M), Spin Off (M), Stock Split (M)

Initially, the announcement may come in with no dates; the system can calculate eligibility using the Default Calculation. As updated announcements are received, the Ex Date should be populated. Then, the system 6 can perform the Ex Date Calculation.

If a due bill settlement date exists, then the system 6 can continue to review pending SMAC records comparing Trade Date to Ex Date. If the system 6 finds a qualifying SMAC transaction, it can adjust eligibility. This part of the process can continue until the end of due bill settlement date. During the Ex Date to Due Bill date, the system 6 can be configured to not pick up the daily posted positions, but to apply the incoming pending activity.

The following is the calculation if both Ex Date and Due Bill Date are populated:

Posted Position

PLUS Executed Buys where Trade Date (TD)<Ex Date

MINUS Executed Sales where TD<Ex Date

PLUS Settled Free Receives where Settlement Date (SD)≦Due Bill Settlement Date

MINUS Settled Free Deliveries where SD≦Due Bill Settlement Date

Plus/Minus WH Changes where CASPR RecvDT≦Due Bill Settlement Date

The following is the calculation if Ex Date is populated and Due Bill Date is not populated: (not likely situation, but is planned for)

Posted Position

PLUS Executed Buys where Trade Date (TD)<Ex Date

MINUS Executed Sales where TD<Ex Date

PLUS Settled Free Receives where Settlement Date (SD)≦Ex Date

MINUS Settled Free Deliveries where SD≦Ex Date

Plus/Minus WH Changes where CASPR RecvDT≦Ex Date

When the system 6 is creating a master and the Ex Date is not populated, the system 6 can create a master announcement with holdings based on Default Calculation. When Ex Date is today or in the past, the system 6 can create a master announcement with holdings based on current posted position and rules above. When Ex Date is in the future, the system 6 can create a master announcement with holdings based on current posted position and Ex Date rules. The system 6 refreshes the master considering the Ex Date. If Ex Date is not populated, the system 6 can calculate eligibility using the Default Calculation. If Ex Date is today, the system 6 can calculate eligibility using current posted position and rules above. If Ex Date is in the past and Due Bill Date is not populated, no calculation is made. The system 6 retains the previously determined eligibility and the detail records that were used to calculate that eligibility. If Ex Date is in the past and Due Bill Date is today or in the future, the system 6 can calculate eligibility using prior posted position and Ex Date rules. If Ex Date is in the past and Due Bill Date is in the past, no calculation is made. The system 6 retains the previously determined eligibility and the detail records that were used to calculate that eligibility. If Ex Date is in the future, the system 6 can calculate eligibility using current posted position and Ex Date rules.

Publication Date Eligibility

Action Types: Partial Redemptions (R), Partial Pre-Refunding (R)

When the system 6 is creating a master and the Publication Date is not populated, the system 6 can create a master announcement with holdings based on the Default Calculation. If Publication date is today or in the past, the system 6 can create a master announcement with holdings based on current posted position and rules below. If Publication date is in the future, the system 6 can create a master announcement with holdings based on current posted position and Publication Date rules. The system 6 can refresh the master considering the Publication Date. If Publication date is not populated, the system 6 can calculate eligibility using the Default Calculation. If Publication date is today, the system 6 can calculate eligibility using current posted position and rules below. If Publication date is in the past, no calculation is made. The system 6 can retain the previously determined eligibility and the detail records that were used to calculate that eligibility. If Publication date is in the future, the system 6 can calculate eligibility using current posted position and the Publication Date rules. Publication date may be in the past.

Posted Position as of Publication Date (Begin of Day, or Close of Business previous day)

PLUS Executed buys where SD is <Publication Date

MINUS Executed sales where SD is <Publication Date

Odd Lot Eligibility Calculation

Action Types: Odd Lot Tender (V)

CASPR currently populates the max eligible shares field on the master announcement when received from XCITEK. The max eligible shares field can be added to the "create master" screen.

When the system 6 is creating a master and the Max Eligible Shares is not populated or is zero, system 6 creates a master announcement without holdings. If Record Date and Expiration Date are not populated, system 6 creates a master announcement with holdings based on the Default Calculation and the Max eligible share amount. If Record Date and Expiration Date are in the future, system 6 creates a master announcement with holdings based on the Default Calculation and the Max eligible share amount. If Record Date is today and Expiration Date is today or in the future, system 6 creates a master announcement with holdings based on current posted position and the rules above. Max eligible share amount is also used. When Record Date is in the past and Expiration Date is today or in the future, system 6 creates a master announcement with holdings based on current posted position and the rules above. Max eligible share amount is also used. When Record Date and Expiration Date are in the past, no master is created. When Record Date is empty and Expiration Date is today or in the future, system 6 creates a master announcement with holdings based on current posted position and the rules below. Max eligible share amount is also used. When Record Date is empty and Expiration Date is in the past, no master is created. When Expiration Date is empty and Record Date is today or in the past, system 6 creates a master announcement with holdings based on the Default Calculation and the Max eligible share amount. When the Expiration Date is empty and Record Date is in the future, system 6 creates a master announcement with holdings based on the Default Calculation and the Max eligible share amount. System 6 refreshes holdings considering max eligible shares, record date, and/or expiration date. When Max Eligible Shares is not populated or is zero, system 6 calculates eligibility with holdings based on current posted position and the rules above. (All eligible holdings will go to zero). When Record Date and Expiration Date are not populated, system 6 calculates eligibility using the Default Calculation and the Max eligible share amount. When Record Date and Expiration Date are in the future, system 6 calculates eligibility with the Default Calculation and the Max eligible share amount. When Record Date is today and Expiration Date is today or in the future, system 6 calculates eligibility using the current posted position and the rules below. Max eligible share amount is also used. When Record Date is in the past and Expiration Date is today or in the future, system 6 calculates eligibility using the prior posted position and rules above. Max eligible share amount is also used. If Record Date and Expiration Date are in the past, no calculation is made. System 6 retains the previously determined eligibility and the detail records that were used to calculate that eligibility. If Record Date is empty and Expiration Date is today or in the future, system 6 calculates eligibility using current posted position and rules above. Max eligible share amount is also used. When Record Date is empty and Expiration Date is in the past, no calculation is made. System 6 retains the previously determined eligibility and the detail records that were used to calculate that eligibility. When Expiration Date is empty and Record Date is today, system 6 calculates eligibility using the Default Calculation. Max eligible share amount is also used. When Expiration Date is empty and Record Date is in the past, system 6 calculates eligibility using the prior posted position and rules below. Max eligible share amount is also used. When Expiration Date is empty and Record Date is in the future, system 6 calculates eligibility using the Default Calculation. Max eligible share amount is also used.

The following is the calculation if Record Date is populated:

Posted Position

PLUS Executed Buys where Settlement Date (SD)≦Record Date

MINUS Executed Sales

PLUS Settled Free Receives where Settlement Date (SD)≦Record Date

MINUS Settled Free Deliveries

Plus/Minus WH Changes where CASPR RecvDT≦Expiration Date

The following is the calculation if Record Date is not populated and Protect Date is populated:

Posted Position

PLUS Executed Buys where Trade Date (TD)≦Expiration Date

MINUS Executed Sales where TD≦Expiration Date

PLUS Settled Free Receives where Settlement Date (SD)≦Expiration Date

MINUS Settled Free Deliveries where SD≦Expiration Date

Plus/Minus WH Changes where CASPR RecvDT≦Expiration Date

The following is the calculation if both Record Date and Protect Date are not populated:

Posted Position

PLUS Executed Buys where Settle Date (SD)≦Expiration Date

MINUS Executed Sales where TD≦Expiration Date

PLUS Settled Free Receives where Settlement Date (SD)≦Expiration Date

MINUS Settled Free Deliveries where SD≦Expiration Date

Plus/Minus WH Changes where CASPR RecvDT≦Expiration Date

Default Calculation

The default calculation is used by system 6 when a critical date of the assigned eligibility calculation rule is missing. The Default calculation will be replaced with the assigned calculation once the missing date is populated.

Posted Position

PLUS Executed Buys

MINUS Executed Sales

PLUS Settled Free Receives

MINUS Settled Free Deliveries

For those "record date" holders, CASPR can continue to look at subsequent days' pending SMAC records, reducing the calculation for executed sales and increasing the calculation for executed buys. After this calculation is completed, if the account meets the max eligible shares, they are eligible. The calculation continues through expiration date.

Example:

Odd Lot Criteria: 99

Record Date: Feb. 15, 2004

Expiration Date: Mar. 29, 2004

Account A held 50 shares as of Feb. 15, 2004; they are eligible for 50 shares. On Mar. 1, 2004 account buys 30 shares; account is now eligible for 80 shares. On Mar. 14, 2004 account buys 50 additional shares; account is no longer eligible since they hold 130 shares.

Account B held 150 shares as of Feb. 15, 2004, they are not eligible. On Mar. 5, 2004 account sells 60 shares, account holds 90 shares but is not eligible because they were not odd lot holders on record date.

Account C held 85 shares as of Feb. 15, 2004; they are eligible for 85 shares. On Mar. 1, 2002 account sells 85 shares, account is not eligible since they have 0 shares.

Account D held 0 shares as of Feb. 15, 2004, they are not eligible to participate in this offer. On Mar. 4, 2002 they purchase 31 shares, they are still not eligible, since their odd lot was not held on record date.

Inquiry Facility

CASPR can provide a display of how an entitled position was calculated. The entitled position calculation display can be accessed based on an announcement/account combination and can present the posted position (end-of-day position the day previous to eligibility date) and what transactions have been added to or subtracted from that posted amount. For each transaction that was added to or subtracted from the posted amount, the system can show the transaction share/face amount, transaction type, trade date, settlement date, and order number, status, broker number, and CASPR receive date/time.

Manual Adjustments

CASPR currently provides the ability to manually override the position reported on the notification. The new amount that was manually entered by the user reverts back to the system-generated amount every time the holders file is refreshed.

This release of the system can retain this functionality and allow the user to manually adjust an eligible position by entering the share/face amount the specialist determines is correct. Additionally, the system can require the specialist to explain why the eligible position is being overridden and maintain that explanation somewhere in the database.

When an eligible position has been overridden and a specialist has made an inquiry into the calculation of the eligible position, the system can show both the system's determination of entitled position and the override amount. The display can also reveal which user entered the override, when, and the explanation for the override.

Explanations for position overrides can be kept in a way that allows the specialist to search for explanations at either the announcement level or for an announcement/account combination.

The system can allow the specialist to instruct the system not to refresh eligible positions for a specific announcement.

Project Proceeds

Proceeds are projected and their receipt is tracked for two major reasons: projecting proceeds of corporate actions provides an investment manager with the opportunity to plan for the investment of the proceeds prior to their receipt; and, the intra-day notification of the receipt of those proceeds allows the investment manager to invest them immediately.

This functionality depends on the accurate calculation of eligible positions and the capture of responses to voluntary actions within CASPR. It also requires the accurate and reliable capture of rate and new security information either from the data vendor or via manual data entry.

There are three elements included with a projection at the announcement/account level: an amount that is expected to be received, a date on which the proceeds are expected to be received and posted, and a projection status. In some cases an amount cannot be determined. In other cases the expected date of receipt cannot be known. Each projection (at the announcement/account level) can be configured to always have a projection status.

Calculate Anticipated Proceeds

Redemptions & Mandatory Corporate Actions

Partial Redemptions and Partial Pre-Refunding action types cannot project proceeds until the "lottery" has been performed (outside of CASPR) and input into CASPR. It is the lottery results that can be projected.

For mandatory corporate actions, proceed projections can be based on the eligible position and the rate or price stated in the announcement. To calculate projected proceeds, the system can perform the required calculation involving the eligible position and the rate or price for each "entitlement" established for the corporate action. For example, for a mandatory exchange there can be at least two "entitlement" transactions: a security debit to remove the underlying security and a security credit for the new security.

Voluntary Corporate Actions

For voluntary corporate actions, proceeds projections can be based on the responded position for any given option, regardless of whether the account is over-committed. If no response has been recorded for an account, the projection report can indicate "No Response" for that account.

To calculate projected proceeds, the system can multiply the responded position for a given option times the rate for each "entitlement" established for that option. For example, if an investor elects to take no action and there are no "entitlements" established for that option, no proceeds would be projected. If an investor elects to take cash and stock in a merger with elections, there can be three "entitlement" transactions: a security debit, a security credit and a cash credit.

If a cash rate is announced in a foreign currency, the projection of proceeds can be provided in that foreign currency.

Debit of Underlying Securities

There is no explicit indicator from the announcement vendor or required in the ISO 15022 standard dealing with whether the security which is the subject of the corporate action can be debited as a result of the corporate action or a specific election option. The system can project this removal of the underlying security when appropriate. For CASPR to know whether to project a debit of the underlying security, it can examine the price or rate qualifier within the announcement. A table within CASPR can list those qualifiers that imply such a debit.

Inclusions/Exclusions

Exclusions:

It can be decided that proceeds for certain corporate actions are not to be projected: announcements with a financial institution 2 Indicator of "informational"; announcements with an announcement status of "preliminary"; announcements with a processing status of "merged"; announcements with a processing status of "completed"; announcements that were terminated or deleted on a previous business day; and, accounts with an eligible position in an active announcement for which payment has been posted.

Projection Status:

Each projection record can have a projection status. This projection status can be at the account/option. There can be at least five projection status values. This status information may be the same for all accounts with positions eligible for an announcement (deleted or terminated), or may differ from account to account within an announcement (posted or no response).

Unable to Calculate

This status can be used when proceeds are expected, but the information available is insufficient to provide a credible projection (e.g., missing rate or price). These projections can reflect a blank amount and a blank date.

No Response

This status can be used when a corporate action requires a response but no response has yet been recorded. These projections can reflect a blank amount and a blank date.

Pending

This status indicates that the projection amount is believed to be accurate but the proceeds have not yet been posted. These projections can typically have both an amount, and a date. If the announcement is a voluntary and the response was for an option that has no transaction data associated with it (e.g. "no action"), the projection can reflect a zero amount and a blank date.

Posted

This status indicates that the proceeds from the corporate action are available to the investor and can be posted to "AMTrust" during the next scheduled night-time batch cycle. Projections for some action types can be automatically moved to the posted status on the morning of payable date in anticipation of receipt of funds (e.g., redemptions can automatically be moved to Posted projection status on the morning of payable date).

Deleted/Terminated

If an announcement is moved to the deleted or terminated announcement status, the system can reflect a zero projection during the business day on which it was marked as deleted or terminated. The date field can be blank.

Start Projections:

Proceeds can be projected for every active mandatory or redemption corporate action for which a rate or price exists, regardless of when it is expected to be paid.

Proceeds can be projected for active voluntary corporate actions for which a rate or price exists—but only for those accounts that have submitted a valid response.

Stop Projecting:

CASPR can stop projecting proceeds at the end of the business day on which the payment can be posted (unless the announcement is deleted or terminated). That is, when the payment is reflected in "AMTrust", the projection may no longer be reflected on the projection file.

Display of Projected Proceeds

The system can provide a display of the projected proceeds for the specialist. For summary projections at the "registration/where held" level, the information can be displayed on the master announcement page for mandatory actions. For voluntary corporate actions, the summary projections at the "registration/where held" level can be displayed on the option page.

Projections at the account level can be displayed on the holders page for all corporate actions. There can be a toggle on this page that allows the specialist to turn off the display of projected proceeds if so desired. All sorts and filters currently available on the holders page can be available when displaying projections.

Maintenance

Projected proceeds must be updated on a real-time or near real-time basis for mandatory corporate actions whenever the eligible position changes for an account or a rate or price changes at the announcement level. Projected proceeds must be updated on a real-time or near real-time basis for voluntary corporate actions whenever the responded position changes for an account or a rate or price changes at the option level. A change in election can also prompt the system the recalculate projected proceeds. Additionally, any time the projected payable date changes on any corporate action, a replacement projection record can be reported to the investor (or investment manager) as well as an updated notification.

Projection Audit Log

CASPR can retain a record of every projection ever communicated to the investor or investment manager. It is expected that this projection information can be kept at the announcement level and can be archived with the announcement. This history must be available to financial institution 2 via an on-line screen, searchable by any combination of the various fields such as, for example, announcement, account, and/or expected receipt date.

Capture Payment Information

Some corporate action payments can be accurately anticipated both in terms of amount and timing. In order to provide information on which investment decisions can be made, payment information must be made available to investment managers throughout the day as proceeds are received.

Payments recorded in CASPR can be made either in cash or securities. The majority of corporate actions are processed through DTC and proceeds are credited to a financial institution 2 account at DTC. Intra-day electronic files are available from DTC that provide information about transactions (debits and credits) made in the period since the last update.

CASPR can attempt to link each new payment item to an active corporate action announcement by comparing the action type and CUSIP number (or contra CUSIP). DTC action types can be mapped to financial institution 2 action types to facilitate this matching process. The CUSIP number on the payment record can first be compared to the underlying CUSIP numbers of active corporate actions in CASPR. If no match is found, the contra-CUSIPs recorded at the option level on voluntaries can be searched. If an exact match can be found, then the system can automatically link the payment to the announcement (and the specific option, if a voluntary action).

The system can provide the ability to manually unlink a payment from an announcement, if the system automatically linked a payment to the wrong announcement. At this point, each source payment record can either be linked to a master announcement record, or be open (pending a link). If a payment item is not linked to a corporate action, either because the system could not link it automatically or a user unlinked it, the item can appear in the "Exception Payments" category on the appropriate specialist's "To Do" page. The specialist for these exception payments can be determined by using the announcement assignment criteria within CASPR as applied to the DTC security description and DTC action type.

The payment source records can be kept in the same database as the announcement source records. When a specialist has exception payments in his folder the list of those payments would be viewed on the existing Source Summary screen. A new screen can be provided to view the details of a payment source record and to provide the specialist with an opportunity to enter a CASPR ID, so that an open payment can be linked to an existing announcement.

There can be more than one payment source record linked to an announcement, but usually never more than one announcement linked to a payment source record. The system can be configured to never automatically link a payment to an inactive corporate action in CASPR. If the specialist wishes to link a payment to an inactive corporate action manually, the announcement status can be first changed to "active" status.

One of three things can happen to an open exception payment on the source file. The specialist can manually link it to an existing announcement. The system can be configured to have a facility to manually link an open payment to a master announcement record. The specialist can establish a new announcement and link the payment to it. The specialist can mark the payment as forever orphaned and the system can remove it from the exception payment category on the "To Do" page and ignore it for future processing. The system can record which specialist marked the payment as orphaned and require the specialist to insert text (linked directly to the payment record) explaining why the payment is not being linked to a CASPR corporate action. So, in summary, there are three possible linking states for a source payment record: Linked, Open, and Orphaned.

In addition to the automatic capture of DTC payments, the system can provide the ability for the specialist to record a payment received from a source that does not provide an electronic feed. This payment information can be manually entered directly on the Option Detail screen (and so can be linked to an announcement) and be recorded in the source database. The system can be configured to not permit any user to edit any payment information that is received electronically. If the payment information is entered manually, the system can allow a user to edit the data. All payment records can be archived—even if they are never matched to an announcement record.

Reconcile Receipt vs. Projected Proceeds

Once a payment is linked to a specific corporate action it can be reconciled to the amount projected. The source contains information regarding the source of the payment and the system correlates that to specific where-held code(s). The amount received can be compared to the amount projected for that where held code (or group of where held codes).

If the payment is within a specific tolerance, then the system can automatically send the appropriate transactions to "AMTrust" and reflect the projected amount(s) as "posted". This tolerance can be established in the administration tool by action type and payment type (cash or shares). If the payment is not within the specified tolerance, the payment can be manually reconciled to the projections.

Exception 1: If the securities for a given announcement/option are split between various locations (including securities on loan) then CASPR may not automatically move the projection status to posted and may not release transactions for posting to AMTrust. The system can put the announcement in the unreconciled payments folder.

Exception 2: CASPR can create AMTrust transactions for some announcements and not for others. If CASPR is not able to create the AMTrust transactions for an announcement, it may not automatically move the projection status to posted. Any announcement for which CASPR cannot create the AMTrust transactions can be moved to the unreconciled payments folder, regardless of whether the payment is reconciled or not.

In order to manually reconcile the payment versus the projected amount, the specialist can use the master announcement screen (for mandatories and redemptions) or the option detail screen (for voluntaries). These screens can also have information regarding payments received, including amount, date received, source, etc.

The following is an example illustration of information that can be displayed a revised Option Detail Screen:

========================================
===========

Option Detail Screen

Announcement ID

Option Rate New CUSIP(s)

DTC Date: 21 Oct. 2004 Position: 365,000 Pmt Amt: $1,000,000.00

DTC CUSIP: Pmt Amt:

Total Position: Total Proceeds

Acct 1 Eligible Position Proceeds

Acct 2 Eligible Position Proceeds

Acct 3 Eligible Position Proceeds

Total Position Total Proceeds

Multiple proceeds columns may be provided when receiving cash and securities.

Adjust Projected Proceeds

CASPR can support different methods for adjusting the projected proceeds on a corporate action. Changing the rate or price on the announcement or the option can automatically generate a recalculation of projected proceeds for all accounts electing that option. Manually adjusting the eligible or responded position for an account can automatically generate a recalculation of projected proceeds for that account. The system can allow the specialist to manually adjust the proceeds amount for a specific account. If a projected amount is adjusted, there may be no requirement that the system provide the specialist with a narrative field to explain the adjustment. The system can stop recalculating when announcement status is terminated or deleted, the posted flag is set, or the processing status is completed. If there is a need to change any proceeds amounts after the announcement is completed or terminated, the specialist can have to change the status of the announcement and then generate a recalculation of the proceeds. Revised projections can be sent for the account or accounts that were affected by the recalculation.

Process Prorated Payments

When a payment is prorated, the specialist can manually reconcile the payment. Adjustments can be made to the prorated positions and the transaction detail on the announcement may require additions or changes. This can, in turn, affect the projections. When a prorated payment is received, the system can allow the specialist to indicate that the payment does not match the projection because it has been prorated. This can occur on the option detail page. The specialist can make sure the system knows to which where held codes or accounts the prorated payment applies.

The system can accept a proration factor (percentage) and then ask what can be done with the securities that were not accepted. The specialist can tell the system either to return the securities to the account(s) in a non-restricted state, or establish an additional entitlement transaction at the option level that would apply to the remaining securities. This new entitlement transaction information can be added to the option detail page.

Create and Post Transactions

Transaction Processing

Once the payment has been reconciled to the projections, if transactions have not already been posted to AMTrust, they can be posted at this time.

The screen used to reconcile payments (either the option detail or Holders page) can allow the specialist to release transactions for posting by option (regardless of where-held), by where-held within the option, or by account within the option. When the specialist has pushed the "release transactions" button, CASPR can change the projection status on the released accounts to "posted" status.

Additionally, CASPR can determine whether or not it can actually create the "AMTrust" transactions for the released accounts. The user can specify within the administration tool 6E those corporate action types for which CASPR can create "AMTrust" transactions. If CASPR can create the "AMTrust" transactions, it can create them and send them to "AMTrust" for posting in the next end of day batch cycle. In order to create the "AMTrust" transactions for corporate actions, CASPR can reference a table which indicates what kind of transaction(s) to create based on the detailed announcement, price and rate information within CASPR. It also includes certain AMTrust data such as tax and standard codes that are required for AMTrust transaction processing.

The specialist can export CASPR projection/transaction data to a spreadsheet, for example. This function can be used after the payment has been balanced in CASPR. The availability of this "Create Transaction Worksheet" function does not, however, depend on whether or not CASPR can post the transactions.

Processing Status

The processing status of an announcement is used to monitor and manage the progress of the announcement through the various stages of processing. The system is able to automatically set the processing status in at least some embodiments.

Once all the transactions have been posted and all payments have been reconciled, CASPR can automatically move the processing status to completed in a batch process. The above rule, however, applies only in certain situations. For example, if a decision is made not to enter the receipt of securities into CASPR manually (since there can be no automatic feed of this information) the specialist can move the processing status to "completed" manually when all proceeds have been received.

An announcement can remain in some type of "pending" processing status until it is completely posted, all payments received, and all fractional share entitlements appropriately processed. As a result, CASPR must provide some facility for the specialist to change the processing status manually.

If the announcement status was changed to terminated or deleted during a given business day, the system can automatically move the processing status to "completed" in batch processing. This rule applies regardless of the action type.

For some action types/indicators CASPR can automatically move the processing status to "completed" when no transactions need to be generated. This would include Voluntaries where every account elected no action, escrows to maturity, full pre-refunded announcements, informational announcements, and the like. This can be configured by using a rule in the action type table for mandatory corporate actions, but is related to the election chosen for voluntaries.

CASPR can know what announcements are awaiting payment when transactions are projected but all payments have not been received and reconciled.

Electronic Notification of Announcements and Proceeds Projections

In one example operational embodiment, the financial institution 2 provides PFPC a full file of all notifications for their accounts at 7:00 PM nightly. Then, beginning at 6:00 AM (or soon thereafter) hourly incremental files are sent to PFPC for notifications released intraday. These files now include all Corporate action notifications.

Projections can follow the same logic, full file nightly processing for purposes of resynchronizing the PFPC application with CASPR, and incremental processing throughout the day for new, and updated projections. Because projections can occur and change at any time, one aspect of the system can use a more real time type of communication, rather than batch processing.

Accounts who had a projection pending, but have since sold can have a replacement projection record that effectively zeroes out their previous projection. The full projection file from CASPR is the most recent projection for each account. The incremental projections can be brand new projections or replacements for previously sent projections.

Mandatory Workflow

CASPR can incorporate workflow management for non Voluntary Corporate Actions. Additional categories can be added to accommodate important dates indicating action must be taken, such as ex date, meeting date, and other like dates Payment/Processing Workflow CASPR can take in DTC's intraday CCF transmissions of unallocated and allocated payments for processing. A reconcilement between the amounts CASPR is projecting to receive versus the amount received is performed and exceptions are reported accordingly on the specialists' To Do page as "unreconciled payments". Payments received but unable to find a CASPR master can be flagged as "exception payments" on the specialists to do page. Actions for which information is required for transactions and projections, but which information is missing, can be flagged as 'missing information'. Payments, which have been released by CASPR but have not yet received a DTC payment record, can be flagged as "open receivables" in the system.

Real Time Entitlement Processing

Entitlement calculations can be generated and maintained real-time or near real-time based on the entitlement rule for that action type. The specialist can have the ability to override or adjust all positions. Adjustments are be maintained in the CASPR Holders Audit Log. The system 6 can also provide displays into how the eligible position was calculated.

Real Time Proceeds Projections

For Voluntary Corporate Actions, once a response has been captured in the system, CASPR can begin projecting the accounts' proceeds due. All other Corporate Actions can begin projecting once rates and prices have been established. A file can be made available of all cash and stock projections in addition to the projected payment date, and status (e.g., pending, replace, paid). The specialist can view all projections and make adjustments as necessary. The file is available for use with accounting systems, portfolio management workstations, and other systems.

Transaction Automation

CASPR can turn the projections into transactions for transmission to one or more accounting systems.

Volume Reporting for Analysis, Trends and Workflow Management

CASPR can have multiple reports to assist in the management of overall volumes. Specific volumes relating to action types and/or specialist can also be available. Information can be historical, rolled up by month, quarter, year, or other period for trend analysis.

Response Management (Investment Manager/LMC)

The investment manager can have a workflow screen at sign-on that assists with management of corporate actions by requiring response, client, receipt date. It can allow the manager to stay as informed as desired, while ensuring attention is directed to expiring actions requiring an investment decision. An internal financial institution 2 operations contact (LMC) can be assigned to each Investment Manager to assist in the solicitation and response process. They can be able to manage their group of Investment Managers through the same set of workflow management screens.

Response Management (Specialists)

Upon input of the response by the Investment Manager or LMC the shares can automatically be "restricted" from sale, delivery or pledge. The specialist can be alerted to the response if it is on or after the Response Deadline, if the offer is a first-come, first-served offer, or the offering price is dictated by the date an election is submitted. As the specialist instructs the appropriate depository, the system can mark the responses/shares as "submitted" and subsequent responses can be kept separate from the "submitted" responses. As each group of instructions is submitted, "bundles" are created and can correspond to each instruction at the depository.

Withdrawal and/or changes to instructions can be processed automatically if the "bundling" has not yet occurred. If "bundling" has occurred, the withdrawal/change instruction can be displayed on the specialists To Do page for processing. There can be a series of workflow management tools in association with the processing and acceptance of withdrawals so none are missed. Responses can also be sent CCF to DTC and additional workflow management can performed around that process.

Response Enhancement

In another embodiment of the present methods and systems, the system 6 can receive one or more files from a source such as the trade-designated "PFPC" source, for example, and automatically populate CASPR with electronic responses where possible and applicable. This embodiment can provide near straight through processing to reduce risk and streamline the corporate action process. It can be appreciated that controls and reports can be provided in association with processing responses to the corporate action information. An interactive, intra-day web page and an end of day report, for example, can be provided in connection with this embodiment.

In one illustrative, operational example, responses are communicated on a real time or near real time basis from the "PFPC" source into the CASPR system. The PFPC source can write directly to a database table named PFPCResponses, which holds PFPC response information (this is a table in CASPR that corresponds to a table in the PFPC system). In one aspect, a software process in the CASPR system can execute a schedule process that pulls information from the PFPCResponses table and creates new records in an AckResponses table (a table in CASPR). Each response from the PFPC source/system creates a response record in the AckResponses table. In one aspect, for a given corporate action, multi-option responses for an account in one response from PFPC can be treated as a single response in CASPR.

In a sample process flow for receiving responses, PFPC updates the PFPCResponses table. CASPR executes a schedule process periodically that updates each row in PFPCResponses setting a LockFlag to true. For each record in the PFPCResponses table where LockFlag is true, CASPR inserts a new row into the AckResponses table, pulling information from the PFPCResponses table including the following data: CASPR ID, Notification Date Time, Response Number, Book Identifier+Account Identifier, Option Title Response Quantity 1, Option All Indicator 1, Option Title 1, Option Title Response Quantity 2, Option All Indicator 2, Option Title 2, Option Title Response Quantity 3, Option All Indicator 3, Option Title 3, Option Title Response Quantity 4, Option All Indicator 4, Option Title 4, Option Title Response Quantity 5, Option All Indicator 5, Option Title 5, Option Title Response Quantity 6, Option All Indicator 6, Option Title 6, Option Title Response Quantity 7, Option All Indicator 7, Option Title 7, Option Title Response Quantity 8, Option All Indicator 8, Option Title 8, Option Title Response Quantity 9, Option All Indicator 9, Option Title 9, Option Title Response Quantity 10, Option All Indicator 10, and Option Title 10.

In another aspect, CASPR also sets the Status field to "pending" for each row inserted and deletes the contents of the PFPCResponses table where LockFlag is true. For each record in the AckResponses where Status is "pending" (i.e., the records most recently inserted), CASPR can process the response and accordingly set the accepted/rejected field.

In processing responses, CASPR can process each response by first validating the response. If the response is valid, then CASPR can update the holders response table. Just as CASPR maintains the holder audit log for user entries, CASPR can also log audit records for system updates to the holders response table. There are several conditions under which CASPR may reject a response: if the account is not in the Holders table for the CASPRID, CASPR may reject the response; if the account has existing responses, CASPR may reject the response; any change or addition to the original response (regardless of whether the account is fully or partially responded to) can be rejected for automatic processing and require the specialist to update the holder responses; if the instructed quantity is greater than the CASPR eligible position, CASPR can total the response from PFPC (in case of split responses across options) and compare that to the total position for the account across all where-helds, and if the total response is greater than the eligible position, CASPR can reject the response; if the response has an "All" choice selected for more than one option, the response can be rejected; if an election quantity must be given, responses with total quantity of zero can be rejected; if the option title given by PFPC is not found in the master, CASPR can reject the response; if the CASPR ID given by PFPC is not found, CASPR can reject the response; if the same Option Title is given more than once for one response from PFPC, CASPR can reject the response; and, if Option Title is given without a quantity or if quantity is given without an option title, CASPR can reject the response.

In another aspect, with regard to updating Holders and Responses, and if the response is not rejected, CASPR can update the Responses table for the account holding. If the account is split across where-helds, the response is automatically applied to the account in numerical order of the where-held codes. For example, if the account is eligible at WH 77 for 100 shares and eligible at WH 78 for 200 shares and the response is for 250 shares, then the response will be 100 shares at WH77 and 150 at WH78. In another example, assume 78 is an FYI and the account described above has another holding at WH80 for 150 shares. CASPR puts 100 shares at WH77 and 150 shares at WH80. For a response that is split across multiple options, CASPR can distribute the first option across all where-helds as described above. Then CASPR can distribute the second option across all where-helds and so on, as shown in the following example:

Holding:
WH78 has 600 shares
WH79 has 1000 shares
Response:
Option1 500 shares
Option2 500 shares Option3 600 shares
Processed:
WH78:
Option1 500 shares
Option2 100 shares
WH79:
Option1 0 shares
Option2 400 shares In another aspect, a response queue page can be provided that contains an interactive queue where specialists/users can view and acknowledge responses that CASPR has automatically processed. The response queue page can pull directly from the AckResponses table and associated tables for complete offer information. The response queue page allows the user to acknowledge incoming responses and manually respond to items that failed the automated process. There are three separate displays included on the page: one display for all rejects; another display for all accepted responses; and, another display for all acknowledged responses. In one aspect, responses that are acknowledged can be dropped from the reject and accept tables. In another aspect, users are able to acknowledge more than one account at a time by marking multiple accounts. Rejects indicate that a manual update to CASPR is required. In another aspect, the default sort can be made on expiration date, and the default view can be on the To Do user with a dropdown box available, for example, to choose another specialist/user or all specialists/users. Sample response queue page display fields can include the following fields: Specialist, Acknowledgement, CASPR ID, Option Title, Notification DateTime, Instructed quantity, Any&All check, Action type, CUSIP, BROA, description, Exp. datetime, PFPC Resp. date & time, CASPR Resp. date & time, and status message. In one aspect, information in the acknowledged area of the display can show responses that have been acknowledged on the current day.

In operation of the response enhancement embodiment, a "Response Queue" link can be included at the top of the To Do Page under the "My Folder" heading, for example. In one aspect, the "Response Queue" may show the count of incoming responses assigned to the specialist/user that are not acknowledged (this can include accepted and rejected responses). Clicking on the "Response Queue" link takes the user to the "Response Queue Page" where users can view and acknowledge responses. In one aspect, the end-of-the-day response report can include responses not acknowledged at the time the end-of-day process is executed. A top menu item named "Response Queue" can be incorporated that includes a link to take the user to the Response Queue Page showing responses for the current To Do List user.

In another aspect of the response enhancement embodiment, a daily response report can be generated that displays a history of response activity for a certain day. In one aspect, the daily response report is available for any business day prior to the current day. The user can select a date range for CASPR to display all available reports. The user can then choose the date for which the user wants to see the daily response report and the system can retrieve the fixed report archived for that date. The report can be accessed from the main Report Menu within the CASPR system. In one aspect, the report contents can be generated in chronological order according to the PFPC Response Datetime. CASPR can create and store the report to reflect the current day's activity, including all incoming responses and all acknowledged responses that arrived on previous days. The end of day process can also add "cleanup" functionality to remove acknowledged responses from the PFPCResponses table. Daily response report display fields can include the following fields: Specialist, Status, Acknowledgement, CASPR ID, Option Title, Notification Datetime, Instructed quantity, Any/All check, Action type, CUSIP, BROA, description, Exp. date & time, PFPC Resp. date & time, and CASPR Resp. date & time.

In another aspect of the response enhancement embodiment, responses from PFPC are given at the account level. Holdings and responses within CASPR are managed at the where-held level. Therefore, it is possible that one response from PFPC may be applied to more than one holding in CASPR. If an account is split across where-helds, the response is automatically applied to the account in numerical order of the where-held codes. In one aspect a software procedure named UpdateResponses can be executed to do the actual update after the response amount has been determined. The UpdateResponses procedure can also address the making of appropriate audit log entries in connection with response updates/changes.

Multiple Vendors

CASPR can receive multiple vendors and utilize current functionality to resolve updates or discrepancies. Other vendors can include, for example and without limitation, vendors with trade designations of "DTC", "FII", and "Exshare", in addition to swift messages from global sub-custodians such as those processed under a "Chase" trade designation, for example.

Incoming & Outgoing Communication Methods

CASPR can communicate SWIFT in and out of the system 6 (IS015022, MT564-568), with the DTC Global Corporate Action Hub (GCAH), E-mail, Intranet, Internet, and/or with an internal portfolio management system of the financial institution 2, such as the trade-designated "Co-Pilot", "Data Path", or "Ilink" systems, for example.

In other aspects of the present methods and systems, a Withdrawal Privilege data element can be provided as an indicator which is operatively associated with various references to withdrawal date or dates described herein. In one example aspect, the Withdrawal Privilege data element can be set to a "true" condition if a withdrawal date exists which is associated with the Withdrawal Privilege data element.

Figure 39:
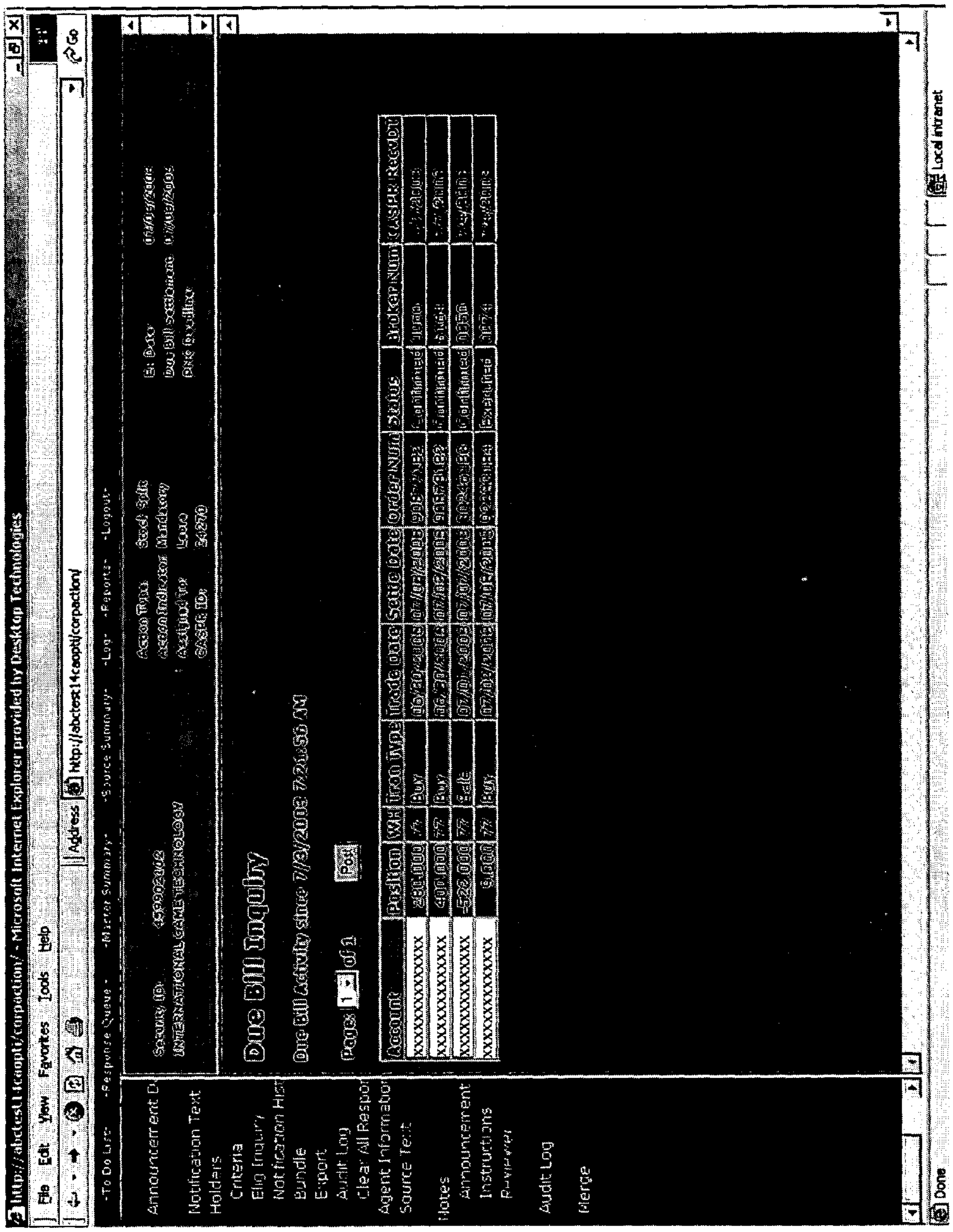

In another example embodiment of the present methods and systems, a Due Bill Inquiry page can be provided as shown in FIG. 39. In one aspect, this inquiry page is specific to those announcements that have due bill settlement dates. In another aspect, this page may be available only on the Master Detail for Mandatory Ex Date Page. Due bill inquiry is available for those announcements after the announcement has been posted. The objective of this inquiry is to identify to the specialist those transactions received after posting (during the due bill period) that will affect eligible positions for the action. The Due Bill Inquiry Page includes a feature that the announcement be posted and have a due bill settlement date. In one aspect, if the announcement is not posted or does not have a due bill settlement date, then the Due Bill Inquiry link is not shown. If the announcement is posted and does have the settlement date, then the page shows each account for that master that has had activity affecting eligibility since the proceeds were last posted for the announcement. The activity presented includes any eligible activity CASPR receives after the "post transaction" button was pressed up to and including the due bill settlement date. In another aspect, for each transaction reported, CASPR shows the account, transaction share/face amount, where held, transaction type, trade date, settlement date, order number, status, broker number, and received date.

The benefits of the present corporate action methods and systems are readily apparent. The present methods and systems can reduce risk by streamlining various processes through reducing manual intervention. Important aspects of corporate action information such as critical dates, for example, can be substantially automatically calculated and tracked to reduce or eliminate omissions or misplacement by personnel of a financial institution. Notifications can be generated and distributed in a timely manner to responsible parties. Aspects of the present methods and systems can route notifications based on software, database and table structures that apply criteria that previously could not be effectively managed in a comparatively more manual environment. It can be seen that these benefits improve customer service by including more timely notification to investors and providing more efficient posting of proceeds, for example, associated with corporate action responses. Other benefits include improved control, reduced risk, and increased operating efficiency of the financial institution.

The examples presented herein are intended to illustrate potential implementations of the present method and system embodiments. It can be appreciated that such examples are intended primarily for purposes of illustration of the present methods and systems to those skilled in the art. No particular aspect or aspects of the example method and system embodiments described herein are intended to limit the scope of the present invention.

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that these and other elements may be desirable. However, because such elements are well known in the art, and because they do not facilitate a better understanding of the present invention, a discussion of such elements is not provided herein.

The term "computer system" as applied herein may include, without limitation, one or more of the following devices: a wireless personal computer, a laptop, a personal digital assistant (PDA), a wireless pager, and a "computer" may be a microcomputer, minicomputer, laptop, personal data assistant, cellular phone, two-way pager, processor, and any other computerized device capable of transmitting, receiving and/or processing data for transmission over a wireless network, a wireline network or a shared network.

The term "computer-readable medium" is defined herein as understood by those skilled in the art. It can be appreciated that various method steps described herein may be performed, in certain embodiments, using instructions stored on a computer-readable medium or media that direct a computer system to perform the method steps. A computer-readable medium can include, for example, memory devices such as diskettes, compact discs of both read-only and writeable varieties, optical disk drives, and hard disk drives. A computer-readable medium can also include memory storage that can be physical, virtual, permanent, temporary, semi-permanent and/or semi-temporary. A computer-readable medium can further include one or more data signals transmitted on one or more carrier waves.

It can be appreciated that, in some embodiments of the present methods and systems disclosed herein, a single component can be replaced by multiple components, and multiple components replaced by a single component, to perform a given function. Except where such substitution would not be operative to practice the present methods and systems, such substitution is within the scope of the present invention.

Whereas particular embodiments of the invention have been described herein for the purpose of illustrating the invention and not for the purpose of limiting the same, it can be appreciated by those of ordinary skill in the art that numerous variations of the details, materials and arrangement of parts may be made within the principle and scope of the invention without departing from the invention as described in the appended claim.

What is claimed is:

1. In a financial institution, a method for managing corporate action information of at least one entity, said method comprising:

electronically receiving data in a corporate action processing system, wherein the data are associated with at least one corporate action of at least one of said entities, wherein said corporate action data includes data associated with at least one of a voluntary corporate action and a mandatory corporate action, wherein the corporate action processing system includes an electronic server computer system and at least one electronic data storage medium;

electronically matching with the server at least a portion of said corporate action data to at least one client of the financial institution;

electronically generating with the server at least one notification including at least a portion of said corporate action data;

electronically performing with the server at least one workflow management activity in connection with generating said notification including said corporate action data;

electronically designating with the server at least one of said mandatory corporate action data and said voluntary corporate action data with a preliminary status;

electronically establishing with the server said preliminary status if at least an important date and a meeting date are not associated with said mandatory corporate action data;

electronically updating said preliminary status once said important date and said meeting date are associated with said mandatory corporate action data; and, recycling at least one announcement associated with said mandatory corporate action data for identifying at least one new holder associated with said mandatory corporate action data.

2. The method of claim 1, further comprising maintaining at least a portion of said mandatory corporate action data in a designated new category pending an indication of review of said mandatory corporate action data.

3. The method of claim 1, further comprising associating at least a portion of said corporate action data with a preparation date category.

4. The method of claim 1, further comprising associating at least a portion of said mandatory corporate action data with at least one important date.

5. The method of claim 1, further comprising associating at least a portion of said mandatory corporate action data with at least one meeting date.

6. The method of claim 1, further comprising associating at least a portion of at least one of said mandatory corporate action data and said voluntary corporate action data with a missing information category.

7. The method of claim 6, further comprising associating said missing information category with said portion of said mandatory corporate action information in connection with identifying at least one important date and rate information for said portion of said mandatory corporate action data.

8. The method of claim 1, further comprising automatically releasing said corporate action data for notification after occurrence of said receiving said corporate action data.

9. The method of claim 8, wherein said corporate action data includes at least mandatory corporate action data.

10. The method of claim 1, further comprising designating at least one of said mandatory corporate action data and said voluntary corporate action data with a preliminary status.

11. The method of claim 10, further including establishing said preliminary status if at least an important date and a meeting date are not associated with said mandatory corporate action data.

12. The method of claim 11, further comprising updating said preliminary status once said important date and said meeting date are associated with said mandatory corporate action data.

13. The method of claim 10, further comprising recycling at least one announcement associated with said mandatory corporate action data for identifying at least one new holder associated with said mandatory corporate action data.

14. The method of claim 1, further comprising identifying an eligibility calculation for application to said corporate action data.

15. The method of claim 14, further comprising executing said eligibility calculation for said corporate action data.

16. The method of claim 15, wherein said eligibility calculation includes a calculation selected from the group consisting of effective date, expiration date, record date, ex date, publication date, odd lot, and default.

17. The method of claim 1, further comprising performing an inquiry regarding traded but not yet settled security transactions that affect eligibility associated with at least a portion of said corporate action data.

18. The method of claim 1, further comprising projecting proceeds associated with at least a portion of said corporate action data.

19. The method of claim 18, wherein said projecting said proceeds includes considering an amount of said proceeds expected to be received, considering a date on which said proceeds are expected to be received and posted, and considering a projection status.

20. The method of claim 18, wherein said portion of said corporate action data includes mandatory corporate action data.

21. The method of claim 20, further comprising basing said projection of said proceeds on at least one of an eligible position associated with said mandatory corporate action data and a rate associated with said mandatory corporate action data.

22. The method of claim 18, wherein said portion of said corporate action data includes voluntary corporate action data.

23. The method of claim 22, further comprising basing said projection of said proceeds on at least a responded position for an option associated with said voluntary corporate action data.

24. The method of claim 18, further comprising generating at least one projection record in association with said projecting of said proceeds.

25. The method of claim 24, further comprising associating at least one of said projection records with a projection status, said projection status selected from a group of statuses consisting of unable to calculate status, no response status, pending status, posted status, and deleted/terminated status.

26. The method of claim 20, further comprising updating previously projected proceeds for said mandatory corporate action data.

27. The method of claim 26, further comprising performing said updating of said previously projected proceeds in association with a change in an eligible position associated with said mandatory corporate action data.

28. The method of claim 26, further comprising performing said updating of said previously projected proceeds in association with a change in a rate included within said mandatory corporate action data.

29. The method of claim 1, further comprising linking a payment item with an active corporate action announcement associated with at least a portion of said corporate action data.

30. The method of claim 1, further comprising establishing a new announcement associated with said corporate action data and linking a payment item to said new announcement.

31. The method of claim 1, further comprising reconciling a payment item received in connection with at least a portion of said corporate action data against a proceeds amount projected for said portion of said corporate action data.

32. The method of claim 1, further comprising processing at least one response received in connection with said corporate action data by updating a holders response table to reflect said response.

33. The method of claim 32, further comprising updating at least one audit log record to reflect said updating of said holders response table.

34. The method of claim 1, further comprising generating a response queue page having an interactive queue including at least one response processed in connection with said corporate action data.

35. The method of claim 1, further comprising generating an end-of-the-day report including at least one response supplied in connection with said corporate action data and not acknowledged at the time of said generating of said end-of-the-day report.

36. The method of claim 1, further comprising generating a daily response report for displaying a history of response activity in connection with said corporate action data for a given period of time.

37. The method of claim 1, further comprising associating at least a portion of said mandatory corporate action data with at least one due bill period.

38. In a financial institution, a computer-readable medium including instructions for causing an electronic computer system to electronically perform a method for managing corporate action information of at least one entity, said medium comprising:

- instructions for electronically receiving data associated with at least one corporate action of at least one of said entities, wherein said corporate action data includes data associated with at least one of a voluntary corporate action and a mandatory corporate action;
- instructions for matching at least a portion of said corporate action data to at least one client of the financial institution;
- instructions for electronically generating at least one notification including at least a portion of said corporate action data;
- instructions for electronically performing at least one workflow management activity in connection with generating said notification including said corporate action data:
- instructions for electronically designating at least one of said mandatory corporate action data and said voluntary corporate action data with a preliminary status;
- instructions for electronically establishing said preliminary status if at least an important date and a meeting date are not associated with said mandatory corporate action data;

instructions for updating said preliminary status once said important date and said meeting date are associated with said mandatory corporate action data; and, instructions for recycling at least one announcement associated with said mandatory corporate action data for identifying at least one new holder associated with said mandatory corporate action data.

39. In a financial institution, a system for managing corporate action information of at least one entity, said system comprising:

means for receiving data associated with at least one corporate action of at least one of said entities, wherein said corporate action data includes data associated with at least one of a voluntary corporate action and a mandatory corporate action;

means for matching at least a portion of said corporate action data to at least one client of the financial institution;

means for generating at least one notification including at least a portion of said corporate action data;

means for performing at least one workflow management activity in connection with generating said notification including said corporate action data:

means for designating at least one of said mandatory corporate action data and said voluntary means for corporate action data with a preliminary status;

means for establishing said preliminary status if at least an important date and a meeting date are not associated with said mandatory corporate action data;

means for updating said preliminary status once said important date and said meeting date are associated with said mandatory corporate action data; and, means for recycling at least one announcement associated with said mandatory corporate action data for identifying at least one new holder associated with said mandatory corporate action data.

40. In a financial institution, a method for managing corporate action information of at least one entity, said method comprising:

electronically receiving data in a corporate action processing system, wherein the data are associated with at least one corporate action of at least one of said entities, wherein said corporate action data includes data associated with at least one of a voluntary corporate action and a mandatory corporate action, wherein the corporate action processing system includes an electronic server computer system and at least one electronic data storage medium;

electronically matching with a server at least a portion of said corporate action data to at least one client of the financial institution;

electronically generating with a server at least one notification including at least a portion of said corporate action data;

electronically performing with a server at least one workflow management activity in connection with electronically generating said notification including said corporate action data;

electronically designating with a server at least one of said mandatory corporate action data and said voluntary corporate action data with a preliminary status;

electronically establishing with a server said preliminary status if at least an important date and a meeting date are not associated with said mandatory corporate action data;

electronically updating with a server said preliminary status once said important date and said meeting date are associated with said mandatory corporate action data; and, recycling at least one announcement associated with said mandatory corporate action data for identifying at least one new holder associated with said mandatory corporate action data.

41. In a financial institution, a method for managing corporate action information of at least one entity, said method comprising:

electronically receiving data in a corporate action processing system, wherein the date are associated with at least one corporate action of at least one of said entities, wherein said corporate action data includes data associated with at least one of a voluntary corporate action and a mandatory corporate action, wherein the corporate action processing system includes an electronic server computer system and at least one electronic data storage medium;

electronically matching with the server at least a portion of said corporate action data to at least one client of the financial institution;

electronically generating with the server at least one notification including at least a portion of said corporate action data;

electronically performing with the server at least one workflow management activity in connection with electronically generating said notification including said corporate action data;

maintaining at least a portion of said mandatory corporate action data in a designated new category pending an indication of review of said mandatory corporate action data;

electronically associating with the server at least a portion of said corporate action data with a preparation date category;

electronically associating with the server at least a portion of said mandatory corporate action data with at least one important date;

associating at least a portion of said mandatory corporate action data with at least one meeting date;

electronically associating with the server at least a portion of at least one of said mandatory corporate action data and said voluntary corporate action data with a missing information category;

electronically associating with the server said missing information category with said portion of said mandatory corporate action information in connection with identifying at least one important date and rate information for said portion of said mandatory corporate action data;

automatically releasing said corporate action data for notification after occurrence of said receiving said corporate action data, wherein said corporate action data includes at least mandatory corporate action data:

electronically designating with the server at least one of said mandatory corporate action data and said voluntary corporate action data with a preliminary status;

electronically establishing with the server said preliminary status if at least an important date and a meeting date are not associated with said mandatory corporate action data;

electronically updating with the server said preliminary status once said important date and said meeting date are associated with said mandatory corporate action data; and, recycling at least one announcement associated with said mandatory corporate action data for identifying at least one new holder associated with said mandatory corporate action data.

42. In a financial institution, a method for managing corporate action information of at least one entity, said method comprising:

electronically receiving data in a corporate action processing system, wherein the data are associated with at least one corporate action of at least one of said entities, wherein said corporate action data includes data associated with at least one of a voluntary corporate action and a mandatory corporate action, wherein the corporate action processing system includes an electronic server computer system and at least one electronic data storage medium;

electronically matching with the server at least a portion of said corporate action data to at least one client of the financial institution;

electronically generating with the server at least one notification including at least a portion of said corporate action data;

electronically performing with the server at least one workflow management activity in connection with generating said notification including said corporate action data;

electronically projecting with the server proceeds associated with at least a portion of said corporate action data, wherein said projecting said proceeds includes considering an amount of said proceeds expected to be received, considering a date on which said proceeds are expected to be received and posted, and considering a projection status, and wherein said portion of said corporate action data includes mandatory corporate action data and voluntary corporate action data;

basing said projection of said proceeds on at least one of an eligible position associated with said mandatory corporate action data and a rate associated with said mandatory corporate action data;

basing said projection of said proceeds on at least a responded position for an option associated with said voluntary corporate action data;

electronically designating with the server at least one of said mandatory corporate action data and said voluntary corporate action data with a preliminary status;

electronically establishing with the server said preliminary status if at least an important date and a meeting date are not associated with said mandatory corporate action data;

electronically updating said preliminary status with the server once said important date and said meeting date are associated with said mandatory corporate action data; and, recycling at least one announcement associated with said mandatory corporate action data for identifying at least one new holder associated with said mandatory corporate action data.

* * * * *

UNITED STATES PATENT AND TRADEMARK OFFICE

CERTIFICATE OF CORRECTION

PATENT NO. : 7,624,052 B1
APPLICATION NO. : 10/631165
DATED : November 24, 2009
INVENTOR(S) : Kimberly D. Seaman et al.

It is certified that error appears in the above-identified patent and that said Letters Patent is hereby corrected as shown below:

Column 76, line 60, delete “data:” and substitute --data;--

Column 77, line 23, delete “data:” and substitute --data;--

Column 77, line 32, delete “and,” and substitute --and--

Column 77, line 50, delete “with a server” and substitute --with the server--

Column 77, line 53, delete “with a server” and substitute --with the server--

Column 77, line 56, delete “with a server” and substitute --with the server--

Column 77, line 61, delete “with a server” and substitute --with the server--

Column 77, line 64, delete “with a server” and substitute --with the server--

Column 78, line 1, delete “with a server” and substitute --with the server--

Column 78, line 13, delete “date” and substitute --data--

Column 78, line 56, delete “data:” and substitute --data;--

Signed and Sealed this

Sixteenth Day of March, 2010

David J. Kappos

David J. Kappos
*Director of the United States Patent and Trademark Office*

UNITED STATES PATENT AND TRADEMARK OFFICE

CERTIFICATE OF CORRECTION

PATENT NO. : 7,624,052 B1
APPLICATION NO. : 10/631165
DATED : November 24, 2009
INVENTOR(S) : Seaman et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1587 days.

Signed and Sealed this

Twenty-sixth Day of October, 2010

David J. Kappos
*Director of the United States Patent and Trademark Office*